US010961338B2

(12) United States Patent
Johnson et al.

(10) Patent No.: US 10,961,338 B2
(45) Date of Patent: Mar. 30, 2021

(54) BOTTLEBRUSH POLYMERS AND USES THEREOF

(71) Applicant: Massachusetts Institute of Technology, Cambridge, MA (US)

(72) Inventors: Jeremiah A. Johnson, Boston, MA (US); Ken Kawamoto, Midland, MI (US); Mingjiang Zhong, Stamford, CT (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/080,503

(22) PCT Filed: Aug. 25, 2017

(86) PCT No.: PCT/US2017/048641
§ 371 (c)(1),
(2) Date: Aug. 28, 2018

(87) PCT Pub. No.: WO2018/039577
PCT Pub. Date: Mar. 1, 2018

(65) Prior Publication Data
US 2020/0123297 A1    Apr. 23, 2020

Related U.S. Application Data

(60) Provisional application No. 62/380,237, filed on Aug. 26, 2016.

(51) Int. Cl.
*C08F 290/06* (2006.01)
(52) U.S. Cl.
CPC .................. *C08F 290/068* (2013.01)
(58) Field of Classification Search
CPC ........ C08G 77/42; C08G 61/08; C08G 63/08; C08G 63/00; C08F 212/08; C08F 277/00; C08F 232/06; C08F 236/10
See application file for complete search history.

(56) References Cited

U.S. PATENT DOCUMENTS

| | | | |
|---|---|---|---|
| 4,359,425 A | 11/1982 | Totani et al. | |
| 5,811,515 A | 9/1998 | Grubbs et al. | |
| 8,067,505 B2 | 11/2011 | Harris et al. | |
| 9,381,253 B2 | 7/2016 | Johnson et al. | |
| 9,447,129 B2 | 9/2016 | Johnson et al. | |
| 9,822,216 B2 | 11/2017 | Mahanthappa et al. | |
| 10,023,536 B2 | 7/2018 | Johnson et al. | |
| 10,105,449 B2 | 10/2018 | Johnson et al. | |
| 10,153,513 B2 | 12/2018 | Grubbs et al. | |
| 10,159,749 B2 | 12/2018 | Johnson et al. | |
| 2002/0183473 A1 | 12/2002 | Matyjaszewski et al. | |
| 2002/0198328 A1 | 12/2002 | L'Alloret | |
| 2003/0004364 A1 | 1/2003 | Yaghi et al. | |
| 2003/0065023 A1 | 4/2003 | Swindell et al. | |
| 2005/0109976 A1 | 5/2005 | Fuchs et al. | |
| 2011/0243848 A1 | 10/2011 | Appel et al. | |
| 2011/0300219 A1 | 12/2011 | Lippard et al. | |
| 2013/0296491 A1 | 11/2013 | Xia et al. | |
| 2013/0324666 A1 | 12/2013 | Yan et al. | |
| 2014/0308234 A1 | 4/2014 | Johnson et al. | |
| 2014/0142249 A1 | 5/2014 | Cho et al. | |
| 2015/0225438 A1 | 8/2015 | Johnson et al. | |
| 2016/0024246 A1* | 1/2016 | Mahanthappa | C08G 63/08 528/354 |
| 2016/0289392 A1 | 10/2016 | Grubbs et al. | |
| 2016/0296631 A1 | 10/2016 | Johnson et al. | |
| 2016/0361702 A1 | 12/2016 | Cohen et al. | |
| 2017/0000909 A1 | 1/2017 | Gianneschi et al. | |
| 2017/0073311 A1 | 3/2017 | Johnson et al. | |
| 2017/0348431 A1 | 12/2017 | Johnson et al. | |
| 2018/0030213 A1 | 2/2018 | Johnson et al. | |
| 2018/0036415 A9 | 2/2018 | Johnson et al. | |
| 2018/0094099 A1 | 4/2018 | Johnson et al. | |

(Continued)

FOREIGN PATENT DOCUMENTS

| | | |
|---|---|---|
| CN | 101412792 A | 4/2009 |
| KR | 20120113694 A | 10/2012 |

(Continued)

OTHER PUBLICATIONS

International Search Report and Written Report for PCT/US17/48641, dated Nov. 9, 2017.
Gestwicki et al., Influencing receptor-ligand binding mechanisms with multivalent ligand architecture. J Am Chem Soc. Dec. 18, 2002;124(50):14922-33.
Burts et al., Using EPR To Compare PEG-branch-nitroxide "Bivalent-Brush Polymers" and Traditional PEG Bottle-Brush Polymers: Branching Makes a Difference. Macromolecules, 2012;45(20):8310-8318. DOI: 10.1021/ma301874d.
International Search Report and Written Opinion for PCT/US2017/044259, dated Jan. 9, 2018.
International Preliminary Report on Patentability for PCT/US2017/044259, dated Feb. 7, 2019.

(Continued)

*Primary Examiner* — Kuo Liang Peng
(74) *Attorney, Agent, or Firm* — Wolf, Greenfield & Sacks, P.C.

(57) ABSTRACT

Provided are new bottlebrush polymers and diblock bottlebrush copolymers, which can self-assemble into structures of desired morphology (e.g., hexagonal cylindrical, gyroid). The self-assembled structures of the bottlebrush polymers and copolymers provide useful materials such as photonics (e.g., photonic crystals), functional materials, chromatography media, stimuli-responsive materials, lubricants, nanolithography, films, and coatings. In certain embodiments, the backbone repeating units of the bottlebrush polymers and copolymers have two different polymeric sidechains covalently attached to the backbone repeating unit through a branched linker, wherein one of the polymeric sidechain is a polysiloxane. Also provided are methods of preparing the bottlebrush polymers and copolymers described herein.

51 Claims, 27 Drawing Sheets

(56) References Cited

U.S. PATENT DOCUMENTS

| | | | |
|---|---|---|---|
| 2018/0258233 | A9 | 9/2018 | Johnson et al. |
| 2019/0030067 | A1 | 1/2019 | Johnson et al. |
| 2019/0038751 | A1 | 2/2019 | Johnson et al. |
| 2019/0038782 | A1 | 2/2019 | Johnson et al. |
| 2019/0054187 | A1 | 2/2019 | Johnson et al. |
| 2019/0192672 | A1 | 6/2019 | Johnson et al. |

FOREIGN PATENT DOCUMENTS

| | | |
|---|---|---|
| WO | WO 2010/047765 A1 | 4/2010 |
| WO | WO 2013/169739 A1 | 11/2013 |
| WO | WO 2014/169073 A1 | 10/2014 |
| WO | WO 2016/023036 A1 | 2/2016 |

OTHER PUBLICATIONS

Extended European Search Report for EP 14782253.0, dated Nov. 11, 2016.
International Preliminary Report on Patentability for PCT/US2014/033554, dated Oct. 22, 2015.
International Search Report and Written Opinion for PCT/US2014/033554, dated Aug. 29, 2014.
International Preliminary Report on Patentability for Application No. PCT/US2017/036447 dated Dec. 20, 2018.
International Search Report and Written Opinion for PCT/US2017/055145, dated Jan. 23, 2018.
International Preliminary Report on Patentability for PCT/US2017/055145, dated Apr. 18, 2019.
International Preliminary Report on Patentability for PCT/US2017/064784, dated Jun. 20, 2019.
International Search Report and Written Opinion for PCT/US2017/064784, dated Mar. 1, 2018.
International Preliminary Report on Patentability for Application No. PCT/US2017/48641 dated Mar. 7, 2019.
International Search Report and Written Opinion for PCT/US2018/040488, dated Oct. 15, 2018.
International Search Report and Written Opinion for PCT/US2018/040494, dated Oct. 10, 2018.
Invitation to Pay Additional Fees for PCT/US2018/040496, mailed on Nov. 21, 2018.
International Search Report and Written Opinion for Application No. PCT/US2018/040496 dated Jan. 14, 2019.
International Preliminary Report on Patentability for PCT/US2018/040488, dated Jan. 9, 2020.
International Preliminary Report on Patentability for PCT/US2018/040494, dated Jan. 9, 2020.
International Preliminary Report on Patentability for PCT/US2018/040496, dated Jan. 9, 2020.
Ahn et al., Two-photon fluorescence microscopy imaging of cellular oxidative stress using profluorescent nitroxides. J Am Chem Soc. Mar. 14, 2012;134(10):4721-30. doi: 10.1021/ja210315x. Epub Mar. 1, 2012.
Aime et al., Lanthanide(III) chelates for NMR biomedical applications. Chem. Soc. Rev., 1998;27:19-29.
Aime et al., Pushing the sensitivity envelope of lanthanide-based magnetic resonance imaging (MRI) contrast agents for molecular imaging applications. Acc Chem Res. Jul. 21, 2009;42(7):822-31. doi: 10.1021/ar800192p.
Alge et al., Synthetically tractable click hydrogels for three-dimensional cell culture formed using tetrazine-norbornene chemistry. Biomacromolecules. Apr. 8, 2013;14(4):949-53. doi: 10.1021/bm4000508. Epub Mar. 8, 2013.
Allen et al., Chemically crosslinked isoreticular metal-organic frameworks. Chem Commun (Camb). Apr. 21, 2013;49(31):3200-2. doi: 10.1039/c3cc40635k. Epub Mar. 14, 2013.
Allen et al., Exploration of chemically cross-linked metal-organic frameworks. Inorg Chem. Jul. 7, 2014;53(13):7014-9. doi: 10.1021/ic500951b. Epub Jun. 19, 2014.
Altintas et al., ATRP-based polymers with modular ligation points under thermal and thermomechanical stress. Polym. Chem., Feb. 2015;6:2854-68.
Altintas et al., Constructing star polymersvia modular ligation strategies. Polym. Chem., 2012;3:34-45. DOI: 10.1039/C1PY00249J.
Amouri et al., Host-guest interactions: design strategy and structure of an unusual cobalt cage that encapsulates a tetrafluoroborate anion. Angew Chem Int Ed Engl. Jul. 18, 2005;44(29):4543-6.
Anderson, Late Transition Metal Complexes of Pentafluorophenylphosphino-Pincer Ligands. Doctoral Thesis. Victoria University of Wellington. 2012:ii, iii, 32.
Angelov et al., EPR and rheological study of hybrid interfaces in gold-clay-epoxy nanocomposites. Langmuir. Nov. 11, 2014;30(44):13411-21. doi: 10.1021/la503361k. Epub Oct. 30, 2014.
Angot et al., Living Radical Polymerization Immobilized on Wang Resins: Synthesis and Harvest of Narrow Polydispersity Poly(methacrylate)s. Macromolecules, 2001;34(4):768-774. DOI: 10.1021/ma0011690.
Anraku et al., Size-controlled long-circulating PICsome as a ruler to measure critical cut-off disposition size into normal and tumor tissues. Chem Commun (Camb). Jun. 7, 2011;47(21):6054-6. doi: 10.1039/c1cc11465d. Epub Apr. 26, 2011.
Arvizo et al., Modulating pharmacokinetics, tumor uptake and biodistribution by engineered nanoparticles. PLoS One. 2011;6(9):e24374. doi: 10.1371/journal.pone.0024374. Epub Sep. 13, 2011.
Aryal et al., Polymeric nanoparticles with precise ratiometric control over drug loading for combination therapy. Mol Pharm. Aug. 1, 2011;8(4):1401-7. doi: 10.1021/mp200243k. Epub Jul. 6, 2011.
Ayala et al., Hierarchical structure and porosity in UiO-66 polyMOFs. Chem Commun (Camb). Mar. 9, 2017;53(21):3058-3061. doi: 10.1039/c6cc10225e.
Bapat et al., Dynamic-covalent nanostructures prepared by Diels—Alder reactions of styrene-maleic anhydride-derived copolymers obtained by one-step cascade block copolymerization. Polym. Chem., 2012;3:3112-3120. DOI: 10.1039/C2PY20351K.
Bapat et al., Redox-Responsive Dynamic-Covalent Assemblies: Stars and Miktoarm Stars. Macromolecules, 2013;46(6):2188-2198. DOI: 10.1021/ma400169m.
Barbour et al., An intermolecular (H2O)10 cluster in a solid-state supramolecular complex. Nature. 1998;393(6686): 671-673.
Barner et al., Synthesis of core-shell poly(divinylbenzene) microspheres via reversible addition fragmentation chain transfer graft polymerization of styrene. J. Polym. Sci. A Polym. Chem., 42: 5067-5076. doi:10.1002/pola.20328.
Barnes et al., Using an RNAi Signature Assay To Guide the Design of Three-Drug-Conjugated Nanoparticles with Validated Mechanisms, In Vivo Efficacy, and Low Toxicity. J Am Chem Soc. Sep. 28, 2016;138(38):12494-501. doi: 10.1021/jacs.6b06321. Epub Sep. 14, 2016.
Barrett et al., pH-Based Regulation of Hydrogel Mechanical Properties Through Mussel-Inspired Chemistry and Processing. Advanced Functional Materials. Mar. 6, 2013;23(9):1111-1119.
Bar-Shir et al., Single 19F Probe for Simultaneous Detection of Multiple Metal Ions Using miCEST MRI. J. Am. Chem. Soc., 2015;137(1):78-81. DOI: 10.1021/ja511313k.
Bates et al., Block Copolymers—Designer Soft Materials. Physics Today 1999;52(2):32-38.
Bates et al., Multiblock polymers: panacea or Pandora's box? Science. Apr. 27, 2012;336(6080):434-40. doi: 10.1126/science.1215368.
Bates et al., Polarity-switching top coats enable orientation of sub-10-nm block copolymer domains. Science. Nov. 9, 2012;338(6108):775-9. doi: 10.1126/science.1226046.
Bates et al., Polymer-polymer phase behavior. Science. Feb. 22, 1991;251(4996):898-905.
Beck et al., Multistimuli, multiresponsive metallo-supramolecular polymers. J Am Chem Soc. Nov. 19, 2003;125(46):13922-3.

(56) References Cited

OTHER PUBLICATIONS

Bender et al., Site-isolated luminescent europium complexes with polyester macroligands: metal-centered heteroarm stars and nanoscale assemblies with labile block junctions. J Am Chem Soc. Jul. 24, 2002;124(29):8526-7.

Binauld et al., Precise Synthesis of Molecularly Defined Oligomers and Polymers by Orthogonal Iterative Divergent/Convergent Approaches. Macromol. Rapid Commun., 32: 147-168. doi:10.1002/marc.201000548.

Blencowe et al., Core cross-linked star polymers via controlled radical polymerisation. Polymer Jan. 2009;50(1):5-32.

Bunco et al., Profluorescent Nitroxides as Sensitive Probes of Oxidative Change and Free Radical Reactions. Australian Journal of Chemistry 2010;64(4):373-389. https://doi.org/10.1071/CH10442.

Boase et al., Molecular imaging with polymers. Polym. Chem., 2012,3, 1384-1389. DOI: 10.1039/C2PY20132A.

Bobko et al., Reversible reduction of nitroxides to hydroxylamines: roles for ascorbate and glutathione. Free Radic Biol Med. Feb. 1, 2007;42(3):404-12. Epub Nov. 10, 2006.

Bohbot-Raviv et al., Discovering new ordered phases of block copolymers. Phys Rev Lett. Oct. 16, 2000;85(16):3428.

Bolton et al., Synthesis and Melt Self-Assembly of PS-PMMA-PLA Triblock Bottlebrush Copolymers. Macromolecules, 2014;47(9):2864-74. DOI: 10.1021/ma500625k.

Brasch et al., Work in progress: nuclear magnetic resonance study of a paramagnetic nitroxide contrast agent for enhancement of renal structures in experimental animals. Radiology. Jun. 1983;147(3):773-9.

Brasch, Work in progress: methods of contrast enhancement for NMR imaging and potential applications. A subject review. Radiology. Jun. 1983;147(3):781-8.

Brown et al., Halide-induced supramolecular ligand rearrangement. J Am Chem Soc. Nov. 10, 2004;126(44):14316-7.

Brummelhuis et al., Stimuli-responsive star polymers through thiol—yne core functionalization/crosslinking of block copolymer micelles. Polym. Chem., 2011;2:1180-1184. DOI: 10.1039/C1PY00002K.

Budil et al., Nonlinear-Least-Squares Analysis of Slow-Motion EPR Spectra in One and Two Dimensions Using a Modified Levenberg—Marquardt Algorithm. Elsevier. Journal of Magnetic Resonance, Series A. Jun. 1996;120(2):155-189.

Buerkle et al., Supramolecular gels formed from multi-component low molecular weight species. Chem Soc Rev. Sep. 21, 2012;41(18):6089-102. doi: 10.1039/c2cs35106d. Epub Jun. 7, 2012.

Bunzen et al., Self-assembly of M24L48 polyhedra based on empirical prediction. Angew Chem Int Ed Engl. Mar. 26, 2012;51(13):3161-3. doi: 10.1002/anie.201108731.

Burdynska et al., Synthesis of Star Polymers Using ARGET ATRP. Macromolecules, 2010;43(22):9227-9229. DOI: 10.1021/ma101971z.

Burnworth et al., Decoupling Optical Properties in Metallo-Supramolecular Poly (p-phenylene ethynylene)s. Macromolecules. 2008;41(6):2157-2163.

Burnworth et al., Optically healable supramolecular polymers. Nature. Apr. 21, 2011;472(7343):334-7. doi: 10.1038/nature09963.

Burts et al., Brush-first and click: efficient synthesis of nanoparticles that degrade and release doxorubicin in response to light. Photochem Photobiol. Mar.-Apr. 2014;90(2):380-5. doi: 10.1111/php.12182. Epub Nov. 25, 2013.

Burts et al., Brush-first synthesis of core-photodegradable miktoarm star polymers via ROMP: towards photoresponsive self-assemblies. Macromol Rapid Commun. Jan. 2014;35(2):168-173. doi: 10.1002/marc.201300618. Epub Nov. 22, 2013.

Burts et al., Using EPR To Compare PEG-branch-nitroxide "Bivalent-Brush Polymers" and Traditional PEG Bottle—Brush Polymers: Branching Makes a Difference. Macromolecules. 2012;45(20):8310-18.

Cabral et al., Accumulation of sub-100 nm polymeric micelles in poorly permeable tumours depends on size. Nat Nanotechnol. Oct. 23, 2011;6(12):815-23. doi: 10.1038/nnano.2011.166.

Caiolfa et al., Polymer-bound camptothecin: initial biodistribution and antitumour activity studies. J Control Release. Mar. 1, 2000;65(1-2):105-19.

Calvez et al., One step synthesis of MOF—polymer composites. RSC Adv., 2016;6:17314-7.

Campos-Fernández et al., A One-Pot, High-Yield Synthesis of a Paramagnetic Nickel Square from Divergent Precursors by Anion Template Assembly. Angewandte Chemie International Edition. Dec. 3, 1999;38(23):3477-3479.

Campos-Fernández et al., Fine-tuning the ring-size of metal-lacyclophanes: a rational approach to molecular pentagons. J Am Chem Soc. Jan. 31, 2001;123(4):773-4.

Caravan et al., Gadolinium(III) Chelates as MRI Contrast Agents: Structure, Dynamics, and Applications. Chem Rev. Sep. 8, 1999;99(9):2293-352.

Castilla et al., Stereochemistry in subcomponent self-assembly. Acc Chem Res. Jul. 15, 2014;47(7):2063-73. doi: 10.1021/ar5000924. Epub May 2, 2014.

Chakrabarty et al., Supramolecular coordination: self-assembly of finite two- and three-dimensional ensembles. Chem Rev. Nov. 9, 2011;111(11):6810-918. doi: 10.1021/cr200077m. Epub Aug. 24, 2011.

Chambron et al., Topologically complex molecules obtained by transition metal templation: it is the presentation that determines the synthesis strategy. New Journal of Chemistry. 2013;37(1):49-57.

Chand et al., Self-assembly of a novel macrotricyclic Pd(II) metal-locage encapsulating a nitrate ion. Chem Commun (Camb). Sep. 7, 2001;(17):1652-3.

Chang et al., Dose-dense chemotherapy improves mechanisms of antitumor immune response. Cancer Res. Jan. 1, 2013;73(1):119-27. doi: 10.1158/0008-5472.CAN-12-2225. Epub Oct. 29, 2012.

Chen et al., Polymeric phosphorylcholine-camptothecin conjugates prepared by controlled free radical polymerization and click chemistry. Bioconjug Chem. Dec. 2009;20(12):2331-41. doi: 10.1021/bc900339x.

Chen et al., Synthesis of superporous hydrogels: hydrogels with fast swelling and superabsorbent properties. J Biomed Mater Res. Jan. 1999;44(1):53-62.

Cheng et al., Well-defined diblock macromonomer with a norbornene group at block junction: anionic living linking synthesis and ring-opening metathesis polymerization. Macromol. Mar. 4, 2010;43(7):3153-5.

Cheon et al., Synergistically integrated nanoparticles as multimodal probes for nanobiotechnology.Acc Chem Res. Dec. 2008;41(12):1630-40. doi: 10.1021/ar800045c.

Chiang et al., Vitamin D for the prevention and treatment of pancreatic cancer. World J Gastroenterol. Jul. 21, 2009;15(27):3349-54.

Chifotides et al., Anion-π interactions in supramolecular architectures. Acc Chem Res. Apr. 16, 2013;46(4):894-906. doi: 10.1021/ar300251k. Epub Mar. 11, 2013.

Choi et al., Self-confirming "AND" logic nanoparticles for fault-free MRI. J Am Chem Soc. Aug. 18, 2010;132(32):11015-7. doi: 10.1021/ja104503g.

Chou et al., In vitro and in vivo studies of FePt nanoparticles for dual modal CT/MRI molecular imaging. J Am Chem Soc. Sep. 29, 2010;132(38):13270-8. doi: 10.1021/ja1035013.

Clever et al., Inclusion of anionic guests inside a molecular cage with palladium(II) centers as electrostatic anchors. Angew Chem Int Ed Engl. 2009;48(38):7010-2. doi: 10.1002/anie.200902717.

Cok et al., Synthesis of Model Network Hydrogels via Tetrazine-Olefin Inverse Electron Demand Diels-Alder Cycloaddition. Macromolecular Symposia. Jul. 2013;329(1):108-112.

Conrad et al., Tunable, temperature-responsive polynorbornenes with side chains based on an elastin peptide sequence. Angew Chem Int Ed Engl. 2009;48(44):8328-30. doi: 10.1002/anie.200903888.

Cook et al., Biomedical and biochemical applications of self-assembled metallacycles and metallacages. Acc Chem Res. Nov. 19, 2013;46(11):2464-74. doi: 10.1021/ar400010v. Epub Jun. 20, 2013.

Cook et al., Metal-organic frameworks and self-assembled supramolecular coordination complexes: comparing and contrasting

(56) References Cited

OTHER PUBLICATIONS the design, synthesis, and functionality of metal-organic materials. Chem Rev. Jan. 9, 2013;113(1):734-77. doi: 10.1021/cr3002824. Epub Nov. 2, 2012.

Cook et al., Recent Developments in the Preparation and Chemistry of Metallacycles and Metallacages via Coordination. Chem Rev. Aug. 12, 2015;115(15):7001-45. doi: 10.1021/cr5005666. Epub Mar. 27, 2015.

Cordier et al., Self-healing and thermoreversible rubber from supramolecular assembly. Nature. Feb. 21, 2008;451(7181):977-80. doi: 10.1038/nature06669.

Dag et al., Three-arm star ring opening metathesis polymers via alkyne-azide click reaction. J. Polym. Sci. A Polym. Chem., 47: 2344-2351. doi:10.1002/pola.23324.

Dalsin et al., Bottlebrush block polymers: Quantitative theory and experiments. ACS Nano. Nov. 6, 2015;9(12):12233-45.

Davies et al., Environmentally responsive MRI contrast agents. Chem Commun (Camb). Oct. 28, 2013;49(84):9704-21. doi: 10.1039/c3cc44268c.

Davis et al., A novel nitroxide is an effective brain redox imaging contrast agent and in vivo radioprotector. Free Radic Biol Med. Aug. 1, 2011;51(3):780-90. doi: 10.1016/j.freeradbiomed.2011.05.019. Epub May 25, 2011.

Davis et al., Atom transfer radical polymerization of tert-butyl acrylate and preparation of block copolymers. Macromol. May 30, 2000;33(11):4039-47.

Davis et al., Nanoparticle therapeutics: an emerging treatment modality for cancer. Nat Rev Drug Discov. Sep. 2008;7(9):771-82. doi: 10.1038/nrd2614.

De La Cruz et al., Theory of microphase separation in graft and star copolymers. Macromolecules, 1986;19(10):2501-8. DOI: 10.1021/ma00164a008.

Desmarets et al., Design, Self-Assembly, and Molecular Structures of 3D Copper(II) Capsules Templated by BF4—Guest Anions. European Journal of Inorganic Chemistry. Oct. 2009;(29-30):4396-4400. doi: 10.1002/ejic.200900606.

Detappe et al., Advanced multimodal nanoparticles delay tumor progression with clinical radiation therapy. J Control Release. Sep. 28, 2016;238:103-113. doi: 10.1016/j.jconrel.2016.07.021. Epub Jul. 14, 2016.

Dhar et al., Polyvalent oligonucleotide gold nanoparticle conjugates as delivery vehicles for platinum(IV) warheads. J Am Chem Soc. Oct. 21, 2009;131(41):14652-3. doi: 10.1021/ja9071282.

Dhar et al., Targeted delivery of a cisplatin prodrug for safer and more effective prostate cancer therapy in vivo. Proc Natl Acad Sci U S A. Feb. 1, 2011;108(5):1850-5. doi: 10.1073/pnas.1011379108. Epub Jan. 13, 2011.

Dhar et al., Targeted delivery of cisplatin to prostate cancer cells by aptamer functionalized Pt(IV) prodrug-PLGA-PEG nanoparticles. Proc Natl Acad Sci U S A. Nov. 11, 2008;105(45):17356-61. doi: 10.1073/pnas.0809154105. Epub Oct. 31, 2008.

Ding et al., BRD4 is a novel therapeutic target for liver fibrosis. Proc Natl Acad Sci U S A. Dec. 22, 2015;112(51):15713-8. doi: 10.1073/pnas.1522163112. Epub Dec. 7, 2015.

Doane et al., The unique role of nanoparticles in nanomedicine: imaging, drug delivery and therapy. Chem Soc Rev. Apr. 7, 2012;41(7):2885-911. doi: 10.1039/c2cs15260f. Epub Jan. 27, 2012.

Duncan, The dawning era of polymer therapeutics. Nat Rev Drug Discov. May 2003;2(5):347-60.

Durr et al., Mild and Efficient Modular Synthesis of Poly(acrylonitrile-co-butadiene) Block and Miktoarm Star Copolymer Architectures. Macromolecules, 2013;46(1):49-62. DOI: 10.1021/ma302017c.

Elliott et al., Metabolism of brain tissue slices and suspensions from various mammals. J Neurophysiol. Nov. 1948;11(6):473-84.

Eryazici et al., Square-planar Pd(II), Pt(II), and Au(III) terpyridine complexes: their syntheses, physical properties, supramolecular constructs, and biomedical activities. Chem Rev. Jun. 2008;108(6):1834-95. doi: 10.1021/cr0781059.

Eryazici et al., Two Large-Pore Metal-Organic Frameworks Derived from a Single Polytopic Strut. Crystal Growth & Design. Mar. 7, 2012;12(3):1075-1080.

Feng et al., A metabonomic analysis of organ specific response to USPIO administration. Biomaterials. Sep. 2011;32(27):6558-69. doi: 10.1016/j.biomaterials.2011.05.035.

Fenlon et al., The Thread & Cut Method: Syntheses of Molecular Knot Precursors. Eur J Org Chem. Jun. 2008;2008(18):3065-3068.

Ferrauto et al., Lanthanide-loaded erythrocytes as highly sensitive chemical exchange saturation transfer MRI contrast agents. J Am Chem Soc. Jan. 15, 2014;136(2):638-41. doi: 10.1021/ja411793u. Epub Dec. 30, 2013.

Forgan et al., Chemical topology: complex molecular knots, links, and entanglements. Chem Rev. Sep. 14, 2011;111(9):5434-64. doi: 10.1021/cr200034u. Epub Jun. 21, 2011.

Foster et al., Differentially Addressable Cavities within Metal-Organic Cage-Cross-Linked Polymeric Hydrogels. J Am Chem Soc. Aug. 5, 2015;137(30):9722-9. doi: 10.1021/jacs.5b05507. Epub Jul. 23, 2015.

Fox et al., Soluble polymer carriers for the treatment of cancer: the importance of molecular architecture. Acc Chem Res. Aug. 18, 2009;42(8):1141-51. doi: 10.1021/ar900035f.

Frechet. Functional polymers and dendrimers: reactivity, molecular architecture, and interfacial energy. Science. Mar. 25, 1994;263(5154):1710-5.

Fujita et al., Coordination assemblies from a Pd(II)-cornered square complex. Acc Chem Res. Apr. 2005;38(4):371-80.

Fujita et al., Metal-directed self-assembly of two- and three-dimensional synthetic receptors. Chem. Soc. Rev., 1998;27:417-25. doi: 10.1039/A827417Z.

Fujita et al., Self-Assembly of M30L60 Icosidodecahedron. Chem 2016;1:91.

Fujita et al., Self-assembly of ten molecules into nanometre-sized organic host frameworks. Nature Nov. 1995;378:469-71. doi:10.1038/378469a0.

Fullenkamp et al., Mussel-Inspired Histidine-Based Transient Network Metal Coordination Hydrogels. Macromolecules. Jan. 18, 2013;46(3):1167-1174.

Furukawa et al., Structuring of metal-organic frameworks at the mesoscopic/macroscopic scale. Chem Soc Rev. Aug. 21, 2014;43(16):5700-34. doi: 10.1039/c4cs00106k.

Furukawa et al., The chemistry and applications of metal-organic frameworks. Science. Aug. 30, 2013;341:1230444. doi: 10.1126/science.1230444.

Gadzikwa et al., Covalent surface modification of a metal-organic framework: selective surface engineering via Cu(I)-catalyzed Huisgen cycloaddition. Chem Commun (Camb). Nov. 21, 2008;(43):5493-5. doi: 10.1039/b805101a. Epub Oct. 8, 2008.

Gamage et al., MOF-5-Polystyrene: Direct Production from Monomer, Improved Hydrolytic Stability, and Unique Guest Adsorption. Angew Chem Int Ed Engl. Sep. 19, 2016;55(39):12099-103. doi: 10.1002/anie.201606926. Epub Aug. 24, 2016.

Gao et al., Development of star polymers as unimolecular containers for nanomaterials. Macromol Rapid Commun. May 14, 2012;33(9):722-34. doi: 10.1002/marc.201200005. Epub Mar. 14, 2012.

Gao et al., Modular Approaches to Star and Miktoarm Star Polymers by ATRP of Cross-Linkers. Macromol. Symp., 291-292: 12-16. doi:10.1002/masy.201050502.

Gao et al., Synthesis of Acid-Labile PEG and PEG-Doxorubicin-Conjugate Nanoparticles via Brush-First ROMP. ACS Macro Lett. Sep. 16, 2014;3(9):854-857. Epub Aug. 13, 2014.

Gao et al., Synthesis of functional polymers with controlled architecture by CRP of monomers in the presence of cross-linkers: From stars to gels. Progress in Polymer Science Apr. 2009;34(4):317-350.

Gao et al., Synthesis of Star Polymers by A New "Core-First" Method: Sequential Polymerization of Cross-Linker and Monomer. Macromolecules, 2008;41(4):1118-1125.

Ge et al., A Pyrene-functionalized Polynorbornene for Ratiometric Fluorescence Sensing of Pyrophosphate. Chem. Asian J. 2016;11:687.

Gilgorich et al., Palladium-catalyzed reductive coupling of styrenes and organostannanes under aerobic conditions. J Am Chem Soc. Nov. 21, 2007;129(46):14193-5. Epub Oct. 27, 2007.

(56) References Cited

OTHER PUBLICATIONS

Glunde et al., Magnetic resonance spectroscopy in metabolic and molecular imaging and diagnosis of cancer. Chem Rev. May 12, 2010;110(5):3043-59. doi: 10.1021/cr9004007.
Godugu et al., Abstract 2139: Effect of telmisartan on triple negative breast cancer (TNBC) and lung cancer tumor progression and intratumoral distribution of nanoparticles. Cancer Res. 2013;73(8).
Goh et al., Highly efficient synthesis of low polydispersity core cross-linked star polymers by Ru—catalyzed living radical polymerization. Macromol Rapid Commun. Mar. 2, 2011;32(5):456-61. doi: 10.1002/marc.201000641. Epub Jan. 7, 2011.
Goto et al., "Clickable" metal-organic framework. J Am Chem Soc. Nov. 5, 2008;130(44):14354-5. doi: 10.1021/ja7114053. Epub Oct. 8, 2008.
Grahovac et al., Abstract B41: The angiotensin receptor blocker telmisartan inhibits the growth of pancreatic ductal adenocarcinoma and improves survival. Cancer Res. 2016;76(24).
Grason et al., Geometric theory of diblock copolymer phases. Phys Rev Lett. Jul. 31, 2003;91(5):058304.
Greenwald et al., Effective drug delivery by PEGylated drug conjugates. Adv Drug Deliv Rev. Feb. 10, 2003;55(2):217-50.
Gu et al., PolyMOF Nanoparticles: Dual Roles of a Multivalent polyMOF Ligand in Size Control and Surface Functionalization. Angewandte Chemie Int. Ed. 2019;58:2-8. Epub Sep. 10, 2019.
Gumbley et al., Photoresponsive Polymers Containing Nitrobenzyl Esters via Ring-Opening Metathesis Polymerization. Macromolecules. 2011;44(20):7956-61.
Hackelbusch et al., Chain Dynamics in Supramolecular Polymer Networks. Macromolecules. 2013;46(15):6273-6286.
Hackelbusch et al., Multiresponsive Polymer Hydrogels by Orthogonal Supramolecular Chain Cross-Linking. Macromolecules. 2014;47(12):4028-4036.
Haddleton et al., Well-defined oligosaccharide-terminated polymers from living radical polymerization. Biomacromolecules. 2000 Summer;1(2):152-6.
Hafkamp et al., Organogel formation and molecular imprinting by functionalized gluconamides and their metal complexes. Chemical Communications. 1997;6:545-546. doi: 10.1039/A608266A.
Hall et al., Platinum(IV) antitumour compounds: their bioinorganic chemistry. Coord Chem Rev. 2002;232:49-67.
Hall et al., The cellular distribution and oxidation state of platinum(II) and platinum(IV) antitumour complexes in cancer cells. J Biol Inorg Chem. Sep. 2003;8(7):726-32. Epub Jul. 12, 2003.
Han et al., Recent Development of Peptide Coupling Reagents in Organic Synthesis. Tetrahedron, 2004;60:2447-2467.
Hansell et al., Additive-free clicking for polymer functionalization and coupling by tetrazine-norbornene chemistry. J Am Chem Soc. Sep. 7, 2011;133(35):13828-31. doi: 10.1021/ja203957h. Epub Aug. 11, 2011.
Hao et al., Dendrimers as scaffolds for multifunctional reversible addition—fragmentation chain transfer agents: Syntheses and polymerization. J. Polym. Sci. A Polym. Chem., 2004;42:5877-5890. doi:10.1002/pola.20434.
Hardy et al., Generation of metallosupramolecular polymer gels from multiply functionalized grid-type complexes. New J. Chem., 2012;36:668-73.
Harrington et al., Holdfast heroics: comparing the molecular and mechanical properties of Mytilus californianus byssal threads. J Exp Biol. Dec. 2007;210(Pt 24):4307-18.
Harrington et al., Iron-clad fibers: a metal-based biological strategy for hard flexible coatings. Science. Apr. 9, 2010;328(5975):216-20. doi: 10.1126/science.1181044. Epub Mar. 4, 2010.
Harris et al., Giant hollow M(n)L(2n) spherical complexes: structure, functionalisation and applications. Chem Commun (Camb). Aug. 4, 2013;49(60):6703-12. doi: 10.1039/c3cc43191f.
Harrison et al., A multimeric MR-optical contrast agent for multimodal imaging. Chem Commun (Camb). Oct. 9, 2014;50(78):11469-71. doi: 10.1039/c4cc05651e.

Harrison et al., Multimeric Near IR-MR Contrast Agent for Multimodal In Vivo Imaging. J Am Chem Soc. Jul. 22, 2015;137(28):9108-16. doi: 10.1021/jacs.5b04509. Epub Jul. 14, 2015.
Harvey et al., Lanthanide Complexes as Paramagnetic Probes for 19F Magnetic Resonance. Eur. J. Inorg. Chem., 2012: 2015-2022. doi:10.1002/ejic.201100894.
Hatje et al., Increases in Anthropogenic Gadolinium Anomalies and Rare Earth Element Concentrations in San Francisco Bay over a 20 Year Record. Environ Sci Technol. Apr. 19, 2016;50(8):4159-68. doi: 10.1021/acs.est.5b04322. Epub Jan. 25, 2016.
Hawker et al., Preparation of polymers with controlled molecular architecture. A new convergent approach to dendritic macromolecules. J Am Chem Soc. Oct. 1990;112(21):7638-47.
Hedrick et al., Dendrimer-like Star Block and Amphiphilic Copolymers by Combination of Ring Opening and Atom Transfer Radical Polymerization. Macromolecules, 1998;31(25):8691-8705. DOI: 10.1021/ma980932b.
Hein et al., Copper-catalyzed azide-alkyne cycloaddition (CuAAC) and beyond: new reactivity of copper(I) acetylides. Chem Soc Rev. Apr. 2010;39(4):1302-15. doi: 10.1039/b904091a. Epub Mar. 4, 2010.
Helms et al., One-Pot Reaction Cascades Using Star Polymers with Core-Confined Catalysts. Angewandte Chemie, 2005;44:6384-6387. doi:10.1002/ange.200502095.
Heroguez et al., Novel Styrene—Butadiene Copolymers by Ring-Opening Metathesis Polymerization. Macromol. Oct. 3, 2000;33(20):7241-8.
Hirakawa et al., Removal of Perchlorate Anion from an Aqueous Solution by Encapsulation in an Anion-templated Self-assembled Molecular Capsule. Chemistry Letters. 2009;38(3):290-291.
Holbrook et al., Gd(III)-Dithiolane Gold Nanoparticles for T1-Weighted Magnetic Resonance Imaging of the Pancreas. Nano Lett. May 11, 2016;16(5):3202-9. doi: 10.1021/acs.nanolett.6b00599. Epub Apr. 20, 2016.
Holliday et al., Strategies for the Construction of Supramolecular Compounds through Coordination Chemistry. Angew Chem Int Ed Engl. Jun. 1, 2001;40(11):2022-2043.
Holten-Andersen et al., Metal-coordination: using one of nature's tricks to control soft material mechanics. J. Mater. Chem. B. 2014;2:2467-2472.
Holten-Andersen et al., pH-induced metal-ligand cross-links inspired by mussel yield self-healing polymer networks with near-covalent elastic moduli. PNAS. Feb. 15, 2011;108:2651-2655.
Hoogenboom et al., 1-Lactide Polymerization Utilizing a Hydroxy-Functionalized 3,6-Bis(2-pyridyl)pyridazine as Supramolecular (Co)initiator: Construction of Polymeric [2×2] Grids. Macromolecules, 2003;36(13):4743-9. DOI: 10.1021/ma034119e.
Hosono et al., Metal-Organic Polyhedral Core as a Versatile Scaffold for Divergent and Convergent Star Polymer Synthesis. J Am Chem Soc. May 25, 2016;138(20):6525-31. doi: 10.1021/jacs.6b01758. Epub May 11, 2016.
Hu et al., Enhancing Gelation of Doubly Thermosensitive Hydrophilic ABC Linear Triblock Copolymers in Water by Thermoresponsive Hairy Nanoparticles. Macromolecules, 2016;49(15):5502-13. DOI: 10.1021/acs.macromol.6b01156.
Hu et al., Nanoparticle-based combination therapy toward overcoming drug resistance in cancer. Biochem Pharmacol. Apr. 15, 2012;83(8):1104-11. doi: 10.1016/j.bcp.2012.01.008. Epub Jan. 18, 2012.
Huang et al., Polymer-Stabilized Perfluorobutane Nanodroplets for Ultrasound Imaging Agents. J Am Chem Soc. Jan. 11, 2017;139(1):15-18. doi: 10.1021/jacs.6b08800. Epub Dec. 29, 2016.
Huinink et al., Topotecan versus paclitaxel for the treatment of recurrent epithelial ovarian cancer. J Clin Oncol. Jun. 1997;15(6):2183-93.
Huynh, Novel Polymeric Micelles via RAFT Polymerization for Platinum Drug Delivery. Doctoral Thesis. The University of New South Wales. 2012:i, 57-58.
Hyodo et al., Assessment of tissue redox status using metabolic responsive contrast agents and magnetic resonance imaging. J Pharm Pharmacol. Aug. 2008;60(8):1049-60. doi: 10.1211/jpp.60.8.0011.

(56) References Cited

OTHER PUBLICATIONS

Hyodo et al., Brain redox imaging using blood-brain barrier-permeable nitroxide MRI contrast agent. J Cereb Blood Flow Metab. Jun. 2008;28(6):1165-74. doi: 10.1038/jcbfm.2008.5. Epub Feb. 13, 2008.

Hyodo et al., Probing the intracellular redox status of tumors with magnetic resonance imaging and redox-sensitive contrast agents. Cancer Res. Oct. 15, 2006;66(20):9921-8.

Iha et al., Applications of Orthogonal "Click" Chemistries in the Synthesis of Functional Soft Materials. Chem. Rev., 2009;109(11):5620-5686. DOI: 10.1021/cr900138t.

Inglis et al., Well-defined star shaped polymer-fullerene hybrids via click chemistry. Soft Matter, 2010;6:82-84. DOI: 10.1039/B920806M.

Jackson et al., pH triggered self-assembly of core cross-linked star polymers possessing thermoresponsive cores. Chem. Commun., 2011;47:6807-6809. DOI: 10.1039/C1CC11785H.

Jakubowski et al., Activators regenerated by electron transfer for atom transfer radical polymerization of styrene. Macromol. Jan. 10, 2006;39(1):39-45.

Jamieson et al., Structure, Recognition, and Processing of Cisplatin-DNA Adducts. Chem Rev. Sep. 8, 1999;99(9):2467-98.

Jansze et al., Ligand Aspect Ratio as a Decisive Factor for the Self-Assembly of Coordination Cages. J Am Chem Soc. Feb. 17, 2016;138(6):2046-54. doi: 10.1021/jacs.5b13190. Epub Feb. 8, 2016.

Jeong et al., Highly tunable self-assembled nanostructures from a poly (2-vinylpyridine-b-dimethylsiloxane) block copolymer. Nano Lett. Sep. 27, 2011;11(10):4095-101.

Jesberger et al., Hyperbranched polymers as scaffolds for multi-functional reversible addition—fragmentation chain-transfer agents: A route to polystyrene-core-polyesters and polystyrene-block-poly(butyl acrylate)-core-polyesters. J. Polym. Sci. A Polym. Chem., 2003;41:3847-3861. doi:10.1002/pola.10976.

Jiang et al., Iterative Exponential Growth Synthesis and Assembly of Uniform Diblock Copolymers. J Am Chem Soc. Aug. 3, 2016;138(30):9369-72. doi: 10.1021/jacs.6b04964. Epub Jul. 20, 2016.

Jiang et al., Morphology and Phase Diagram of Comb Block Copolymer A m+1 (BC) m. J Phys Chem B. May 7, 2009;113(21):7462-7.

Jiang et al., Thiophene-coated functionalized M12L24 spheres: synthesis, characterization, and electrochemical properties. Chem Asian J. Oct. 2012;7(10):2230-4. doi: 10.1002/asia.201200413. Epub Jul. 9, 2012.

Johnson et al., Construction of Linear Polymers, Dendrimers, Networks, and Other Polymeric Architectures by Copper-Catalyzed Azide-Alkyne Cycloaddition "Click" Chemistry. Macromol Rapid Commun Jul. 2008;29(12-13):1052-72.

Johnson et al., Core-clickable PEG-branch-azide bivalent-bottle-brush polymers by ROMP: grafting-through and clicking-to. J Am Chem Soc. Jan. 26, 2011;133(3):559-66. doi: 10.1021/ja108441d. Epub Dec. 13, 2010.

Johnson et al., Drug-loaded, bivalent-bottle-brush polymers by graft-through ROMP. Macromolecules. Dec. 28, 2010;43(24):10326-10335.

Johnson et al., Efficient Synthesis of Doxorubicin Releasing Brush Polymers by Graft-Through Romp. Polymer Preprints. 2010;51(2):96-97.

Johnson et al., Synthesis of degradable model networks via ATRP and click chemistry. J Am Chem Soc. May 24, 2006;128(20):6564-5.

Jokerst et al., Molecular imaging with theranostic nanoparticles. Acc Chem Res. Oct. 18, 2011;44(10):1050-60. doi: 10.1021/ar200106e. Epub Sep. 15, 2011.

Jokerst et al., Nanoparticle PEGylation for imaging and therapy. Nanomedicine (Lond). Jun. 2011;6(4):715-28. doi: 10.2217/nnm.11.19.

Joralemon et al., PEGylated polymers for medicine: from conjugation to self-assembled systems. Chem Commun (Camb). Mar. 7, 2010;46(9):1377-93. doi: 10.1039/b920570p. Epub Jan. 28, 2010.

Jung et al., Orientation-controlled self-assembled nanolithography using a polystyrene-polydimethylsiloxane block copolymer. Nano Lett. Jul. 11, 2007;7(7):2046-50.

Kale et al., Supramolecular assemblies of amphiphilic homopolymers. Langmuir. May 19, 2009;25(17):9660-70.

Kalyani et al., Oxidatively intercepting Heck intermediates: Pd-catalyzed 1,2- and 1,1-arylhalogenation of alkenes. J Am Chem Soc. Feb. 20, 2008;130(7):2150-1. doi: 10.1021/ja0782798. Epub Jan. 30, 2008.

Kawamoto et al., Dual Role for 1,2,4,5-Tetrazines in Polymer Networks: Combining Diels-Alder Reactions and Metal Coordination To Generate Functional Supramolecular Gels. ACS Macro Letters 2015;4(4):458-61. doi: 10.1021/acsmacrolett.5b00221.

Kawamoto et al., Graft-through Synthesis and Assembly of Janus Bottlebrush Polymers from A-Branch-B Diblock Macromonomers. J Am Chem Soc. Sep. 14, 2016;138(36):11501-4. doi: 10.1021/jacs.6b07670. Epub Sep. 1, 2016.

Kawamoto et al., Loops versus branch functionality in model click hydrogels. Macromol. Dec. 1, 2015;48(24):8980-8.

Kean et al., Increasing the maximum achievable strain of a covalent polymer gel through the addition of mechanically invisible cross-links. Adv Mater. Sep. 10, 2014;26(34):6013-8. doi: 10.1002/adma.201401570. Epub Jul. 17, 2014.

Keana et al., Nitroxides as potential contrast enhancing agents for MRI application: influence of structure on the rate of reduction by rat hepatocytes, whole liver homogenate, subcellular fractions, and ascorbate. Magn Reson Med. Dec. 1987;5(6):525-36.

Khanna et al., Designing Miktoarm Polymers Using a Combination of "Click" Reactions in Sequence with Ring-Opening Polymerization. Macromolecules, 2010;43(13):5688-5698. DOI: 10.1021/ma100845a.

Kikuchi et al., Stepwise DNA condensation by a histone-mimic peptide-coated M12L24 spherical complex. Chem. Sci., 2014;5:3257-60.

Kim et al., Anion-directed self-assembly of coordination polymer into tunable secondary structure. J Am Chem Soc. Jun. 9, 2004;126(22):7009-14.

Kim et al., Supporting Information Experimental Section. J Am Chem Soc. Jun. 9, 2004;126(22):7009-14. Available at: http://pubs.acs.org/doi/suppl/10.1021/ja049799v/suppl_file/ja049799vsi20040219_113203.pdf Retrieved Apr. 24, 2015.

Kirchhoff et al., Boronic acids: new coupling partners in room-temperature Suzuki reactions of alkyl bromides. Crystallographic characterization of an oxidative-addition adduct generated under remarkably mild conditions. J Am Chem Soc. Nov. 20, 2002;124(46):13662-3.

Kishi et al., An M2L4 molecular capsule with an anthracene shell: encapsulation of large guests up to 1 nm. J Am Chem Soc. Aug. 3, 2011;133(30):11438-41. doi: 10.1021/ja2037029. Epub Jul. 8, 2011.

Kokuryo et al., SPIO-PICsome: development of a highly sensitive and stealth-capable MRI nano-agent for tumor detection using SPIO-loaded unilamellar polyion complex vesicles (PICsomes). J Control Release. Aug. 10, 2013;169(3):220-7. doi: 10.1016/j.jconrel.2013.03.016. Epub Mar. 29, 2013.

Kolishetti et al., Engineering of self-assembled nanoparticle platform for precisely controlled combination drug therapy. Proc Natl Acad Sci U S A. Oct. 19, 2010;107(42):17939-44. doi: 10.1073/pnas.1011368107. Epub Oct. 4, 2010.

Kreutzer et al., Water-Soluble, Unimolecular Containers Based on Amphiphilic Multiarm Star Block Copolymers. Macromolecules, 2006;39(13):4507-4516. DOI: 10.1021/ma060548b.

Kuppler et al., Potential applications of metal-organic frameworks. Coord. Chem. Rev. 2009;253:3042-66.

Kwon et al., Block copolymer micelles as long-circulating drug vehicles. Adv Drug Delivery Rev. 1995;16:295-309.

Lammers et al., Simultaneous delivery of doxorubicin and gemcitabine to tumors in vivo using prototypic polymeric drug carriers. Biomaterials. Jul. 2009;30(20):3466-75. doi: 10.1016/j.biomaterials.2009.02.040. Epub Mar. 21, 2009.

(56) References Cited

OTHER PUBLICATIONS

Laurier et al., Iron(III)-based metal-organic frameworks as visible light photocatalysts. J Am Chem Soc. Oct. 2, 2013;135(39):14488-91. doi: 10.1021/ja405086e. Epub Sep. 17, 2013.

Lee et al., Multifunctional nanoparticles for multimodal imaging and theragnosis. Chem Soc Rev. Apr. 7, 2012;41(7):2656-72. doi: 10.1039/c2cs15261d. Epub Dec. 21, 2011.

Lee et al., Mussel-Inspired Adhesives and Coatings. Annu Rev Mater Res. Aug. 1, 2011;41:99-132.

Lee et al., Novel phase morphologies in a microphase-separated dendritic polymer melt. Macromol. Jan. 12, 2009;42(3):849-59.

Lee et al., Single-molecule mechanics of mussel adhesion. Proc Natl Acad Sci U S A. Aug. 29, 2006;103(35):12999-3003. Epub Aug. 18, 2006.

Lee et al., Stimuli-responsive molecular brushes. Progress in Polymer Science (Oxford), 35(1-2), 24-44. DOI: 10.1016/j.progpolymsci.2009.11.002.

Leibfarth et al., Scalable synthesis of sequence-defined, unimolecular macromolecules by Flow-IEG. Proc Natl Acad Sci U S A. Aug. 25, 2015;112(34):10617-22. doi: 10.1073/pnas.1508599112. Epub Aug. 12, 2015.

Leininger et al., Self-assembly of discrete cyclic nanostructures mediated by transition metals. Chem Rev. Mar. 8, 2000;100(3):853-908.

Li et al., Polycatechol Nanoparticle MRI Contrast Agents. Small, 2016;12(5):668-677. https://doi.org/10.1002/smll.201502754.

Li et al., A magnetic switch for spin-catalyzed interconversion of nuclear spin isomers. J Am Chem Soc. Mar. 31, 2010;132(12):4042-3. doi: 10.1021/ja910282p.

Li et al., Cross-linked supramolecular polymer gels constructed from discrete multi-pillar[5]arene metallacycles and their multiple stimuli-responsive behavior. J Am Chem Soc. Jun. 18, 2014;136(24):8577-89. doi: 10.1021/ja413047r. Epub Mar. 11, 2014.

Li et al., Crosslinking-induced morphology change of latex nanoparticles: A study of RAFT-mediated polymerization in aqueous dispersed media using amphiphilic double-brush copolymers as reactive surfactants. J Polym Sci Part A: Polym Chem. Nov. 15, 2014;52(22):3250-9.

Li et al., Design and synthesis of an exceptionally stable and highly porous metal-organic framework. Nature Nov. 1999;402:276-79. doi:10.1038/46248.

Li et al., Distance-Dependent Paramagnet-Enhanced Nuclear Spin Relaxation of H2@C60 Derivatives Covalently Linked to a Nitroxide Radical. J. Phys. Chem. Lett., 2010;1(14):2135-2138. DOI: 10.1021/jz100645w.

Li et al., Dynamic cylindrical assembly of triblock copolymers by a hierarchical process of covalent and supramolecular interactions. J Am Chem Soc. Jan. 4, 2011;133(5):1228-31.

Li et al., Efficient synthesis of narrowly dispersed amphiphilic double-brush copolymers through the polymerization reaction of macromonomer micelle emulsifiers at the oil-water interface. Polym Chem. 2016;7(27):4476-85.

Li et al., Facile syntheses of cylindrical molecular brushes by a sequential RAFT and ROMP "grafting-through" methodology. J Polym Sci A Polym Chem. Oct. 15, 2009;47(20):5557-5563.

Li et al., Highly fluorescent M2L4 molecular capsules with anthracene shells. Chem Commun (Camb). Aug. 14, 2011;47(30):8605-7. doi: 10.1039/c1cc12946e. Epub Jun. 28, 2011.

Li et al., Isostructural M2L4 molecular capsules with anthracene shells: synthesis, crystal structures, and fluorescent properties. Chemistry. Jul. 2, 2012;18(27):8358-65. doi: 10.1002/chem.201200155. Epub May 25, 2012.

Li et al., Metallo/clusto hybridized supramolecular polymers. Soft Matter. Dec. 7, 2014;10(45):9038-53. doi: 10.1039/c4sm01684j.

Li et al., Pinpointing the extent of electronic delocalization in the Re(I)-to-tetrazine charge-separated excited state using time-resolved infrared spectroscopy. J Am Chem Soc. Aug. 26, 2009;131(33):11656-7. doi: 10.1021/ja903901n.

Li et al., Star Polymers via Cross-Linking Amphiphilic Macroinitiators by AGET ATRP in Aqueous Media. J. Am. Chem. Soc., 2009;131(30):10378-10379. DOI: 10.1021/ja904204g.

Li et al., Surface Properties of Bottlebrush Polymer Thin Films. Macromolecules. 2012;45(17):7118-7127.

Li et al., Synthesis of Hetero-Grafted Amphiphilic Diblock Molecular Brushes and Their Self-Assembly in Aqueous Medium. Macromolecules. 2010;43(3):1182-1184.

Li et al., Well-defined amphiphilic double-brush copolymers and their performance as emulsion surfactants. Macromol. May 18, 2012;45(11):4623-9.

Liang et al., The copper(I)-catalyzed alkyne-azide cycloaddition (CuAAC) "click" reaction and its applications. An overview. Coordination Chemistry Reviews Dec. 2011;255(23-24):2933-2945.

Liao et al., A convergent synthetic platform for single-nanoparticle combination cancer therapy: ratiometric loading and controlled release of cisplatin, doxorubicin, and camptothecin. J Am Chem Soc. Apr. 23, 2014;136(16):5896-9. doi: 10.1021/ja502011g. Epub Apr. 11, 2014.

Liao et al., A palladium-catalyzed three-component cross-coupling of conjugated dienes or terminal alkenes with vinyl triflates and boronic acids. J Am Chem Soc. Apr. 20, 2011;133(15):5784-7. doi: 10.1021/ja201358b. Epub Mar. 30, 2011.

Liao et al., Palladium-catalyzed hydroarylation of 1,3-dienes with boronic esters via reductive formation of pi-allyl palladium intermediates under oxidative conditions. J Am Chem Soc. Aug. 4, 2010;132(30):10209-11. doi: 10.1021/ja105010t.

Liao et al., Two-component control of guest binding in a self-assembled cage molecule. Chem Commun (Camb). Jul. 21, 2010;46(27):4932-4. doi: 10.1039/c0cc00234h. Epub Jun. 2010.

Lim et al., Multiplexed imaging of therapeutic cells with multispectrally encoded magnetofluorescent nanocomposite emulsions. J Am Chem Soc. Dec. 2, 2009;131(47):17145-54. doi: 10.1021/ja904472z.

Liu et al., "Brush-first" method for the parallel synthesis of photocleavable, nitroxide-labeled poly(ethylene glycol) star polymers. J Am Chem Soc. Oct. 3, 2012;134(39):16337-44. doi: 10.1021/ja3067176. Epub Sep. 24, 2012.

Liu et al., Aqueous Dispersion Polymerization of 2-Methoxyethyl Acrylate for the Synthesis of Biocompatible Nanoparticles Using a Hydrophilic RAFT Polymer and a Redox Initiator. Macromolecules, 2011;44(13):5237-5245. DOI: 10.1021/ma200984h.

Liu et al., Assembly of trigonal and tetragonal prismatic cages from octahedral metal ions and a flexible molecular clip. Inorg Chem. Jul. 23, 2007;46(15):5814-6. Epub Jan. 26, 2007.

Liu et al., Composites of metal-organic frameworks and carbon-based materials: preparations, functionalities and applications. J. Mater. Chem. A, 2016;4:3584-616.

Liu et al., Discrete M2L2 metallacycle and M2L4 cage frameworks and anion competitive reactions of Cu2L4 type receptor. Inorganic Chemistry Communications. Jun. 2009;12(6):457-460.

Liu et al., Nuts and bolts of chemical exchange saturation transfer MRI. NMR Biomed. Jul. 2013;26(7):810-28. doi: 10.1002/nbm.2899. Epub Jan. 10, 2013.

Liu et al., Particles without a Box: Brush-first Synthesis of Photodegradable PEG Star Polymers under Ambient Conditions. J Vis Exp. 2013;80:e50874, doi:10.3791/50874.

Liu et al., Synthesis of functional core, star polymers via RAFT polymerization for drug delivery applications. Macromol Rapid Commun. May 14, 2012;33(9):760-6. doi: 10.1002/marc.201200029. Epub Apr. 12, 2012.

Lock et al., One-Component Supramolecular Filament Hydrogels as Theranostic Label-Free Magnetic Resonance Imaging Agents. ACS Nano. Jan. 24, 2017;11(1):797-805.

Love et al., A practical and highly active ruthenium-based catalyst that effects the cross metathesis of acrylonitrile. Angew Chem Int Ed Engl. Nov. 4, 2002;41(21):4035-7.

Loveless et al., Chemoresponsive viscosity switching of a metallo-supramolecular polymer network near the percolation threshold. J. Mater Chem. 2007;17:56-61.

Loveless et al., Rational Control of Viscoelestic Properties in Multicomponent Associative Polymer Networks. Macromolecules. 2005;38(24):10171-10177.

(56) References Cited

OTHER PUBLICATIONS

Luo et al., Toroidal structures from brush amphiphiles. Chem Commun. 2014;50(5):536-8.
Lutz et al., From precision polymers to complex materials and systems. Nat Rev Mat, 2016;1:1. doi:10.1038/natrevmats.2016.24.
Lynd et al., Influence of Polydispersity on the Self-Assembly of Diblock Copolymers. Macromolecules, 2005;38(21):8803-10.
Ma et al., Nanoparticles for combination drug therapy. ACS Nano. Nov. 26, 2013;7(11):9518-25. doi: 10.1021/nn405674m.
Mackay et al., Self-assembling chimeric polypeptide-doxorubicin conjugate nanoparticles that abolish tumours after a single injection. Nat Mater. Dec. 2009;8(12):993-9. doi: 10.1038/nmat2569. Epub Nov. 8, 2009.
Macrenaris et al., Cell-Permeable Esterase-Activated Ca(II)-Sensitive MRI Contrast Agent. Bioconjug Chem. Feb. 17, 2016;27(2):465-73. doi: 10.1021/acs.bioconjchem.5b00561. Epub Jan. 6, 2016.
Maeda et al., Polymeric drugs for efficient tumor-targeted drug delivery based on EPR-effect. Eur J Pharm Biopharm. Mar. 2009;71(3):409-19. doi: 10.1016/j.ejpb.2008.11.010. Epub Dec. 3, 2008.
Mai et al., Self-assembly of block copolymers. Chem Soc Rev. Sep. 21, 2012;41(18):5969-85. doi: 10.1039/c2cs35115c. Epub Jul. 9, 2012.
Mastarone et al., A modular system for the synthesis of multiplexed magnetic resonance probes. J Am Chem Soc. Apr. 13, 2011;133(14):5329-37. doi: 10.1021/ja1099616. Epub Mar. 17, 2011.
Matson et al., Synthesis of fluorine-18 functionalized nanoparticles for use as in vivo molecular imaging agents. J Am Chem Soc. May 28, 2008;130(21):6731-3. doi: 10.1021/ja802010d. Epub May 2, 2008.
Matsumoto et al., High-resolution mapping of tumor redox status by magnetic resonance imaging using nitroxides as redox-sensitive contrast agents. Clin Cancer Res. Apr. 15, 2006;12(8):2455-62.
Matsumura et al., A new concept for macromolecular therapeutics in cancer chemotherapy: mechanism of tumoritropic accumulation of proteins and the antitumor agent smancs. Cancer Res. Dec. 1986;46(12 Pt 1):6387-92.
Matyjaszewski et al., Nanostructured functional materials prepared by atom transfer radical polymerization. Nat Chem. Jul. 2009;1(4):276-88. doi: 10.1038/nchem.257. Epub Jun. 22, 2009.
Mccammant et al., Palladium-catalyzed 1,4-difunctionalization of butadiene to form skipped polyenes. J Am Chem Soc. Mar. 20, 2013;135(11):4167-70. doi: 10.1021/ja3110544. Epub Mar. 12, 2013.
Mcconnell et al., Stimuli-Responsive Metal-Ligand Assemblies. Chem Rev. Aug. 12, 2015;115(15):7729-93. doi: 10.1021/cr500632f. Epub Apr. 16, 2015.
Mcdonald et al., Polymer@MOF@MOF: "grafting from" atom transfer radical polymerization for the synthesis of hybrid porous solids. Chem. Commun. 2015;51:11994-6.
Mckenzie et al., Highly Efficient and Versatile Formation of Biocompatible Star Polymers in Pure Water and Their Stimuli-Responsive Self-Assembly. Macromolecules, 2014;47(22):7869-7877. DOI: 10.1021/ma502008j.
Mckenzie et al., Visible Light Mediated Controlled Radical Polymerization in the Absence of Exogenous Radical Sources or Catalysts. Macromolecules, 2015;48(12):3864-3872. DOI: 10.1021/acs.macromol.5b00965.
Medarova et al., In vivo imaging of siRNA delivery and silencing in tumors. Nat Med. Mar. 2007;13(3):372-7. Epub Feb. 25, 2007.
Mendichovszky et al., Gadolinium and nephrogenic systemic fibrosis: time to tighten practice. Pediatr Radiol. May 2008;38(5):489-96; quiz 602-3. Epub Oct. 18, 2007.
Meng et al., Controlling the transmission of stereochemical information through space in terphenyl-edged Fe4L6 cages. J Am Chem Soc. Aug. 31, 2011;133(34):13652-60. doi: 10.1021/ja205254s. Epub Aug. 9, 2011.

Menyo et al., Versatile tuning of supramolecular hydrogels through metal complexation of oxidation-resistant catechol-inspired ligands. Soft Matter. 2013;9:10314-10323.
Meyer et al., The dynamic chemistry of molecular borromean rings and Solomon knots. Chemistry. Nov. 8, 2010;16(42):12570-81. doi: 10.1002/chem.201001806.
Mi et al., A pH-activatable nanoparticle with signal-amplification capabilities for non-invasive imaging of tumour malignancy. Nat Nanotechnol. Aug. 2016;11(8):724-30. doi: 10.1038/nnano.2016.72. Epub May 16, 2016.
Mi et al., Hydrothermally synthesized PEGylated calcium phosphate nanoparticles incorporating Gd-DTPA for contrast enhanced MRI diagnosis of solid tumors. Journal of Controlled Release Jan. 2014;174(28):63-71.
Miyake et al., Precisely tunable photonic crystals from rapidly self-assembling brush block copolymer blends. Angew Chem Int Ed Engl. Nov. 5, 2012;51(45):11246-8. doi: 10.1002/anie.201205743. Epub Sep. 13, 2012.
Moghimi et al., Long-circulating and target-specific nanoparticles: theory to practice. Pharmacol Rev. Jun. 2001;53(2):283-318.
Moon et al., Targeting the indoleamine 2,3-dioxygenase pathway in cancer. J Immunother Cancer. Dec. 15, 2015;3:51. doi: 10.1186/s40425-015-0094-9. eCollection 2015.
Mukherjee et al., pH-Sensitive Nanoaggregates for Site-Specific Drug-Delivery as Well as Cancer Cell Imaging. ACS Omega, 2016;1(5):755-764. DOI: 10.1021/acsomega.6b00167.
Mukherjee et al., Site-Specific Amphiphilic Magnetic Copolymer Nanoaggregates for Dual Imaging. Macromolecules, 2015;48(19):6791-6800. DOI: 10.1021/acs.macromol.5b01716.
Mukherjee et al., Oximes as reversible links in polymer chemistry: dynamic macromolecular stars. Polym. Chem., 2014;5:6923-6931. DOI: 10.1039/C4PY01282H.
Muthukrishnan et al., Synthesis and Characterization of Glycomethacrylate Hybrid Stars from Silsesquioxane Nanoparticles. Macromolecules, 2005;38(26):10631-10642. DOI: 10.1021/ma051949e.
Na et al., Development of a T1 contrast agent for magnetic resonance imaging using MnO nanoparticles. Angew Chem Int Ed Engl. 2007;46(28):5397-401.
Na et al., Inorganic Nanoparticles for MRI Contrast Agents. Adv. Mater., 21: 2133-2148. doi:10.1002/adma.200802366.
Nair et al., Modulating mechanical properties of self-assembled polymer networks by multi-functional complementary hydrogen bonding. Soft Matter. 2011;7(2):553-559.
Nair et al., Multiresponsive Reversible Polymer Networks Based on Hydrogen Bonding and Metal Coordination. Macromolecules. 2011;44(9):3346-3357.
Nardone et al., Pediatric nephrogenic systemic fibrosis is rarely reported: a RADAR report. Pediatr Radiol. Feb. 2014;44(2):173-80. doi: 10.1007/s00247-013-2795-x. Epub Sep. 21, 2013.
Nese et al., Synthesis, Characterization, and Properties of Starlike Poly(n-butyl acrylate)-b-poly(methyl methacrylate) Block Copolymers. Macromolecules, 2010;43(3):1227-35. DOI: 10.1021/ma902447p.
Nguyen et al., Nitroxide-Based Macromolecular Contrast Agents with Unprecedented Transverse Relaxivity and Stability for Magnetic Resonance Imaging of Tumors. ACS Cent. Sci., 2017;3(7):800-811. DOI: 10.1021/acscentsci.7b00253.
Nicholls et al., DNA-gadolinium-gold nanoparticles for in vivo T1 MR imaging of transplanted human neural stem cells. Biomaterials. Jan. 2016;77:291-306. doi: 10.1016/j.biomaterials.2015.11.021. Epub Nov. 14, 2015.
Nishiyama et al., Novel cisplatin-incorporated polymeric micelles can eradicate solid tumors in mice. Cancer Res. Dec. 15, 2003;63(24):8977-83.
Nitschke et al., Construction, substitution, and sorting of metalloorganic structures via subcomponent self-assembly. Acc Chem Res. Feb. 2007;40(2):103-12.
Nomura et al., Facile Controlled Synthesis of Soluble Star Shape Polymers by Ring-Opening Metathesis Polymerization (ROMP). Macromolecules, 2009;42(4):899-901. DOI: 10.1021/ma8027529.
Nomura et al., Use of Pyridine-Coated Star-Shaped ROMP Polymer As the Supporting Ligand for Ruthenium-Catalyzed Chemoselec-

(56) References Cited

OTHER PUBLICATIONS tive Hydrogen Transfer Reduction of Ketones. Organometallics, 2012;31(14):5074-5080. DOI: 10.1021/om300417v.
Ohno et al., Synthesis of well-defined cyclodextrin-core star polymers. J. Polym. Sci. A Polym. Chem., 39: 2206-2214. doi:10.1002/pola.1197.
Olenyuk et al., Self-assembly of nanoscale cuboctahedra by coordination chemistry. Nature. Apr. 29, 1999;398(6730):796-9.
Oliveri et al., Heteroligated supramolecular coordination complexes formed via the halide-induced ligand rearrangement reaction. Acc Chem Res. Dec. 2008;41(12):1618-29. doi: 10.1021/ar800025w.
Pakula et al., Effect of chain topology on the self-organization and the mechanical properties of poly(n-butyl acrylate)-b-polystyrene block copolymers. Polymer, May 26, 2011;52(12):2576-83.
Paletta et al., Synthesis and Reduction Kinetics of Sterically Shielded Pyrrolidine Nitroxides. Org. Lett., 2012;14(20):5322-5325. DOI: 10.1021/ol302506f.
Park et al.,Star Synthesis Using Macroinitiators via Electrochemically Mediated Atom Transfer Radical Polymerization. Macromolecules, 2013;46(15):5856-5860 DOI: 10.1021/ma401308e.
Patel et al., Synthesis and cell adhesive properties of linear and cyclic RGD functionalized polynorbornene thin films. Biomacromolecules. Aug. 13, 2012;13(8):2546-53. doi: 10.1021/bm300795y. Epub Jul. 27, 2012.
Patrick et al., Intracellular pH measurements using perfluorocarbon nanoemulsions. J Am Chem Soc. Dec. 11, 2013;135(49):18445-57. doi: 10.1021/ja407573m. Epub Nov. 22, 2013.
Peer et al., Nanocarriers as an emerging platform for cancer therapy. Nat Nanotechnol. Dec. 2007;2(12):751-60. doi: 10.1038/nnano.2007.387.
Perez-Salvia et al., Bromodomain inhibitors and cancer therapy: From structures to applications. Epigenetics. May 4, 2017;12(5):323-339. doi: 10.1080/15592294.2016.1265710. Epub Dec. 2, 2016.
Pesek et al., Synthesis of bottlebrush copolymers based on poly(dimethylsiloxane) for surface active additives. Polymer. Aug. 19, 2016;98(19):495-504.
Petros et al., Strategies in the design of nanoparticles for therapeutic applications. Nat Rev Drug Discov. Aug. 2010;9(8):615-27. doi: 10.1038/nrd2591. Epub Jul. 9, 2010.
Plummer et al., A Phase I clinical study of cisplatin-incorporated polymeric micelles (NC-6004) in patients with solid tumours. Br J Cancer. Feb. 15, 2011;104(4):593-8. doi: 10.1038/bjc.2011.6. Epub Feb. 1, 2011.
Pluth et al., Proton-mediated chemistry and catalysis in a self-assembled supramolecular host. Acc Chem Res. Oct. 20, 2009;42(10):1650-9. doi: 10.1021/ar900118t.
Pollino et al., Cross-linked and functionalized 'universal polymer backbones' via simple, rapid, and orthogonal multi-site self-assembly. Tetrahedron, 60(34), 7205-7215. DOI: 10.1016/j.tet.2004.05.055.
Qiu et al., Efficient and versatile synthesis of star polymers in water and their use as emulsifiers. Chem. Commun., 2011;47:12685-12687. DOI: 10.1039/C1CC15679A.
Rajca et al., Correction to organic radical contrast agents for magnetic resonance imaging. J Am Chem Soc. Feb. 26, 2014;136(8):3318. doi: 10.1021/ja413028d. Epub Feb. 17, 2014.
Rajca et al., Organic radical contrast agents for magnetic resonance imaging. J Am Chem Soc. Sep. 26, 2012;134(38):15724-7. Epub Sep. 17, 2012.
Rangadurai et al., Temporal and triggered evolution of host-guest characteristics in amphiphilic polymer assemblies. J Am Chem Soc. Jun. 10, 2016;138(24):7508-11.
Rasmussen et al., Improved numerical algorithm for exploring block copolymer mesophases. J Polym Sci Part B: Poly Phys. Aug. 15, 2002;40(16):1777-83.
Ratnakar et al., Modulation of CEST images in vivo by T1 relaxation: a new approach in the design of responsive PARACEST agents. J Am Chem Soc. Oct. 9, 2013;135(40):14904-7. doi: 10.1021/ja406738y. Epub Sep. 25, 2013.

Reboul et al., Mesoscopic architectures of porous coordination polymers fabricated by pseudomorphic replication. Nat Mater. Jun. 24, 2012;11(8):717-23. doi: 10.1038/nmat3359.
Ren et al., Organic Catalyst-Mediated Ring-Opening Polymerization for the Highly Efficient Synthesis of Polyester-Based Star Polymers. ACS Macro Lett., 2012;1(6):681-686. DOI: 10.1021/mz300169m.
Ren et al., Star Polymers. Chem Rev. Jun. 22, 2016;116(12):6743-836. doi: 10.1021/acs.chemrev.6b00008. Epub Jun. 14, 2016.
Ren et al., Synthetic Strategies towards Well-Defined Complex Polymeric Architectures through Covalent Chemistry. Chemie Ingenieur Technik, 86: 2195-2214. doi:10.1002/cite.201400088.
Rizzo et al., In vivo nanotoxicity testing using the zebrafish embryo assay. J. Mater. Chem. B, 2013,1, 3918-3925. DOI: 10.1039/C3TB20528B.
Rodenas et al., Metal-organic framework nanosheets in polymer composite materials for gas separation. Nat Mater. Jan. 2015;14(1):48-55. doi: 10.1038/nmat4113. Epub Nov. 2, 2014.
Rolfe et al., Multimodal polymer nanoparticles with combined 19F magnetic resonance and optical detection for tunable, targeted, multimodal imaging in vivo. J Am Chem Soc. Feb. 12, 2014;136(6):2413-9. doi: 10.1021/ja410351h. Epub Jan. 29, 2014.
Ronson et al., Metal-organic container molecules through subcomponent self-assembly. Chem Commun (Camb). Mar. 28, 2013;49(25):2476-90. doi: 10.1039/c2cc36363a.
Rowan et al., Metal-ligand induced supramolecular polymerization: a route to responsive materials. Faraday Discuss. 2005;128:43-53.
Roy et al., Cyclic β-Peptoids. Org. Lett., 2008;10(5):921-924. DOI: 10.1021/ol7030763.
Runge et al., "Synthesis and Self-Assembly of Bottlebrush Block Copolymers" PMSEPreprints, 2005, 92, 5-6.
Rzayev et al., Molecular Bottlebrushes: New Opportunities in Nanomaterials Fabrication. ACS Macro Lett., 2012;1(9):1146-1149. DOI: 10.1021/mz300402x.
Rzayev Synthesis of polystyrene- polylactide bottlebrush block copolymers and their melt self-assembly into large domain nanostructures. Macromol. Feb. 20, 2009;42(6):2135-41.
Saini et al., Pd(0)-catalyzed 1,1-diarylation of ethylene and allylic carbonates. Org Lett. Oct. 4, 2013;15(19):5008-11. doi: 10.1021/ol4023358. Epub Sep. 18, 2013.
Samuni et al., Factors influencing nitroxide reduction and cytotoxicity in vitro. Antioxid Redox Signal. Jun. 2004;6(3):587-95.
Sancey et al., Long-term in vivo clearance of gadolinium-based AGuIX nanoparticles and their biocompatibility after systemic injection. ACS Nano. Mar. 24, 2015;9(3):2477-88. doi: 10.1021/acsnano.5b00552. Epub Feb. 26, 2015.
Sanders et al., Metal-free sequential [3+2]-dipolar cycloadditions using cyclooctynes and 1,3-dipoles of different reactivity. J Am Chem Soc. Feb. 2, 2011;133(4):949-57. doi: 10.1021/ja1081519. Epub Dec. 23, 2010.
Sartori et al., Nitroxide paramagnet-induced para-ortho conversion and nuclear spin relaxation of H2 in organic solvents. J Am Chem Soc. Sep. 24, 2008;130(38):12752-6. doi: 10.1021/ja8037195. Epub Aug. 20, 2008.
Sato et al., Remarkable stabilization of M(12)L(24) spherical frameworks through the cooperation of 48 Pd(II)-pyridine interactions. J Am Chem Soc. May 6, 2009;131(17):6064-5. doi: 10.1021/ja900676f.
Saunders et al., Synthesis of amphiphilic star block copolymers using ring-opening metathesis polymerization. Macromolecules, 1992;25(7):2055-2057. DOI: 10.1021/ma00033a035.
Schmidt et al., Supramolecular three-armed star polymers via cyclodextrin host-guest self-assembly. Polym. Chem., 2012;3:3139-3145. DOI: 10.1039/C2PY20293J.
Schukraft et al., Isoreticular expansion of polyMOFs achieves high surface area materials. Chem Commun (Camb). Sep. 26, 2017;53(77):10684-10687. doi: 10.1039/c7cc04222a.
Seitz et al., Self-Assembly and Stress Relaxation in Acrylic Triblock Copolymer Gels. Macromolecules, 2007;40(4):1218-26.
Semino et al., Microscopic Model of the Metal-Organic Framework/Polymer Interface: A First Step toward Understanding the Compat-

(56) References Cited

OTHER PUBLICATIONS ibility in Mixed Matrix Membranes. ACS Appl Mater Interfaces. Jan. 13, 2016;8(1):809-19. doi: 10.1021/acsami.5b10150. Epub Dec. 22, 2015.

Sengupta et al., Temporal targeting of tumour cells and neovasculature with a nanoscale delivery system. Nature. Jul. 28, 2005;436(7050):568-72.

Seredyuk et al., Spin-crossover and liquid crystal properties in 2D cyanide-bridged Fe(II)-M(I/II) metalorganic frameworks. Inorg Chem. Nov. 1, 2010;49(21):10022-31. doi: 10.1021/ic101304v.

Sheiko et al., Cylindrical molecular brushes: Synthesis, characterization, and properties. Progress in Polymer Science (Oxford), 33(7), 759-785. DOI: 10.1016/j.progpolymsci.2008.05.001.

Shellock et al., Safety of magnetic resonance imaging contrast agents. J Magn Reson Imaging. Sep. 1999;10(3):477-84.

Shi et al., Core cross-linked star (CCS) polymers with tunable polarity: synthesis by RAFT dispersion polymerization, self-assembly and emulsification. Polym. Chem., 2013;4:1950-1959. DOI: 10.1039/C3PY21120G.

Shi et al., Producing Small Domain Features Using Miktoarm Block Copolymers with Large Interaction Parameters. ACS Macro Lett., 2015;4(11):1287-92. DOI: 10.1021/acsmacrolett.5b00712.

Shibata et al., Quantitative Synthesis of Star-Shaped Poly(vinyl ether)s with a Narrow Molecular Weight Distribution by Living Cationic Polymerization. J. Am. Chem. Soc., 2006;128(23):7497-7504. DOI: 10.1021/ja057611h.

Shin et al., Recent advances in magnetic nanoparticle-based multimodal imaging. Chem Soc Rev. Jul. 21, 2015;44(14):4501-16. doi: 10.1039/c4cs00345d.

Sides et al., Parallel algorithm for numerical self-consistent field theory simulations of block copolymer structure. Polymer. Sep. 1, 2003;44(19):5859-66.

Sinturel et al., High $\chi$-low N block polymers: how far can we go?. ACS Macro Lett. Sep. 2, 2015;4:1044-50.

Skomski et al., Redox-active on-surface assembly of metal-organic chains with single-site Pt(II). J Am Chem Soc. Jul. 16, 2014;136(28):9862-5. doi: 10.1021/ja504850f. Epub Jul. 1, 2014.

Smith et al., Nanomaterials for In Vivo Imaging. Chem Rev. Feb. 8, 2017;117(3):901-986. doi: 10.1021/acs.chemrev.6b00073. Epub Jan. 3, 2017.

Smulders et al., Building on architectural principles for three-dimensional metallosupramolecular construction. Chem Soc Rev. Feb. 21, 2013;42(4):1728-54. doi: 10.1039/c2cs35254k. Epub Oct. 2, 2012.

Smulders et al., Integrative self-sorting synthesis of a Fe8Pt6L24 cubic cage. Angew Chem Int Ed Engl. Jul. 2, 2012;51(27):6681-5. doi: 10.1002/anie.201202050. Epub Jun. 5, 2012.

Sowers et al., Redox-responsive branched-bottlebrush polymers for in vivo MRI and fluorescence imaging. Nature Communications. 2014;52:Article No. 5460.

Spiniello et al., Synthesis and characterization of fluorescently labeled core cross-linked star polymers. J. Polym. Sci. A Polym. Chem., 2008;46:2422-2432. doi:10.1002/pola.22576.

Stadler et al., Formation of RACK- and grid-type metallosupramolecular architectures and generation of molecular motion by reversible uncoiling of helical ligand strands. Chemistry. Jun. 2, 2006;12(17):4503-22.

Stang et al., Self-Assembly, Symmetry, and Molecular Architecture: Coordination as the Motif in the Rational Design of Supramolecular Metallacyclic Polygons and Polyhedra. Acc. Chem. Res., 1997;30(12):502-18. DOI: 10.1021/ar9602011.

Stenzel-Rosenbaum et al., Synthesis of Poly(styrene) Star Polymers Grown from Sucrose, Glucose, and Cyclodextrin Cores via Living Radical Polymerization Mediated by a Half-Metallocene Iron Carbonyl Complex. Macromolecules, 2001;34(16):5433-5438. DOI: 10.1021/ma0021803.

Stock et al., Synthesis of Metal-Organic Frameworks (MOFs): Routes to Various MOF Topologies, Morphologies, and Composites. Chem. ReV., 2012;112(2):933-69.

Su et al., Coordination-directed assembly of trigonal and tetragonal molecular boxes encapsulating anionic guests. Journal of the Chemical Society, Dalton Transactions. 2001:359-361. doi: 10.1039/B010118O.

Sulistio et al., Star polymers composed entirely of amino acid building blocks: a route towards stereospecific, biodegradable and hierarchically functionalized stars. Chem. Commun., 2011;47:1151-1153. DOI: 10.1039/C0CC03541F.

Sun et al., Multicomponent metal-ligand self-assembly. Curr Opin Chem Biol. Dec. 2002;6(6):757-64.

Sun et al., Self-assembled M24L48 polyhedra and their sharp structural switch upon subtle ligand variation. Science. May 28, 2010;328(5982):1144-7. doi:10.1126/science.1188605. Epub Apr. 29, 2010.

Sveinbjornsson et al., Rapid self-assembly of brush block copolymers to photonic crystals. Proc Natl Acad Sci U S A. Sep. 4, 2012;109(36):14332-6. doi: 10.1073/pnas.1213055109. Epub Aug. 21, 2012.

Swaminathan et al., Nephrogenic systemic fibrosis, gadolinium, and iron mobilization. N Engl J Med. Aug. 16, 2007;357(7):720-2.

Takamizu et al., Synthesis of oligo(thiophene)-coated star-shaped ROMP polymers: unique emission properties by the precise integration of functionality. Journal of the American Chemical Society 2012;134(18):7892-7895.

Tam et al., Recent advances in metallogels. Chem Soc Rev. Feb. 21, 2013;42(4):1540-67. doi: 10.1039/c2cs35354g. Epub Jan. 8, 2013.

Terashima et al., Star-Polymer-Catalyzed Living Radical Polymerization: Microgel-Core Reaction Vessel by Tandem Catalyst Interchange. Angew. Chem., 2011;50:7892-7895. doi:10.1002/anie.201101381.

Terreno et al., Challenges for molecular magnetic resonance imaging. Chem Rev. May 12, 2010;110(5):3019-42. doi: 10.1021/cr100025t.

Theodorakis et al., Interplay between chain collapse and microphase separation in bottle-brush polymers with two types of side chains. Macromol. May 4, 2010;43(11):5137-48.

Thompson et al., Labelling polymers and micellar nanoparticles via initiation, propagation and termination with ROMP. Polym. Chem., 2014;5:1954-1964.

Tirotta et al., (19)F magnetic resonance imaging (MRI): from design of materials to clinical applications. Chem Rev. Jan. 28, 2015;115(2):1106-29. doi: 10.1021/cr500286d. Epub Oct. 20, 2014.

Tolmasoff et al., Superoxide dismutase: correlation with life-span and specific metabolic rate in primate species. Proc Natl Acad Sci U S A. May 1980;77(5):2777-81.

Tominaga et al., Finite, spherical coordination networks that self-organize from 36 small components. Angew Chem Int Ed Engl. Oct. 25, 2004;43(42):5621-5.

Torchilin, Tumor delivery of macromolecular drugs based on the EPR effect. Adv Drug Deliv Rev. Mar. 18, 2011;63(3):131-5. doi: 10.1016/j.addr.2010.03.011. Epub Mar. 18, 2010.

Tsuji et al., Facile Palladium catalyzed decarboxylative allylation of active methylene compounds under neutral conditions using allylic carbonates. Tetrahedron Letters. 1982;23(46):4809-12.

Tu et al., Multimodal magnetic-resonance/optical-imaging contrast agent sensitive to NADH. Angew Chem Int Ed Engl. 2009;48(35):6547-51. doi: 10.1002/anie.200900984.

Tunca et al., Novel miktofunctional initiator for the preparation of an ABC-type miktoarm star polymer via a combination of controlled polymerization techniques. J. Polym. Sci. A Polym. Chem., 42: 4228-4236. doi:10.1002/pola.20284.

Uemura et al., Polymerization reactions in porous coordination polymers. Chem Soc Rev. May 2009;38(5):1228-36. doi: 10.1039/b802583p. Epub Feb. 3, 2009.

Valeur et al., Amide bond formation: beyond the myth of coupling reagents. Chem. Soc. Rev., 2009;38:606-631. DOI: 10.1039/B701677H.

Van Genabeek et al., Synthesis and Self-Assembly of Discrete Dimethylsiloxane-Lactic Acid Diblock Co-oligomers: The Dononacontamer and Its Shorter Homologues. J Am Chem Soc. Mar. 30, 2016;138(12):4210-8. doi: 10.1021/jacs.6b00629. Epub Mar. 21, 2016.

(56) References Cited

OTHER PUBLICATIONS

Verduzco et al., Correction: Structure, function, self-assembly, and applications of bottlebrush copolymers. Chem Soc Rev. Nov. 7, 2015;44(21):7916. doi: 10.1039/c5cs90099a.

Verduzco et al., Structure, function, self-assembly, and applications of bottlebrush copolymers. Chem. Soc. Rev., 2015;44:2405-20.

Verwilst et al., Recent advances in Gd—chelate based bimodal optical/MRI contrast agents. Chem Soc Rev. Apr. 7, 2015;44(7):1791-806. doi: 10.1039/c4cs00336e. Epub Jan. 27, 2015.

Villaraza et al., Macromolecules, dendrimers, and nanomaterials in magnetic resonance imaging: the interplay between size, function, and pharmacokinetics. Chem Rev. May 12, 2010;110(5):2921-59. doi: 10.1021/cr900232t.

Wang et al., A supramolecular approach to combining enzymatic and transition metal catalysis. Nat Chem. Feb. 2013;5(2):100-3. doi: 10.1038/nchem.1531. Epub Jan. 6, 2013.

Wang et al., Advances of cancer therapy by nanotechnology. Cancer Res Treat. Mar. 2009;41(1):1-11. doi: 10.4143/crt.2009.41.1.1. Epub Mar. 31, 2009.

Wang et al., Block Co-PolyMOCs by Stepwise Self-Assembly. J Am Chem Soc. Aug. 24, 2016;138(33):10708-15. doi: 10.1021/jacs.6b06712. Epub Aug. 16, 2016.

Wang et al., Postsynthetic modification of metal-organic frameworks. Chem Soc Rev. May 2009;38(5):1315-29. doi: 10.1039/b802258p. Epub Jan. 20, 2009.

Wang et al., Star PolyMOCs with Diverse Structures, Dynamics, and Functions by Three-Component Assembly. Angew Chem Int Ed Engl. Jan. 2, 2017;56(1):188-192. doi: 10.1002/anie.201609261. Epub Dec. 5, 2016.

Wang et al., Synthesis of Unnatural Amino Acids Functionalized with Sterically Shielded Pyrroline Nitroxides. Org Lett. Oct. 17, 2014;16(20): 5298-5300. Published online Sep. 16, 2014. doi: [10.1021/ol502449r].

Wei et al., Exceedingly small iron oxide nanoparticles as positive MRI contrast agents. Proc. Natl. Acad. Sci. USA 2017;114(9):2325-2330.

Weng et al., Control of Gel Morphology and Properties of a Class of Metallo-Supramolecular Polyers by Good/Poor Solvent Environments. Macromolecules. 2009;42(1):236-246.

Weng et al., Effect of monomer structure on the gelation of a class of metallo-supramolecular polymers. Soft Matter. 2009;5(23):4647-4657.

Weng et al., Structural origin of the thixotropic behavior of a class of metallosupramolecular gels. Tetrahedron. Jul. 30, 2007;63(31):7419-7431.

Weng et al., Understanding the mechanism of gelation and stimuli-responsive nature of a class of metallo-supramolecular gels. J Am Chem Soc. Sep. 6, 2006;128(35):11663-72.

Westhaus et al., Triggered release of calcium from lipid vesicles: a bioinspired strategy for rapid gelation of polysaccharide and protein hydrogels. Biomaterials. Mar. 2001;22(5):453-62.

Wollinsky et al., Therapeutic and diagnostic applications of dendrimers for cancer treatment. Adv Drug Deliv Rev. Jun. 10, 2008;60(9):1037-55. doi: 10.1016/j.addr.2008.02.012. Epub Mar. 4, 2008.

Wong et al., Quantitative formation of core cross-linked star polymers via a one-pot two-step single electron transfer-living radical polymerization. Polym. Chem., 2013;4:4562-4565. DOI: 10.1039/C3PY00726J.

Wood et al., Two-stage directed self-assembly of a cyclic [3]catenane. Nat Chem. Apr. 2015;7(4):354-8. doi: 10.1038/nchem.2205.

Worrell et al., Direct evidence of a dinuclear copper intermediate in Cu(I)-catalyzed azide-alkyne cycloadditions. Science. Apr. 26, 2013;340(6131):457-60. doi: 10.1126/science.1229506. Epub Apr. 4, 2013.

Xia et al., Efficient synthesis of narrowly dispersed brush copolymers and study of their assemblies: the importance of side chain arrangement. J Am Chem Soc. Dec. 30, 2009;131(51):18525-32. doi: 10.1021/ja908379q.

Xia et al., Efficient Synthesis of Narrowly Dispersed Brush Polymers via Living Ring-Opening Metathesis Polymerization of Macromonomers. Macromolecules, 2009;42(11):3761-3766. DOI: 10.1021/ma900280c.

Xia et al., EPR study of spin labeled brush polymers in organic solvents. J Am Chem Soc. Dec. 14, 2011;133(49):19953-9. doi: 10.1021/ja2085349. Epub Nov. 21, 2011.

Xiao et al., The use of polymeric platinum(IV) prodrugs to deliver multinuclear platinum(II) drugs with reduced systemic toxicity and enhanced antitumor efficacy. Biomaterials. Nov. 2012;33(33):8657-69. doi: 10.1016/j.biomaterials.2012.08.015. Epub Aug. 28, 2012.

Xie et al., Construction of a highly symmetric nanosphere via a one-pot reaction of a tristerpyridine ligand with Ru(II). J Am Chem Soc. Jun. 11, 2014;136(23):8165-8. doi: 10.1021/ja502962j. Epub May 22, 2014.

Xie et al., Hydrophobic-Driven, Metallomacrocyclic Assembly—Towards Quantitative Construction. Eur. J. Inorg. Chem. 2016;11:1671-7.

Xie et al., Precise Molecular Fission and Fusion: Quantitative Self-Assembly and Chemistry of a Metallo-Cuboctahedron. Angew. Chem., 2015;54:9224-9.

Xing et al., A stable metal coordination polymer gel based on a calix[4]arene and its 'uptake' of non-ionic organic molecules from the aqueous phase. Chem Commun (Camb). Feb. 21, 2002;(4):362-3.

Xing et al., Design of coordination polymer as stable catalytic systems. Chemistry. Nov. 4, 2002;8(21):5028-32.

Xing et al., Spontaneous Enrichment of Organic Molecules from Aqueous and Gas Phases into a Stable Metallogel. Langmuir. 2002;18:9654-9658.

Xu et al., Mechanism of Shear Thickening in Reversibly Cross-linked Supramolecular Polymer Networks. Macromolecules. Apr. 13, 2010;43(7):3556-3565.

Xu et al., Scaling Laws in Supramolecular Polymer Networks. Macromolecules. 2011;44(13):5465-5472.

Xu et al., Strain Hardening and Strain Softening of Reversibly Cross-linked Supramolecular Polymer Networks. Macromolecules. Sep. 27, 2011;44(18):7478-7488.

Yamazaki et al., Dynamic Viscoelasticity of Poly(butyl acrylate) Elastomers Containing Dangling Chains with Controlled Lengths. Macromolecules, 2011;44(22):8829-34. DOI: 10.1021/ma201941v.

Yan et al., Hierarchical self-assembly: well-defined supramolecular nanostructures and metallohydrogels via amphiphilic discrete organoplatinum(II) metallacycles. J Am Chem Soc. Sep. 25, 2013;135(38):14036-9. doi: 10.1021/ja406877b. Epub Aug. 8, 2013.

Yan et al., Particle carriers for combating multidrug-resistant cancer. ACS Nano. Nov. 26, 2013;7(11):9512-7. doi: 10.1021/nn405632s. Epub Nov. 11, 2013.

Yan et al., Responsive supramolecular polymer metallogel constructed by orthogonal coordination-driven self-assembly and host/guest interactions. J Am Chem Soc. Mar. 26, 2014;136(12):4460-3. doi: 10.1021/ja412249k. Epub Mar. 12, 2014.

Yan et al., Supramolecular polymers with tunable topologies via hierarchical coordination-driven self-assembly and hydrogen bonding interfaces. Proc Natl Acad Sci U S A. Sep. 24, 2013;110(39):15585-90. doi: 10.1073/pnas.1307472110. Epub Sep. 9, 2013.

Yang et al., Luminescent chemodosimeters for bioimaging. Chem Rev. Jan. 9, 2013;113(1):192-270. doi: 10.1021/cr2004103. Epub Jun. 18, 2012.

Yang et al., Supramolecular Polymers: Historical Development, Preparation, Characterization, and Functions. Chem Rev. Aug. 12, 2015;115(15):7196-239. doi: 10.1021/cr500633b. Epub Mar. 13, 2015.

Yi et al., Telmisartan attenuates hepatic fibrosis in bile ductligated rats. Acta Pharmacol Sin. Dec. 2012;33(12):1518-24. doi: 10.1038/aps.2012.115. Epub Oct. 29, 2012.

Yoneya et al., Coordination-directed self-assembly of M12L24 nanocage: effects of kinetic trapping on the assembly process. ACS Nano. Feb. 25, 2014;8(2):1290-6. doi: 10.1021/nn404595j. Epub Jan. 31, 2014.

Yoneya et al., Simulation of metal-ligand self-assembly into spherical complex M6L8. J Am Chem Soc. Sep. 5, 2012;134(35):14401-7. doi: 10.1021/ja303542r. Epub Aug. 22, 2012.

(56) References Cited

OTHER PUBLICATIONS

Yoshizawa et al., Molecular architectures of multi-anthracene assemblies. Chem Soc Rev. Mar. 21, 2014;43(6):1885-98. doi: 10.1039/c3cs60315f.

You et al., Manganese displacement from Zinpyr-1 allows zinc detection by fluorescence microscopy and magnetic resonance imaging. Chem Commun (Camb). Jun. 21, 2010;46(23):4139-41. doi: 10.1039/c0cc00179a. Epub May 10, 2010.

Yount et al., Small-molecule dynamics and mechanisms underlying the macroscopic mechanical properties of coordinatively cross-linked polymer networks. J Am Chem Soc. Oct. 19, 2005;127(41):14488-96.

Yount et al., Strong means slow: dynamic contributions to the bulk mechanical properties of supramolecular networks. Angew Chem Int Ed Engl. Apr. 29, 2005;44(18):2746-8.

Yuan et al., One-pot syntheses of amphiphilic centipede-like brush copolymers via combination of ring-opening polymerization and "click" chemistry. Macromol. Jan. 27, 2010;43(4):1739-46.

Yue et al., Macrocyclic and lantern complexes of palladium(II) with bis(amidopyridine) ligands: synthesis, structure, and host-guest chemistry. Inorg Chem. Nov. 29, 2004;43(24):7671-81.

Zhang et al., Active cross-linkers that lead to active gels. Angew Chem Int Ed Engl. Oct. 25, 2013;52(44):11494-8. doi: 10.1002/anie.201304437. Epub Sep. 12, 2013.

Zhang et al., Challenges and recent advances in MOF-polymer composite membranes for gas separation. Inorg. Chem. Front., 2016;3:896-909. DOI: 10.1039/C6QI00042H.

Zhang et al., Cyclodextrin-centred star polymers synthesized via a combination of thiol-ene click and ring opening polymerization. Chem Commun (Camb). Aug. 21, 2012;48(65):8063-5. doi: 10.1039/c2cc33742h. Epub Jul. 6, 2012.

Zhang et al., Dual-functional gadolinium-based copper(II) probe for selective magnetic resonance imaging and fluorescence sensing. Inorg Chem. Feb. 20, 2012;51(4):2325-31. doi: 10.1021/ic202322f. Epub Feb. 8, 2012.

Zhang et al., Metal-organic gels: From discrete metallogelators to coordination polymers. Coordination Chemistry Reviews Apr. 2013;257(7-8):1373-1408.

Zhang et al., One-pot RAFT synthesis of core cross-linked star polymers of polyPEGMA in water by sequential homogeneous and heterogeneous polymerizations. Polym. Chem., 2012;3:2656-2664. DOI: 10.1039/C2PY20442H.

Zhang et al., Polymer-Metal-Organic Frameworks (polyMOFs) as Water Tolerant Materials for Selective Carbon Dioxide Separations. J Am Chem Soc. Jan. 27, 2016;138(3):920-5. doi: 10.1021/jacs.5b11034. Epub Jan. 13, 2016.

Zhang et al., polyMOFs: A Class of Interconvertible Polymer-Metal-Organic-Framework Hybrid Materials. Angew Chem Int Ed Engl. May 18, 2015;54(21):6152-7. doi: 10.1002/anie.201502733. Epub Apr. 29, 2015.

Zhang et al., Redox-Responsive, Core Cross-Linked Polyester Micelles. ACS Macro Lett., 2013;2(1):40-44. DOI: 10.1021/mz300522n.

Zhao et al., Chiral amide directed assembly of a diastereo- and enantiopure supramolecular host and its application to enantioselective catalysis of neutral substrates. J Am Chem Soc. Dec. 18, 2013;135(50):18802-5. doi: 10.1021/ja411631v. Epub Dec. 5, 2013.

Zhao et al., Polystyrene- Polylactide Bottlebrush Block Copolymer at the Air/Water Interface. Macromol. Sep. 28, 2009;42(22):9027-33.

Zhao et al., Rheological Behavoir of Shear-Responsive Metallo-Supramolecular Gels. Macromolecules. 2004;37(10):3529-3531.

Zhelev et al., Imaging of superoxide generation in the dopaminergic area of the brain in Parkinson's disease, using mito-TEMPO. ACS Chem Neurosci. Nov. 20, 2013;4(11):1439-45. doi: 10.1021/cn400159h. Epub Sep. 16, 2013.

Zhelev et al., Nitroxyl radicals as low toxic spin-labels for non-invasive magnetic resonance imaging of blood-brain barrier permeability for conventional therapeutics. Chem Commun (Camb). Jan. 7, 2009;(1):53-5. doi: 10.1039/b816878d. Epub Nov. 13, 2008.

Zhelev et al., Nitroxyl radicals for labeling of conventional therapeutics and noninvasive magnetic resonance imaging of their permeability for blood-brain barrier: relationship between structure, blood clearance, and MRI signal dynamic in the brain. Mol Pharm. Mar.-Apr. 2009;6(2):504-12. doi: 10.1021/mp800175k.

Zheng et al., Construction of Smart Supramolecular Polymeric Hydrogels Cross-linked by Discrete Organoplatinum(II) Metallacycles via Post-Assembly Polymerization. J. Am. Chem. Soc., 2016;138(14):4927-37. DOI: 10.1021/jacs.6b01089.

Zheng et al., Morphology of ABC triblock copolymers. Macromol. Oct. 1995;28(21):7215-23.

Zhou et al., Counting primary loops in polymer gels. Proc Natl Acad Sci U S A. Nov. 20, 2012;109(47):19119-24. doi: 10.1073/pnas.1213169109. Epub Nov. 6, 2012.

Zhou et al., Introduction to metal-organic frameworks. Chem Rev. Feb. 8, 2012;112(2):673-4. doi: 10.1021/cr300014x. Epub Jan. 26, 2012.

Zhou et al., Photo-controlled growth of telechelic polymers and end-linked polymer gels. Angew Chem Int Ed Engl. Feb. 18, 2013;52(8):2235-8. doi: 10.1002/anie.201207966. Epub Jan. 17, 2013.

Zhukhovitskiy et al., Highly branched and loop-rich gels via formation of metal-organic cages linked by polymers. Nat Chem. Jan. 2016;8(1):33-41. doi: 10.1038/nchem.2390. Epub Nov. 16, 2015.

Zhukhovitskiy et al., Polymer Structure Dependent Hierarchy in PolyMOC Gels. Macromolecules, 2016;49(18):6896-902.

\* cited by examiner (1) A = PS, B = PDMS, (2) A = P*t*BA, B = PDMS, (3) A = P*t*BA, B = PS 2.3k: $M_n$: 2320, $M_w$: 2580, $Đ$: 1.11
3.3k: $M_n$: 3300, $M_w$: 3650, $Đ$: 1.10
4.6k: $M_n$: 4730, $M_w$: 5060, $Đ$: 1.07
6.4k: $M_n$: 6490, $M_w$: 7140, $Đ$: 1.10
8.2k: $M_n$: 8210, $M_w$: 8780, $Đ$: 1.07
9.2k: $M_n$: 9200, $M_w$: 9830, $Đ$: 1.07
10.3k: $M_n$: 10300, $M_w$: 10900, $Đ$: 1.06
15.3k: $M_n$: 15300, $M_w$: 16000, $Đ$: 1.04

2.3k: $M_n$: 2360, $M_w$: 2590, $Đ$: 1.10
3.3k: $M_n$: 3300, $M_w$: 3600, $Đ$: 1.11
4.6k: $M_n$: 4690, $M_w$: 5020, $Đ$: 1.07
6.4k: $M_n$: 6530, $M_w$: 6930, $Đ$: 1.06
8.2k: $M_n$: 8070, $M_w$: 8620, $Đ$: 1.07
9.2k: $M_n$: 9170, $M_w$: 9740, $Đ$: 1.06
10.3k: $M_n$: 10200, $M_w$: 10770, $Đ$: 1.05
15.3k: $M_n$: 15000, $M_w$: 15640, $Đ$: 1.05

2.3k: $M_n$: 9270, $M_w$: 9650, $Đ$: 1.04
3.3k: $M_n$: 12400, $M_w$: 12900, $Đ$: 1.04
4.6k $M_n$: 11700, $M_w$: 12300, $Đ$: 1.05
6.4k $M_n$: 13700, $M_w$: 14300, $Đ$: 1.04
8.2k $M_n$: 15600, $M_w$: 16100, $Đ$: 1.04
9.2k $M_n$: 16600, $M_w$: 17200, $Đ$: 1.04
10.3k $M_n$: 17100, $M_w$: 17700, $Đ$: 1.03
15.3k $M_n$: 21900, $M_w$: 22500, $Đ$: 1.03

Macromonomer: $M_n$: 9270, $M_w$: 9650, $Đ$: 1.04
DP = 10: $M_n$: 58700, $M_w$: 61800, $Đ$: 1.05
DP = 20: $M_n$: 87900, $M_w$: 93100, $Đ$: 1.06
DP = 30: $M_n$: 120000, $M_w$: 130000, $Đ$: 1.09
DP = 40: $M_n$: 150000, $M_w$: 168000, $Đ$: 1.12

Macromonomer: $M_n$: 12400, $M_w$: 12900, $Đ$: 1.04
DP = 25: $M_n$: 105000, $M_w$: 110000, $Đ$: 1.04
DP = 50: $M_n$: 220000, $M_w$: 254000, $Đ$: 1.16
DP = 100: $M_n$: 420000, $M_w$: 493000, $Đ$: 1.17

Macromonomer: $M_n$: 11700, $M_w$: 12300, $Đ$: 1.05
DP = 10: $M_n$: 66200, $M_w$: 68000, $Đ$: 1.03
DP = 20: $M_n$: 101000, $M_w$: 107000, $Đ$: 1.09
DP = 30: $M_n$: 270000, $M_w$: 291000, $Đ$: 1.13
DP = 40: $M_n$: 192000, $M_w$: 234000, $Đ$: 1.22
DP = 50: $M_n$: 207000, $M_w$: 286000, $Đ$: 1.38
DP = 60: $M_n$: 228000, $M_w$: 31000, $Đ$: 1.36
DP = 70: $M_n$: 274000, $M_w$: 389000, $Đ$: 1.42
DP = 80: $M_n$: 344000, $M_w$: 509000, $Đ$: 1.48

Macromonomer: $M_n$: 13700, $M_w$: 14300, $Đ$: 1.04
DP = 10: $M_n$: 77000, $M_w$: 79000, $Đ$: 1.03
DP = 20: $M_n$: 116000, $M_w$: 124000, $Đ$: 1.07
DP = 30: $M_n$: 163000, $M_w$: 187000, $Đ$: 1.15
DP = 40: $M_n$: 271000, $M_w$: 331000, $Đ$: 1.22
DP = 50: $M_n$: 293000, $M_w$: 450000, $Đ$: 1.54
DP = 60: $M_n$: 270000, $M_w$: 381000, $Đ$: 1.41
DP = 70: $M_n$: 287000, $M_w$: 441000, $Đ$: 1.54
DP = 80: $M_n$: 321000, $M_w$: 617000, $Đ$: 1.92

Macromonomer: $M_n$: 15600, $M_w$: 16100, $Đ$: 1.04
DP = 10: $M_n$: 82200, $M_w$: 84700, $Đ$: 1.03
DP = 20: $M_n$: 120000, $M_w$: 129000, $Đ$: 1.07
DP = 30: $M_n$: 175000, $M_w$: 205000, $Đ$: 1.17
DP = 40: $M_n$: 200000, $M_w$: 251000, $Đ$: 1.25
DP = 50: $M_n$: 243000, $M_w$: 313000, $Đ$: 1.29
DP = 60: $M_n$: 250000, $M_w$: 375000, $Đ$: 1.50
DP = 70: $M_n$: 348000, $M_w$: 554000, $Đ$: 1.54

Macromonomer: $M_n$: 16600, $M_w$: 17200, $Đ$: 1.04
DP = 10: $M_n$: 91000, $M_w$: 94200, $Đ$: 1.04
DP = 20: $M_n$: 131000, $M_w$: 140000, $Đ$: 1.07
DP = 30: $M_n$: 176000, $M_w$: 208000, $Đ$: 1.18
DP = 40: $M_n$: 218000, $M_w$: 273000, $Đ$: 1.25
DP = 50: $M_n$: 258000, $M_w$: 344000, $Đ$: 1.33
DP = 60: $M_n$: 292000, $M_w$: 420000, $Đ$: 1.44
DP = 70: $M_n$: 348000, $M_w$: 594000, $Đ$: 1.71

Macromonomer: $M_n$: 17100, $M_w$: 17700, $Đ$: 1.03
DP = 10: $M_n$: 57600, $M_w$: 62400, $Đ$: 1.04
DP = 20: $M_n$: 68500, $M_w$: 75600, $Đ$: 1.11
DP = 30: $M_n$: 71000, $M_w$: 79200, $Đ$: 1.12
DP = 40: $M_n$: 75800, $M_w$: 87000, $Đ$: 1.15
DP = 50: $M_n$: 79500, $M_w$: 91000, $Đ$: 1.14
DP = 60: $M_n$: 82400, $M_w$: 92100, $Đ$: 1.12

Macromonomer: $M_n$: 21900, $M_w$: 22500, $Đ$: 1.03
DP = 10: $M_n$: 115000, $M_w$: 122000, $Đ$: 1.06
DP = 20: $M_n$: 185000, $M_w$: 21000, $Đ$: 1.13
DP = 30: $M_n$: 252000, $M_w$: 305000, $Đ$: 1.21
DP = 40: $M_n$: 321000, $M_w$: 450000, $Đ$: 1.40

3.6k: $M_n$: 3600, $M_w$: 4100, $Đ$: 1.13
4.6k: $M_n$: 4570, $M_w$: 5120, $Đ$: 1.12

PtBA: $M_n$: 3600, $M_w$: 4100, $Đ$: 1.13
Macromonomer: $M_n$: 13100, $M_w$: 13500, $Đ$: 1.03
DP = 25: $M_n$: 103000, $M_w$: 106000, $Đ$: 1.03
DP = 50: $M_n$: 235000, $M_w$: 257000, $Đ$: 1.09
DP = 100: $M_n$: 270000, $M_w$: 291000, $Đ$: 1.08

PS4.6k: $M_n$: 4690, $M_w$: 5020, Đ: 1.07
PS4.6kOH: $M_n$: 4940, $M_w$: 5240, Đ: 1.06
P*t*BA4.6k: $M_n$: 4570, $M_w$: 5120, Đ: 1.12
Nb-PS-4.6-kalkyne: $M_n$: 5260, $M_w$: 5580, Đ: 1.06
Nb-PS-4.6k-*branch*-P*t*BA-4.6k: $M_n$: 7800, $M_w$: 8800, Đ: 1.13

Macromonomer: $M_n$: 7800, $M_w$: 8800, $Đ$: 1.13
DP = 10: $M_n$: 68400, $M_w$: 69700, $Đ$: 1.02
DP = 20: $M_n$: 88600, $M_w$: 90700, $Đ$: 1.02
DP = 30: $M_n$: 111000, $M_w$: 116000, $Đ$: 1.05
DP = 40: $M_n$: 156000, $M_w$: 188000, $Đ$: 1.21

1D SAXS Profile for $(PS4.7k\text{-}br\text{-}PLA3.8k)_n$

Gyroid with $d = 13.6$ nm

BOTTLEBRUSH POLYMERS AND USES THEREOF

RELATED APPLICATIONS

This application is a national stage filing under 35 U.S.C. § 371 of international PCT application, PCT/US2017/048641, filed Aug. 25, 2017, which claims priority under 35 U.S.C. § 119(e) to U.S. provisional patent application, U.S. Ser. No. 62/380,237, filed Aug. 26, 2016, each of which is incorporated herein by reference.

GOVERNMENT SUPPORT

This invention was made with government support under grant number FA9550-14-1-0292 awarded by the Air Force Office of Scientific Research. The government has certain rights in the invention.

BACKGROUND OF THE INVENTION

Bottlebrush polymers (also referred to a polymer brushes) are macromolecules comprising polymeric sidechains attached to a linear polymeric backbone. Bottlebrush polymers are types of branched or graft polymer, and have unique properties due to their highly branched structure. The high molecular weight and high sidechain grating density typical of bottlebrush polymers can allow these macromolecules to self-assemble into well-defined structures with large domain sizes. Such properties give these polymers potential applications in, e.g., photonics, chromatography media, stimuli-responsive materials, lubricants, nanolithography, films, coatings, and drug delivery. Bottlebrush copolymers are bottlebrush polymers comprising two or more different polymeric sidechains (i.e., two or more sidechains of different polymeric composition). These copolymers can be block copolymers, or copolymers wherein the polymeric sidechains are mixed and/or randomly dispersed. For a review on the structure, function, self-assembly, and applications of bottlebrush polymers, see. e.g., Verduzco et al. *Chem. Soc. Rev.* 2015, 44, 2405-2420, and references cite therein; the entire contents of which are incorporated herein by reference.

The merger of advanced polymer architectures with concepts from block copolymer (BCP) assembly[1] has offered numerous strategies for controlling the structure and composition of soft matter on the nanoscale. For example, several studies have investigated the assembly of multi-block linear copolymers, miktoarm star polymers, dendrimers, and bottlebrush block copolymers (BBCPs).[2] BBCPs are particularly interesting due to their dense functionality, high molecular weight, lack of entanglement, large molecular size, and tendency to undergo rapid and efficient bulk phase-separation.[3]

Of the various methods for BBCP synthesis, graft-through ring-opening metathesis polymerization (ROMP) of norbomene-functionalized macromonomers (MMs) has proven to be particularly effective. For example, Grubbs and coworkers have demonstrated the synthesis of a range of various $A_n$-block-$B_m$ BBCPs via sequential addition of "A" and "B" MMs in a "graft-through" ROMP process (FIG. 1A).[4] Alternatively, there are examples of core-shell BBCPs via graft-through ROMP of norbornene-terminated BCP MMs (FIG. 1B).[1b,5]

The synthesis of bottlebrush and related nano-architectures via graft-through ROMP of branched MMs (BMMs) that feature a polymerizable norbornene group at the center of distinct "A" and "B" domains have been of interest.[6] Such polymers mimic alternating copolymers, but are more synthetically accessible.[5d] Though there are now several examples of such Janus-type "A-branch-B" polymers wherein one of the functional domains is a small molecule, there is a need for polymer materials wherein A and B are immiscible polymers (FIG. 1C).[7]

SUMMARY OF THE INVENTION

Nanostructures with certain ordered morphologies (e.g., hexagonal cylindrical, gyroid) provide useful materials for a variety of applications, including photonics (e.g., photonic crystals), functional materials, chromatography media, stimuli-responsive materials, lubricants, nanolithography, films, and coatings. The present invention relates to new bottlebrush polymers (e.g. "A-branch-B bottlebrush copolymers" or "Janus bottlebrush polymers") and copolymers, which are useful in these applications. In certain embodiments, the backbone repeating units of the bottlebrush polymers and copolymers have two different immiscible polymeric sidechains covalently attached to the backbone repeating unit through a branched linker, thus imparting specific structure that results in desired properties (e.g., hexagonal cylindrical and/or gyroid morphologies). In particular, in bottlebrush polymers with dissimilar sidechains, the microdomain period scales with the length of the sidechains instead of the overall backbone length. Ultra-small patterns can therefore be fabricated from a high molecular weight bottlebrush polymer, and the desired pitch of the patterns can be controlled by tuning the sidechain length, thus making possible well-ordered self-assembled thin film nanostructures with diverse applications, such as nanolithographic pattern transfer.

In one aspect, the present invention provides bottlebrush polymers. In certain embodiments, a bottlebrush polymer of the present invention comprises a backbone of repeating units covalently linked to polymeric sidechains, wherein the polymer is capable of self-assembling into structures having a hexagonal cylindrical or gyroid morphology. In certain embodiments, the repeating units of the backbone are the same. In certain embodiments, each repeating unit of the backbone is linked to at least two different polymeric sidechains. In certain embodiments, at least one polymeric sidechain is a polysiloxane (e.g., polydimethylsiloxane).

In certain embodiments, a bottlebrush polymer of the present invention is of Formula (I):

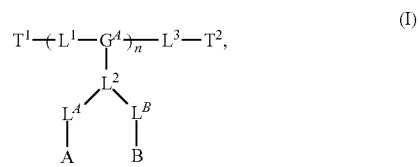

or salts thereof, wherein:

$G^A$ is optionally substituted alkylene, optionally substituted heteroalkylene, optionally substituted carbocyclylene, optionally substituted heterocyclylene, optionally substituted arylene, optionally substituted heteroarylene, or a combination thereof;

each of $L^1$, $L^2$, $L^3$, $L^A$, and $L^B$ is independently a linker selected from the group consisting of a bond, optionally substituted alkylene, optionally substituted heteroalkylene, optionally substituted alkenylene, optionally substituted alkynylene, optionally substituted carbocyclylene, optionally substituted heterocyclylene, optionally substituted arylene, optionally substituted heteroarylene, and combinations thereof;

each of $T^1$ and $T^2$ is independently a terminal group selected from the group consisting of hydrogen, halogen, optionally substituted alkyl, optionally substituted alkenyl, optionally substituted alkynyl, optionally substituted carbocyclyl, optionally substituted heterocyclyl, optionally substituted aryl, optionally substituted heteroaryl, optionally substituted acyl, optionally substituted hydroxyl, optionally substituted amino, and optionally substituted thio;

n is an integer between 1 and 4000, inclusive;

A is a polysiloxane having a number average molecular weight of about 1,000 Da to about 20,000 Da; and B is a different polymer having a number average molecular weight of about 1,000 Da to about 20,000 Da.

For example, in certain embodiments, the bottlebrush polymer of Formula (I) is a bottlebrush polymer of Formula (I-a):

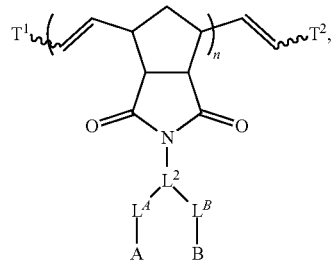

(I-a)

or salts thereof, wherein $T^1$, $T^2$, $L^2$, $L^A$, $L^B$, A, B, n, and m, are as defined in the embodiments of Formula (I).

In certain embodiments, one of A and B is a polysiloxane (e.g., polydimethylsiloxane), and the other is a polyether, a polyester, a polyacrylamide, a polyacrylate, or a vinyl polymer. In certain embodiments, A is a polysiloxane (e.g., polydimethylsiloxane), and B is a vinyl polymer (e.g., polystyrene). In other embodiments, A is a polysiloxane (e.g., polydimethylsiloxane), and B is a polyacrylate (e.g., poly(tert-butylacrylate)).

In certain embodiments, polymers of Formula (I) provides a bottlebrush polymer capable of self-assembling into structures having a gyroid morphology. For example, a bottlebrush polymer of formula (I-a), wherein A is polydimethylsiloxane; and B is poly(tert-butyl acrylate); wherein the ratio of dimethylsiloxane repeating units to tert-butyl acrylate)repeating units is about 2.6:1, may be capable of self-assembling into structures with a gyroid morphology. In particular, a bottlebrush polymer of the following formula may be capable of self-assembling into structures with a gyroid morphology:

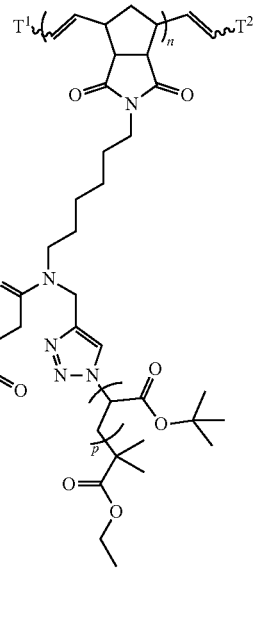

or salts thereof, wherein: each of $T^1$ and $T^2$ is independently hydrogen or phenyl; n is an integer between 10 and 100, inclusive; p is an integer between 10 and 100, inclusive; and q is an integer between 25 and 260, inclusive; wherein the ratio of q:p is about 2.6:1.

In another aspect, the present invention provides bottlebrush copolymers (e.g., AB diblock bottlebrush copolymers). A diblock bottlebrush copolymer of the present invention comprises a backbone of repeating units covalently linked to polymeric sidechains; wherein the copolymer is a diblock copolymer. In certain embodiments, at least one block of the copolymer comprises polysiloxane sidechains (e.g., polydimethylsiloxane). In certain embodiments, one block of the copolymer comprises repeating units of the backbone linked to at least two different polymeric sidechains (e.g., polydimethylsiloxane and polystyrene). In certain embodiments, each block of the copolymer comprises repeating units of the backbone linked to at least two different polymeric sidechains (e.g., poly(lactic acid) and polystyrene).

In certain embodiments, a bottlebrush copolymer of the present invention is of Formula (II):

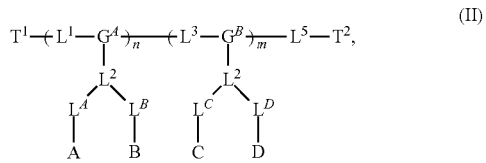

(II)

or salts thereof, wherein:

each of $G^A$ and $G^B$ is independently optionally substituted alkylene, optionally substituted heteroalkylene, optionally substituted carbocyclylene, optionally substituted heterocyclylene, optionally substituted arylene, optionally substituted heteroarylene, or a combination thereof;

each of $L^1$, $L^2$, $L^3$, $L^4$, and $L^5$ is independently a linker selected from the group consisting of a bond, optionally substituted alkylene, optionally substituted heteroalkylene, optionally substituted alkenylene, optionally substituted alkynylene, optionally substituted carbocyclylene, optionally substituted heterocyclylene, optionally substituted arylene, optionally substituted heteroarylene, and combinations thereof;

each of $L^A$, $L^B$, $L^C$, and $L^D$ is independently a linker selected from the group consisting of a bond, optionally substituted alkylene, optionally substituted heteroalkylene, optionally substituted alkenylene, optionally substituted alkynylene, optionally substituted carbocyclylene, optionally substituted heterocyclylene, optionally substituted arylene, optionally substituted heteroarylene, and combinations thereof;

each of $T^1$ and $T^2$ is independently a terminal group selected from the group consisting of hydrogen, halogen, optionally substituted alkyl, optionally substituted alkenyl, optionally substituted alkynyl, optionally substituted carbocyclyl, optionally substituted heterocyclyl, optionally substituted aryl, optionally substituted heteroaryl, optionally substituted acyl, optionally substituted hydroxyl, optionally substituted amino, and optionally substituted thio;

n is an integer between 1 and 4000, inclusive;

m is an integer between 1 and 4000, inclusive; and each of A, B, C, and D is independently a polymer or hydrogen.

In certain embodiments, no more than one of A, B, C, or D is hydrogen. In certain embodiments, no more than two of A, B, C, or D is the same polymer. In certain embodiments, none of A, B, C, or D is the same polymer. In certain embodiments, at least one of A, B, C, or D is a polysiloxane.

For example, in certain embodiments, the bottlebrush copolymer of Formula (II) is a bottlebrush copolymer of Formula (II-a):

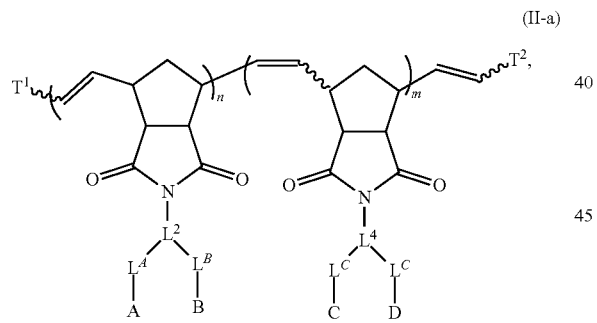

(II-a)

or salts thereof, wherein $T^1$, $T^2$, $L^2$, $L^4$, $L^A$, $L^B$, $L^C$, $L^D$, A, B, C, D, n, and m are as defined in the embodiments of Formula (II).

In certain embodiments, one of A, B, C, and D is a hydrogen; one is a polysiloxane (e.g., polydimethylsiloxane); and the remaining are polymers (e.g. polyethers, polyesters, polyacrylamides, polyacrylates, vinyl polymers). In certain embodiments, one of A, B, C, and D is a polysiloxane (e.g., polydimethylsiloxane); and the remaining are polymers (e.g., polyethers, polyesters, polyacrylamides, polyacrylates, vinyl polymers). In other embodiments, B is a polysiloxane (e.g., polydimethylsiloxane), and A, C, and D are each independently a polyacrylate (e.g., poly(tert-butylacrylate)), a polyester (e.g., poly(lactic acid)), or a vinyl polymer (e.g., polystyrene).

For example, in particular embodiments, a bottlebrush copolymer provided herein is of the following formula:

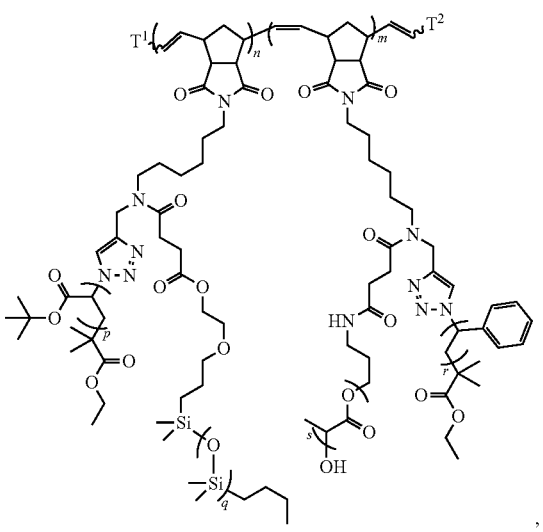

or salts thereof, wherein each of $T^1$ and $T^2$ is independently hydrogen or phenyl; n is an integer between 10 and 100, inclusive; m is an integer between 10 and 100, inclusive; p is an integer between 10 and 50, inclusive; q is an integer between 50 and 100, inclusive; s is an integer between 30 and 70, inclusive; and r is an integer between 10 and 50, inclusive.

As described herein, the present invention provides new bottlebrush polymers with gyroid morphologies. In certain embodiments, provided herein are bottlebrush polymers of Formula (I):

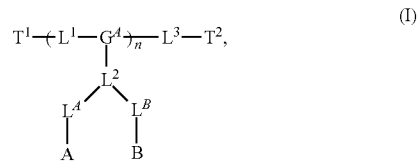

(I)

and salts thereof, wherein:

$G^A$ is optionally substituted alkylene, optionally substituted heteroalkylene, optionally substituted carbocyclylene, optionally substituted heterocyclylene, optionally substituted arylene, optionally substituted heteroarylene, or a combination thereof;

each of $L^1$, $L^2$, $L^3$, $L^A$, and $L^B$ is independently a linker selected from the group consisting of a bond, optionally substituted alkylene, optionally substituted heteroalkylene, optionally substituted alkenylene, optionally substituted alkynylene, optionally substituted carbocyclylene, optionally substituted heterocyclylene, optionally substituted arylene, optionally substituted heteroarylene, and combinations thereof;

each of $T^1$ and $T^2$ is independently a terminal group selected from the group consisting of hydrogen, halogen, optionally substituted alkyl, optionally substituted alkenyl, optionally substituted alkynyl, optionally substituted carbocyclyl, optionally substituted heterocyclyl, optionally substituted aryl, optionally substituted heteroaryl, optionally substituted acyl, optionally substituted hydroxyl, optionally substituted amino, and optionally substituted thio;

n is an integer between 1 and 4000, inclusive;

A is a polymer having a number average molecular weight of about 1,000 Da to about 20,000 Da; and B is a different polymer having a number average molecular weight of about 1,000 Da to about 20,000 Da;

wherein the bottlebrush polymer has a gyroid morphology.

For example, in certain embodiments, polymer A is polylactic acid (ALA) and polymer B is polystyrene (PS). For example, in certain embodiments, the bottlebrush polymer of Formula (I), having a gyroid morphology, is of Formula (I-aa):

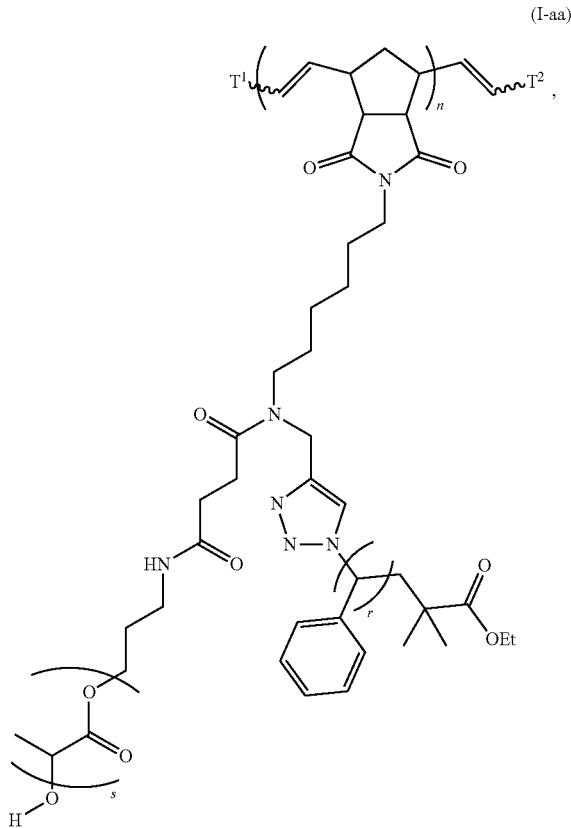

(I-aa)

or a salt thereof, wherein: each of $T^1$ and $T^2$ is independently hydrogen or phenyl; n is an integer between 10 and 100, inclusive; s is an integer between 10 and 100, inclusive; and r is an integer between 10 and 100, inclusive.

In another aspect, the present invention also provides methods of preparing bottlebrush polymers and copolymers described herein via polymerization reactions. In certain embodiments, methods for preparing bottlebrush polymers and copolymers described herein comprises polymerization of the macromonomers using ring-opening metathesis ("ROMP") polymerization.

As described herein, a bottlebrush polymer or diblock bottlebrush copolymer of the present invention may self-assemble to form a structure, such as a photonic crystal.

The present invention also provides uses of bottlebrush polymers and copolymers. For example, the invention provides uses of bottlebrush copolymers and copolymers in a variety of applications, such as photonics (e.g., photonic crystals), functional materials, chromatography media, stimuli-responsive materials, lubricants, nanolithography, films, and coatings. In certain embodiments, the polymers can be used in drug delivery.

The details of certain embodiments of the invention are set forth herein. Other features, objects, and advantages of the invention will be apparent from the Detailed Description, Figures, Examples, and Claims.

Definitions

Chemical Definitions

Definitions of specific functional groups and chemical terms are described in more detail below. The chemical elements are identified in accordance with the Periodic Table of the Elements, CAS version, *Handbook of Chemistry and Physics*, 75th Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March, *March's Advanced Organic Chemistry*, 5th Edition, John Wiley & Sons, Inc., New York, 2001; Larock, *Comprehensive Organic Transformations*, VCH Publishers, Inc., New York, 1989; and Carruthers, *Some Modern Methods of Organic Synthesis*, 3rd Edition. Cambridge University Press, Cambridge, 1987.

Compounds described herein can comprise one or more asymmetric centers, and thus can exist in various stereoisomeric forms, e.g., enantiomers and/or diastereomers. For example, the compounds described herein can be in the form of an individual enantiomer, diastereomer or geometric isomer, or can be in the form of a mixture of stereoisomers, including racemic mixtures and mixtures enriched in one or more stereoisomer. Isomers can be isolated from mixtures by methods known to those skilled in the art, including chiral high pressure liquid chromatography (HPLC) and the formation and crystallization of chiral salts; or preferred isomers can be prepared by asymmetric syntheses. See, for example, Jacques et al., *Enantiomers, Racemates and Resolutions* (Wiley Interscience. New York, 1981); Wilen et al., Tetrahedron 33:2725 (1977); Eliel, E. L. *Stereochemistry of Carbon Compounds* (McGraw-Hill, N Y, 1962); and Wilen, S. H., *Tables of Resolving Agents and Optical Resolutions*, p. 268 (E. L. Eliel, Ed., Univ. of Notre Dame Press, Notre Dame. Ind. 1972). The invention additionally encompasses compounds as individual isomers substantially free of other isomers, and alternatively, as mixtures of various isomers.

In a formula, ⌇⌇ is a single bond where the stereochemistry of the moieties immediately attached thereto is not specified, - - - is absent or a single bond, and ═══ or ≡≡≡ is a single or double bond.

Unless otherwise stated, structures depicted herein are also meant to include compounds that differ only in the presence of one or more isotopically enriched atoms. For example, compounds having the present structures except for the replacement of hydrogen by deuterium or tritium, replacement of $^{19}F$ with $^{18}F$, or the replacement of $^{12}C$ with $^{13}C$ or $^{14}C$ are within the scope of the disclosure. Such compounds are useful, for example, as analytical tools or probes in biological assays.

When a range of values is listed, it is intended to encompass each value and sub-range within the range. For example "$C_{1-6}$ alkyl" is intended to encompass, $C_1$, $C_2$, $C_3$, $C_4$, $C_5$, $C_6$, $C_{1-6}$, $C_{1-5}$, $C_{1-4}$, $C_{1-3}$, $C_{1-2}$, $C_{2-6}$, $C_{2-5}$, $C_{2-4}$, $C_{2-3}$, $C_{3-6}$, $C_{3-5}$, $C_{3-4}$, $C_{4-6}$, $C_{4-5}$, and $C_{5-6}$ alkyl.

The term "aliphatic" refers to alkyl, alkenyl, alkynyl, and carbocyclic groups. Likewise, the term "heteroaliphatic" refers to heteroalkyl, heteroalkenyl, heteroalkynyl, and heterocyclic groups.

The term "alkyl" refers to a radical of a straight-chain or branched saturated hydrocarbon group having from 1 to 10 carbon atoms ("$C_{1-10}$ alkyl"). In some embodiments, an alkyl group has 1 to 9 carbon atoms ("$C_{1-9}$ alkyl"). In some embodiments, an alkyl group has 1 to 8 carbon atoms ("$C_{1-8}$ alkyl"). In some embodiments, an alkyl group has 1 to 7 carbon atoms ("$C_{1-7}$ alkyl"). In some embodiments, an alkyl group has 1 to 6 carbon atoms ("$C_{1-6}$ alkyl"). In some embodiments, an alkyl group has 1 to 5 carbon atoms ("$C_{1-5}$ alkyl"). In some embodiments, an alkyl group has 1 to 4 carbon atoms ("$C_{1-4}$ alkyl"). In some embodiments, an alkyl group has 1 to 3 carbon atoms ("$C_{1-3}$ alkyl"). In some embodiments, an alkyl group has 1 to 2 carbon atoms ("$C_{1-2}$ alkyl"). In some embodiments, an alkyl group has 1 carbon atom ("$C_1$ alkyl"). In some embodiments, an alkyl group has 2 to 6 carbon atoms ("$C_{2-6}$ alkyl"). Examples of $C_{1-6}$ alkyl groups include methyl ($C_1$), ethyl ($C_2$), propyl ($C_3$) (e.g., n-propyl, isopropyl), butyl ($C_4$) (e.g., n-butyl, tert-butyl, sec-butyl, iso-butyl), pentyl ($C_5$) (e.g., n-pentyl, 3-pentanyl, amyl, neopentyl, 3-methyl-2-butanyl, tertiary amyl), and hexyl ($C_6$) (e.g., n-hexyl). Additional examples of alkyl groups include n-heptyl ($C_7$), n-octyl ($C_8$), and the like. Unless otherwise specified, each instance of an alkyl group is independently unsubstituted (an "unsubstituted alkyl") or substituted (a "substituted alkyl") with one or more substituents (e.g., halogen, such as F). In certain embodiments, the alkyl group is an unsubstituted $C_{1-10}$ alkyl (such as unsubstituted $C_{1-6}$ alkyl, e.g., —$CH_3$ (Me), unsubstituted ethyl (Et), unsubstituted propyl (Pr, e.g., unsubstituted n-propyl (n-Pr), unsubstituted isopropyl (i-Pr)), unsubstituted butyl (Bu. e.g., unsubstituted n-butyl (n-Bu), unsubstituted tert-butyl (tert-Bu or t-Bu), unsubstituted sec-butyl (sec-Bu), unsubstituted isobutyl (i-Bu)). In certain embodiments, the alkyl group is a substituted $C_{1-10}$ alkyl (such as substituted $C_{1-6}$ alkyl, e.g., —$CF_3$, Bn).

The term "haloalkyl" is a substituted alkyl group, wherein one or more of the hydrogen atoms are independently replaced by a halogen, e.g., fluoro, bromo, chloro, or iodo. In some embodiments, the haloalkyl moiety has 1 to 8 carbon atoms ("$C_{1-8}$ haloalkyl"). In some embodiments, the haloalkyl moiety has 1 to 6 carbon atoms ("$C_{1-6}$ haloalkyl"). In some embodiments, the haloalkyl moiety has 1 to 4 carbon atoms ("$C_{1-4}$ haloalkyl"). In some embodiments, the haloalkyl moiety has 1 to 3 carbon atoms ("$C_{1-3}$ haloalkyl"). In some embodiments, the haloalkyl moiety has 1 to 2 carbon atoms ("$C_{1-2}$ haloalkyl"). Examples of haloalkyl groups include —$CF_3$, —$CF_2CF_3$, —$CF_2CF_2CF_3$, —$CCl_3$, —$CFCl_2$, —$CF_2Cl$, and the like.

The term "heteroalkyl" refers to an alkyl group, which further includes at least one heteroatom (e.g., 1, 2, 3, or 4 heteroatoms) selected from oxygen, nitrogen, or sulfur within (i.e., inserted between adjacent carbon atoms of) and/or placed at one or more terminal position(s) of the parent chain. In certain embodiments, a heteroalkyl group refers to a saturated group having from 1 to 10 carbon atoms and 1 or more heteroatoms within the parent chain ("hetero$C_{1-10}$ alkyl"). In some embodiments, a heteroalkyl group is a saturated group having 1 to 9 carbon atoms and 1 or more heteroatoms within the parent chain ("hetero$C_{1-9}$ alkyl"). In some embodiments, a heteroalkyl group is a saturated group having 1 to 8 carbon atoms and 1 or more heteroatoms within the parent chain ("hetero$C_{1-8}$ alkyl"). In some embodiments, a heteroalkyl group is a saturated group having 1 to 7 carbon atoms and 1 or more heteroatoms within the parent chain ("hetero$C_{1-7}$ alkyl"). In some embodiments, a heteroalkyl group is a saturated group having 1 to 6 carbon atoms and 1 or more heteroatoms within the parent chain ("hetero$C_{1-6}$ alkyl"). In some embodiments, a heteroalkyl group is a saturated group having 1 to 5 carbon atoms and 1 or 2 heteroatoms within the parent chain ("hetero$C_{1-5}$ alkyl"). In some embodiments, a heteroalkyl group is a saturated group having 1 to 4 carbon atoms and 1 or 2 heteroatoms within the parent chain ("hetero$C_{1-4}$ alkyl"). In some embodiments, a heteroalkyl group is a saturated group having 1 to 3 carbon atoms and 1 heteroatom within the parent chain ("hetero$C_{1-3}$ alkyl"). In some embodiments, a heteroalkyl group is a saturated group having 1 to 2 carbon atoms and 1 heteroatom within the parent chain ("hetero$C_{1-2}$ alkyl"). In some embodiments, a heteroalkyl group is a saturated group having 1 carbon atom and 1 heteroatom ("hetero$C_{1-3}$ alkyl"). In some embodiments, a heteroalkyl group is a saturated group having 2 to 6 carbon atoms and 1 or 2 heteroatoms within the parent chain ("hetero$C_{2-6}$ alkyl"). Unless otherwise specified, each instance of a heteroalkyl group is independently unsubstituted (an "unsubstituted heteroalkyl") or substituted (a "substituted heteroalkyl") with one or more substituents. In certain embodiments, the heteroalkyl group is an unsubstituted hetero$C_{1-10}$ alkyl. In certain embodiments, the heteroalkyl group is a substituted hetero$C_{1-10}$ alkyl.

The term "alkenyl" refers to a radical of a straight-chain or branched hydrocarbon group having from 2 to 10 carbon atoms and one or more carbon-carbon double bonds (e.g., 1, 2, 3, or 4 double bonds). In some embodiments, an alkenyl group has 2 to 9 carbon atoms ("$C_{2-9}$ alkenyl"). In some embodiments, an alkenyl group has 2 to 8 carbon atoms ("$C_{2-4}$ alkenyl"). In some embodiments, an alkenyl group has 2 to 7 carbon atoms ("$C_{2-7}$ alkenyl"). In some embodiments, an alkenyl group has 2 to 6 carbon atoms ("$C_{2-6}$ alkenyl"). In some embodiments, an alkenyl group has 2 to 5 carbon atoms ("$C_{2-5}$ alkenyl"). In some embodiments, an alkenyl group has 2 to 4 carbon atoms ("$C_{2-4}$ alkenyl"). In some embodiments, an alkenyl group has 2 to 3 carbon atoms ("$C_{2-3}$ alkenyl"). In some embodiments, an alkenyl group has 2 carbon atoms ("$C_2$ alkenyl"). The one or more carbon-carbon double bonds can be internal (such as in 2-butenyl) or terminal (such as in 1-butenyl). Examples of $C_{2-4}$ alkenyl groups include ethenyl ($C_2$), 1-propenyl ($C_3$), 2-propenyl ($C_3$), 1-butenyl ($C_4$), 2-butenyl ($C_4$), butadienyl ($C_4$), and the like. Examples of $C_{2-6}$ alkenyl groups include the aforementioned $C_{2-4}$ alkenyl groups as well as pentenyl ($C_5$), pentadienyl ($C_5$), hexenyl ($C_6$), and the like. Additional examples of alkenyl include heptenyl ($C_7$), octenyl ($C_8$), octatrienyl ($C_8$), and the like. Unless otherwise specified, each instance of an alkenyl group is independently unsubstituted (an "unsubstituted alkenyl") or substituted (a "substituted alkenyl") with one or more substituents. In certain embodiments, the alkenyl group is an unsubstituted $C_{2-10}$ alkenyl. In certain embodiments, the alkenyl group is a substituted $C_{2-10}$ alkenyl. In an alkenyl group, a C=C double bond for which the stereochemistry is not specified (e.g., —CH=$CHCH_3$ or 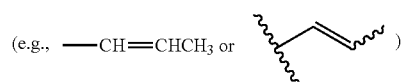 )

may be an (E)- or (Z)-double bond.

The term "heteroalkenyl" refers to an alkenyl group, which further includes at least one heteroatom (e.g., 1, 2, 3, or 4 heteroatoms) selected from oxygen, nitrogen, or sulfur within (i.e., inserted between adjacent carbon atoms of) and/or placed at one or more terminal position(s) of the parent chain. In certain embodiments, a heteroalkenyl group refers to a group having from 2 to 10 carbon atoms, at least one double bond, and 1 or more heteroatoms within the parent chain ("heteroC$_{2-10}$ alkenyl"). In some embodiments, a heteroalkenyl group has 2 to 9 carbon atoms at least one double bond, and 1 or more heteroatoms within the parent chain ("heteroC$_{2-9}$ alkenyl"). In some embodiments, a heteroalkenyl group has 2 to 8 carbon atoms, at least one double bond, and 1 or more heteroatoms within the parent chain ("heteroC$_{2-8}$ alkenyl"). In some embodiments, a heteroalkenyl group has 2 to 7 carbon atoms, at least one double bond, and 1 or more heteroatoms within the parent chain ("heteroC$_{2-7}$ alkenyl"). In some embodiments, a heteroalkenyl group has 2 to 6 carbon atoms, at least one double bond, and 1 or more heteroatoms within the parent chain ("heteroC$_{2-6}$ alkenyl"). In some embodiments, a heteroalkenyl group has 2 to 5 carbon atoms, at least one double bond, and 1 or 2 heteroatoms within the parent chain ("heteroC$_{2-5}$ alkenyl"). In some embodiments, a heteroalkenyl group has 2 to 4 carbon atoms, at least one double bond, and 1 or 2 heteroatoms within the parent chain ("heteroC$_{2-4}$ alkenyl"). In some embodiments, a heteroalkenyl group has 2 to 3 carbon atoms, at least one double bond, and 1 heteroatom within the parent chain ("heteroC$_{2-3}$ alkenyl"). In some embodiments, a heteroalkenyl group has 2 to 6 carbon atoms, at least one double bond, and 1 or 2 heteroatoms within the parent chain ("heteroC$_{2-6}$ alkenyl"). Unless otherwise specified, each instance of a heteroalkenyl group is independently unsubstituted (an "unsubstituted heteroalkenyl") or substituted (a "substituted heteroalkenyl") with one or more substituents. In certain embodiments, the heteroalkenyl group is an unsubstituted heteroC$_{2-10}$ alkenyl. In certain embodiments, the heteroalkenyl group is a substituted heteroC$_{2-10}$ alkenyl.

The term "alkynyl" refers to a radical of a straight-chain or branched hydrocarbon group having from 2 to 10 carbon atoms and one or more carbon-carbon triple bonds (e.g., 1, 2, 3, or 4 triple bonds) ("C$_{2-10}$ alkynyl"). In some embodiments, an alkynyl group has 2 to 9 carbon atoms ("C$_{2-9}$ alkynyl"). In some embodiments, an alkynyl group has 2 to 8 carbon atoms ("C$_{2-8}$ alkynyl"). In some embodiments, an alkynyl group has 2 to 7 carbon atoms ("C$_{2-7}$ alkynyl"). In some embodiments, an alkynyl group has 2 to 6 carbon atoms ("C$_2$, alkynyl"). In some embodiments, an alkynyl group has 2 to 5 carbon atoms ("C$_{2-5}$ alkynyl"). In some embodiments, an alkynyl group has 2 to 4 carbon atoms ("C$_{2-4}$ alkynyl"). In some embodiments, an alkynyl group has 2 to 3 carbon atoms ("C$_{2-3}$ alkynyl"). In some embodiments, an alkynyl group has 2 carbon atoms ("C$_2$ alkynyl"). The one or more carbon-carbon triple bonds can be internal (such as in 2-butynyl) or terminal (such as in 1-butynyl). Examples of C$_{2-4}$ alkynyl groups include, without limitation, ethynyl (C$_2$), 1-propynyl (C$_3$), 2-propynyl (C$_3$), 1-butynyl (C$_4$), 2-butynyl (C$_4$), and the like. Examples of C$_{2-6}$ alkenyl groups include the aforementioned C$_{2-4}$ alkynyl groups as well as pentynyl (C$_5$), hexynyl (C$_6$), and the like. Additional examples of alkynyl include heptynyl (C$_7$), octynyl (C$_8$), and the like. Unless otherwise specified, each instance of an alkynyl group is independently unsubstituted (an "unsubstituted alkynyl") or substituted (a "substituted alkynyl") with one or more substituents. In certain embodiments, the alkynyl group is an unsubstituted C$_{2-10}$ alkynyl. In certain embodiments, the alkynyl group is a substituted C$_{2-10}$ alkynyl.

The term "heteroalkynyl" refers to an alkynyl group, which further includes at least one heteroatom (e.g., 1, 2, 3, or 4 heteroatoms) selected from oxygen, nitrogen, or sulfur within (i.e., inserted between adjacent carbon atoms of) and/or placed at one or more terminal position(s) of the parent chain. In certain embodiments, a heteroalkynyl group refers to a group having from 2 to 10 carbon atoms, at least one triple bond, and 1 or more heteroatoms within the parent chain ("heteroC$_{2-10}$ alkynyl"). In some embodiments, a heteroalkynyl group has 2 to 9 carbon atoms, at least one triple bond, and 1 or more heteroatoms within the parent chain ("heteroC$_{2-9}$ alkynyl"). In some embodiments, a heteroalkynyl group has 2 to 8 carbon atoms, at least one triple bond, and 1 or more heteroatoms within the parent chain ("heteroC$_{2-8}$ alkynyl"). In some embodiments, a heteroalkynyl group has 2 to 7 carbon atoms, at least one triple bond, and 1 or more heteroatoms within the parent chain ("heteroC$_{2-7}$ alkynyl"). In some embodiments, a heteroalkynyl group has 2 to 6 carbon atoms, at least one triple bond, and 1 or more heteroatoms within the parent chain ("heteroC$_{2-6}$ alkynyl"). In some embodiments, a heteroalkynyl group has 2 to 5 carbon atoms, at least one triple bond, and 1 or 2 heteroatoms within the parent chain ("heteroC$_{2-5}$ alkynyl"). In some embodiments, a heteroalkynyl group has 2 to 4 carbon atoms, at least one triple bond, and 1 or 2 heteroatoms within the parent chain ("heteroC$_{2-4}$ alkynyl"). In some embodiments, a heteroalkynyl group has 2 to 3 carbon atoms, at least one triple bond, and 1 heteroatom within the parent chain ("heteroC$_{2-3}$ alkynyl"). In some embodiments, a heteroalkynyl group has 2 to 6 carbon atoms, at least one triple bond, and 1 or 2 heteroatoms within the parent chain ("heteroC$_{2-6}$ alkynyl"). Unless otherwise specified, each instance of a heteroalkynyl group is independently unsubstituted (an "unsubstituted heteroalkynyl") or substituted (a "substituted heteroalkynyl") with one or more substituents. In certain embodiments, the heteroalkynyl group is an unsubstituted heteroC$_{2-10}$ alkynyl. In certain embodiments, the heteroalkynyl group is a substituted heteroC$_{2-10}$ alkynyl.

The term "carbocyclyl" or "carbocyclic" refers to a radical of a non-aromatic cyclic hydrocarbon group having from 3 to 14 ring carbon atoms ("C$_{3-14}$ carbocyclyl") and zero heteroatoms in the non-aromatic ring system. In some embodiments, a carbocyclyl group has 3 to 10 ring carbon atoms ("C$_{3-10}$ carbocyclyl"). In some embodiments, a carbocyclyl group has 3 to 8 ring carbon atoms ("C$_{3-8}$ carbocyclyl"). In some embodiments, a carbocyclyl group has 3 to 7 ring carbon atoms ("C$_{3-7}$ carbocyclyl"). In some embodiments, a carbocyclyl group has 3 to 6 ring carbon atoms ("C$_{3-6}$ carbocyclyl"). In some embodiments, a carbocyclyl group has 4 to 6 ring carbon atoms ("C$_{4-6}$ carbocyclyl"). In some embodiments, a carbocyclyl group has 5 to 6 ring carbon atoms ("C$_{5-6}$ carbocyclyl"). In some embodiments, a carbocyclyl group has 5 to 10 ring carbon atoms ("C$_{5-10}$ carbocyclyl"). Exemplary C$_{3-6}$ carbocyclyl groups include, without limitation, cyclopropyl (C$_3$), cyclopropenyl (C$_3$), cyclobutyl (C$_4$), cyclobutenyl (C$_4$), cyclopentyl (C$_5$), cyclopentenyl (C$_5$), cyclohexyl (C$_6$), cyclohexenyl (C$_6$), cyclohexadienyl (C$_6$), and the like. Exemplary C$_{3-8}$ carbocyclyl groups include, without limitation, the aforementioned C$_{3-6}$ carbocyclyl groups as well as cycloheptyl (C$_7$), cycloheptenyl (C$_7$), cycloheptadienyl (C$_7$), cycloheptatrienyl (C$_7$), cyclooctyl (C$_8$), cyclooctenyl (C$_8$), bicyclo[2.2.1]heptanyl (C$_7$), bicyclo[2.2.2]octanyl (C$_8$), and the like. Exemplary C$_{3-10}$ carbocyclyl groups include, without limitation, the aforementioned $C_{3-8}$ carbocyclyl groups as well as cyclononyl ($C_9$), cyclononenyl ($C_9$), cyclodecyl ($C_{10}$), cyclodecenyl ($C_{10}$), octahydro-1H-indenyl ($C_9$), decahydronaphthalenyl ($C_{10}$), spiro[4.5]decanyl ($C_{10}$), and the like. As the foregoing examples illustrate, in certain embodiments, the carbocyclyl group is either monocyclic ("monocyclic carbocyclyl") or polycyclic (e.g., containing a fused, bridged or spiro ring system such as a bicyclic system ("bicyclic carbocyclyl") or tricyclic system ("tricyclic carbocyclyl")) and can be saturated or can contain one or more carbon-carbon double or triple bonds. "Carbocyclyl" also includes ring systems wherein the carbocyclyl ring, as defined above, is fused with one or more aryl or heteroaryl groups wherein the point of attachment is on the carbocyclyl ring, and in such instances, the number of carbons continue to designate the number of carbons in the carbocyclic ring system. Unless otherwise specified, each instance of a carbocyclyl group is independently unsubstituted (an "unsubstituted carbocyclyl") or substituted (a "substituted carbocyclyl") with one or more substituents. In certain embodiments, the carbocyclyl group is an unsubstituted $C_{3-14}$ carbocyclyl. In certain embodiments, the carbocyclyl group is a substituted $C_{3-14}$ carbocyclyl.

In some embodiments. "carbocyclyl" is a monocyclic, saturated carbocyclyl group having from 3 to 14 ring carbon atoms ("$C_{3-14}$ cycloalkyl"). In some embodiments, a cycloalkyl group has 3 to 10 ring carbon atoms ("$C_{3-10}$ cycloalkyl"). In some embodiments, a cycloalkyl group has 3 to 8 ring carbon atoms ("$C_{3-8}$ cycloalkyl"). In some embodiments, a cycloalkyl group has 3 to 6 ring carbon atoms ("$C_{3-6}$ cycloalkyl"). In some embodiments, a cycloalkyl group has 4 to 6 ring carbon atoms ("$C_{4-6}$ cycloalkyl"). In some embodiments, a cycloalkyl group has 5 to 6 ring carbon atoms ("$C_{4-6}$ cycloalkyl"). In some embodiments, a cycloalkyl group has 5 to 10 ring carbon atoms ("$C_{5-10}$ cycloalkyl"). Examples of $C_{5-6}$ cycloalkyl groups include cyclopentyl ($C_5$) and cyclohexyl ($C_6$). Examples of $C_{3-6}$ cycloalkyl groups include the aforementioned $C_{5-6}$ cycloalkyl groups as well as cyclopropyl ($C_3$) and cyclobutyl ($C_4$). Examples of $C_{3-8}$ cycloalkyl groups include the aforementioned $C_{3-6}$ cycloalkyl groups as well as cycloheptyl ($C_7$) and cyclooctyl ($C_8$). Unless otherwise specified, each instance of a cycloalkyl group is independently unsubstituted (an "unsubstituted cycloalkyl") or substituted (a "substituted cycloalkyl") with one or more substituents. In certain embodiments, the cycloalkyl group is an unsubstituted $C_{3-14}$ cycloalkyl. In certain embodiments, the cycloalkyl group is a substituted $C_{3-14}$ cycloalkyl.

The term "heterocyclyl" or "heterocyclic" refers to a radical of a 3- to 14-membered non-aromatic ring system having ring carbon atoms and 1 to 4 ring heteroatoms, wherein each heteroatom is independently selected from nitrogen, oxygen, and sulfur ("3-14 membered heterocyclyl"). In heterocyclyl groups that contain one or more nitrogen atoms, the point of attachment can be a carbon or nitrogen atom, as valency permits. A heterocyclyl group can either be monocyclic ("monocyclic heterocyclyl") or polycyclic (e.g., a fused, bridged or spiro ring system such as a bicyclic system ("bicyclic heterocyclyl") or tricyclic system ("tricyclic heterocyclyl")), and can be saturated or can contain one or more carbon-carbon double or triple bonds. Heterocyclyl polycyclic ring systems can include one or more heteroatoms in one or both rings. "Heterocyclyl" also includes ring systems wherein the heterocyclyl ring, as defined above, is fused with one or more carbocyclyl groups wherein the point of attachment is either on the carbocyclyl or heterocyclyl ring, or ring systems wherein the heterocyclyl ring, as defined above, is fused with one or more aryl or heteroaryl groups, wherein the point of attachment is on the heterocyclyl ring, and in such instances, the number of ring members continue to designate the number of ring members in the heterocyclyl ring system. Unless otherwise specified, each instance of heterocyclyl is independently unsubstituted (an "unsubstituted heterocyclyl") or substituted (a "substituted heterocyclyl") with one or more substituents. In certain embodiments, the heterocyclyl group is an unsubstituted 3-14 membered heterocyclyl. In certain embodiments, the heterocyclyl group is a substituted 3-14 membered heterocyclyl.

In some embodiments, a heterocyclyl group is a 5-10 membered non-aromatic ring system having ring carbon atoms and 1-4 ring heteroatoms, wherein each heteroatom is independently selected from nitrogen, oxygen, and sulfur ("5-10 membered heterocyclyl"). In some embodiments, a heterocyclyl group is a 5-8 membered non-aromatic ring system having ring carbon atoms and 1-4 ring heteroatoms, wherein each heteroatom is independently selected from nitrogen, oxygen, and sulfur ("5-8 membered heterocyclyl"). In some embodiments, a heterocyclyl group is a 5-6 membered non-aromatic ring system having ring carbon atoms and 1-4 ring heteroatoms, wherein each heteroatom is independently selected from nitrogen, oxygen, and sulfur ("5-6 membered heterocyclyl"). In some embodiments, the 5-6 membered heterocyclyl has 1-3 ring heteroatoms selected from nitrogen, oxygen, and sulfur. In some embodiments, the 5-6 membered heterocyclyl has 1-2 ring heteroatoms selected from nitrogen, oxygen, and sulfur. In some embodiments, the 5-6 membered heterocyclyl has 1 ring heteroatom selected from nitrogen, oxygen, and sulfur. Exemplary 3-membered heterocyclyl groups containing 1 heteroatom include, without limitation, azirdinyl, oxiranyl, and thiiranyl. Exemplary 4-membered heterocyclyl groups containing 1 heteroatom include, without limitation, azetidinyl, oxetanyl, and thietanyl. Exemplary 5-membered heterocyclyl groups containing 1 heteroatom include, without limitation, tetrahydrofuranyl, dihydrofuranyl, tetrahydrothiophenyl, dihydrothiophenyl, pyrrolidinyl, dihydropyrrolyl, and pyrrolyl-2,5-dione. Exemplary 5-membered heterocyclyl groups containing 2 heteroatoms include, without limitation, dioxolanyl, oxathiolanyl and dithiolanyl. Exemplary 5-membered heterocyclyl groups containing 3 heteroatoms include, without limitation, triazolinyl, oxadiazolinyl, and thiadiazolinyl. Exemplary 6-membered heterocyclyl groups containing 1 heteroatom include, without limitation, piperidinyl, tetrahydropyranyl, dihydropyridinyl, and thianyl. Exemplary 6-membered heterocyclyl groups containing 2 heteroatoms include, without limitation, piperazinyl, morpholinyl, dithianyl, and dioxanyl. Exemplary 6-membered heterocyclyl groups containing 2 heteroatoms include, without limitation, triazinanyl. Exemplary 7-membered heterocyclyl groups containing 1 heteroatom include, without limitation, azepanyl, oxepanyl and thiepanyl. Exemplary 8-membered heterocyclyl groups containing 1 heteroatom include, without limitation, azocanyl, oxecanyl and thiocanyl. Exemplary bicyclic heterocyclyl groups include, without limitation, indolinyl, isoindolinyl, dihydrobenzofuranyl, dihydrobenzothienyl, tetrahydrobenzothienyl, tetrahydrobenzofuranyl, tetrahydroindolyl, tetrahydroquinolinyl, tetrahydroisoquinolinyl, decahydroquinolinyl, decahydroisoquinolinyl, octahydrochromenyl, octahydroisochromenyl, decahydronaphthyridinyl, decahydro-1,8-naphthyridinyl, octahydropyrrolo[3,2-b]pyrrole, indolinyl, phthalimidyl, naphthalimidyl, chromanyl, chromenyl, 1H-benzo[e][1,4]diazepinyl, 1,4,5,7-tetrahydropyrano[3,4-b]pyrrolyl, 5,6-dihydro-4H-furo[3,2-b]pyrrolyl, 6,7-dihydro-5H-furo[3,2-b]pyranyl, 5,7-dihydro-4H-thieno[2,3-c]pyranyl, 2,3-dihydro-1H-pyrrolo[2,3-b]pyridinyl, 2,3-dihydrofuro[2,3-b]pyridinyl, 4,5,6,7-tetrahydro-1H-pyrrolo[2,3-b]pyridinyl, 4,5,6,7-tetrahydrofuro[3,2-c]pyridinyl, 4,5,6,7-tetrahydrothieno[3,2-b]pyridinyl, 1,2,3,4-tetrahydro-1,6-naphthyridinyl, and the like.

The term "aryl" refers to a radical of a monocyclic or polycyclic (e.g., bicyclic or tricyclic) 4n+2 aromatic ring system (e.g., having 6, 10, or 14 π electrons shared in a cyclic array) having 6-14 ring carbon atoms and zero heteroatoms provided in the aromatic ring system ("$C_{6-14}$ aryl"). In some embodiments, an aryl group has 6 ring carbon atoms ("$C_6$ aryl"; e.g., phenyl). In some embodiments, an aryl group has 10 ring carbon atoms ("$C_{10}$ aryl"; e.g., naphthyl such as 1-naphthyl and 2-naphthyl). In some embodiments, an aryl group has 14 ring carbon atoms ("$C_{14}$ aryl"; e.g., anthracyl). "Aryl" also includes ring systems wherein the aryl ring, as defined above, is fused with one or more carbocyclyl or heterocyclyl groups wherein the radical or point of attachment is on the aryl ring, and in such instances, the number of carbon atoms continue to designate the number of carbon atoms in the aryl ring system. Unless otherwise specified, each instance of an aryl group is independently unsubstituted (an "unsubstituted aryl") or substituted (a "substituted aryl") with one or more substituents. In certain embodiments, the aryl group is an unsubstituted $C_{6-14}$ aryl. In certain embodiments, the aryl group is a substituted $C_{6-14}$ aryl.

The term "heteroaryl" refers to a radical of a 5-14 membered monocyclic or polycyclic (e.g., bicyclic, tricyclic) 4n+2 aromatic ring system (e.g., having 6, 10, or 14 π electrons shared in a cyclic array) having ring carbon atoms and 1-4 ring heteroatoms provided in the aromatic ring system, wherein each heteroatom is independently selected from nitrogen, oxygen, and sulfur ("5-14 membered heteroaryl"). In heteroaryl groups that contain one or more nitrogen atoms, the point of attachment can be a carbon or nitrogen atom, as valency permits. Heteroaryl polycyclic ring systems can include one or more heteroatoms in one or both rings. "Heteroaryl" includes ring systems wherein the heteroaryl ring, as defined above, is fused with one or more carbocyclyl or heterocyclyl groups wherein the point of attachment is on the heteroaryl ring, and in such instances, the number of ring members continue to designate the number of ring members in the heteroaryl ring system. "Heteroaryl" also includes ring systems wherein the heteroaryl ring, as defined above, is fused with one or more aryl groups wherein the point of attachment is either on the aryl or heteroaryl ring, and in such instances, the number of ring members designates the number of ring members in the fused polycyclic (aryl/heteroaryl) ring system. Polycyclic heteroaryl groups wherein one ring does not contain a heteroatom (e.g., indolyl, quinolinyl, carbazolyl, and the like) the point of attachment can be on either ring, i.e., either the ring bearing a heteroatom (e.g., 2-indolyl) or the ring that does not contain a heteroatom (e.g., 5-indolyl).

In some embodiments, a heteroaryl group is a 5-10 membered aromatic ring system having ring carbon atoms and 1-4 ring heteroatoms provided in the aromatic ring system, wherein each heteroatom is independently selected from nitrogen, oxygen, and sulfur ("5-10 membered heteroaryl"). In some embodiments, a heteroaryl group is a 5-8 membered aromatic ring system having ring carbon atoms and 1-4 ring heteroatoms provided in the aromatic ring system, wherein each heteroatom is independently selected from nitrogen, oxygen, and sulfur ("5-8 membered heteroaryl"). In some embodiments, a heteroaryl group is a 5-6 membered aromatic ring system having ring carbon atoms and 1-4 ring heteroatoms provided in the aromatic ring system, wherein each heteroatom is independently selected from nitrogen, oxygen, and sulfur ("5-6 membered heteroaryl"). In some embodiments, the 5-6 membered heteroaryl has 1-3 ring heteroatoms selected from nitrogen, oxygen, and sulfur. In some embodiments, the 5-6 membered heteroaryl has 1-2 ring heteroatoms selected from nitrogen, oxygen, and sulfur. In some embodiments, the 5-6 membered heteroaryl has 1 ring heteroatom selected from nitrogen, oxygen, and sulfur. Unless otherwise specified, each instance of a heteroaryl group is independently unsubstituted (an "unsubstituted heteroaryl") or substituted (a "substituted heteroaryl") with one or more substituents. In certain embodiments, the heteroaryl group is an unsubstituted 5-14 membered heteroaryl. In certain embodiments, the heteroaryl group is a substituted 5-14 membered heteroaryl. Exemplary 5-membered heteroaryl groups containing 1 heteroatom include, without limitation, pyrrolyl, furanyl, and thiophenyl. Exemplary 5-membered heteroaryl groups containing 2 heteroatoms include, without limitation, imidazolyl, pyrazolyl, oxazolyl, isoxazolyl, thiazolyl, and isothiazolyl. Exemplary 5-membered heteroaryl groups containing 3 heteroatoms include, without limitation, triazolyl, oxadiazolyl, and thiadiazolyl. Exemplary 5-membered heteroaryl groups containing 4 heteroatoms include, without limitation, tetrazolyl. Exemplary 6-membered heteroaryl groups containing 1 heteroatom include, without limitation, pyridinyl. Exemplary 6-membered heteroaryl groups containing 2 heteroatoms include, without limitation, pyridazinyl, pyrimidinyl, and pyrazinyl. Exemplary 6-membered heteroaryl groups containing 3 or 4 heteroatoms include, without limitation, triazinyl and tetrazinyl, respectively. Exemplary 7-membered heteroaryl groups containing 1 heteroatom include, without limitation, azepinyl, oxepinyl, and thiepinyl. Exemplary 5,6-bicyclic heteroaryl groups include, without limitation, indolyl, isoindolyl, indazolyl, benzotriazolyl, benzothiophenyl, isobenzothiophenyl, benzofuranyl, benzoisofuranyl, benzimidazolyl, benzoxazolyl, benzisoxazolyl, benzoxadiazolyl, benzthiazolyl, benzisothiazolyl, benzthiadiazolyl, indolizinyl, and purinyl. Exemplary 6,6-bicyclic heteroaryl groups include, without limitation, naphthyridinyl, pteridinyl, quinolinyl, isoquinolinyl, cinnolinyl, quinoxalinyl, phthalazinyl, and quinazolinyl. Exemplary tricyclic heteroaryl groups include, without limitation, phenanthridinyl, dibenzofuranyl, carbazolyl, acridinyl, phenothiazinyl, phenoxazinyl and phenazinyl.

The term "unsaturated bond" refers to a double or triple bond.

The term "unsaturated" or "partially unsaturated" refers to a moiety that includes at least one double or triple bond.

The term "saturated" refers to a moiety that does not contain a double or triple bond, i.e., the moiety only contains single bonds.

Affixing the suffix "-ene" to a group indicates the group is a divalent moiety, e.g., alkylene is the divalent moiety of alkyl, alkenylene is the divalent moiety of alkenyl, alkynylene is the divalent moiety of alkynyl, heteroalkylene is the divalent moiety of heteroalkyl, heteroalkenylene is the divalent moiety of heteroalkenyl, heteroalkynylene is the divalent moiety of heteroalkynyl, carbocyclylene is the divalent moiety of carbocyclyl, heterocyclylene is the divalent moiety of heterocyclyl, arylene is the divalent moiety of aryl, heteroarylene is the divalent moiety of heteroaryl, and heteroarylalkylene is the divalent moiety of heteroarylalkyl.

A group is optionally substituted unless expressly provided otherwise. The term "optionally substituted" refers to being substituted or unsubstituted. In certain embodiments, alkyl, alkenyl, alkynyl, heteroalkyl, heteroalkenyl, heteroalkynyl, carbocyclyl, heterocyclyl, aryl, and heteroaryl groups are optionally substituted. "Optionally substituted" refers to a group which may be substituted or unsubstituted (e.g., "substituted" or "unsubstituted" alkyl, "substituted" or "unsubstituted" alkenyl. "substituted" or "unsubstituted" alkynyl, "substituted" or "unsubstituted" heteroalkyl, "substituted" or "unsubstituted" heteroalkenyl, "substituted" or "unsubstituted" heteroalkynyl, "substituted" or "unsubstituted" carbocyclyl, "substituted" or "unsubstituted" heterocyclyl, "substituted" or "unsubstituted" aryl or "substituted" or "unsubstituted" heteroaryl group). In general, the term "substituted" means that at least one hydrogen present on a group is replaced with a permissible substituent, e.g., a substituent which upon substitution results in a stable compound, e.g., a compound which does not spontaneously undergo transformation such as by rearrangement, cyclization, elimination, or other reaction. Unless otherwise indicated, a "substituted" group has a substituent at one or more substitutable positions of the group, and when more than one position in any given structure is substituted, the substituent is either the same or different at each position. The term "substituted" is contemplated to include substitution with all permissible substituents of organic compounds, and includes any of the substituents described herein that results in the formation of a stable compound. The present invention contemplates any and all such combinations in order to arrive at a stable compound. For purposes of this invention, heteroatoms such as nitrogen may have hydrogen substituents and/or any suitable substituent as described herein which satisfy the valencies of the heteroatoms and results in the formation of a stable moiety. The invention is not intended to be limited in any manner by the exemplary substituents described herein.

Exemplary carbon atom substituents include, but are not limited to, halogen, —CN, —NO$_2$, —N$_3$, —SO$_2$H, —SO$_3$H, —OH, —OR$^{aa}$, —ON(R)$_2$, —N(R$^{bb}$)$_2$, —N(R$^{bb}$)$_3$$^+$X$^-$, —N(OR$^{cc}$)R$^{bb}$, —SH, —SR$^{aa}$, —SSR$^{cc}$, —C(=O)R$^{aa}$, —CO$_2$H, —CHO, —C(OR$^{cc}$)$_2$, —CO$_2$R$^{aa}$, —OC(=O)R$^{aa}$, —OCO$_2$R$^{aa}$, —C(=O)N(R$^{bb}$)$_2$, —OC(=O)N(R$^{bb}$)$_2$, —NR$^{bb}$C(=O)R$^{aa}$, —NR$^{bb}$CO$_2$R$^{aa}$, —NR$^{bb}$C(=O)N(R$^{bb}$)$_2$, —C(=NR$^{bb}$)R$^{aa}$, —C(=NR$^{bb}$)OR$^{aa}$, —OC(=NR$^{bb}$)R$^{aa}$, —OC(=NR$^{bb}$)OR$^{aa}$, —C(=NR$^{bb}$)N(R$^{bb}$)$_2$, —OC(=NR$^{bb}$)N(R$^{bb}$)$_2$, —NR$^{bb}$C(=NR$^{bb}$)N(R$^{bb}$)$_2$, —C(=O)NR$^{bb}$SO$_2$R$^{aa}$, —NR$^{bb}$SO$_2$R$^{aa}$, —SO$_2$N(R$^{bb}$)$_2$, —SO$_2$R$^{aa}$, —SO$_2$OR$^{aa}$, —OSO$_2$R$^{aa}$, —S(=O)R$^{aa}$, —OS(=O)R$^{aa}$, —Si(R$^{aa}$)$_3$, —OSi(R$^{aa}$)$_3$—C(=S)N(R$^{bb}$)$_2$, —C(=O)SR$^{aa}$, —C(=S)SR$^{aa}$, —SC(=S)SR$^{aa}$, —SC(=O)SR$^{aa}$, —OC(=O)SR$^{aa}$, —SC(=O)OR$^{aa}$, —SC(=O)R$^{aa}$, —P(=O)(R$^{aa}$)$_2$, —P(=O)(OR$^{cc}$)$_2$, —OP(=O)(R$^{aa}$)$_2$, —OP(=O)(OR$^{cc}$)$_2$, —P(=O)(N(R$^{bb}$)$_2$)$_2$, —OP(=O)(N(R$^{bb}$)$_2$)$_2$, —NR$^{bb}$P(=O)(R$^{aa}$)$_2$, —NR$^{bb}$P(=O)(OR$^{cc}$)$_2$. —NR$^{bb}$P(=O)(N(R$^{bb}$)$_2$)$_2$. —P(R$^{cc}$)$_2$, —P(OR$^{cc}$)$_2$, —P(R$^{cc}$)$_3$$^+$X$^-$, —P(OR$^{cc}$)$_3$$^+$X$^-$, —P(R$^{cc}$)$_4$, —P(OR$^{cc}$)$_4$, —OP(R$^{cc}$)$_2$, —OP(R$^{cc}$)$_3$$^+$X$^-$, —OP(OR$^{cc}$)$_2$, —OP(OR$^{cc}$)$_3$$^+$X$^-$, —OP(R$^{cc}$)$_4$, —OP(OR$^{cc}$)$_4$, —B(R$^{aa}$)$_2$, —B(OR$^{cc}$)$_2$, —BR$^{aa}$(OR$^{cc}$), C$_{1-10}$ alkyl, C$_{1-10}$ perhaloalkyl, C$_{2-10}$ alkenyl, C$_{2-10}$ alkynyl, heteroC$_{1-10}$ alkyl, heteroC$_{2-10}$ alkenyl, heteroC$_{2-10}$ alkynyl. C$_{3-10}$ carbocyclyl, 3-14 membered heterocyclyl, C$_{6-14}$ aryl, and 5-14 membered heteroaryl, wherein each alkyl, alkenyl, alkynyl, heteroalkyl, heteroalkenyl, heteroalkynyl, carbocyclyl, heterocyclyl, aryl and heteroaryl is independently substituted with 0, 1, 2, 3, 4, or 5 R$^{dd}$ groups; wherein X is a counterion;

or two geminal hydrogens on a carbon atom are replaced with the group =O, =S, =NN(R$^{bb}$)$_2$, =NNR$^{bb}$C(=O)R$^{aa}$, =NNR$^{bb}$C(=O)OR$^{aa}$, =NNR$^{bb}$S(=O)$_2$R$^{aa}$, =NR$^{bb}$, or =NOR$^{cc}$;

each instance of R$^{aa}$ is, independently, selected from C$_{1-10}$ alkyl, C$_{1-10}$ perhaloalkyl, C$_{2-10}$ alkenyl, C$_{2-10}$ alkynyl, heteroC$_{1-10}$ alkyl, heteroC$_{2-10}$alkenyl, heteroC$_{2-10}$alkynyl, C$_{3-10}$ carbocyclyl, 3-14 membered heterocyclyl, C$_{6-14}$ aryl, and 5-14 membered heteroaryl, or two R$^{aa}$ groups are joined to form a 3-14 membered heterocyclyl or 5-14 membered heteroaryl ring, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{dd}$ groups;

each instance of R$^{bb}$ is, independently, selected from hydrogen, —OH, —OR$^{aa}$, —N(R$^{cc}$)$_2$, —CN, —C(=O)R$^{aa}$, —C(=O)N(R$^{cc}$)$_2$, —CO$_2$R$^{aa}$, —SO$_2$R$^{aa}$, —C(=NR$^{cc}$)OR$^{aa}$, —C(=NR$^{cc}$)N(R$^{cc}$)$_2$, —SO$_2$N(R$^{cc}$)$_2$, —SO$_2$R$^{cc}$, —SO$_2$OR$^{cc}$, —SOR$^{aa}$, —C(=S)N(R$^{cc}$)$_2$, —C(=O)SR$^{cc}$, —C(=S)SR$^{cc}$, —P(=O)(R$^{aa}$)$_2$, —P(=O)(OR$^{cc}$)$_2$, —P(=O)(N(R$^{cc}$)$_2$)$_2$, C$_{1-10}$ alkyl, C$_{1-10}$ perhaloalkyl, C$_{2-10}$ alkenyl, C$_{2-10}$ alkynyl, heteroC$_{1-10}$ alkyl, heteroC$_{2-10}$ alkenyl, heteroC$_{2-10}$ alkynyl, C$_{3-10}$ carbocyclyl, 3-14 membered heterocyclyl, C$_{6-14}$ aryl, and 5-14 membered heteroaryl, or two R$^{bb}$ groups are joined to form a 3-14 membered heterocyclyl or 5-14 membered heteroaryl ring, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{dd}$ groups; wherein X$^-$ is a counterion;

each instance of R$^{cc}$ is, independently, selected from hydrogen, C$_{1-10}$ alkyl. C$_{1-10}$ perhaloalkyl, C$_{2-10}$ alkenyl, C$_{2-10}$ alkynyl, heteroC$_{1-10}$ alkyl, heteroC$_{2-10}$ alkenyl, heteroC$_{2-10}$ alkynyl. C$_{3-10}$ carbocyclyl, 3-14 membered heterocyclyl, C$_{6-14}$ aryl, and 5-14 membered heteroaryl, or two R$^{cc}$ groups are joined to form a 3-14 membered heterocyclyl or 5-14 membered heteroaryl ring, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{dd}$ groups;

each instance of R$^{dd}$ is, independently, selected from halogen, —CN, —NO$_2$, —N$_3$, —SO$_2$H, —SO$_3$H, —OH, —OR$^{ee}$, —ON(R$^{ff}$)$_2$, —N(R$^{ff}$)$_2$, —N(R$^{ff}$)$_3$$^+$X$^-$, —N(OR$^{ee}$)R$^{ff}$, —SH, —SR$^{ee}$, —SSR$^{ee}$, —C(=O)R$^{ee}$, —CO$_2$H, —CO$_2$R$^{ee}$, —OC(=O)R$^{ee}$, —OCO$_2$R$^{ee}$, —C(=O)N(R$^{ff}$)$_2$, —OC(=O)N(R$^{ff}$)$_2$, —NR$^{ff}$C(=O)R$^{ee}$, —NR$^{ff}$CO$_2$R$^{ee}$, —NR$^{ff}$C(=O)N(R$^{ff}$)$_2$, —C(=NR$^{ff}$)OR$^{ee}$, —OC(=NR$^{ff}$)R$^{ee}$, —OC(=NR$^{ff}$)OR$^{ee}$, —C(=NR$^{ff}$)N(R$^{ee}$)$_2$, —OC(=NR$^{ff}$)N(R$^{ff}$)$_2$, —NR$^{ff}$C(=NR$^{ff}$)N(R$^{ff}$)$_2$, —NR$^{ff}$SO$_2$R$^{ee}$, —SO$_2$N(R$^{ff}$)$_2$, —SO$_2$R$^{ee}$, —SO$_2$OR$^{ee}$, —OSO$_2$R$^{ee}$, —S(=O)R$^{ee}$, —Si(R$^{ee}$)$_3$, —OSi(R$^{ee}$)$_3$, —C(=S)N(R$^{ff}$)$_2$, —C(=O)SR$^{ee}$, —C(=S)SR$^{ee}$, —SC(=S)SR$^{ee}$, —P(=O)(OR$^{ee}$)$_2$, —P(=O)(R$^{ee}$)$_2$, —OP(=O)(R$^{ee}$)$_2$, —OP(=O)OR$^{ee}$)$_2$, C$_{1-6}$ alkyl, C$_{1-6}$ perhaloalkyl, C$_{2-6}$ alkenyl, C$_{2-6}$ alkynyl, heteroC$_{1-6}$alkyl, heteroC$_{2-6}$alkenyl, heteroC$_{2-6}$alkynyl, C$_{3-10}$ carbocyclyl, 3-10 membered heterocyclyl, C$_{6-10}$ aryl, 5-10 membered heteroaryl, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{gg}$ groups, or two geminal R$^{dd}$ substituents can be joined to form =O or =S; wherein X$^-$ is a counterion;

each instance of R$^{ee}$ is, independently, selected from C$_{1-6}$ alkyl, C$_{1-6}$ perhaloalkyl, C$_{2-6}$ alkenyl, C$_{2-6}$ alkynyl, heteroC$_{1-6}$ alkyl, heteroC$_{2-6}$alkenyl, heteroC$_{2-6}$ alkynyl, C$_{3-10}$ carbocyclyl. C$_{6-10}$ aryl, 3-10 membered heterocyclyl, and 3-10 membered heteroaryl, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 $R^{gg}$ groups;

each instance of $R^{ff}$ is, independently, selected from hydrogen, $C_{1-6}$ alkyl, $C_{1-6}$ perhaloalkyl, $C_{2-6}$ alkenyl, $C_{2-6}$ alkynyl, heteroC$_{1-6}$alkyl, heteroC$_{2-6}$alkenyl, heteroC$_{2-6}$alkynyl, $C_{3-10}$ carbocyclyl, 3-10 membered heterocyclyl, $C_{6-10}$ aryl and 5-10 membered heteroaryl, or two $R^{ff}$ groups are joined to form a 3-10 membered heterocyclyl or 5-10 membered heteroaryl ring, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 $R^{gg}$ groups; and each instance of $R^{gg}$ is, independently, halogen, —CN, —NO$_2$, —N$_3$, —SO$_2$H, —SO$_3$H, —OH, —OC$_{1-6}$ alkyl, —ON(C$_{1-6}$ alkyl)$_2$, —N(C$_{1-6}$ alkyl)$_2$, —N(C$_{1-6}$ alkyl)$_3^+$X$^-$, —NH(C$_{1-6}$ alkyl)$_2^+$X$^-$, —NH$_2$(C$_{1-6}$ alkyl)$^+$X$^-$, —NH$_3^+$X$^-$, —N(OC$_{1-6}$ alkyl)(C$_{1-6}$ alkyl), —N(OH)(C$_{1-6}$ alkyl), —NH(OH), —SH, —SC$_{1-6}$ alkyl, —SS(C$_{1-6}$ alkyl), —C(=O)(C$_{1-6}$ alkyl), —CO$_2$H, —CO$_2$(C$_{1-6}$ alkyl), —OC(=O)(C$_{1-6}$ alkyl), —OCO$_2$(C$_{1-6}$ alkyl), —C(=O)NH$_2$, —C(=O)N(C$_{1-6}$ alkyl)$_2$, —OC(=O)NH(C$_{1-6}$ alkyl), —NHC(=O)(C$_{1-6}$ alkyl), —N(C$_{1-6}$ alkyl)C(=O)(C$_{1-6}$ alkyl), —NHCO$_2$(C$_{1-6}$ alkyl), —NHC(=O)N(C$_{1-6}$ alkyl)$_2$, —NHC(=O)NH(C$_{1-6}$ alkyl), —NHC(=O)NH$_2$, —C(=NH)O(C$_{1-6}$ alkyl), —OC(=NH)(C$_{1-6}$ alkyl), —OC(=NH)OC$_{1-6}$ alkyl, —C(=NH)N(C$_{1-6}$ alkyl)$_2$, —C(=NH)NH(C$_{1-6}$ alkyl), —C(=NH)NH$_2$, —OC(=NH)N(C$_{1-6}$ alkyl)$_2$, —OC(NH)NH(C$_{1-6}$ alkyl), —OC(NH)NH$_2$, —NHC(NH)N(C$_{1-6}$ alkyl)$_2$, —NHC(=NH)NH$_2$, —NHSO$_2$(C$_{1-6}$ alkyl), —SO$_2$N(C$_{1-6}$ alkyl)$_2$, —SO$_2$NH(C$_{1-6}$ alkyl), —SO$_2$NH$_2$, —SO$_2$C$_{1-6}$ alkyl, —SO$_2$OC$_{1-6}$ alkyl, —OSO$_2$C$_{1-6}$ alkyl, —SOC$_{1-6}$ alkyl, —Si(C$_{1-6}$ alkyl)$_3$, —OSi(C$_{1-6}$ alkyl)$_3$—C(=S)N(C$_{1-6}$ alkyl)$_2$, C(=S)NH(C$_{1-6}$ alkyl), C(=S)NH$_2$, —C(=O)S(C$_{1-6}$ alkyl), —C(=S)SC$_{1-6}$ alkyl, —SC(=S)SC$_{1-6}$ alkyl, —P(=O)(OC$_{1-6}$ alkyl)$_2$, —P(=O)(C$_{1-6}$ alkyl)$_2$, —OP(=O)(C$_{1-6}$ alkyl)$_2$, —OP(=O)(OC$_{1-6}$ alkyl)$_2$, C$_{1-6}$ alkyl, C$_{1-6}$ perhaloalkyl, C$_{2-6}$ alkenyl, C$_{2-6}$ alkynyl, heteroC$_{1-6}$ alkyl, heteroC$_{2-6}$alkenyl, heteroC$_{2-6}$alkynyl, C$_{3-10}$ carbocyclyl. C$_{6-10}$ aryl, 3-10 membered heterocyclyl, 5-10 membered heteroaryl; or two geminal $R^{gg}$ substituents can be joined to form =O or =S; wherein X$^-$ is a counterion.

The term "halo" or "halogen" refers to fluorine (fluoro, —F), chlorine (chloro, —Cl), bromine (bromo, —Br), or iodine (iodo, —I).

The term "hydroxyl" or "hydroxy" refers to the group —OH. The term "substituted hydroxyl" or "substituted hydroxyl," by extension, refers to a hydroxyl group wherein the oxygen atom directly attached to the parent molecule is substituted with a group other than hydrogen, and includes groups selected from —OR$^{aa}$, —ON(R$^{bb}$)$_2$, —OC(=O)SR$^{aa}$, —OC(=O)R$^{aa}$, —OCO$_2$R$^{aa}$, —OC(=O)N(R$^{bb}$)$_2$, —OC(=NR$^{bb}$)R$^{aa}$, —OC(=NR$^{bb}$)OR$^{aa}$, —OC(=NR$^{bb}$)N(R$^{bb}$)$_2$, —OS(=O)R$^{aa}$, —OSO$_2$R$^{aa}$, —OSi(R$^{aa}$)$_3$, —OP(R$^{cc}$)$_2$, —OP(R$^{cc}$)$_3^+$X$^-$, —OP(OR$^{cc}$)$_2$, —OP(OR$^{cc}$)$_3^+$X$^-$, —OP(=O)(R$^{aa}$)$_2$, —OP(=O)(OR$^{cc}$)$_2$, and —OP(=O)(N(R$^{bb}$))$_2$, wherein X$^-$, R$^{aa}$, R$^{bb}$, and R$^{cc}$ are as defined herein.

In certain embodiments, substituents include: halogen, —CN, —NO$_2$, —N$_3$, —SO$_2$H, —SO$_3$H, —OH, —OR$^{aa}$, —ON(R$^{bb}$)$_2$, —N(R$^{bb}$)$_2$, —N(R$^{bb}$)$_3^+$X$^-$, —N(OR$^{cc}$)R$^{bb}$, —SH, —SR$^{aa}$, —SSR$^{cc}$, —C(=O)R$^{aa}$, —CO$_2$H, —CHO, —C(OR$^{cc}$)$_2$, —CO$_2$R$^{aa}$, —OC(=O)R$^{aa}$, —OCO$_2$R$^{aa}$, —C(=O)N(R$^{bb}$)$_2$, —OC(=O)N(R$^{bb}$)$_2$, —NR$^{bb}$C(=O)R$^{aa}$, —NR$^{bb}$CO$_2$R$^{aa}$, —NR$^{bb}$C(=O)N(R$^{bb}$)$_2$, —C(=NR$^{bb}$)R$^{aa}$, —C(=NR$^{bb}$)OR$^{aa}$, —OC(=NR$^{bb}$)R$^{aa}$, —OC(=NR$^{bb}$)OR$^{aa}$, —C(=NR$^{bb}$)N(R$^{bb}$)$_2$, —OC(=NR$^{bb}$)N(R$^{bb}$)$_2$, —NR$^{bb}$C(=NR$^{bb}$)N(R$^{bb}$)$_2$, C(=O)NR$^{bb}$SO$_2$R$^{aa}$, —NR$^{bb}$SO$_2$R$^{aa}$, —SO$_2$N(R$^{bb}$)$_2$, —SO$_2$R$^{aa}$, —SO$_2$OR$^{aa}$, —OSO$_2$R$^{aa}$, —S(=O)R$^{aa}$, —OS(=O)R$^{aa}$, —Si(R$^{aa}$)$_3$, —OSi(R$^{aa}$)$_3$—C(=S)N(R$^{bb}$)$_2$, —C(=O)SR$^{aa}$, —C(=S)SR$^{aa}$, —SC(=S)SR$^{aa}$, —SC(=O)SR$^{aa}$, —OC(=O)SR$^{aa}$, —SC(=O)OR$^{aa}$, —SC(=O)R$^{aa}$, —P(=O)(R$^{aa}$)$_2$, —P(=O)(OR$^{cc}$)$_2$, —OP(=O)(R$^{aa}$)$_2$, —OP(=O)(OR$^{cc}$)$_2$, —P(=O)(N(R$^{bb}$)$_2$)$_2$, —OP(=O)(N(R$^{bb}$)$_2$)$_2$, —NR$^{bb}$P(=O)(R$^{aa}$)$_2$, —NR$^{bb}$P(=O)(OR$^{cc}$)$_2$, —NR$^{bb}$P(=O)(N(R$^{bb}$)$_2$)$_2$, —P(R$^{cc}$)$_2$, —P(OR$^{cc}$)$_2$, —P(R$^{cc}$)$_3^+$X$^-$, —P(OR$^{cc}$)$_3^+$X$^-$, —P(R$^{cc}$)$_4$, —P(OR$^{cc}$)$_4$, —OP(R$^{cc}$)$_2$, —OP(R$^{cc}$)$_3^+$X$^-$, —OP(OR$^{cc}$)$_2$, —OP(OR$^{cc}$)$_3^+$X$^-$, —OP(R$^{cc}$)$_4$, —OP(OR$^{cc}$)$_4$, —B(R$^{aa}$)$_2$, —B(OR$^{cc}$)$_2$, —BR$^{aa}$(OR$^{cc}$), C$_{1-10}$ alkyl, C$_{1-10}$ perhaloalkyl, C$_{2-10}$ alkenyl, C$_{2-10}$ alkynyl, heteroC$_{1-10}$ alkyl, heteroC$_{2-10}$ alkenyl, heteroC$_{2-10}$ alkynyl, C$_{3-10}$ carbocyclyl, 3-14 membered heterocyclyl, C$_{6-14}$ aryl, and 5-14 membered heteroaryl; wherein X$^-$ is a counterion;

or two geminal hydrogens on a carbon atom are replaced with the group =O, —S, =NN(R$^{bb}$)$_2$, =NNR$^{bb}$C(=O)R$^{aa}$, =NNR$^{bb}$C(=O)OR$^{aa}$, =NNR$^{bb}$S(=O)$_2$R$^{aa}$, =NR$^{bb}$, or =NOR$^{cc}$;

each instance of R$^{aa}$ is, independently, selected from C$_{1-10}$ alkyl, C$_{1-10}$ perhaloalkyl, C$_{2-10}$ alkenyl, C$_{2-10}$ alkynyl, heteroC$_{1-10}$ alkyl, heteroC$_{2-10}$ alkenyl, heteroC$_{2-10}$ alkynyl, C$_{3-10}$ carbocyclyl, 3-14 membered heterocyclyl, C$_{6-14}$ aryl, and 5-14 membered heteroaryl, or two R$^{aa}$ groups are joined to form a 3-14 membered heterocyclyl or 5-14 membered heteroaryl ring;

each instance of R$^{bb}$ is, independently, selected from hydrogen, —OH, —OR$^{aa}$, —N(R$^{cc}$)$_2$, —CN, —C(=O)R$^{aa}$, —C(=O)N(R$^{cc}$)$_2$, —CO$_2$R$^{aa}$, —SO$_2$R$^{aa}$, —C(=NR$^{cc}$)OR$^{aa}$, —C(=NR$^{cc}$)N(R$^{cc}$)$_2$, —SO$_2$N(R$^{cc}$)$_2$, —SO$_2$R$^{cc}$, —SO$_2$OR$^{cc}$, —SOR$^{aa}$, —C(=S)N(R$^{cc}$)$_2$, —C(=O)SR$^{cc}$, —C(=S)SR$^{cc}$, —P(=O)(R$^{aa}$)$_2$, —P(=O)(OR$^{cc}$)$_2$, —P(=O)(N(R$^{cc}$)$_2$)$_2$. C$_{1-10}$ alkyl, C$_{1-10}$ perhaloalkyl, C$_{2-10}$ alkenyl, C$_{2-10}$ alkynyl, heteroC$_{1-10}$alkyl, heteroC$_{2-10}$alkenyl, heteroC$_{2-10}$alkynyl, C$_{3-10}$ carbocyclyl, 3-14 membered heterocyclyl, C$_{6-14}$ aryl, and 5-14 membered heteroaryl, or two R$^{bb}$ groups are joined to form a 3-14 membered heterocyclyl or 5-14 membered heteroaryl ring; wherein X$^-$ is a counterion; and each instance of R$^{cc}$ is, independently, selected from hydrogen, C$_{1-10}$ alkyl, C$_{1-10}$ perhaloalkyl, C$_{2-10}$ alkenyl, C$_{2-10}$ alkynyl, heteroC$_{1-10}$ alkyl, heteroC$_{2-10}$ alkenyl, heteroC$_{2-10}$ alkynyl, C$_{3-10}$ carbocyclyl, 3-14 membered heterocyclyl, C$_{6-14}$ aryl, and 5-14 membered heteroaryl, or two R$^{cc}$ groups are joined to form a 3-14 membered heterocyclyl or 5-14 membered heteroaryl ring.

In certain embodiments, carbon atom substituents include: halogen, —CN, —NO$_2$, —N$_3$, —SO$_2$H, —SO$_3$H, —OH, —OC$_{1-6}$ alkyl, —ON(C$_{1-6}$ alkyl)$_2$, —N(C$_{1-6}$ alkyl)$_2$, —N(C$_{1-6}$ alkyl)$_3^+$X$^-$, —NH(C$_{1-6}$ alkyl)$_2^+$X$^-$, —NH$_2$(C$_{1-6}$ alkyl)$^+$X$^-$, —NH$_3^+$X$^-$, —N(OC$_{1-6}$ alkyl)(C$_{1-6}$ alkyl), —N(OH)C$_{1-6}$ alkyl), —NH(OH), —SH, —SC$_{1-6}$ alkyl, —SS(C$_{1-6}$ alkyl), —C(=O)(C$_{1-6}$ alkyl), —CO$_2$H, —CO$_2$(C$_{1-6}$ alkyl), —OC(=O)(C$_{1-6}$ alkyl), —OCO$_2$(C$_{1-6}$ alkyl), —C(=O)NH$_2$, —C(=O)N(C$_{1-6}$ alkyl)$_2$, —OC(=O)NH(C$_{1-6}$ alkyl), —NHC(=O)(C$_{1-6}$ alkyl), —N(C$_{1-6}$ alkyl)C(=O)(C$_{1-6}$ alkyl), —NHCO$_2$(C$_{1-6}$ alkyl), —NHC(=O)N(C$_{1-6}$ alkyl)$_2$, —NHC(=O)NH(C$_{1-6}$ alkyl), —NHC(=O)NH$_2$, —C(=NH)O(C$_{1-6}$ alkyl), —OC(=NH)(C$_{1-6}$ alkyl), —OC(=NH)OC$_{1-6}$ alkyl, —C(=NH)N(C$_{1-6}$ alkyl)$_2$, —C(=NH)NH(C$_{1-6}$ alkyl), —C(=NH)NH$_2$, —OC(=NH) N(C$_{1-6}$ alkyl)$_2$, —OC(=NH)NH(C$_{1-6}$ alkyl), —OC(=NH) NH$_2$, —NHC(=NH)N(C$_{1-6}$ alkyl)$_2$, —NHC(=NH)NH$_2$. —NHSO$_2$(C$_{1-6}$ alkyl), —SO$_2$N(C$_{1-6}$ alkyl)$_2$, —SO$_2$NH(C$_{1-6}$ alkyl), —SO$_2$NH$_2$, —SO$_2$(C$_{1-6}$ alkyl), —SO$_2$O(C$_{1-6}$ alkyl), —OSO$_2$(C$_{1-6}$ alkyl), —SO(C$_{1-6}$ alkyl). —Si(C$_{1-6}$ alkyl)$_3$, —OSi($C_{1-6}$ alkyl)$_3$-C(=S)N($C_{1-6}$ alkyl)$_2$, C(=S)NH($C_{1-6}$ alkyl), C(=S)NH$_2$, —C(=O)S($C_{1-6}$ alkyl), —C(=S)S$C_{1-6}$ alkyl, —SC(=S)S$C_{1-6}$ alkyl, —P(=O)(O$C_{1-6}$ alkyl)$_2$. —P(=O)($C_{1-6}$ alkyl)$_2$, —OP(=O)($C_{1-6}$ alkyl)$_2$, —OP(=O)(O$C_{1-6}$ alkyl)$_2$, $C_{1-6}$ alkyl, $C_{1-6}$ perhaloalkyl, $C_{2-6}$ alkenyl. $C_{2-6}$ alkynyl, hetero$C_{1-6}$ alkyl, hetero$C_{2-6}$ alkenyl, hetero$C_{2-6}$ alkynyl, $C_{3-10}$ carbocyclyl, $C_{6-10}$ aryl. 3-10 membered heterocyclyl, 5-10 membered heteroaryl; =O; or =S; wherein $X^-$ is a counterion.

The term "amino" refers to the group —NH$_2$. The term "substituted amino," by extension, refers to a monosubstituted amino, a disubstituted amino, or a trisubstituted amino. In certain embodiments, the "substituted amino" is a monosubstituted amino or a disubstituted amino group.

The term "monosubstituted amino" refers to an amino group wherein the nitrogen atom directly attached to the parent molecule is substituted with one hydrogen and one group other than hydrogen, and includes groups selected from —NH($R^{bb}$). —NHC(=O)$R^{aa}$, —NHCO$_2R^{aa}$, —NHC(=O)N($R^{bb}$)$_2$, —NHC(=N$R^{bb}$)N($R^{bb}$)$_2$, —NHSO$_2R^{aa}$, —NHP(=O)(O$R^{cc}$)$_2$, and —NHP(=O)(N($R^{bb}$)$_2$)$_2$, wherein $R^{aa}$, $R^{bb}$ and $R^{cc}$ are as defined herein, and wherein $R^{bb}$ of the group —NH($R^{bb}$) is not hydrogen.

The term "disubstituted amino" refers to an amino group wherein the nitrogen atom directly attached to the parent molecule is substituted with two groups other than hydrogen, and includes groups selected from —N($R^{bb}$)$_2$, —NR$C$(=O)$R^{aa}$, —N$R^{bb}$CO$_2R^{aa}$, —N$R^{bb}$C(=O)N($R^{bb}$)$_2$, —N$R^{bb}$C(=N$R^{bb}$)N($R^{bb}$)$_2$, —N$R^{bb}$SO$_2R^{aa}$, —N$R^{bb}$P(=O)(O$R^{cc}$)$_2$, and —N$R^{bb}$P(=O)(N($R^{bb}$)$_2$)$_2$, wherein $R^{aa}$, $R^{bb}$, and $R^{cc}$ are as defined herein, with the proviso that the nitrogen atom directly attached to the parent molecule is not substituted with hydrogen.

The term "trisubstituted amino" refers to an amino group wherein the nitrogen atom directly attached to the parent molecule is substituted with three groups, and includes groups selected from —N($R^{bb}$)$_3$ and —N($R^{bb}$)$_3^+X^-$, wherein $R^{bb}$ and $X^-$ are as defined herein.

The term "acyl" refers to a group having the general formula —C(=O)Rx, —C(=O)O$R^{X1}$, —C(=O)—O—C(=O)$R^{X1}$, —C(=O)S$R^{X1}$, —C(=O)N($R^{X1}$)$_2$, —C(=S)$R^{X1}$, —C(=S)N($R^{X1}$)$_2$, and —C(=S)S($R^{X1}$), —C(=N$R^{X1}$)$R^{X1}$, —C(=N$R^{X1}$)O$R^{X1}$, —C(=N$R^{X1}$)S$R^{X1}$, and —C(=N$R^{X1}$)N($R^{X1}$)$_2$, wherein $R^{X1}$ is hydrogen; halogen; substituted or unsubstituted hydroxyl; substituted or unsubstituted thiol; substituted or unsubstituted amino; substituted or unsubstituted acyl, cyclic or acyclic, substituted or unsubstituted, branched or unbranched aliphatic, cyclic or acyclic, substituted or unsubstituted, branched or unbranched heteroaliphatic; cyclic or acyclic, substituted or unsubstituted, branched or unbranched alkyl; cyclic or acyclic, substituted or unsubstituted, branched or unbranched alkenyl; substituted or unsubstituted alkynyl; substituted or unsubstituted aryl, substituted or unsubstituted heteroaryl, aliphaticoxy, heteroaliphaticoxy, alkyloxy, heteroalkyloxy, aryloxy, heteroaryloxy, aliphaticthioxy, heteroaliphaticthioxy, alkylthioxy, heteroalkylthioxy, arylthioxy, heteroarylthioxy, mono- or di-aliphaticamino, mono- or di-heteroaliphaticamino, mono- or di-alkylamino, mono- or di-heteroalkylamino, mono- or di-arylamino, or mono- or di-heteroarylamino; or two $R^{X1}$ groups taken together form a 5- to 6-membered heterocyclic ring. Exemplary acyl groups include aldehydes (—CHO), carboxylic acids (—CO$_2$H), ketones, acyl halides, esters, amides, imines, carbonates, carbamates, and ureas. Acyl substituents include, but are not limited to, any of the substituents described herein, that result in the formation of a stable moiety (e.g., aliphatic, alkyl, alkenyl, alkynyl, heteroaliphatic, heterocyclic, aryl, heteroaryl, acyl, oxo, imino, thiooxo, cyano, isocyano, amino, azido, nitro, hydroxyl, thiol, halo, aliphaticamino, heteroaliphaticamino, alkylamino, heteroalkylamino, arylamino, heteroarylamino, alkylaryl, arylalkyl, aliphaticoxy, heteroaliphaticoxy, alkyloxy, heteroalkyloxy, aryloxy, heteroaryloxy, aliphaticthioxy, heteroaliphaticthioxy, alkylthioxy, heteroalkylthioxy, arylthioxy, heteroarylthioxy, acyloxy, and the like, each of which may or may not be further substituted).

The term "carbonyl" refers a group wherein the carbon directly attached to the parent molecule is $sp^2$ hybridized, and is substituted with an oxygen, nitrogen or sulfur atom, e.g., a group selected from ketones (—C(=O)$R^{aa}$), carboxylic acids (—CO$_2$H), aldehydes (—CHO), esters (—CO$_2R^{aa}$, —C(=O)S$R^{aa}$, —C(=S)S$R^{aa}$), amides (—C(=O)N($R^{bb}$)$_2$, —C(=O)N$R^{bb}$SO$_2R^{aa}$, —C(=S)N($R^{bb}$)$_2$), and imines (—C(=N$R^{bb}$)$R^{aa}$, —C(=N$R^{bb}$)O$R^{aa}$, —C(=N$R^{bb}$)N($R^{bb}$)$_2$), wherein $R^{aa}$ and $R^{bb}$ are as defined herein.

The term "silyl" refers to the group —Si($R^{aa}$)$_3$, wherein $R^{aa}$ is as defined herein.

The term "oxo" refers to the group =O, and the term "thiooxo" refers to the group =S.

Nitrogen atoms can be substituted or unsubstituted as valency permits, and include primary, secondary, tertiary, and quaternary nitrogen atoms. Exemplary nitrogen atom substituents include, but are not limited to, hydrogen, —OH, —O$R^{aa}$, —N($R^{cc}$)$_2$, —CN, —C(=O)$R^{aa}$, —C(=O)N($R^{cc}$)$_2$, —CO$_2R^{aa}$, —SO$_2R^{aa}$, —C(=N$R^{bb}$)$R^{aa}$, —C(=N$R^{cc}$)O$R^{aa}$, —C(=N$R^{cc}$)N($R^{cc}$)$_2$, —SO$_2$N($R^{cc}$)$_2$, —SO$_2R^{cc}$, —SO$_2$O$R^{cc}$, —SO$R^{aa}$, —C(=S)N($R^{cc}$)$_2$, —C(=O)S$R^{cc}$, —C(=S)S$R^{cc}$, —P(=O)(O$R^{cc}$)$_2$, —P(=O)($R^{aa}$)$_2$, —P(=O)(N($R^{cc}$)$_2$)$_2$, $C_{1-10}$ alkyl, $C_{1-10}$ perhaloalkyl, $C_{2-10}$ alkenyl, $C_{2-10}$ alkynyl, hetero$C_{1-10}$alkyl, hetero$C_{2-10}$alkenyl, hetero$C_{2-10}$alkynyl, $C_{3-10}$ carbocyclyl, 3-14 membered heterocyclyl, $C_{6-14}$ aryl, and 5-14 membered heteroaryl, or two $R^{cc}$ groups attached to an N atom are joined to form a 3-14 membered heterocyclyl or 5-14 membered heteroaryl ring, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 $R^{dd}$ groups, and wherein $R^{aa}$, $R^{bb}$, $R^{cc}$ and $R^{dd}$ are as defined above.

In certain embodiments, the substituent present on the nitrogen atom is an nitrogen protecting group (also referred to herein as an "amino protecting group"). Nitrogen protecting groups include, but are not limited to, —OH. —O$R^{aa}$, —N($R^{cc}$)$_2$, —C(=O)$R^{aa}$, C(=O)N($R^{cc}$)$_2$, —CO$_2R^{aa}$, —SO$_2R^{aa}$, —C(=N$R^{cc}$)$R^{aa}$, —C(=N$R^{cc}$)O$R^{aa}$, —C(=N$R^{cc}$)N($R^{cc}$)$_2$, —SO$_2$N($R^{cc}$)$_2$, —SO$_2R^{cc}$, —SO$_2$O$R^{cc}$, —SO$R^{aa}$, —C(=S)N($R^{cc}$)$_2$, —C(=O)S$R^{cc}$, —C(=S)S$R^{cc}$, $C_{1-10}$ alkyl (e.g., aralkyl, heteroaralkyl). $C_{2-10}$ alkenyl, $C_{2-10}$ alkynyl, hetero$C_{1-10}$ alkyl, hetero$C_{2-10}$ alkenyl, hetero$C_{2-10}$ alkynyl, $C_{3-10}$ carbocyclyl, 3-14 membered heterocyclyl, $C_{6-14}$ aryl, and 5-14 membered heteroaryl groups, wherein each alkyl, alkenyl, alkynyl, heteroalkyl, heteroalkenyl, heteroalkynyl, carbocyclyl, heterocyclyl, aralkyl, aryl, and heteroaryl is independently substituted with 0, 1, 2, 3, 4, or 5 $R^{dd}$ groups, and wherein $R^{aa}$, $R^{bb}$, $R^{cc}$ and $R^{dd}$ are as defined herein. Nitrogen protecting groups are well known in the art and include those described in detail in *Protecting Groups in Organic Synthesis*, T. W. Greene and P. G. M. Wuts, 3$^{rd}$ edition, John Wiley & Sons, 1999, incorporated herein by reference.

For example, nitrogen protecting groups such as amide groups (e.g., —C(=O)$R^{aa}$) include, but are not limited to, formamide, acetamide, chloroacetamide, trichloroacetamide, trifluoroacetamide, phenylacetamide, 3-phenylpropanamide, picolinamide, 3-pyridylcarboxamide, N-benzoylphenylalanyl derivative, benzamide, p-phenylbenzamide, o-nitrophenylacetamide, o-nitrophenoxyacetamide, acetoacetamide, (N'-dithiobenzyloxyacylamino)acetamide, 3-(p-hydroxyphenyl)propanamide, 3-(o-nitrophenyl)propanamide, 2-methyl-2-(o-nitrophenoxy)propanamide, 2-methyl-2-(o-phenylazophenoxy)propanamide, 4-chlorobutanamide, 3-methyl-3-nitrobutanamide, o-nitrocinnamide, N-acetylmethionine derivative, o-nitrobenzamide and o-(benzoyloxymethyl)benzamide.

Nitrogen protecting groups such as carbamate groups (e.g., —C(=O)OR$^{aa}$) include, but are not limited to, methyl carbamate, ethyl carbamate, 9-fluorenylmethyl carbamate (Fmoc), 9-(2-sulfo)fluorenylmethyl carbamate, 9-(2,7-dibromo)fluoroenylmethyl carbamate, 2,7-di-t-butyl-[9-(10,10-dioxo-10,10,10,10-tetrahydrothioxanthyl)]methyl carbamate (DBD-Tmoc), 4-methoxyphenacyl carbamate (Phenoc), 2,2,2-trichloroethyl carbamate (Troc), 2-trimethylsilylethyl carbamate (Teoc), 2-phenylethyl carbamate (hZ), 1-(1-adamantyl)-1-methylethyl carbamate (Adpoc), 1,1-dimethyl-2-haloethyl carbamate, 1,1-dimethyl-2,2-dibromoethyl carbamate (DB-t-BOC), 1,1-dimethyl-2,2,2-trichloroethyl carbamate (TCBOC), 1-methyl-1-(4-biphenylyl)ethyl carbamate (Bpoc), 1-(3,5-di-t-butvlphenyl)-1-methylethyl carbamate (t-Bumeoc), 2-(2'- and 4'-pyridyl)ethyl carbamate (Pvoc), 2-(N,N-dicyclohexylcarboxamido)ethyl carbamate, t-butyl carbamate (BOC or Boc), 1-adamantyl carbamate (Adoc), vinyl carbamate (Voc), allyl carbamate (Alloc), 1-isopropylallyl carbamate (Ipaoc), cinnamyl carbamate (Coc), 4-nitrocinnamyl carbamate (Noc), 8-quinolyl carbamate, N-hydroxypiperidinyl carbamate, alkyldithio carbamate, benzyl carbamate (Cbz), p-methoxybenzyl carbamate (Moz), p-nitobenzyl carbamate, p-bromobenzyl carbamate, p-chlorobenzyl carbamate, 2,4-dichlorobenzl carbamate, 4-methylsulfinylbenzyl carbamate (Msz), 9-anthrylmethyl carbamate, diphenylmethyl carbamate, 2-methylthioethyl carbamate, 2-methylsulfonylethyl carbamate, 2-(p-toluenesulfonyl)ethyl carbamate, [2-(1,3-dithianyl)]methyl carbamate (Dmoc), 4-methylthiophenyl carbamate (Mtpc), 2,4-dimethylthiophenyl carbamate (Bmpc), 2-phosphonioethyl carbamate (Peoc), 2-triphenylphosphonioisopropyl carbamate (Ppoc), 1,1-dimethyl-2-cyanoethyl carbamate, m-chloro-p-acyloxybenzyl carbamate, p-(dihydroxyboryl)benzyl carbamate, 5-benzisoxazolylmethyl carbamate, 2-(trifluoromethyl)-6-chromonylmethyl carbamate (Tcroc), m-nitrophenyl carbamate, 35-dimethoxybenzyl carbamate, o-nitrobenzyl carbamate, 3,4-dimethoxy-6-nitrobenzyl carbamate, phenyl(o-nitrophenyl) methyl carbamate, t-amyl carbamate, S-benzyl thiocarbamate, p-cyanobenzl carbamate, cyclobutyl carbamate, cyclohexyl carbamate, cyclopentyl carbamate, cyclopropylmethyl carbamate, p-decyloxybenzyl carbamate, 2,2-dimethoxyacylvinyl carbamate, o-(N,N-dimethylcarboxamido)benzyl carbamate, 1,1-dimethyl-3-(N,N-dimethylcarboxamido)propyl carbamate, 1,1-dimethylpropynyl carbamate, di(2-pyridyl)methyl carbamate, 2-furanylmethyl carbamate, 2-iodoethyl carbamate, isoborynl carbamate, isobutyl carbamate, isonicotinyl carbamate, p-(p'-methoxyphenylazo)benzyl carbamate, 1-methylcyclobutyl carbamate, 1-methylcyclohexyl carbamate, 1-methyl-1-cyclopropylmethyl carbamate, 1-methyl-1-(3,5-dimethoxyphenyl)ethyl carbamate, 1-methyl-1-(p-phenylazophenyl)ethyl carbamate, 1-methyl-1-phenylethyl carbamate, 1-methyl-1-(4-pyridyl)ethyl carbamate, phenyl carbamate, p-(phenylazo)benzyl carbamate, 2,4,6-tri-t-butylphenyl carbamate, 4-(trimethylammonium) benzyl carbamate, and 2,4,6-trimethylbenzyl carbamate.

Nitrogen protecting groups such as sulfonamide groups (e.g., —S(=O)$_2$R$^{aa}$) include, but are not limited to, p-toluenesulfonamide (Ts), benzenesulfonamide, 2,3,6-trimethyl-4-methoxybenzenesulfonamide (Mtr), 2,4,6-trimethoxybenzenesulfonamide (Mtb), 2,6-dimethyl-4-methoxybenzenesulfonamide (Pme), 2,3,5,6-tetramethyl-4-methoxybenzenesulfonamide (Mte), 4-methoxybenzenesulfonamide (Mbs), 2,4,6-trimethylbenzenesulfonamide (Mts), 2,6-dimethoxy-4-methylbenzenesulfonamide (iMds), 2,2,5,7,8-pentamethylchroman-6-sulfonamide (Pmc), methanesulfonamide (Ms), β-trimethylsilylethanesulfonamide (SES), 9-anthracenesulfonamide, 4-(4',8'-dimethoxynaphthylmethyl)benzenesulfonamide (DNMBS), benzylsulfonamide, trifluoromethylsulfonamide, and phenacylsulfonamide.

Other nitrogen protecting groups include, but are not limited to, phenothiazinyl-(10)-acyl derivative, N'-p-toluenesulfonylaminoacyl derivative, N'-phenylaminothioacyl derivative, N-benzoylphenylalanyl derivative, N-acetylmethionine derivative, 4,5-diphenyl-3-oxazolin-2-one, N-phthalimide, N-dithiasuccinimide (Dts), N-2,3-diphenylmaleimide, N-2,5-dimethylpvrrole, N-, 1,4,4-tetramethyldisilylazacyclopentane adduct (STABASE), 5-substituted 1,3-dimethyl-1,3,5-triazacyclohexan-2-one, 5-substituted 1,3-dibenzyl-1,3,5-triazacyclohexan-2-one, 1-substituted 3,5-dinitro-4-pyridone. N-methylamine, N-allylamine, N-[2-(trimethylsilyl)ethoxy]methylamine (SEM). N-3-acetoxypropylamine. N-(1-isopropyl-4-nitro-2-oxo-3-pyroolin-3-yl)amine, quaternary ammonium salts, N-benzylamine, N-di(4-methoxyphenyl)methylamine, N-5-dibenzosuberylamine, N-triphenylmethylamine (Tr), N-[(4-methoxyphenyl)diphenylmethyl]amine (MMTr), N-9-phenylfluorenylamine (PhF), N-2,7-dichloro-9-fluorenylmethyleneamine, N-ferrocenylmethylamino (Fcm), N-2-picolylamino N'-oxide, N-1,1-dimethylthiomethyleneamine, N-benzylideneamine. N-p-methoxybenzylideneamine, N-diphenylmethyleneamine, N-[(2-pyridyl)mesityl]methyleneamine, N—(N',N'-dimethylaminomethylene) amine, N,N'-isopropylidenediamine, N-p-nitrobenzylideneamine, N-salicylideneamine, N-5-chlorosalicylideneamine, N-(5-chloro-2-hydroxyphenyl) phenylmethyleneamine, N-cyclohexylideneamine, N-(5,5-dimethyl-3-oxo-1-cyclohexenyl)amine, N-borane derivative, N-diphenylborinic acid derivative, N-[phenyl(pentaacylchromium- or tungsten)acyl]amine, N-copper chelate, N-zinc chelate, N-nitroamine, N-nitrosoamine, amine N-oxide, diphenylphosphinamide (Dpp), dimethylthiophosphinamide (Mpt), diphenylthiophosphinamide (Ppt), dialkyl phosphoramidates, dibenzyl phosphoramidate, diphenyl phosphoramidate, benzenesulfenamide, o-nitrobenzenesulfenamide (Nps), 2,4-dinitrobenzenesulfenamide, pentachlorobenzenesulfenamide, 2-nitro-4-methoxybenzenesulfenamide, triphenylmethylsulfenamide, and 3-nitropyridinesulfenamide (Npys).

In certain embodiments, the substituent present on an oxygen atom is an oxygen protecting group (also referred to herein as an "hydroxyl protecting group"). Oxygen protecting groups include, but are not limited to, —R$^{aa}$, —N(R$^{bb}$)$_2$, —C(=O)SR$^{aa}$, —C(=O)R$^{aa}$, —CO$_2$R$^{aa}$, —C(O)N(R$^{bb}$)$_2$, —C(=NR$^{bb}$)R$^{aa}$C(=NR$^{bb}$)OR$^{aa}$, —C(=NR$^{bb}$)N(R$^{bb}$)$_2$, —S(=O)R$^{aa}$, —SO$_2$R$^{aa}$, —Si(R$^{aa}$)$_3$, —P(R$^{cc}$)$_2$, —P(R$^{cc}$)$_3$$^+$X$^-$, —P(OR$^{cc}$)$_2$, —P(OR$^{cc}$)$_3$$^+$X$^-$, —P(=O)(R$^{aa}$)$_2$, —P(=O)OR$^{cc}$)$_2$, and —P(=O)(N(R$^{bb}$)$_2$)$_2$, wherein X$^-$, R$^{aa}$, R$^{bb}$, and R$^{cc}$ are as defined herein. Oxygen protecting groups are well known in the art and include those described in detail in *Protecting Groups in Organic Synthesis*, T. W. Greene and P. G. M. Wuts, 3rd edition, John Wiley & Sons, 1999, incorporated herein by reference.

Exemplary oxygen protecting groups include, but are not limited to, methyl, methoxylmethyl (MOM), methylthiomethyl (MTM), t-butylthiomethyl, (phenyldimethylsilyl) methoxymethyl (SMOM), benzyloxymethyl (BOM), p-methoxybenzyloxymethyl (PMBM), (4-methoxyphenoxy)methyl (p-AOM), guaiacolmethyl (GUM), t-butoxymethyl, 4-pentenyloxymethyl (POM), siloxymethyl, 2-methoxyethoxymethyl (MEM), 2,2,2-trichloroethoxymethyl, bis(2-chloroethoxyv)methyl, 2-(trimethylsilyl) ethoxymethyl (SEMOR), tetrahydropyranyl (THP), 3-bromotetrahydropyranyl, tetrahydrothiopyranyl, 1-methoxvcyclohexyl, 4-methoxytetrahydropyranyl (MTHP), 4-methoxytetrahydrothiopyranyl, 4-methoxytetrahydrothiopyranyl S,S-dioxide, 1-[(2-chloro-4-methyl)phenyl]-4-methoxypiperidin-4-yl (CTMP), 1,4-dioxan-2-yl, tetrahydrofuranyl, tetrahydrothiofuranyl, 2,3,3a,4,5,6,7,7a-octahydro-7,8,8-trimethyl-4,7-methanobenzofuran-2-yl, 1-ethoxyethyl, 1-(2-chloroethoxy)ethyl, 1-methyl-1-methoxyethyl, 1-methyl-1-benzyloxyethyl, 1-methyl-1-benzyloxy-2-fluoroethyl, 2,2,2-trichloroethyl, 2-trimethylsilylethyl, 2-(phenylselenyl)ethyl, t-butyl, allyl, p-chlorophenyl, p-methoxyphenyl, 2,4-dinitrophenyl, benzyl (Bn), p-methoxybenzyl, 3,4-dimethoxybenzyl, o-nitrobenzyl, p-nitrobenzyl, p-halobenzyl, 2,6-dichlorobenzyl, p-cyanobenzyl, p-phenylbenzyl, 2-picolyl, 4-picolyl, 3-methyl-2-picolyl N-oxido, diphenylmethyl, p,p'-dinitrobenzhydryl, 5-dibenzosuberyl, triphenylmethyl, α-naphthyldiphenylmethyl, p-methoxyphenyldiphenylmethyl, di(p-methoxyphenyl)phenylmethyl, tri(p-methoxyphenyl)methyl, 4-(4'-bromophenacyloxyphenyl)diphenylmethyl, 4,4',4"-tris(4,5-dichlorophthalimidophenvl)methyl, 4,4',4"-tris(levulinoyloxyphenvl)methyl, 4,4',4"-tris(benzoyloxyphenyl)methyl, 3-(imidazol-1-yl)bis(4',4"-dimethoxyphenyl)methyl, 1,1-bis(4-methoxyphenyl)-1'-pyrenylmethyl, 9-anthryl, 9-(9-phenyl)xanthenyl, 9-(9-phenyl-10-oxo)anthrvl, 1,3-benzodithiolan-2-yl, benzisothiazolyl S,S-dioxido, trimethylsilyl (TMS), triethylsilyl (TES), triisopropylsilyl (TIPS), dimethylisopropylsilyl (IPDMS), diethylisopropylsilyl (DEIPS), dimethylthexylsilyl, t-butyldimethylsilyl (TBDMS), t-butyldiphenylsilyl (TBDPS), tribenzylsilyl, tri-p-xylylsilyl, triphenylsilyl, diphenylmethylsilyl (DPMS), t-butylmethoxyphenylsilyl (TBMPS), formate, benzoylformate, acetate, chloroacetate, dichloroacetate, trichloroacetate, trifluoroacetate, methoxyacetate, triphenylmethoxyacetate, phenoxyacetate, p-chlorophenoxyacetate, 3-phenylpropionate, 4-oxopentanoate (levulinate), 4,4-(ethylenedithio)pentanoate (levulinoyldithioacetal), pivaloate, adamantoate, crotonate, 4-methoxycrotonate, benzoate, p-phenylbenzoate, 2,4,6-trimethylbenzoate (mesitoate), methyl carbonate, 9-fluorenylmethyl carbonate (Fmoc), ethyl carbonate, 2,2,2-trichloroethyl carbonate (Troc), 2-(trimethylsilyl)ethyl carbonate (TMSEC), 2-(phenylsulfonyl) ethyl carbonate (Psec), 2-(triphenylphosphonio) ethyl carbonate (Peoc), isobutyl carbonate, vinyl carbonate, allyl carbonate, t-butyl carbonate (BOC or Boc), p-nitrophenyl carbonate, benzyl carbonate, p-methoxybenzyl carbonate, 3,4-dimethoxybenzyl carbonate, o-nitrobenzyl carbonate, p-nitrobenzyl carbonate, S-benzyl thiocarbonate, 4-ethoxy-1-napththyl carbonate, methyl dithiocarbonate, 2-iodobenzoate, 4-azidobutyrate, 4-nitro-4-methylpentanoate, o-(dibromomethyl)benzoate, 2-formylbenzenesulfonate, 2-(methylthiomethoxy)ethyl, 4-(methylthiomethoxy)butyrate, 2-(methylthiomethoxymethyl)benzoate, 2,6-dichloro-4-methylphenoxyacetate, 2,6-dichloro-4-(1,1,3,3-tetramethylbutyl)phenoxyacetate, 2,4-bis(1,1-dimethylpropyl)phenoxyacetate, chlorodiphenylacetate, isobutyrate, monosuccinoate, (E)-2-methyl-2-butenoate, o-(methoxyacyl)benzoate, α-naphthoate, nitrate, alkyl N,N,N',N'-tetramethylphosphorodiamidate, alkyl N-phenylcarbamate, borate, dimethylphosphinothioyl, alkyl 2,4-dinitrophenylsulfenate, sulfate, methanesulfonate (mesylate), benzylsulfonate, and tosylate (Ts).

In certain embodiments, the substituent present on a sulfur atom is a sulfur protecting group (also referred to as a "thiol protecting group"). Sulfur protecting groups include, but are not limited to, $-R^{aa}$, $-N(R^{bb})_2$, $-C(=O)SR^{aa}$, $-C(=O)R^{aa}$, $-CO_2R^{aa}$, $-C(=O)N(R^{bb})_2$, $-C(=NR^{bb})R^{aa}$, $-C(=NR^{bb})OR^{aa}$, $-C(=NR^{bb})N(R^{bb})_2$, $-S(=O)R^{aa}$, $-SO_2R^{aa}$, $-Si(R^{aa})_3$, $-P(R^{cc})_2$, $-P(R^{cc})_3{}^+X^-$, $-P(OR^{cc})_2$, $-P(OR^{cc})_3{}^+X^-$, $-P(=O)(R^{aa})_2$, $-P(=O)(OR^{cc})_2$, and $-P(=O)(N(R^{bb})_2)_2$, wherein $R^{aa}$, $R^{bb}$, and $R^{cc}$ are as defined herein. Sulfur protecting groups are well known in the art and include those described in detail in *Protecting Groups in Organic Synthesis*, T. W. Greene and P. G. M. Wuts, 3rd edition, John Wiley & Sons, 1999, incorporated herein by reference.

A "counterion" or "anionic counterion" is a negatively charged group associated with a positively charged group in order to maintain electronic neutrality. An anionic counterion may be monovalent (i.e., including one formal negative charge). An anionic counterion may also be multivalent (i.e., including more than one formal negative charge), such as divalent or trivalent. Exemplary counterions include halide ions (e.g., $F^-$, $Cl^-$, $Br^-$, $I^-$), $NO_3^-$, $ClO_4^-$, $OH^-$, $H_2PO_4^-$, $HCO_3^-$, $HSO_4^-$, sulfonate ions (e.g., methansulfonate, trifluoromethanesulfonate, p-toluenesulfonate, benzenesulfonate, 10-camphor sulfonate, naphthalene-2-sulfonate, naphthalene-1-sulfonic acid-5-sulfonate, ethan-1-sulfonic acid-2-sulfonate, and the like), carboxylate ions (e.g., acetate, propanoate, benzoate, glycerate, lactate, tartrate, glycolate, gluconate, and the like), $BF_4^-$, $PF_4^-$, $PF_6^-$, $AsF_6^-$, $SbF_6^-$, $B[3,5-(CF_3)_2C_6H_3]_4^-$, $B(C_6F_5)_4^-$, $BPh_4^-$, $Al(OC(CF_3)_3)_4^-$, and carborane anions (e.g., $CB_{11}H_{12}^-$ or $(HCB_{11}Me_5Br_6)^-$). Exemplary counterions which may be multivalent include $CO_3^{2-}$, $HPO_4^{2-}$, $PO_4^{3-}$, $B_4O_7^{2-}$, $SO_4^{2-}$, $S_2O_3^{2-}$, carboxylate anions (e.g., tartrate, citrate, fumarate, maleate, malate, malonate, gluconate, succinate, glutarate, adipate, pimelate, suberate, azelate, sebacate, salicylate, phthalates, aspartate, glutamate, and the like), and carboranes.

As used herein, a "leaving group" (LG) is an art-understood term referring to a molecular fragment that departs with a pair of electrons in heterolytic bond cleavage, wherein the molecular fragment is an anion or neutral molecule. As used herein, a leaving group can be an atom or a group capable of being displaced by a nucleophile. See, for example, Smith, *March Advanced Organic Chemistry* 6th ed. (501-502). Exemplary leaving groups include, but are not limited to, halo (e.g., chloro, bromo, iodo) and activated substituted hydroxyl groups (e.g., $-OC(=O)SR^{aa}$, $-OC(=O)R^{aa}$, $-OCO_2R^{aa}$, $-OC(=O)N(R^{bb})_2$, $-OC(=NR^{bb})R^{aa}$, $-OC(=NR^{bb})OR^{aa}$, $-OC(=NR^{bb})N(R^{bb})_2$, $-OS(=O)R^{aa}$, $-OSO_2R^{aa}$, $-OP(R^{cc})_2$, $-OP(R^{cc})_3$, $-OP(=O)_2R^{aa}$, $-OP(=O)(R^{cc})_2$, $-OP(=O)(OR^{cc})_2$, $-OP(=O)_2N(R^{bb})_2$, and $-OP(=O)(NR^{bb})$, wherein $R^{aa}$, $R^{bb}$, and $R^{cc}$ are as defined herein).

As used herein, use of the phrase "at least one instance" refers to 1, 2, 3, 4, or more instances, but also encompasses a range, e.g., for example, from 1 to 4, from 1 to 3, from 1 to 2, from 2 to 4, from 2 to 3, or from 3 to 4 instances, inclusive.

These and other exemplary substituents are described in more detail in the Detailed Description, Examples, and Claims. The invention is not intended to be limited in any manner by the above exemplary listing of substituents.

Other Definitions

The following definitions are more general terms used throughout the present application.

The term "polymer" refers to a molecule including two or more (e.g., 3 or more, 4 or more, 5 or more, 10 or more) repeating units which are covalently bound together. In certain embodiments, a polymer comprises 3 or more, 5 or more, 10 or more, 50 or more, 100 or more, 1000 or more, 2000 or more, or 4000 or more repeating units. In certain embodiments, a polymer comprises more than 4000 repeating units. The repeating units of a polymer are referred to as "monomers." A "homopolymer" is a polymer that consists of a single repeating monomer. A "copolymer" is a polymer that comprises two or more different monomer subunits. Copolymers include, but are not limited to, random, block, alternating, segmented, linear, branched, grafted, and tapered copolymers. Polymers may be natural (e.g., naturally occurring polypeptides), or synthetic (e.g., non-naturally occurring). A polymer may have an overall molecular weight of 50 Da or greater, 100 Da or greater, 500 Da or greater, 1000 Da or greater, 2000 Da or greater, 5000 Da or greater, 10000 Da or greater, 20000 Da or greater, or 50000 Da or greater.

"Block copolymers" are copolymers comprising homopolymer subunits (i.e., "blocks") covalently linked together. The blocks of a block copolymer are separated into distinct domains. A "diblock copolymer" is a block copolymer comprising two distinct homopolymer domains. A "diblock bottlebrush copolymer" is a block copolymer comprising two distinct homopolymer domains. A "triblock bottlebrush copolymer" is a block copolymer comprising three distinct homopolymer domains. A "tetrablock bottlebrush copolymer" is a block copolymer comprising four distinct homopolymer domains. Each distinct homopolymer domain of a block copolymer is of a different polymeric composition (e.g., comprising different repeating monomers). A diblock bottlebrush copolymer can be an "AB diblock bottlebrush copolymer," defined as a copolymer comprising two blocks (Block A and Block B), each of which is a distinct homopolymer domain with a different monomeric subunit. A diblock bottlebrush copolymer can be an "ABC diblock bottlebrush copolymer," defined as a copolymer comprising three blocks (Block A, Block B, and Block C), each of which is a distinct homopolymer domain with a different monomeric subunit. A tetrablock bottlebrush copolymer can be an "ABCD tetrablock bottlebrush copolymer," defined as a copolymer comprising four blocks (Block A, Block B, Block C, and Block D), each of which is a distinct homopolymer domain with a different monomeric subunit.

The terms "bottlebrush polymer" or "polymer brush" refer to a polymer comprising a polymeric backbone of repeating units, wherein the repeating units of the polymeric backbone are covalently linked to polymeric sidechains. In certain embodiments, each repeating unit of the polymeric backbone is linked to a polymeric sidechain. In certain embodiments, two polymeric sidechains, wherein the polymeric sidechains are the same or different, are connected to the backbone repeating unit at a branching point through a linker. In embodiments where two different polymeric sidechains are connected to the backbone repeating unit at a branching point through a linker, the bottlebrush copolymer may be referred to as an "A-branch-B bottlebrush copolymer" or a "Janus bottlebrush polymer." In bottlebrush copolymers, the entire polymeric backbone may be composed of a single repeating backbone unit, and the blocks of the copolymer are defined by the composition of the polymeric sidechains. For example, in an AB diblock bottlebrush copolymer, the polymeric backbone may be composed of a single unit that repeats throughout the entire backbone of the polymer, and each of Block A and Block B of the diblock bottlebrush copolymer comprise polymeric sidechains of a different polymeric composition (e.g., comprised of different monomers). In other embodiments, a bottlebrush copolymer comprises more than one monomeric subunit in its polymeric backbone. The polymeric sidechains of a bottlebrush polymer or copolymer can be homopolymers or copolymers, and can have linear or branched architectures.

The terms "number average molecular weight," "number average molar mass," and "$M_n$," are measurements of the molecular mass of a polymer. The number average molecular mass is the ordinary arithmetic mean or average of the molecular masses of the individual polymers. It is determined by measuring the molecular mass of n polymer molecules, summing the masses, and dividing by n. For example, a polymer having 100 repeating units of a monomer with a molecular weight of 100 g/mol would have a number average molecular weight ($M_n$) of 10,000 g/mol [Mn=(100)*(100 g/mol)/(1)=10,000 g/mol)]. The number average molecular mass of a polymer can be determined by gel permeation chromatography, viscometry via the Mark-Houwink equation, colligative methods such as vapor pressure osmometry, end-group determination, or $^1$H NMR.

The term "gyroid" refers to an infinitely connected triply periodic minimal surface (e.g. FIG. 5A). In the polymer phase diagram, the gyroid phase is between the lamellar and cylindrical phases. Gyroid structures have photonic band gaps that make them potential photonic crystals. Self-assembled gyroid structures are found in certain block copolymers and are useful in applications such as supercapacitors, solar cells, and nanoporous membranes.

The term "hexagonal cylinder" refers to a structure where cylinders are vertically aligned on a 2D plane in a hexagonal arrangement. The cylindrical morphology of block copolymers has been employed for high-density storage applications and may provide a low-cost alternative to challenging lithographic techniques.

The term "lamellar" refers to a 1D structure where two or more chemically distinct sheets alternate along one axis. Selective removal of a polymer block leads to the formation of nanosheets. The lamellar phase occupies the widest area in a diblock copolymer phase diagram.

The term "photonic crystal" or "photonic band-gap material" refers to periodic dielectric structures (e.g., optical nanostructures) that have a band gap forbidding propagation of a certain frequency range of light. This property enables control of light with facility and production of effects that may not be possible with conventional optics. One dimensional photonic crystals are useful in thin-film optics (e.g., low and high reflection coatings on lenses and mirrors to color changing paints and inks). Two dimensional photonic crystals may be found in the form of photonic-crystal fibers, which use a microscale structure to confine light with radically different characteristics compared to conventional optical fiber for applications in nonlinear devices and guiding exotic wavelengths. Three dimensional photonic crystals may provide optical nonlinearity required for the operation of optical transistors used in optical computers.

BRIEF DESCRIPTION OF THE DRAWINGS

The accompanying drawings, which constitute a part of this specification, illustrate several embodiments of the invention and together with the description, serve to explain the principles of the invention.

DETAILED DESCRIPTION OF CERTAIN EMBODIMENTS

Figure 1A:
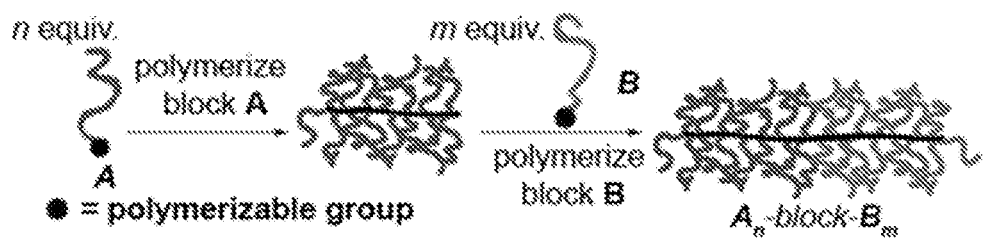
FIG. 1A shows graft-through polymerization methods for traditional diblock BBCPs.
Figure 1B:
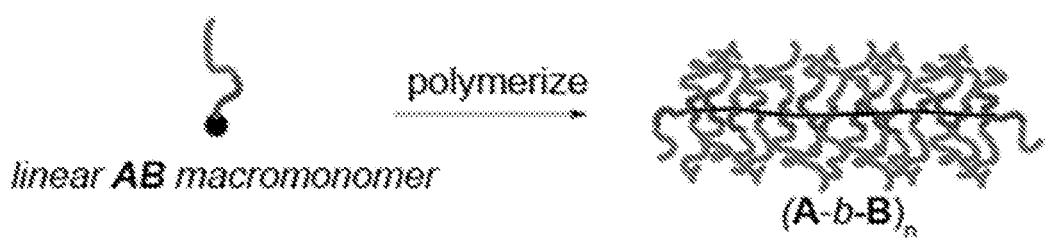
FIG. 1B shows graft-through polymerization methods for core-shell BBCPs.
Figure 1C:
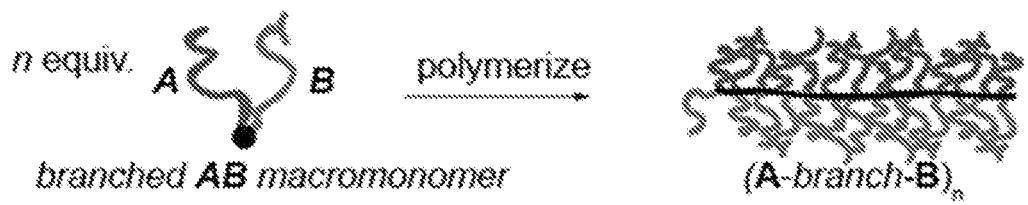
FIG. 1C shows graft-through polymerization methods for A-branch-B BBCPs.

Provided herein are bottlebrush polymers and bottlebrush copolymers. The bottlebrush polymers and copolymers may comprise multiple polymeric sidechains that, in part, confer certain unexpected and advantageous properties. For example, when the repeating unit of the bottlebrush polymer backbone is linked to two different polymeric sidechains (e.g., polysiloxane and polyacrylate sidechains), the bottlebrush polymers are capable of self-assembly into structures that have a gyroid morphology. Accordingly, the pseudo-alternating bottlebrush polymer structure provides several unique advantages in the context of bottlebrush polymer assembly, including access to the first examples of gyroid phases. In other embodiments, the bottlebrush polymers and copolymers are capable of self-assembly into structures that have a hexagonal cylindrical morphology. In other embodiments, the bottlebrush polymers and copolymers are capable of self-assembly into structures that have a lamellar morphology. In other embodiments, the bottlebrush polymers and copolymers are capable of self-assembly into structures that have a spherical morphology.

The bottlebrush polymers and copolymers may be capable of self-assembling into useful materials, such as photonic crystals. In other embodiments, the bottlebrush polymers and copolymers may be chemically manipulated to provide useful materials, such as nanofiltration devices. In another aspect, the present disclosure provides self-assembled materials comprising the bottlebrush polymers and copolymers described herein. Also provided are methods of preparing the bottlebrush polymers and copolymers and self-assembled materials comprising the bottlebrush polymers and copolymers.

Bottlebrush Polymers

One aspect of the present disclosure relates to bottlebrush polymers. In certain embodiments, the bottlebrush polymers comprise a backbone of repeating units covalently linked to polymeric sidechains, wherein the polymer is capable of self-assembling into structures having a hexagonal cylindrical or gyroid morphology. In some embodiments, the bottlebrush polymers are capable of self-assembling into structures having a hexagonal cylindrical morphology. In some embodiments, the bottlebrush polymers are capable of self-assembling into structures having a gyroid morphology.

In certain embodiments, the bottlebrush polymers provided herein have the same backbone repeating units, meaning that the polymer sidechains covalently linked to the repeating units of the backbone are the same for each repeating unit. In certain embodiments, the repeating units may be covalently linked to more than one polymeric sidechain. For example, in certain embodiments, the polymeric sidechains may be connected to the backbone repeating unit through a linker that branches such that two polymeric sidechains are connected through the same linker. In some embodiments, the branched linker connects the backbone repeating unit to two or more polymeric sidechains that are each of a different polymer class. In certain embodiments, at least one polymeric sidechain is a polysiloxane. In certain embodiments, the polysiloxane is polydimethylsiloxane (PDMS). Further, the polymeric sidechains may be of the same or different lengths, and/or of the same or different molecular weights.

In embodiments where two different polymeric sidechains are connected to the backbone repeating unit at a branching point through a linker, the bottlebrush copolymer may be referred to as an "A-branch-B bottlebrush copolymer" or a "Janus bottlebrush polymer."

The bottlebrush polymers provided herein comprise a backbone of repeating units ("backbone units"). In some embodiments, the repeating backbone units are the same throughout the polymer. In other embodiments, the polymer may comprise two or more blocks of different repeating backbone units. In certain embodiments, the bottlebrush polymers comprise 1 to 4000 repeating backbone units, inclusive. In certain embodiments, the bottlebrush polymers comprise 2 to 4000 repeating backbone units, inclusive. In certain embodiments, the bottlebrush polymers comprise 2 to 2000 repeating backbone units, inclusive. In certain embodiments, the bottlebrush polymers comprise 2 to 1000 repeating backbone units, inclusive. In certain embodiments, the bottlebrush polymers comprise 2 to 500 repeating backbone units, inclusive. In certain embodiments, the bottlebrush polymers comprise 2 to 200) repeating backbone units, inclusive. In certain embodiments, the bottlebrush polymers comprise 2 to 100 repeating backbone units, inclusive. In certain embodiments, the bottlebrush polymers comprise 5 to 1(0) repeating backbone units, inclusive. In certain embodiments, the bottlebrush polymers comprise 10 to 100 repeating backbone units, inclusive. In certain embodiments, the bottlebrush polymers comprise 25 to 100 repeating backbone units, inclusive. In certain embodiments, the bottlebrush polymers comprise 10 to 50 repeating backbone units, inclusive. In certain embodiments, the bottlebrush polymers comprise 25 to 50 repeating backbone units, inclusive. In certain embodiments, the bottlebrush polymers comprise 10, 25, 50, or 100 repeating backbone units. In certain embodiments, the bottlebrush polymers comprise 10 repeating backbone units. In certain embodiments, the bottlebrush polymers comprise 25 repeating backbone units. In certain embodiments, the bottlebrush polymers comprise 50 repeating backbone units. In certain embodiments, the bottlebrush polymers comprise 100 repeating backbone units. In certain embodiments, each repeating backbone unit of the bottlebrush polymer is covalently linked to a polymeric sidechain. In certain embodiments, each repeating backbone unit of the bottlebrush polymer is covalently linked to two polymeric sidechains. In certain embodiments, each repeating backbone unit of the bottlebrush polymer is covalently linked to two polymeric sidechains that are connected to the repeating backbone unit through the same linker. In certain embodiments, some but not all repeating backbone units are covalently linked to polymeric sidechains.

The backbone units may be derived from polymerization of a monomer including, but not limited to, substituted or unsubstituted norbornene, olefin, cyclic olefin, norbornene anhydride, cyclooctene, cyclopentadiene, styrene, or acrylate. In other embodiments, the repeating backbone units are derived from monomers not listed here. Some backbone units useful in the present disclosure may be obtained from a ring opening metathesis polymerization (ROMP) reaction.

The polymer sidechains of the bottlebrush polymer may comprise any polymer. Examples of classes of polymers include, but are not limited to, vinyl polymers (e.g., polystyrene), polyethylenes (e.g., polyethylene, polytetrafluoroethylene), polypropylenes, polyacetylenes, polyethers (e.g., polyethylene glycol, polyoxymethylene, polypropylene glycol, polytetramethylene glycol, poly(ethyl ethylene) phosphate, poly(oxazoline)), polyamines, polyesters (e.g., polyglycolic acid, polylactic acid, poly(lactic-co-glycolic acid), polycaprolactone, polyhydroxyalkanoate, polyhydroxybutryate, polyethylene adipate, polybutylene succinate, poly(3-hydroxybutyrate-co-3-hydroxy valerate), polysilanes, polysiloxanes (e.g., polydimethylsiloxane), polyacrylates (e.g., polymethacrylate, poly(n-butyl acrylate), poly(tert-butyl acrylate)), polylactides (e.g., polylactic acid), polyamino acids, polypeptides, polyamides, polyacrylamides (e.g., polymethylacrylamide), and polysaccharides. The polymer sidechains may be homopolymers or copolymers. The polymer sidechains may be linear or branched. In certain embodiments, the polymer sidechains are linear. In certain embodiments, the polymer sidechains are branched.

In certain embodiments, the bottlebrush polymer comprises polyether, polyester, polyacrylamide, polyacrylate, polysiloxane, or vinyl polymer sidechains, or a combination thereof. In certain embodiments, the bottlebrush polymer comprises polyester, polyacrylate, or vinyl polymer sidechains, or a combination thereof.

In certain embodiments, the bottlebrush polymer comprises polyester sidechains. Examples of polyesters include, but are not limited to, polyglycolic acid (PGA), polylactic acid (PLA), poly(lactic-co-glycolic acid) (PLGA), polycaprolactone (PCL), polyhydroxyalkanoate (PHA), polyhydroxybutryate (PHB), polyethylene adipate (PEA), polybutylene succinate (PBS), or poly(3-hydroxybutyrate-co-3-hydroxyvalerate) (PHBV). In certain embodiments, the bottlebrush polymer comprises polylactic acid (PLA) sidechains.

In certain embodiments, the bottlebrush polymer comprises polyether sidechains. Examples of polyethers include, but are not limited to, polyethylene glycol (PEG), polyoxymethylene (POM), polypropylene glycol (PPG), polytetramethylene glycol (PTMG), poly(ethyl ethylene) phosphate (PEEP), and poly(oxazoline). In certain embodiments, the bottlebrush polymer comprises polyethylene glycol (PEG) sidechains.

In certain embodiments, the bottlebrush polymer comprises polysiloxane sidechains. In certain embodiments, the polysiloxane is polydimethylsiloxane (PDMS). In certain embodiments, the bottlebrush polymer comprises polydimethylsiloxane sidechains.

In certain embodiments, the bottlebrush polymer comprises vinyl polymer sidechains. Examples of vinyl polymers include, but are not limited to, polystyrene, polyvinyl chloride, polyethylene, polypropylene, polybutadiene, polyvinyl acetate, polyvinyl alcohol, and polyacrylonitrile. In certain embodiments, the bottlebrush polymer comprises polystyrene sidechains.

In certain embodiments, the bottlebrush polymer comprises polyacrylate sidechains. Examples of polyacrylates include, but are not limited to, poly(methyl methacrylate), poly(methyl acrylate), poly(methacrylate), poly(hydroxyethyl methacrylate), poly(n-butyl acrylate), and poly(tert-butyl acrylate). In certain embodiments, the bottlebrush polymer comprises poly(tert-butyl acrylate) sidechains.

In certain embodiments, the bottlebrush polymer comprises polysiloxane sidechains and vinyl polymer sidechains. In certain embodiments, the bottlebrush polymer comprises polydimethylsiloxane sidechains and polystyrene sidechains. In certain embodiments, the bottlebrush polymer comprises polysiloxane sidechains and polyacrylate sidechains. In certain embodiments, the bottlebrush polymer comprises polydimethylsiloxane sidechains and poly(tert-butyl acrylate) sidechains. In certain embodiments, the bottlebrush polymer comprises polysiloxane sidechains and polyester sidechains. In certain embodiments, the bottlebrush polymer comprises polydimethylsiloxane sidechains and poly(lactic acid) sidechains.

The polymer sidechains may be of any molecular weight. In certain embodiments, the polymer sidechains each independently have a number average molecular weight ranging from about 50 to about 10000 Da, about 100 to about 10000 Da, about 500 to about 10000 Da, about 1000 to about 10000 Da, about 2000 to about 10000 Da, about 2000 to about 7000 Da, about 2000 to about 4000 Da, about 3000 to about 4000) Da. or about 4000 to about 6000 Da; each range being inclusive.

In certain embodiments, the bottlebrush polymer is of Formula (I):

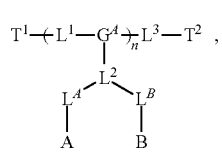

(I)

or salts thereof, wherein:

$G^A$ is optionally substituted alkylene, optionally substituted heteroalkylene, optionally substituted carbocyclylene, optionally substituted heterocyclylene, optionally substituted arylene, optionally substituted heteroarylene, or a combination thereof:

each of $L^1$, $L^2$, $L^3$, $L^A$, and $L^B$ is independently a linker selected from the group consisting of a bond, optionally substituted alkylene, optionally substituted heteroalkylene, optionally substituted alkenylene, optionally substituted alkynylene, optionally substituted carbocyclylene, optionally substituted heterocyclylene, optionally substituted arylene, optionally substituted heteroarylene, and combinations thereof;

each of $T^1$ and $T^2$ is independently a terminal group selected from the group consisting of hydrogen, halogen, optionally substituted alkyl, optionally substituted alkenyl, optionally substituted alkynyl, optionally substituted carbocyclyl, optionally substituted heterocyclyl, optionally substituted aryl, optionally substituted heteroaryl, optionally substituted acyl, optionally substituted hydroxyl, optionally substituted amino, and optionally substituted thio;

n is an integer between 1 and 4000, inclusive;

A is a polysiloxane having a number average molecular weight of about 1,000 Da to about 20,000 Da; and B is a different polymer having a number average molecular weight of about 1,000 Da to about 20,000 Da.

As described herein, in certain embodiments, the bottlebrush polymer may have a gyroidal or hexagonal cylindrical morphology.

In certain embodiments, $G^A$ is optionally substituted carbocyclylene, optionally substituted heterocyclylene, or a combination thereof. In certain embodiments, $G^A$ is optionally substituted carbocyclylene. In certain embodiments, $G^A$ is optionally substituted heterocyclylene. In certain embodiments, $G^A$ comprises optionally substituted 5-membered carbocyclylene or 5-membered heterocyclylene. In certain embodiments, $G^A$ comprises optionally substituted cyclopentylene, cyclohexylene, tetrahydrofuranylene, tetrahydrothiophenylene, or pyrrolidinylene. In certain embodiments, $G^A$ is optionally substituted bicyclic heterocyclylene. In certain embodiments, $G^A$ is substituted bicyclic heterocyclylene. In certain embodiments, $G^A$ is of the following formula:

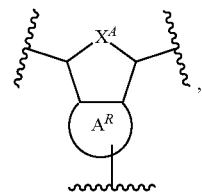

wherein $X^A$ is —CH$_2$—, —CH$_2$CH$_2$—, —O—, or —S—; and $A^R$ is optionally substituted carbocyclyl or optionally substituted heterocyclyl. In certain embodiments, $G^A$ is of the following formula:

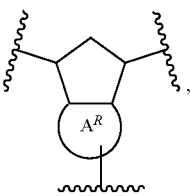

wherein $A^R$ is optionally substituted carbocyclyl or optionally substituted heterocyclyl. In certain embodiments, $G^A$ is of the following formula:

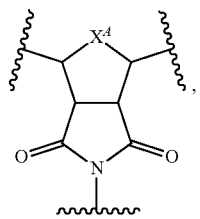

wherein $X^A$ is —CH$_2$—, —CH$_2$CH$_2$—, —O—, or —S—. In certain embodiments. $G^A$ is of the following formula:

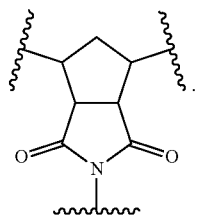 [SMILES: *C1CC(*)C2C(=O)N(*)C(=O)C12]

In certain embodiments, each of $L^1$ and $L^3$ is independently a linker selected from the group consisting of optionally substituted alkylene, optionally substituted heteroalkylene, optionally substituted alkenylene, optionally substituted alkynylene, and combinations thereof. In certain embodiments, each of $L^1$ and $L^3$ is optionally substituted alkylene. In certain embodiments, each of $L^1$ and $L^3$ is optionally substituted heteroalkylene. In certain embodiments, each of $L^1$ and $L^3$ is optionally substituted alkynylene. In certain embodiments, each of $L^1$ and $L^3$ is optionally substituted alkenylene. In certain embodiments, each of $L^1$ and $L^3$ is substituted alkenylene. In certain embodiments, each of $L^1$ and $L^3$ is unsubstituted alkenylene. In certain embodiments, each of $L^1$ and $L^3$ is of the formula:

In certain embodiments, each of $L^1$ and $L^3$ is of the formula:

In certain embodiments, each of $L^1$ and $L^3$ is of the formula:

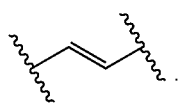 [SMILES: */C=C/*]

In certain embodiments, $L^1$ is optionally substituted alkylene. In certain embodiments. $L^1$ is optionally substituted heteroalkylene. In certain embodiments, $L^1$ is optionally substituted alkynylene. In certain embodiments. $L^1$ is optionally substituted alkenylene. In certain embodiments, $L^1$ substituted alkenylene. In certain embodiments, $L^1$ is unsubstituted alkenylene. In certain embodiments, $L^1$ is of the formula:

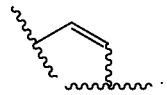 [SMILES: */C=C\*]

In certain embodiments, $L^1$ is of the formula:

In certain embodiments, $L^1$ is of the formula:

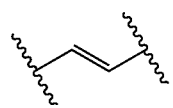

In certain embodiments, $L^3$ is optionally substituted alkylene. In certain embodiments, $L^3$ is optionally substituted heteroalkylene. In certain embodiments, $L^3$ is optionally substituted alkynylene. In certain embodiments, $L^3$ is optionally substituted alkenylene. In certain embodiments, $L^3$ substituted alkenylene. In certain embodiments, $L^3$ is unsubstituted alkenylene. In certain embodiments, $L^3$ is of the formula:

In certain embodiments, $L^3$ is of the formula:

In certain embodiments, $L^3$ is of the formula:

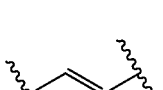

In certain embodiments, $L^2$ is a linker selected from the group consisting of optionally substituted alkylene, optionally substituted heteroalkylene, optionally substituted alkenylene, optionally substituted alkynylene, optionally substituted carbocyclylene, optionally substituted heterocyclylene, optionally substituted arylene, optionally substituted heteroarylene, and combinations thereof. In certain embodiments, $L^2$ is optionally substituted alkylene or optionally substituted heteroalkylene. In certain embodiments, $L^2$ is optionally substituted alkylene. In certain embodiments, $L^2$ is optionally substituted heteroalkylene. In certain embodiments, $L^2$ is unsubstituted alkylene. In certain embodiments, $L^2$ is unsubstituted heteroalkylene. In certain embodiments, $L^2$ is optionally substituted $C_{1-20}$ heteroalkylene. In certain embodiments, $L^2$ is optionally substituted $C_{1-10}$ heteroalkylene. In certain embodiments, $L^2$ is unsubstituted $C_{1-10}$ heteroalkylene. In certain embodiments, $L^2$ is of the formula:

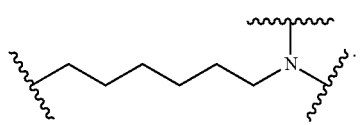

In certain embodiments, $L^A$ is a linker selected from the group consisting of optionally substituted alkylene, optionally substituted heteroalkylene, optionally substituted alkenylene, optionally substituted alkynylene, optionally substituted carbocyclylene, optionally substituted heterocyclylene, optionally substituted arylene, optionally substituted heteroarylene, and combinations thereof. In certain embodiments, $L^A$ is optionally substituted alkylene, optionally substituted heteroalkylene, optionally substituted heteroarylene, or optionally substituted heteroarylalkylene. In certain embodiments, $L^A$ is optionally substituted alkylene. In certain embodiments, $L^A$ is optionally substituted heteroalkylene. In certain embodiments, $L^A$ is optionally substituted heteroarylene. In certain embodiments, $L^A$ is unsubstituted alkylene. In certain embodiments, $L^A$ is unsubstituted heteroalkylene. In certain embodiments, $L^A$ is substituted heteroalkylene. In certain embodiments, $L^A$ is optionally substituted $C_{1-20}$ heteroalkylene. In certain embodiments, L is optionally substituted $C_{1-10}$ heteroalkylene. In certain embodiments. $L^A$ is substituted $C_{1-10}$ heteroalkylene. In certain embodiments, $L^A$ is $C_{1-10}$ heteroalkylene substituted with at least one oxo (=O) group. In certain embodiments, $L^A$ is of the formula:

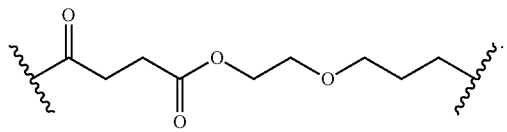 [SMILES: *CCCOCCOC(=O)CCC(*)=O]

In certain embodiments, $L^A$ is of the formula:

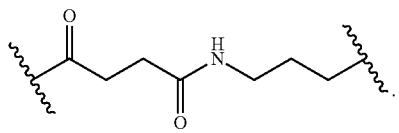

In certain embodiments, $L^A$ is unsubstituted heteroarylalkylene. In certain embodiments, $L^A$ is optionally substituted heteroarylalkylene. In certain embodiments, $L^A$ is an unsubstituted 5-membered heteroarylalkylene. In certain embodiments, $L^A$ comprises a triazole. In certain embodiments, $L^A$ comprises a group of the formula:

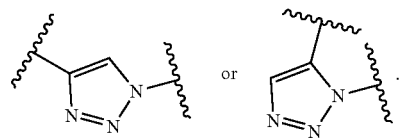 [SMILES: *c1cn(*)nn1 ; *c1cnnn1*]

In certain embodiments, $L^A$ is of the formula:

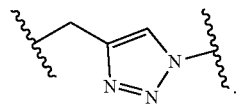 [SMILES: *Cc1cn(*)nn1]

In certain embodiments, $L^B$ is a linker selected from the group consisting of optionally substituted alkylene, optionally substituted heteroalkylene, optionally substituted alkenylene, optionally substituted alkynylene, optionally substituted carbocyclylene, optionally substituted heterocyclylene, optionally substituted arylene, optionally substituted heteroarylene, and combinations thereof. In certain embodiments, $L^B$ is optionally substituted alkylene, optionally substituted heteroalkylene, optionally substituted heteroarylene, or optionally substituted heteroarylalkylene. In certain embodiments, $L^B$ is optionally substituted alkylene. In certain embodiments, $L^B$ is optionally substituted heteroalkylene. In certain embodiments, $L^B$ is optionally substituted heteroarylene. In certain embodiments, $L^B$ is unsubstituted alkylene. In certain embodiments, $L^B$ is unsubstituted heteroalkylene. In certain embodiments, $L^B$ is substituted heteroalkylene. In certain embodiments, $L^B$ is optionally substituted $C_{1-20}$ heteroalkylene. In certain embodiments, $L^B$ is optionally substituted $C_{1-10}$ heteroalkylene. In certain embodiments, $L^B$ is substituted $C_{1-10}$ heteroalkylene. In certain embodiments, $L^B$ is $C_{1-10}$ heteroalkylene substituted with at least one oxo (=O) group. In certain embodiments, $L^B$ is of the formula:

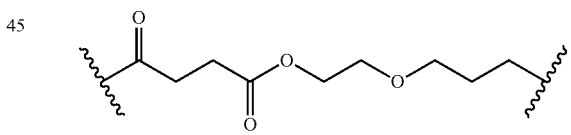

In certain embodiments, $L^B$ is of the formula:

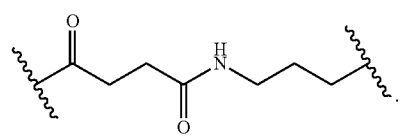 [SMILES: *CCCNC(=O)CCC(*)=O]

In certain embodiments, $L^B$ is unsubstituted heteroarylalkylene. In certain embodiments, $L^B$ is optionally substituted heteroarylalkylene. In certain embodiments, $L^B$ is an unsubstituted 5-membered heteroarylalkylene. In certain embodiments, $L^B$ comprises a triazole. In certain embodiments, $L^B$ comprises a group of the formula:

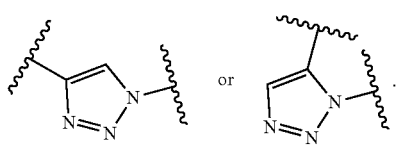 [SMILES: *c1cn(*)nn1 ; *c1cnnn1*]

In certain embodiments, $L^B$ is of the formula:

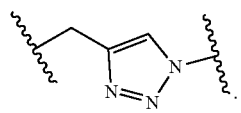

In certain embodiments, $L^2$ is optionally substituted alkylene or optionally substituted heteroalkylene; $L^A$ is optionally substituted alkylene, optionally substituted heteroalkylene, optionally substituted heteroarylalkylene, or optionally substituted heteroarylene; and $L^B$ is optionally substituted alkylene, optionally substituted heteroalkylene, optionally substituted heteroarylalkylene, or optionally substituted heteroarylene. In certain embodiments, $L^2$ is optionally substituted heteroalkylene; $L^A$ is optionally substituted heteroalkylene; and $L^B$ is optionally substituted heteroarylalkylene. In certain embodiments, $L^2$ is unsubstituted heteroalkylene; $L^A$ is unsubstituted heteroalkylene; and $L^B$ is substituted heteroarylalkylene. In certain embodiments. $L^2$ is unsubstituted $C_{1-10}$ heteroalkylene; $L^A$ is substituted $C_{1-10}$ heteroalkylene; and $L^B$ is an unsubstituted 5-membered heteroarylalkylene.

In certain embodiments, $L^2$ is of the formula:

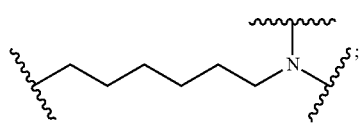

$L^A$ is of the formula:

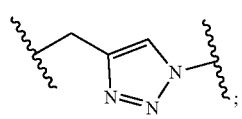

and $L^B$ is of the formula:

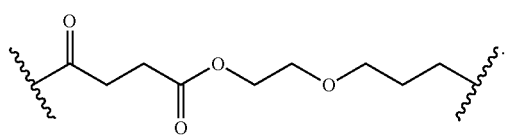 [SMILES: *CCCOCCOC(=O)CCC(*)=O]

In certain embodiments, $L^2$ is of the formula:

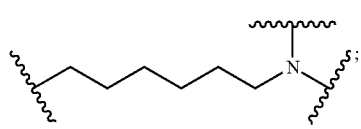

$L^A$ is of the formula:

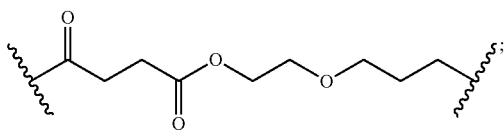

and $L^B$ is of the formula:

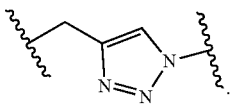 [SMILES: *Cc1cn(*)nn1]

In certain embodiments, $L^2$ is of the formula:

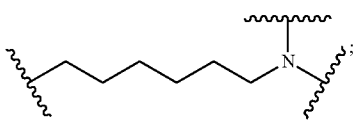 [SMILES: *CCCCCCN(*)*]

$L^A$ is of the formula:

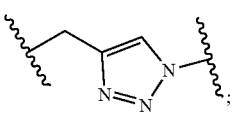

and $L^B$ is of the formula:

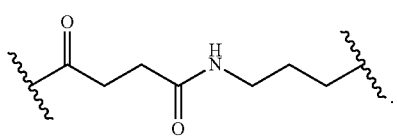

In certain embodiments, $L^2$ is of the formula:

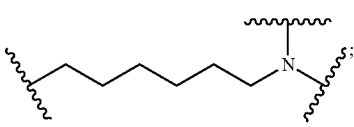 [SMILES: *CCCCCCN(*)*]

$L^A$ is of the formula:

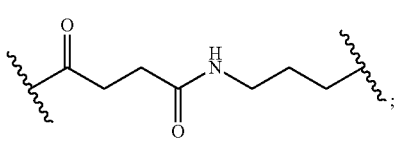

and LB is of the formula:

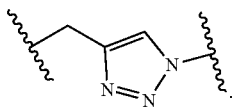 [SMILES: *Cc1cn(*)nn1]

In certain embodiments, n is an integer between 1 and 4000, inclusive. In certain embodiments, n is an integer between 5 and 4000, inclusive. In certain embodiments, n is an integer is between 50 and 4000, inclusive. In certain embodiments, n is an integer between 100 and 4000, inclusive. In certain embodiments, n is an integer between 1000 and 4000, inclusive. In certain embodiments, n is an integer between 2000 and 4000, inclusive. In certain embodiments, n is an integer between 2 and 4000, inclusive. In certain embodiments, n is an integer between 2 and 2000, inclusive. In certain embodiments, n is an integer between 2 and 1000, inclusive. In certain embodiments, n is an integer between 10 and 1000, inclusive. In certain embodiments, n is an integer between 2 and 100, inclusive. In certain embodiments, n is an integer between 10 and 100, inclusive. In certain embodiments, n is an integer between 10 and 50, inclusive. In certain embodiments, n is an integer between 25 and 50, inclusive. In certain embodiments, n is an integer between 25 and 100, inclusive. In certain embodiments, n is about 10, about 25, about 50, or about 100. In certain embodiments, the average of n is about 10, about 25, about 50, or about 100. In certain embodiments, the average of n is about 25 or about 50. In certain embodiments, the average of n is about 10. In certain embodiments, the average of n is about 25. In certain embodiments, the average of n is about 50. In certain embodiments, the average of n is about 100. In certain embodiments, n is the same as the degree of polymerization of the polymer.

In certain embodiments, each of $T^1$ and $T^2$ is independently a terminal group selected from the group consisting of hydrogen, halogen, optionally substituted alkyl, optionally substituted alkenyl, optionally substituted alkynyl, optionally substituted carbocyclyl, optionally substituted heterocyclyl, optionally substituted aryl, optionally substituted heteroaryl, optionally substituted acyl, optionally substituted hydroxyl, optionally substituted amino, and optionally substituted thiol. In certain embodiments, $T^1$ is hydrogen. In certain embodiments, $T^1$ is halogen. In certain embodiments, $T^1$ is optionally substituted alkyl. In certain embodiments, $T^1$ is optionally substituted alkenyl. In certain embodiments, $T^1$ is optionally substituted alkynyl. In certain embodiments, $T^1$ is optionally substituted carbocyclyl. In certain embodiments, $T^1$ is optionally substituted heterocyclyl. In certain embodiments, $T^1$ is optionally substituted aryl. In certain embodiments, $T^1$ is optionally substituted heteroaryl. In certain embodiments, $T^1$ is optionally substituted acyl. In certain embodiments, $T^1$ is optionally substituted hydroxyl. In certain embodiments, $T^1$ is optionally substituted amino. In certain embodiments, $T^1$ is optionally substituted thiol. In certain embodiments, $T^2$ is hydrogen. In certain embodiments, $T^2$ is halogen. In certain embodiments, $T^2$ is optionally substituted alkyl. In certain embodiments, $T^2$ is optionally substituted alkenyl. In certain embodiments, $T^2$ is optionally substituted alkynyl. In certain embodiments, $T^2$ is optionally substituted carbocyclyl. In certain embodiments, $T^2$ is optionally substituted heterocyclyl. In certain embodiments, $T^2$ is optionally substituted aryl. In certain embodiments, $T^2$ is optionally substituted heteroaryl. In certain embodiments, $T^2$ is optionally substituted acyl. In certain embodiments, $T^2$ is optionally substituted hydroxyl. In certain embodiments, $T^2$ is optionally substituted amino. In certain embodiments, $T^2$ is optionally substituted thiol. In certain embodiments, both $T^1$ and $T^2$ are hydrogen.

In certain embodiments, $T^1$ is optionally substituted aryl, and $T^2$ is hydrogen. In certain embodiments, $T^1$ is phenyl, and $T^2$ is hydrogen. In certain embodiments, $T^2$ is optionally substituted aryl, and $T^1$ is hydrogen. In certain embodiments. $T^2$ is phenyl, and $T^1$ is hydrogen.

In certain embodiments, A is a polysiloxane and B is a different polymer. In certain embodiments, A is a polysiloxane having a number average molecular weight of about 1,000 Da to about 20.000 Da; and B is a different polymer having a number average molecular weight of about 1,000 Da to about 20,000 Da.

In certain embodiments, A is a polysiloxane. In certain embodiments, the polysiloxane is of the formula:

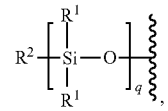

wherein:

$R^1$ is optionally substituted alkyl, optionally substituted alkenyl, optionally substituted aryl, or optionally substituted alkoxy:

$R^2$ is optionally substituted alkyl, optionally substituted alkenyl, optionally substituted aryl, or optionally substituted alkoxy; and q is an integer between 5 and 2000, inclusive.

In certain embodiments, $R^1$ is optionally substituted alkyl. In certain embodiments, $R^1$ is optionally substituted $C_{1-6}$ alkyl. In certain embodiments, $R^1$ is unsubstituted $C_{1-6}$ alkyl. In certain embodiments, $R^1$ is selected from the group consisting of methyl, ethyl, n-propyl, iso-propyl, n-butyl, sec-butyl, iso-butyl, and tert-butyl. In certain embodiments, $R^1$ is methyl.

In certain embodiments, $R^2$ is optionally substituted alkyl. In certain embodiments, $R^2$ is optionally substituted $C_{1-20}$ alkyl. In certain embodiments. $R^2$ is unsubstituted $C_{1-20}$ alkyl. In certain embodiments, $R^2$ is optionally substituted $C_{1-6}$ alkyl. In certain embodiments, $R^2$ is unsubstituted $C_{1-6}$ alkyl. In certain embodiments, $R^2$ is selected from the group consisting of methyl, ethyl, n-propyl, iso-propyl, n-butyl, sec-butyl, iso-butyl, and tert-butyl. In certain embodiments, $R^2$ is n-butyl.

In certain embodiments, q is an integer between 5 and 500, inclusive. In certain embodiments, q is an integer between 5 and 100, inclusive. In certain embodiments, q is an integer between 10 and 100, inclusive. In certain embodiments, q is an integer between 30 and 80, inclusive. In certain embodiments, q is an integer between 50 and 80, inclusive. In certain embodiments, q is an integer between 60 and 70, inclusive.

In certain embodiments, $R^1$ is optionally substituted $C_{1-6}$ alkyl; $R^2$ is optionally substituted $C_{1-6}$ alkyl; and q is an integer between 10 and 100, inclusive. In certain embodiments, $R^1$ is unsubstituted $C_{1-6}$ alkyl; $R^2$ is unsubstituted $C_{1-6}$ alkyl; and q is an integer between 10 and 100, inclusive. In certain embodiments, $R^1$ is methyl; $R^2$ is n-butyl; and q is an integer between 50 and 100, inclusive.

In certain embodiments. $R^1$ is $C_{1-6}$ alkyl, and the polysiloxane has a number average molecular weight of about 2,000 Da to about 20,000 Da, about 2,000 Da to about 10,000 Da, about 2,000 Da to about 6,000 Da, or about 4,000 Da to about 6,000 Da. or about 4,500 Da to about 5,500 Da.

In certain embodiments, the polysiloxane is polydimethylsiloxane (PDMS) having a number average molecular weight of about 2,000 Da to about 20,000 Da, about 2,000 Da to about 10,000 Da, about 2,000 Da to about 6,000 Da, or about 4,000 Da to about 6,000 Da, or about 4,500 Da to about 5,500 Da.

In certain embodiments, B is a polyether, a polyester, a polyacrylamide, a polyacrylate, or a vinyl polymer. The polyacrylate may be any polyester described herein. The polyester may be any polyester described herein. The polyether may be any polyether described herein. The polyacrylamide may be any polyacrylamide described herein. Additionally, the vinyl polymer may be any vinyl polymer described herein.

In certain embodiments, B is a polyether selected from the group consisting of polyethylene glycol (PEG), polyoxymethylene (POM), polypropylene glycol (PPG), polytetramethylene glycol (PTMG), poly(ethyl ethylene) phosphate (PEEP), and poly(oxazoline). In certain embodiments, B is polyethylene glycol (PEG). In certain embodiments. B is a polyester. In certain embodiments, B is a polyester selected from the group consisting of polyglycolic acid (PGA), polylactic acid (PLA), poly(lactic-co-glycolic acid) (PLGA), polycaprolactone (PCL), polyhydroxyalkanoate (PHA), polyhydroxybutyrate (PHB), polyethylene adipate (PEA), polybutylene succinate (PBS), and poly(3-hydroxybutyrate-co-3-hydroxyvalerate) (PHBV). In certain embodiments, B is polylactic acid (PLA). In certain embodiments, B is polyglycolic acid (PGA) or poly(lactic-co-glycolic acid) (PLGA). In certain embodiments, B is a polyacrylamide. In certain embodiments, B is a poly(N-alkylacrylamide). In certain embodiments, B is poly(N-isopropylacrylamide). In certain embodiments, B is a vinyl polymer. In certain embodiments, B is a vinyl polymer selected from the group consisting of polystyrene, polyvinyl chloride, polyethylene, polypropylene, polybutadiene, polyvinyl acetate, polyvinyl alcohol, and polyacrylonitrile. In certain embodiments, B is polystyrene. In certain embodiments, B is a polyacrylate. In certain embodiments, B is a polyacrylate selected from the group consisting of poly(methyl methacrylate), poly(methyl acrylate), poly(methacrylate), poly(hydroxyethyl methacrylate), poly(n-butyl acrylate), and poly(tert-butyl acrylate). In certain embodiments, B is poly(tert-butyl acrylate).

In certain embodiments, B is a vinyl polymer of the following formula:

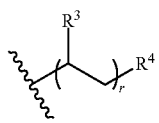

wherein:

$R^3$ is optionally substituted alkyl, halogen, hydrogen, cyano, $OR^a$, optionally substituted alkenyl, optionally substituted alkynyl, optionally substituted aryl, or optionally substituted heteroaryl;

$R^4$ is optionally substituted alkyl, optionally substituted alkenyl, optionally substituted alkynyl, optionally substituted aryl, or optionally substituted heteroaryl;

$R^a$ is hydrogen, optionally substituted alkyl, optionally substituted alkenyl, optionally substituted alkynyl, optionally substituted aryl, or optionally substituted heteroaryl; and r is an integer between 5 and 2000, inclusive.

In certain embodiments, $R^3$ is hydrogen. In certain embodiments, $R^3$ is optionally substituted alkyl. In certain embodiments, $R^3$ is optionally substituted alkenyl. In certain embodiments, $R^3$ is optionally substituted alkynyl. In certain embodiments, $R^3$ is optionally substituted aryl. In certain embodiments, $R^3$ is optionally substituted heteroaryl. In certain embodiments, $R^3$ is cyano. In certain embodiments, $R^3$ is halogen. In certain embodiments, $R^3$ is $OR^a$, wherein $R^a$ is hydrogen or optionally substituted alkyl. In certain embodiments, $R^3$ is optionally substituted phenyl. In certain embodiments. $R^3$ is unsubstituted phenyl.

In certain embodiments, $R^4$ is optionally substituted alkyl. In certain embodiments, $R^4$ is optionally substituted alkenyl. In certain embodiments, $R^4$ is optionally substituted alkynyl. In certain embodiments, $R^4$ is optionally substituted aryl. In certain embodiments. $R^4$ is optionally substituted heteroaryl. In certain embodiments, $R^4$ is optionally substituted $C_{1-6}$ alkyl. In certain embodiments, $R^4$ is unsubstituted $C_{1-6}$ alkyl. In certain embodiments, $R^4$ is $C_{1-6}$ alkyl substituted with an ester group.

In certain embodiments, r is an integer between 5 and 500, inclusive. In certain embodiments, r is an integer between 5 and 100, inclusive. In certain embodiments, r is an integer between 10 and 100, inclusive. In certain embodiments, r is an integer between 10 and 50, inclusive. In certain embodiments, r is an integer between 20 and 40, inclusive. In certain embodiments, r is an integer between 30 and 40, inclusive.

In certain embodiments, $R^3$ is optionally substituted aryl; $R^4$ is optionally substituted $C_{1-6}$ alkyl; and r is an integer between 10 and 100, inclusive. In certain embodiments, $R^3$ is unsubstituted aryl; $R^4$ is substituted $C_{1-6}$ alkyl; and r is an integer between 10 and 50, inclusive. In certain embodiments, $R^3$ is unsubstituted phenyl; $R^4$ is substituted $C_10.6$ alkyl; and r is an integer between 10 and 50, inclusive.

In certain embodiments, the vinyl polymer is polystyrene. In certain embodiments, the vinyl polymer is polystyrene having a number average molecular weight of about 2,000 Da to about 20,000 Da, about 10,000 Da to about 15,000 Da, about 2,000 Da to about 10,000 Da, about 7.000 Da to about 10,000 Da, about 8,000 Da to about 9,500 Da, about 2,000 Da to about 7,000 Da, about 2,000 Da to about 4,000 Da, about 2,000 Da to about 3.000 Da, or about 2,500 Da to about 3,600 Da.

In certain embodiments. B is a polyacrylate of the following formula:

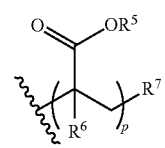

wherein:

$R^5$ is optionally substituted alkyl, hydrogen, optionally substituted alkenyl, optionally substituted alkynyl, optionally substituted aryl, or optionally substituted heteroaryl;

$R^6$ is optionally substituted alkyl, hydrogen, optionally substituted alkenyl, optionally substituted alkynyl, optionally substituted aryl, or optionally substituted heteroaryl;

R⁷ is optionally substituted alkyl, optionally substituted alkenyl, optionally substituted alkynyl, optionally substituted aryl, or optionally substituted heteroaryl; and p is an integer between 5 and 2000, inclusive.

In certain embodiments, $R^5$ is hydrogen. In certain embodiments, $R^5$ is optionally substituted alkyl. In certain embodiments, $R^5$ is optionally substituted alkenyl. In certain embodiments, $R^5$ is optionally substituted alkynyl. In certain embodiments, $R^5$ is optionally substituted aryl. In certain embodiments, $R^5$ is optionally substituted heteroaryl. In certain embodiments, $R^5$ is optionally substituted alkyl. In certain embodiments, $R^5$ is optionally substituted $C_{1-6}$ alkyl. In certain embodiments, $R^5$ is unsubstituted $C_{1-6}$ alkyl. In certain embodiments, $R^5$ is selected from the group consisting of methyl, ethyl, n-propyl, iso-propyl, n-butyl, sec-butyl, iso-butyl, and tert-butyl. In certain embodiments, $R^5$ is tert-butyl.

In certain embodiments, $R^6$ is optionally substituted alkyl. In certain embodiments, $R^6$ is hydrogen. In certain embodiments, $R^6$ is optionally substituted alkenyl. In certain embodiments, $R^6$ is optionally substituted alkynyl. In certain embodiments, $R^6$ is optionally substituted aryl. In certain embodiments, $R^6$ is optionally substituted heteroaryl. In certain embodiments, $R^6$ is optionally substituted $C_{1-6}$ alkyl. In certain embodiments, $R^6$ is unsubstituted $C_{1-6}$ alkyl. In certain embodiments, $R^6$ is methyl.

In certain embodiments, $R^7$ is optionally substituted alkyl. In certain embodiments, $R^7$ is optionally substituted alkenyl. In certain embodiments, $R^7$ is optionally substituted alkynyl. In certain embodiments, $R^7$ is optionally substituted aryl. In certain embodiments, $R^7$ is optionally substituted heteroaryl. In certain embodiments, $R^7$ is optionally substituted $C_{1-6}$ alkyl. In certain embodiments. $R^7$ is unsubstituted $C_{1-6}$ alkyl. In certain embodiments, $R^7$ is $C_{1-6}$ alkyl substituted with an ester group.

In certain embodiments, p is an integer between 5 and 500, inclusive. In certain embodiments, p is an integer between 5 and 100, inclusive. In certain embodiments, p is an integer between 10 and 100, inclusive. In certain embodiments, p is an integer between 10 and 50, inclusive. In certain embodiments, p is an integer between 20 and 40, inclusive. In certain embodiments, p is an integer between 25 and 35, inclusive.

In certain embodiments, $R^5$ is optionally substituted alkyl; $R^6$ is hydrogen; $R^7$ is optionally substituted $C_{1-6}$ alkyl; and p is an integer between 10 and 100, inclusive. In certain embodiments, $R^5$ is optionally substituted $C_{1-6}$ alkyl; $R^6$ is hydrogen; $R^7$ is substituted $C_{1-6}$ alkyl; and p is an integer between 10 and 50, inclusive. In certain embodiments, $R^5$ is tert-butyl; $R^6$ is hydrogen; $R^4$ is substituted $C_{1-6}$ alkyl; and p is an integer between 20 and 40, inclusive.

In certain embodiments, the vinyl polymer is polystyrene. In certain embodiments, the vinyl polymer is polystyrene having a number average molecular weight of about 2,000 Da to about 20,000 Da, about 10,000 Da to about 15,000 Da, about 2,000 Da to about 10,000 Da, about 7,000 Da to about 10,000 Da, about 8,000 Da to about 9,500 Da, about 2,000 Da to about 7,000 Da, about 2,000 Da to about 4,000 Da, about 2,000 Da to about 3,000 Da, or about 2,500 Da to about 3,600 Da.

In certain embodiments, B is a polyester of the following formula:

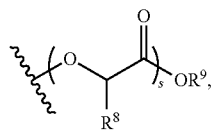

wherein:

$R^8$ is hydrogen, optionally substituted alkyl, optionally substituted alkenyl, optionally substituted alkynyl, optionally substituted aryl, optionally substituted heteroaryl, optionally substituted carbocyclyl, optionally substituted heterocyclyl, or optionally substituted acyl;

$R^9$ is hydrogen, optionally substituted alkyl, optionally substituted alkenyl, optionally substituted alkynyl, optionally substituted aryl, optionally substituted heteroaryl, optionally substituted carbocyclyl, optionally substituted heterocyclyl, optionally substituted acyl, or an oxygen protecting group; and s is an integer between 5 and 2000, inclusive.

In certain embodiments, $R^8$ is hydrogen, optionally substituted alkyl, optionally substituted alkenyl, optionally substituted alkynyl, optionally substituted aryl, optionally substituted heteroaryl, optionally substituted carbocyclyl, optionally substituted heterocyclyl, or optionally substituted acyl. In certain embodiments, $R^8$ is hydrogen. In certain embodiments, $R^8$ is optionally substituted alkyl. In certain embodiments. $R^8$ is optionally substituted alkenyl. In certain embodiments. $R^8$ is optionally substituted alkynyl. In certain embodiments, $R^8$ is optionally substituted aryl. In certain embodiments, $R^8$ is optionally substituted heteroaryl In certain embodiments, $R^8$ is optionally substituted carbocyclyl. In certain embodiments, $R^8$ is optionally substituted heterocyclyl. In certain embodiments, $R^8$ is optionally substituted acyl. In certain embodiments, $R^8$ is optionally substituted $C_{1-6}$ alkyl. In certain embodiments. $R^8$ is unsubstituted $C_{1-6}$ alkyl. In certain embodiments, $R^8$ is optionally substituted $C_{1-3}$ alkyl. In certain embodiments, $R^8$ is unsubstituted $C_{1-3}$ alkyl. In certain embodiments. $R^8$ is selected from the group consisting of methyl, ethyl, n-propyl, iso-propyl, n-butyl, sec-butyl, iso-butyl, and tert-butyl. In certain embodiments, $R^8$ is methyl.

In certain embodiments, $R^9$ hydrogen, optionally substituted alkyl, optionally substituted alkenyl, optionally substituted alkynyl, optionally substituted aryl, optionally substituted heteroaryl, optionally substituted carbocyclyl, optionally substituted heterocyclyl, optionally substituted acyl, or an oxygen protecting group. In certain embodiments, $R^9$ is hydrogen. In certain embodiments, $R^9$ is optionally substituted alkyl. In certain embodiments, $R^9$ is optionally substituted $C_{1-6}$ alkyl. In certain embodiments, $R^9$ is unsubstituted $C_{1-6}$ alkyl. In certain embodiments, $R^9$ is selected from the group consisting of methyl, ethyl, n-propyl, iso-propyl, n-butyl, sec-butyl, iso-butyl, and tert-butyl. In certain embodiments, $R^9$ is optionally substituted alkenyl. In certain embodiments, $R^9$ is optionally substituted alkynyl. In certain embodiments, $R^9$ is optionally substituted aryl. In certain embodiments, $R^9$ is optionally substituted heteroaryl. In certain embodiments, $R^9$ is optionally substituted carbocyclyl. In certain embodiments, $R^9$ is optionally substituted heterocyclyl. In certain embodiments. $R^9$ is optionally substituted acyl. In certain embodiments, $R^9$ is an oxygen protecting group.

In certain embodiments, s is an integer between 5 and 2000, inclusive. In certain embodiments, s is an integer between 5 and 1000, inclusive. In certain embodiments, s is an integer between 5 and 500, inclusive. In certain embodiments, s is an integer between 5 and 200, inclusive. In certain embodiments, s is an integer between 5 and 100, inclusive.

In certain embodiments, B is a polyether of the following formula:

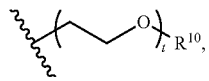

wherein:

$R^{10}$ is hydrogen, optionally substituted alkyl, optionally substituted alkenyl, optionally substituted alkynyl, optionally substituted aryl, optionally substituted heteroaryl, optionally substituted carbocyclyl, optionally substituted heterocyclyl, optionally substituted acyl, or an oxygen protecting group; and t is an integer between 5 and 2000, inclusive.

As generally defined herein, t is an integer between 5 and 2000, inclusive. In certain embodiments, t is an integer between 5 and 1000, inclusive. In certain embodiments, t is an integer between 5 and 500, inclusive. In certain embodiments, t is an integer between 5 and 200, inclusive. In certain embodiments, t is an integer between 5 and 100, inclusive.

In certain embodiments. B is a polyacrylamide group of the following formula:

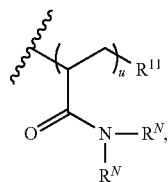

wherein:

each instance of $R^N$ is independently hydrogen, optionally substituted alkyl, optionally substituted alkenyl, optionally substituted alkynyl, optionally substituted carbocyclyl, optionally substituted heterocyclyl, optionally substituted aryl, optionally substituted heteroaryl, or a nitrogen protecting group; or optionally two $R^N$ on the same nitrogen atom are taken together with the intervening atoms to form optionally substituted heterocyclyl or optionally substituted heteroaryl;

$R^{11}$ is hydrogen, halogen, —CN, optionally substituted alkyl, optionally substituted alkenyl, optionally substituted alkynyl, optionally substituted aryl, optionally substituted heteroaryl, optionally substituted carbocyclyl, optionally substituted heterocyclyl, optionally substituted acyl, optionally substituted amino, optionally substituted hydroxyl, or optionally substituted thiol; and u is an integer between 5 and 2000, inclusive.

In certain embodiments, each instance of $R^N$ is independently hydrogen, optionally substituted alkyl, optionally substituted alkenyl, optionally substituted alkynyl, optionally substituted carbocyclyl, optionally substituted heterocyclyl, optionally substituted aryl, optionally substituted heteroaryl, or a nitrogen protecting group; or optionally two $R^N$ on the same nitrogen atom are taken together with the intervening atoms to form optionally substituted heterocyclyl or optionally substituted heteroaryl. In certain embodiments, $R^N$ is hydrogen. In certain embodiments, $R^N$ is optionally substituted alkyl. In certain embodiments, $R^N$ is optionally substituted alkenyl. In certain embodiments, $R^N$ is optionally substituted alkynyl. In certain embodiments, $R^N$ is optionally substituted carbocyclyl. In certain embodiments, $R^N$ is optionally substituted heterocyclyl. In certain embodiments, $R^N$ is optionally substituted aryl. In certain embodiments, $R^N$ is optionally substituted heteroaryl. In certain embodiments, $R^N$ is or a nitrogen protecting group. In certain embodiments, $R^N$ on the same nitrogen atom are taken together with the intervening atoms to form optionally substituted heterocyclyl or optionally substituted heteroaryl. In certain embodiments, $R^N$ is optionally substituted $C_{1-6}$ alkyl. In certain embodiments, $R^N$ is unsubstituted $C_{1-6}$ alkyl. In certain embodiments, $R^N$ is optionally substituted $C_{1-3}$ alkyl. In certain embodiments, $R^N$ is unsubstituted $C_{1-3}$ alkyl. In certain embodiments, $R^N$ is selected from the group consisting of methyl, ethyl, n-propyl, iso-propyl, n-butyl, sec-butyl, iso-butyl, and tert-butyl. In certain embodiments, $R^N$ is iso-propyl.

In certain embodiments, $R^{11}$ is hydrogen, halogen, —CN, optionally substituted alkyl, optionally substituted alkenyl, optionally substituted alkynyl, optionally substituted aryl, optionally substituted heteroaryl, optionally substituted carbocyclyl, optionally substituted heterocyclyl, optionally substituted acyl, optionally substituted amino, optionally substituted hydroxyl, or optionally substituted thiol. In certain embodiments, $R^{11}$ is hydrogen. In certain embodiments, $R^{11}$ is halogen. In certain embodiments, $R^{11}$ is —CN. In certain embodiments, $R^{11}$ is optionally substituted alkyl. In certain embodiments, $R^{11}$ is optionally substituted alkenyl. In certain embodiments, $R^{11}$ is optionally substituted alkynyl. In certain embodiments, $R^{11}$ is optionally substituted aryl. In certain embodiments, $R^{11}$ is optionally substituted heteroaryl. In certain embodiments, $R^{11}$ is optionally substituted carbocyclyl. In certain embodiments, $R^{11}$ is optionally substituted heterocyclyl. In certain embodiments, $R^{11}$ is optionally substituted acyl. In certain embodiments, $R^{11}$ is optionally substituted amino. In certain embodiments, $R^C$ is optionally substituted hydroxyl. In certain embodiments, $R^{11}$ is optionally substituted thiol. In certain embodiments, $R^{11}$ is optionally substituted $C_{1-6}$ alkyl. In certain embodiments, $R^{11}$ is substituted $C_{1-6}$ alkyl. In certain embodiments, $R^{11}$ is optionally substituted $C_{1-3}$ alkyl. In certain embodiments, $R^{11}$ is substituted $C_{1-3}$ alkyl. In certain embodiments, $R^{11}$ is of the formula:

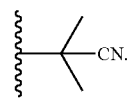

In certain embodiments, u is an integer between 5 and 2000, inclusive. In certain embodiments, u is an integer between 5 and 1000, inclusive. In certain embodiments, u is an integer between 5 and 500, inclusive. In certain embodiments, u is an integer between 5 and 200, inclusive. In certain embodiments, u is an integer between 5 and 100, inclusive.

In certain embodiments, the bottlebrush polymer of Formula (I) is of Formula (I-a):

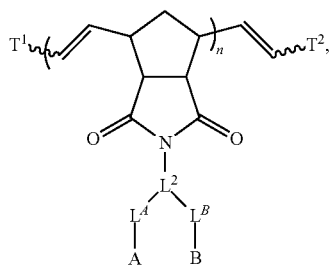

(I-a)

or salts thereof, wherein:

each of $L^2$, $L^A$, and $L^B$ is independently a linker selected from the group consisting of a bond, optionally substituted alkylene, optionally substituted heteroalkylene, optionally substituted alkenylene, optionally substituted alkynylene, optionally substituted carbocyclylene, optionally substituted heterocyclylene, optionally substituted arylene, optionally substituted heteroarylene, and combinations thereof;

each of $T^1$ and $T^2$ is independently a terminal group selected from the group consisting of hydrogen, halogen, optionally substituted alkyl, optionally substituted alkenyl, optionally substituted alkynyl, optionally substituted carbocyclyl, optionally substituted heterocyclyl, optionally substituted aryl, optionally substituted heteroaryl, optionally substituted acyl, optionally substituted hydroxyl, optionally substituted amino, and optionally substituted thio;

n is an integer between 1 and 4000, inclusive;

A is a polysiloxane having a number average molecular weight of about 1,000 Da to about 20,000 Da; and B is a different polymer having a number average molecular weight of about 1.000 Da to about 20,000 Da.

In certain embodiments, $L^2$ is a linker selected from the group consisting of optionally substituted alkylene, optionally substituted heteroalkylene, optionally substituted alkenylene, optionally substituted alkynylene, optionally substituted carbocyclylene, optionally substituted heterocyclylene, optionally substituted arylene, optionally substituted heteroarylene, and combinations thereof. In certain embodiments, $L^2$ is optionally substituted alkylene or optionally substituted heteroalkylene. In certain embodiments, $L^2$ is optionally substituted alkylene. In certain embodiments, $L^2$ is optionally substituted heteroalkylene. In certain embodiments, $L^2$ is unsubstituted alkylene. In certain embodiments, $L^2$ is unsubstituted heteroalkylene. In certain embodiments, $L^2$ is optionally substituted $C_{1-20}$ heteroalkylene. In certain embodiments, $L^2$ is optionally substituted $C_{1-10}$ heteroalkylene. In certain embodiments, $L^2$ is unsubstituted $C_{1-10}$ heteroalkylene. In certain embodiments, $L^2$ is of the formula:

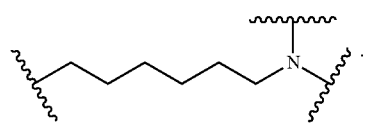 [SMILES: *CCCCCCN(*)*]

In certain embodiments, $L^A$ is a linker selected from the group consisting of optionally substituted alkylene, optionally substituted heteroalkylene, optionally substituted alkenylene, optionally substituted alkynylene, optionally substituted carbocyclylene, optionally substituted heterocyclylene, optionally substituted arylene, optionally substituted heteroarylene, and combinations thereof. In certain embodiments, $L^A$ is optionally substituted alkylene, optionally substituted heteroalkylene, optionally substituted heteroarylene, or optionally substituted heteroarylalkylene. In certain embodiments, L is optionally substituted alkylene. In certain embodiments, $L^A$ is optionally substituted heteroalkylene. In certain embodiments, $L^A$ is optionally substituted heteroarylene. In certain embodiments, $L^A$ is unsubstituted alkylene. In certain embodiments, $L^A$ is unsubstituted heteroalkylene. In certain embodiments, $L^A$ is substituted heteroalkylene. In certain embodiments, $L^A$ is optionally substituted $C_{1-20}$ heteroalkylene. In certain embodiments, $L^A$ is optionally substituted $C_{1-10}$ heteroalkylene. In certain embodiments. $L^A$ is substituted $C_{1-10}$ heteroalkylene. In certain embodiments, $L^A$ is $C_{1-10}$ heteroalkylene substituted with at least one oxo (=O) group. In certain embodiments, $L^A$ is of the formula:

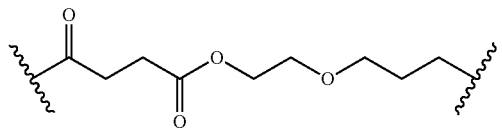

In certain embodiments, $L^A$ is of the formula:

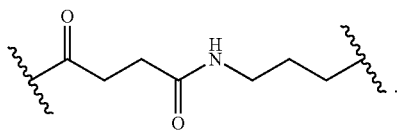 [SMILES: *CCCNC(=O)CCC(*)=O]

In certain embodiments, $L^A$ is unsubstituted heteroarylalkylene. In certain embodiments, $L^A$ is optionally substituted heteroarylalkylene. In certain embodiments, $L^A$ is an unsubstituted 5-membered heteroarylalkylene. In certain embodiments, $L^A$ comprises a triazole. In certain embodiments, $L^A$ comprises a group of the formula:

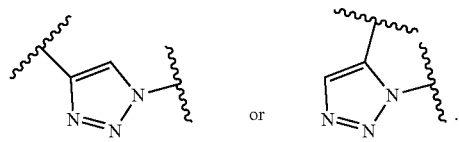 [SMILES: *c1cn(*)nn1 ; *c1cnnn1*]

In certain embodiments, $L^A$ is of the formula:

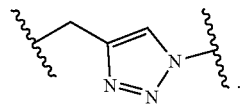

In certain embodiments. $L^B$ is a linker selected from the group consisting of optionally substituted alkylene, optionally substituted heteroalkylene, optionally substituted alkenylene, optionally substituted alkynylene, optionally substituted carbocyclylene, optionally substituted heterocyclylene, optionally substituted arylene, optionally substituted heteroarylene, and combinations thereof. In certain embodiments. $L^B$ is optionally substituted alkylene, optionally substituted heteroalkylene, optionally substituted heteroarylene, or optionally substituted heteroarylalkylene.

In certain embodiments, $L^B$ is optionally substituted alkylene. In certain embodiments, $L^B$ is optionally substituted heteroalkylene. In certain embodiments, $L^B$ is optionally substituted heteroarylene. In certain embodiments, $L^B$ is unsubstituted alkylene. In certain embodiments, $L^B$ is unsubstituted heteroalkylene. In certain embodiments, $L^B$ is substituted heteroalkylene. In certain embodiments, $L^B$ is optionally substituted $C_{1-20}$ heteroalkylene. In certain embodiments, $L^B$ is optionally substituted $C_{1-10}$ heteroalkylene. In certain embodiments, $L^B$ is substituted $C_{1-10}$ heteroalkylene. In certain embodiments, $L^B$ is $C_{1-10}$ heteroalkylene substituted with at least one oxo (=O) group. In certain embodiments, $L^B$ is of the formula:

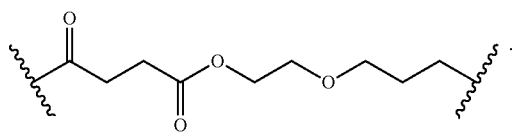 [SMILES: *CCCOCCOC(=O)CCC(*)=O]

In certain embodiments, $L^B$ is of the formula:

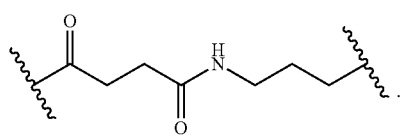 [SMILES: *CCCNC(=O)CCC(*)=O]

In certain embodiments, $L^B$ is unsubstituted heteroarylalkylene. In certain embodiments, $L^B$ is optionally substituted heteroarylalkylene. In certain embodiments, $L^B$ is an unsubstituted 5-membered heteroarylalkylene. In certain embodiments, $L^B$ comprises a triazole. In certain embodiments, $L^B$ comprises a group of the formula:

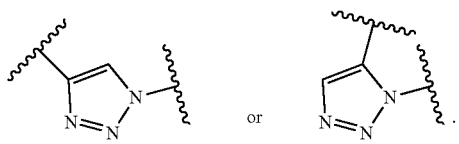 [SMILES: *c1cn(*)nn1 ; *c1cnnn1*]

In certain embodiments, $L^B$ is of the formula:

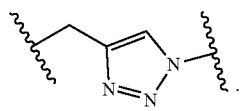 [SMILES: *Cc1cn(*)nn1]

In certain embodiments, $L^2$ is optionally substituted alkylene or optionally substituted heteroalkylene; $L^A$ is optionally substituted alkylene, optionally substituted heteroalkylene, optionally substituted heteroarylalkylene, or optionally substituted heteroarylene; and $L^B$ is optionally substituted alkylene, optionally substituted heteroalkylene, optionally substituted heteroarylalkylene, or optionally substituted heteroarylene. In certain embodiments, $L^2$ is optionally substituted heteroalkylene; $L^A$ is optionally substituted heteroalkylene; and $L^B$ is optionally substituted heteroarylalkylene. In certain embodiments, $L^2$ is unsubstituted heteroalkylene; $L^A$ is unsubstituted heteroalkylene; and $L^B$ is substituted heteroarylalkylene. In certain embodiments, $L^2$ is unsubstituted $C_{1-10}$ heteroalkylene; $L^A$ is substituted $C_{1-10}$ heteroalkylene; and $L^B$ is an unsubstituted 5-membered heteroarylalkylene.

In certain embodiments, $L^2$ is of the formula:

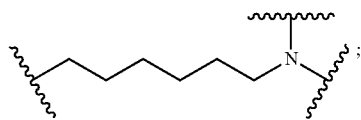 [SMILES: *CCCCCCN(*)*]

$L^A$ is of the formula:

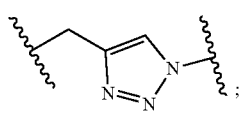 [SMILES: *Cc1cn(*)nn1]

and $L^B$ is of the formula:

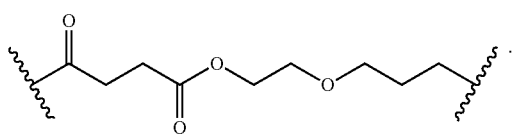 [SMILES: *CCCOCCOC(=O)CCC(*)=O]

In certain embodiments, $L^2$ is of the formula:

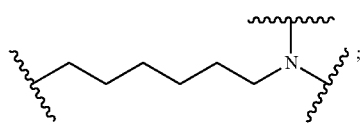 [SMILES: *CCCCCCN(*)*]

$L^A$ is of the formula:

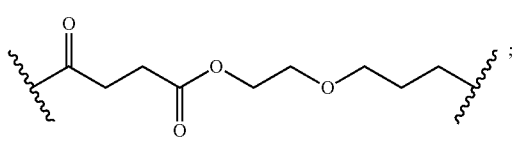 [SMILES: *CCCOCCOC(=O)CCC(*)=O]

and $L^B$ is of the formula:

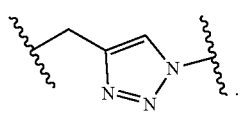 [SMILES: *Cc1cn(*)nn1]

In certain embodiments, $L^2$ is of the formula:

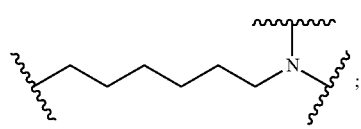 [SMILES: *CCCCCCN(*)*]

$L^A$ is of the formula:

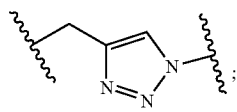

and $L^B$ is of the formula:

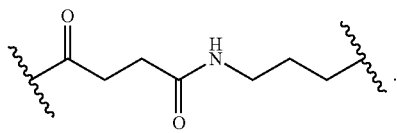 [SMILES: *CCCNC(=O)CCC(*)=O]

In certain embodiments, $L^2$ is of the formula:

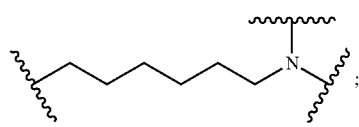 [SMILES: *CCCCCCN(*)*]

$L^A$ is of the formula:

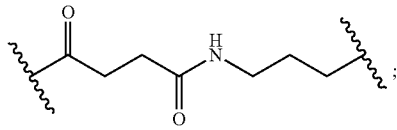 [SMILES: *CCCNC(=O)CCC(*)=O]

and $L^B$ is of the formula:

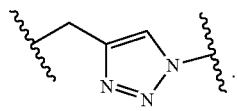 [SMILES: *Cc1cn(*)nn1]

In certain embodiments, n is an integer between 1 and 4000, inclusive. In certain embodiments, n is an integer between 5 and 4000, inclusive. In certain embodiments, n is an integer is between 50 and 4000, inclusive. In certain embodiments, n is an integer between 100 and 4000, inclusive. In certain embodiments, n is an integer between 1000 and 4000, inclusive. In certain embodiments, n is an integer between 2000 and 4000, inclusive. In certain embodiments, n is an integer between 2 and 4000, inclusive. In certain embodiments, n is an integer between 2 and 2000, inclusive. In certain embodiments, n is an integer between 2 and 1000, inclusive. In certain embodiments, n is an integer between 10 and 1000, inclusive. In certain embodiments, n is an integer between 2 and 100, inclusive. In certain embodiments, n is an integer between 10 and 100, inclusive. In certain embodiments, n is an integer between 10 and 50, inclusive. In certain embodiments, n is an integer between 25 and 50, inclusive. In certain embodiments, n is an integer between 25 and 100, inclusive. In certain embodiments, n is about 10, about 25, about 50, or about 100. In certain embodiments, n is 10, 25, 50, or 100. In certain embodiments, n is 25 or 50. In certain embodiments, n is 10. In certain embodiments, n is 25. In certain embodiments, n is 50. In certain embodiments, n is 100.

In certain embodiments, each of $T^1$ and $T^2$ is independently a terminal group selected from the group consisting of hydrogen, halogen, optionally substituted alkyl, optionally substituted alkenyl, optionally substituted alkynyl, optionally substituted carbocyclyl, optionally substituted heterocyclyl, optionally substituted aryl, optionally substituted heteroaryl, optionally substituted acyl, optionally substituted hydroxyl, optionally substituted amino, and optionally substituted thiol. In certain embodiments, $T^1$ is hydrogen. In certain embodiments, $T^1$ is halogen. In certain embodiments, $T^1$ is optionally substituted alkyl. In certain embodiments, $T^1$ is optionally substituted alkenyl. In certain embodiments, $T^1$ is optionally substituted alkynyl. In certain embodiments, $T^1$ is optionally substituted carbocyclyl. In certain embodiments, $T^1$ is optionally substituted heterocyclyl. In certain embodiments, $T^1$ is optionally substituted aryl. In certain embodiments, $T^1$ is optionally substituted heteroaryl. In certain embodiments, $T^1$ is optionally substituted acyl. In certain embodiments, $T^1$ is optionally substituted hydroxyl. In certain embodiments, $T^1$ is optionally substituted amino. In certain embodiments, $T^1$ is optionally substituted thiol. In certain embodiments, $T^2$ is hydrogen. In certain embodiments, $T^2$ is halogen. In certain embodiments, $T^2$ is optionally substituted alkyl. In certain embodiments, $T^2$ is optionally substituted alkenyl. In certain embodiments. $T^2$ is optionally substituted alkynyl. In certain embodiments, $T^2$ is optionally substituted carbocyclyl. In certain embodiments, $T^2$ is optionally substituted heterocyclyl. In certain embodiments, $T^2$ is optionally substituted aryl. In certain embodiments, $T^2$ is optionally substituted heteroaryl. In certain embodiments, $T^2$ is optionally substituted acyl. In certain embodiments, $T^2$ is optionally substituted hydroxyl. In certain embodiments, $T^2$ is optionally substituted amino. In certain embodiments, $T^2$ is optionally substituted thiol. In certain embodiments, both $T^1$ and $T^2$ are hydrogen.

In certain embodiments, $T^1$ is optionally substituted aryl, and $T^2$ is hydrogen. In certain embodiments, $T^1$ is phenyl, and $T^2$ is hydrogen. In certain embodiments, $T^2$ is optionally substituted aryl, and $T^1$ is hydrogen. In certain embodiments, $T^2$ is phenyl, and $T^1$ is hydrogen.

In certain embodiments, A is a polysiloxane and B is a different polymer. In certain embodiments, A is a polysiloxane having a number average molecular weight of about 1,000 Da to about 20.000 Da; and B is a different polymer having a number average molecular weight of about 1,000 Da to about 20,000 Da.

In certain embodiments, A is a polysiloxane. In certain embodiments, the polysiloxane is of the formula:

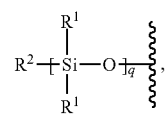

wherein:
$R^1$ is optionally substituted alkyl, optionally substituted alkenyl, optionally substituted aryl, or optionally substituted alkoxy;
$R^2$ is optionally substituted alkyl, optionally substituted alkenyl, optionally substituted aryl, or optionally substituted alkoxy; and
q is an integer between 5 and 2000, inclusive.

In certain embodiments, $R^1$ is optionally substituted alkyl. In certain embodiments, $R^1$ is optionally substituted $C_{1-6}$ alkyl. In certain embodiments, $R^1$ is unsubstituted $C_{1-6}$ alkyl. In certain embodiments, $R^1$ is selected from the group consisting of methyl, ethyl, n-propyl, iso-propyl, n-butyl, sec-butyl, iso-butyl, and tert-butyl. In certain embodiments, $R^1$ is methyl.

In certain embodiments, $R^1$ is $C_{1-6}$ alkyl, and the polysiloxane has a number average molecular weight of about 2,000 Da to about 20,000 Da, about 2,000 Da to about 10,000 Da, about 2,000 Da to about 6,000 Da, or about 4,000 Da to about 6,000 Da, or about 4,500 Da to about 5,500 Da.

In certain embodiments, $R^2$ is optionally substituted alkyl. In certain embodiments, $R^2$ is optionally substituted $C_{1-20}$ alkyl. In certain embodiments. $R^2$ is unsubstituted $C_{1-20}$ alkyl. In certain embodiments, $R^2$ is optionally substituted $C_{1-6}$ alkyl. In certain embodiments, $R^2$ is unsubstituted $C_{1-6}$ alkyl. In certain embodiments, $R^2$ is selected from the group consisting of methyl, ethyl, n-propyl, iso-propyl, n-butyl, sec-butyl, iso-butyl, and tert-butyl. In certain embodiments, $R^2$ is n-butyl.

In certain embodiments, q is an integer between 5 and 500, inclusive. In certain embodiments, q is an integer between 5 and 100, inclusive. In certain embodiments, q is an integer between 10 and 100, inclusive. In certain embodiments, q is an integer between 30 and 80, inclusive. In certain embodiments, q is an integer between 50 and 80, inclusive. In certain embodiments, q is an integer between 60 and 70, inclusive.

In certain embodiments, $R^1$ is optionally substituted $C_{1-6}$ alkyl; $R^2$ is optionally substituted $C_{1-6}$ alkyl; and q is an integer between 10 and 100, inclusive. In certain embodiments, $R^1$ is unsubstituted $C_{1-6}$ alkyl; $R^2$ is unsubstituted $C_{1-6}$ alkyl; and q is an integer between 10 and 100, inclusive. In certain embodiments, $R^1$ is methyl; $R^2$ is n-butyl; and q is an integer between 50 and 100, inclusive.

In certain embodiments, $R^1$ is $C_{1-6}$ alkyl, and the polysiloxane has a number average molecular weight of about 2,000 Da to about 20,000 Da, about 2,000 Da to about 10,000 Da, about 2,000 Da to about 6,000 Da, or about 4,000 Da to about 6,000 Da. or about 4,500 Da to about 5,500 Da.

In certain embodiments, the polysiloxane is polydimethylsiloxane (PDMS) having a number average molecular weight of about 2,000 Da to about 20,000 Da, about 2,000 Da to about 10,000 Da, about 2,000 Da to about 6,000 Da, about 4,000 Da to about 6,000 Da, or about 4,500 Da to about 5,500 Da.

In certain embodiments, B is a polyether, a polyester, a polyacrylamide, a polyacrylate, or a vinyl polymer. The polyacrylate may be any polyester described herein. The polyester may be any polyester described herein. The polyether may be any polyether described herein. The polyacrylamide may be any polyacrylamide described herein. Additionally, the vinyl polymer may be any vinyl polymer described herein.

In certain embodiments, B is a polyether selected from the group consisting of polyethylene glycol (PEG), polyoxymethylene (POM), polypropylene glycol (PPG), polytetramethylene glycol (PTMG), poly(ethyl ethylene) phosphate (PEEP), and poly(oxazoline). In certain embodiments, B is polyethylene glycol (PEG). In certain embodiments. B is a polyester. In certain embodiments, B is a polyester selected from the group consisting of polyglycolic acid (PGA), polylactic acid (PLA), poly(lactic-co-glycolic acid) (PLGA), polycaprolactone (PCL), polyhydroxyalkanoate (PHA), polyhydroxybutryate (PHB), polyethylene adipate (PEA), polybutylene succinate (PBS), and poly(3-hydroxy-butyrate-co-3-hydroxyvalerate) (PHBV). In certain embodiments, B is polylactic acid (PLA). In certain embodiments, B is polyglycolic acid (PGA) or poly(lactic-co-glycolic acid) (PLGA). In certain embodiments. B is a polyacrylamide. In certain embodiments, B is a poly(N-alkylacrylamide). In certain embodiments, B is poly(N-isopropylacrylamide). In certain embodiments, B is a vinyl polymer. In certain embodiments, B is a vinyl polymer selected from the group consisting of polystyrene, polyvinyl chloride, polyethylene, polypropylene, polybutadiene, polyvinyl acetate, polyvinyl alcohol, and polyacrylonitrile. In certain embodiments, B is polystyrene. In certain embodiments, B is a polyacrylate. In certain embodiments, B is a polyacrylate selected from the group consisting of poly(methyl methacrylate), poly(methyl acrylate), poly(methacrylate), poly(hydroxyethyl methacrylate), poly(n-butyl acrylate), and poly(tert-butyl acrylate). In certain embodiments. B is poly(tert-butyl acrylate).

In certain embodiments, B is a vinyl polymer of the following formula:

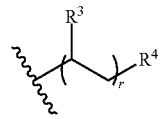

wherein:

$R^3$ is optionally substituted alkyl, halogen, hydrogen, cyano, $OR^a$, optionally substituted alkenyl, optionally substituted alkynyl, optionally substituted aryl, or optionally substituted heteroaryl;

$R^4$ is optionally substituted alkyl, optionally substituted alkenyl, optionally substituted alkynyl, optionally substituted aryl, or optionally substituted heteroaryl;

$R^a$ is hydrogen, optionally substituted alkyl, optionally substituted alkenyl, optionally substituted alkynyl, optionally substituted aryl, or optionally substituted heteroaryl; and r is an integer between 5 and 2000, inclusive.

In certain embodiments, $R^3$ is hydrogen. In certain embodiments, $R^3$ is optionally substituted alkyl. In certain embodiments, $R^3$ is optionally substituted alkenyl. In certain embodiments, $R^3$ is optionally substituted alkynyl. In certain embodiments, $R^3$ is optionally substituted aryl. In certain embodiments, $R^3$ is optionally substituted heteroaryl. In certain embodiments, $R^3$ is cyano. In certain embodiments, $R^3$ is halogen. In certain embodiments, $R^3$ is $OR^a$, wherein $R^a$ is hydrogen or optionally substituted alkyl. In certain embodiments, $R^3$ is optionally substituted phenyl. In certain embodiments, $R^3$ is unsubstituted phenyl.

In certain embodiments, $R^4$ is optionally substituted alkyl. In certain embodiments, $R^4$ is optionally substituted alkenyl. In certain embodiments, $R^4$ is optionally substituted alkynyl. In certain embodiments. $R^4$ is optionally substituted aryl. In certain embodiments, $R^4$ is optionally substituted heteroaryl. In certain embodiments, $R^4$ is optionally substituted $C_{1-6}$ alkyl. In certain embodiments, $R^4$ is unsubstituted $C_{1-6}$ alkyl. In certain embodiments, $R^4$ is $C_{1-6}$ alkyl substituted with an ester group.

In certain embodiments, r is an integer between 5 and 500, inclusive. In certain embodiments, r is an integer between 5 and 100, inclusive. In certain embodiments, r is an integer between 10 and 100, inclusive. In certain embodiments, r is an integer between 10 and 50, inclusive. In certain embodiments, r is an integer between 20 and 40, inclusive. In certain embodiments, r is an integer between 30 and 40, inclusive.

In certain embodiments. $R^3$ is optionally substituted aryl; $R^4$ is optionally substituted $C_{1-6}$ alkyl; and r is an integer between 10 and 100, inclusive. In certain embodiments, $R^3$ is unsubstituted aryl; $R^4$ is substituted $C_{1-6}$ alkyl; and r is an integer between 10 and 50, inclusive. In certain embodiments, $R^3$ is unsubstituted phenyl; $R^4$ is substituted $C_{1-6}$ alkyl; and r is an integer between 10 and 50, inclusive.

In certain embodiments, the vinyl polymer is polystyrene. In certain embodiments, the vinyl polymer is polystyrene having a number average molecular weight of about 2,000 Da to about 20.000 Da, about 10,000 Da to about 15,000 Da, about 2,000 Da to about 10,000 Da, about 7,000 Da to about 10,000 Da, about 8,000 Da to about 9,500 Da, about 2,000 Da to about 7,000 Da, about 2,000 Da to about 4,000 Da, about 2,000 Da to about 3,000 Da, or about 2,500 Da to about 3,600 Da.

In certain embodiments, B is a polyacrylate of the following formula:

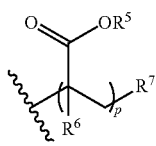

wherein:

$R^5$ is optionally substituted alkyl, hydrogen, optionally substituted alkenyl, optionally substituted alkynyl, optionally substituted aryl, or optionally substituted heteroaryl;

$R^6$ is optionally substituted alkyl, hydrogen, optionally substituted alkenyl, optionally substituted alkynyl, optionally substituted aryl, or optionally substituted heteroaryl;

$R^7$ is optionally substituted alkyl, optionally substituted alkenyl, optionally substituted alkynyl, optionally substituted aryl, or optionally substituted heteroaryl; and p is an integer between 5 and 2000, inclusive.

In certain embodiments, $R^5$ is hydrogen. In certain embodiments, $R^5$ is optionally substituted alkyl. In certain embodiments, $R^5$ is optionally substituted alkenyl. In certain embodiments, $R^5$ is optionally substituted alkynyl. In certain embodiments, $R^5$ is optionally substituted aryl. In certain embodiments, $R^5$ is optionally substituted heteroaryl. In certain embodiments. $R^5$ is optionally substituted alkyl. In certain embodiments, $R^5$ is optionally substituted $C_{1-6}$ alkyl. In certain embodiments, $R^5$ is unsubstituted $C_{1-6}$ alkyl. In certain embodiments, $R^5$ is selected from the group consisting of methyl, ethyl, n-propyl, iso-propyl, n-butyl, sec-butyl, iso-butyl, and tert-butyl. In certain embodiments, $R^5$ is tert-butyl.

In certain embodiments, $R^6$ is optionally substituted alkyl. In certain embodiments, $R^6$ is hydrogen. In certain embodiments, $R^6$ is optionally substituted alkenyl. In certain embodiments, $R^6$ is optionally substituted alkynyl. In certain embodiments, $R^6$ is optionally substituted aryl. In certain embodiments, $R^6$ is optionally substituted heteroaryl. In certain embodiments, $R^6$ is optionally substituted $C_{1-6}$ alkyl. In certain embodiments, $R^6$ is unsubstituted $C_{1-6}$ alkyl. In certain embodiments, $R^6$ is methyl.

In certain embodiments, $R^7$ is optionally substituted alkyl. In certain embodiments, $R^7$ is optionally substituted alkenyl. In certain embodiments, $R^7$ is optionally substituted alkynyl. In certain embodiments, $R^7$ is optionally substituted aryl. In certain embodiments, $R^7$ is optionally substituted heteroaryl. In certain embodiments, $R^7$ is optionally substituted $C_{1-6}$ alkyl. In certain embodiments, $R^7$ is unsubstituted $C_{1-6}$ alkyl. In certain embodiments, $R^7$ is $C_{1-6}$ alkyl substituted with an ester group.

In certain embodiments, p is an integer between 5 and 500, inclusive. In certain embodiments, p is an integer between 5 and 100, inclusive. In certain embodiments, p is an integer between 10 and 100, inclusive. In certain embodiments, p is an integer between 10 and 50, inclusive. In certain embodiments, p is an integer between 20 and 40, inclusive. In certain embodiments, p is an integer between 25 and 35, inclusive.

In certain embodiments. $R^5$ is optionally substituted alkyl; $R^6$ is hydrogen; $R^7$ is optionally substituted $C_{1-6}$ alkyl; and p is an integer between 10 and 100, inclusive. In certain embodiments, $R^5$ is optionally substituted $C_{1-6}$ alkyl; $R^6$ is hydrogen; $R^7$ is substituted $C_{1-6}$ alkyl; and p is an integer between 10 and 50, inclusive. In certain embodiments. $R^5$ is tert-butyl; $R^6$ is hydrogen; $R^4$ is substituted $C_{1-6}$ alkyl; and p is an integer between 20 and 40, inclusive.

In certain embodiments, the vinyl polymer is polystyrene. In certain embodiments, the vinyl polymer is polystyrene having a number average molecular weight of about 2,000 Da to about 20,000 Da, about 10,000 Da to about 15,000 Da, about 2,000 Da to about 10,000 Da, about 7,000 Da to about 10,000 Da, about 8,000 Da to about 9,500 Da, about 2,000 Da to about 7,000 Da, about 2,000 Da to about 4,000 Da, about 2,000 Da to about 3,000 Da. or about 2,500 Da to about 3,600 Da.

In certain embodiments, B is a polyester of the following formula:

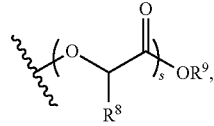

wherein:

$R^8$ is hydrogen, optionally substituted alkyl, optionally substituted alkenyl, optionally substituted alkynyl, optionally substituted aryl, optionally substituted heteroaryl, optionally substituted carbocyclyl, optionally substituted heterocyclyl, or optionally substituted acyl:

$R^9$ is hydrogen, optionally substituted alkyl, optionally substituted alkenyl, optionally substituted alkynyl, optionally substituted aryl, optionally substituted heteroaryl, optionally substituted carbocyclyl, optionally substituted heterocyclyl, optionally substituted acyl, or an oxygen protecting group; and s is an integer between 5 and 2000, inclusive.

In certain embodiments, $R^8$ is hydrogen, optionally substituted alkyl, optionally substituted alkenyl, optionally substituted alkynyl, optionally substituted aryl, optionally substituted heteroaryl, optionally substituted carbocyclyl, optionally substituted heterocyclyl, or optionally substituted acyl. In certain embodiments, $R^8$ is hydrogen. In certain embodiments. $R^8$ is optionally substituted alkyl. In certain embodiments, $R^8$ is optionally substituted alkenyl. In certain embodiments, $R^8$ is optionally substituted alkynyl. In certain embodiments, $R^8$ is optionally substituted aryl. In certain embodiments, $R^8$ is optionally substituted heteroaryl In certain embodiments, $R^8$ is optionally substituted carbocyclyl. In certain embodiments, $R^8$ is optionally substituted heterocyclyl. In certain embodiments, $R^8$ is optionally substituted acyl. In certain embodiments, $R^8$ is optionally substituted $C_{1-6}$ alkyl. In certain embodiments, $R^8$ is unsubstituted $C_{1-6}$ alkyl. In certain embodiments, $R^8$ is optionally substituted $C_{1-3}$ alkyl. In certain embodiments, $R^8$ is unsubstituted $C_{1-3}$ alkyl. In certain embodiments, $R^8$ is selected from the group consisting of methyl, ethyl, n-propyl, iso-propyl, n-butyl, sec-butyl, iso-butyl, and tert-butyl. In certain embodiments, $R^8$ is methyl.

In certain embodiments, $R^9$ hydrogen, optionally substituted alkyl, optionally substituted alkenyl, optionally substituted alkynyl, optionally substituted aryl, optionally substituted heteroaryl, optionally substituted carbocyclyl, optionally substituted heterocyclyl, optionally substituted acyl, or an oxygen protecting group. In certain embodiments, $R^9$ is hydrogen. In certain embodiments. $R^9$ is optionally substituted alkyl. In certain embodiments, $R^9$ is optionally substituted $C_{1-6}$ alkyl. In certain embodiments, $R^9$ is unsubstituted $C_{1-6}$ alkyl. In certain embodiments, $R^9$ is selected from the group consisting of methyl, ethyl, n-propyl, iso-propyl, n-butyl, sec-butyl, iso-butyl, and tert-butyl. In certain embodiments, $R^9$ is optionally substituted alkenyl. In certain embodiments, $R^9$ is optionally substituted alkynyl. In certain embodiments, $R^9$ is optionally substituted aryl. In certain embodiments, $R^9$ is optionally substituted heteroaryl. In certain embodiments, $R^9$ is optionally substituted carbocyclyl. In certain embodiments, $R^9$ is optionally substituted heterocyclyl. In certain embodiments, $R^9$ is optionally substituted acyl. In certain embodiments, $R^9$ is an oxygen protecting group.

In certain embodiments, s is an integer between 5 and 2000, inclusive. In certain embodiments, s is an integer between 5 and 1000, inclusive. In certain embodiments, s is an integer between 5 and 500, inclusive. In certain embodiments, s is an integer between 5 and 200, inclusive. In certain embodiments, s is an integer between 5 and 100, inclusive.

In certain embodiments, B is a polyether of the following formula:

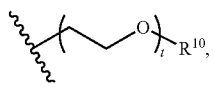

wherein:

$R^{10}$ is hydrogen, optionally substituted alkyl, optionally substituted alkenyl, optionally substituted alkynyl, optionally substituted aryl, optionally substituted heteroaryl, optionally substituted carbocyclyl, optionally substituted heterocyclyl, optionally substituted acyl, or an oxygen protecting group; and t is an integer between 5 and 2000, inclusive.

In certain embodiments, t is an integer between 5 and 2000, inclusive. In certain embodiments, t is an integer between 5 and 1000, inclusive. In certain embodiments, t is an integer between 5 and 500, inclusive. In certain embodiments, t is an integer between 5 and 200, inclusive. In certain embodiments, t is an integer between 5 and 100, inclusive.

In certain embodiments, B is a polyacrylamide group of the following formula:

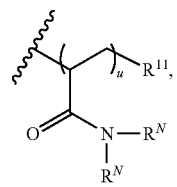

wherein:

each instance of $R^N$ is independently hydrogen, optionally substituted alkyl, optionally substituted alkenyl, optionally substituted alkynyl, optionally substituted carbocyclyl, optionally substituted heterocyclyl, optionally substituted aryl, optionally substituted heteroaryl, or a nitrogen protecting group; or optionally two $R^N$ on the same nitrogen atom are taken together with the intervening atoms to form optionally substituted heterocyclyl or optionally substituted heteroaryl;

$R^{11}$ is hydrogen, halogen, —CN, optionally substituted alkyl, optionally substituted alkenyl, optionally substituted alkynyl, optionally substituted aryl, optionally substituted heteroaryl, optionally substituted carbocyclyl, optionally substituted heterocyclyl, optionally substituted acyl, optionally substituted amino, optionally substituted hydroxyl, or optionally substituted thiol; and u is an integer between 5 and 2000, inclusive.

In certain embodiments, each instance of $R^N$ is independently hydrogen, optionally substituted alkyl, optionally substituted alkenyl, optionally substituted alkynyl, optionally substituted carbocyclyl, optionally substituted heterocyclyl, optionally substituted aryl, optionally substituted heteroaryl, or a nitrogen protecting group; or optionally two $R^N$ on the same nitrogen atom are taken together with the intervening atoms to form optionally substituted heterocyclyl or optionally substituted heteroaryl. In certain embodiments, $R^N$ is hydrogen. In certain embodiments, $R^N$ is optionally substituted alkyl. In certain embodiments. $R^N$ is optionally substituted alkenyl. In certain embodiments, $R^N$ is optionally substituted alkynyl. In certain embodiments, $R^N$ is optionally substituted carbocyclyl. In certain embodiments, $R^N$ is optionally substituted heterocyclyl. In certain embodiments, $R^N$ is optionally substituted aryl. In certain embodiments, $R^N$ is optionally substituted heteroaryl. In certain embodiments, $R^N$ is or a nitrogen protecting group. In certain embodiments, $R^N$ on the same nitrogen atom are taken together with the intervening atoms to form optionally substituted heterocyclyl or optionally substituted heteroaryl. In certain embodiments, $R^N$ is optionally substituted $C_{1-6}$ alkyl. In certain embodiments, $R^N$ is unsubstituted $C_{1-6}$ alkyl. In certain embodiments, $R^N$ is optionally substituted $C_{1-3}$ alkyl. In certain embodiments, $R^N$ is unsubstituted $C_{1-3}$ alkyl. In certain embodiments, $R^N$ is selected from the group consisting of methyl, ethyl, n-propyl, iso-propyl, n-butyl, sec-butyl, iso-butyl, and tert-butyl. In certain embodiments, $R^N$ is iso-propyl.

In certain embodiments, $R^{11}$ is hydrogen, halogen, —CN, optionally substituted alkyl, optionally substituted alkenyl, optionally substituted alkynyl, optionally substituted aryl, optionally substituted heteroaryl, optionally substituted carbocyclyl, optionally substituted heterocyclyl, optionally substituted acyl, optionally substituted amino, optionally substituted hydroxyl, or optionally substituted thiol. In certain embodiments, $R^{11}$ is hydrogen. In certain embodiments, $R^{11}$ is halogen. In certain embodiments, $R^{11}$ is —CN. In certain embodiments, $R^{11}$ is optionally substituted alkyl. In certain embodiments. $R^{11}$ is optionally substituted alkenyl. In certain embodiments. $R^{11}$ is optionally substituted alkynyl. In certain embodiments. $R^{11}$ is optionally substituted aryl. In certain embodiments, $R^{11}$ is optionally substituted heteroaryl. In certain embodiments, $R^{11}$ is optionally substituted carbocyclyl. In certain embodiments, $R^{11}$ is optionally substituted heterocyclyl. In certain embodiments, $R^{11}$ is optionally substituted acyl. In certain embodiments, $R^{11}$ is optionally substituted amino. In certain embodiments, $R^C$ is optionally substituted hydroxyl. In certain embodiments, $R^{11}$ is optionally substituted thiol. In certain embodiments, $R^{11}$ is optionally substituted $C_{1-6}$ alkyl. In certain embodiments, $R^{11}$ is substituted $C_{1-6}$ alkyl. In certain embodiments, $R^{11}$ is optionally substituted $C_{1-3}$ alkyl. In certain embodiments, $R^{11}$ is substituted $C_{1-3}$ alkyl. In certain embodiments, $R^{11}$ is of the formula:

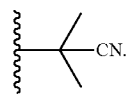 [SMILES: *C(C)(C)C#N]

In certain embodiments, u is an integer between 5 and 2000, inclusive. In certain embodiments, u is an integer between 5 and 1000, inclusive. In certain embodiments, u is an integer between 5 and 500, inclusive. In certain embodiments, u is an integer between 5 and 200, inclusive. In certain embodiments, u is an integer between 5 and 100, inclusive.

In certain embodiments, the bottlebrush polymer is of Formula (I-b):

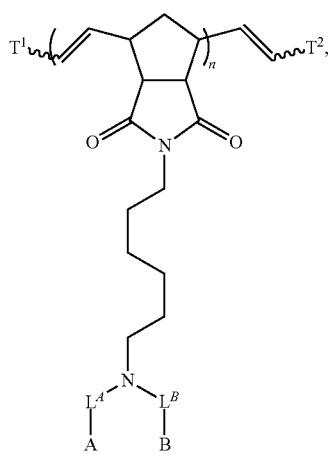

(I-b)

or salts thereof, wherein:

each $L^A$, and $L^B$ is independently a linker selected from the group consisting of a bond, optionally substituted alkylene, optionally substituted heteroalkylene, optionally substituted alkenylene, optionally substituted alkynylene, optionally substituted carbocyclylene, optionally substituted heterocyclylene, optionally substituted arylene, optionally substituted heteroarylene, and combinations thereof;

each of $T^1$ and $T^2$ is independently a terminal group selected from the group consisting of hydrogen, halogen, optionally substituted alkyl, optionally substituted alkenyl, optionally substituted alkynyl, optionally substituted carbocyclyl, optionally substituted heterocyclyl, optionally substituted aryl, optionally substituted heteroaryl, optionally substituted acyl, optionally substituted hydroxyl, optionally substituted amino, and optionally substituted thio;

n is an integer between 1 and 4000, inclusive;

A is a polysiloxane having a number average molecular weight of about 1,000 Da to about 20,000 Da; and B is a different polymer having a number average molecular weight of about 1,000 Da to about 20,000 Da.

In certain embodiments. $L^A$ is a linker selected from the group consisting of optionally substituted alkylene, optionally substituted heteroalkylene, optionally substituted alkenylene, optionally substituted alkynylene, optionally substituted carbocyclylene, optionally substituted heterocyclylene, optionally substituted arylene, optionally substituted heteroarylene, and combinations thereof. In certain embodiments, $L^A$ is optionally substituted alkylene, optionally substituted heteroalkylene, optionally substituted heteroarylene, or optionally substituted heteroarylalkylene. In certain embodiments, $L^A$ is optionally substituted alkylene. In certain embodiments, $L^A$ is optionally substituted heteroalkylene. In certain embodiments, $L^A$ is optionally substituted heteroarylene. In certain embodiments, $L^A$ is unsubstituted alkylene. In certain embodiments, $L^A$ is unsubstituted heteroalkylene. In certain embodiments, $L^A$ is substituted heteroalkylene. In certain embodiments, $L^A$ is optionally substituted $C_{1-20}$ heteroalkylene. In certain embodiments, $L^A$ is optionally substituted $C_{1-10}$ heteroalkylene. In certain embodiments, $L^A$ is substituted $C_{1-10}$ heteroalkylene. In certain embodiments, $L^A$ is C-10 heteroalkylene substituted with at least one oxo (=O) group. In certain embodiments, $L^A$ is of the formula:

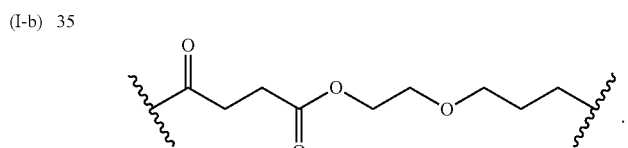

In certain embodiments, $L^A$ is of the formula:

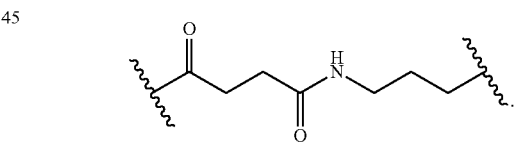

In certain embodiments, $L^A$ is unsubstituted heteroarylalkylene. In certain embodiments, $L^A$ is optionally substituted heteroarylalkylene. In certain embodiments, $L^A$ is an unsubstituted 5-membered heteroarylalkylene. In certain embodiments, $L^A$ comprises a triazole. In certain embodiments, $L^A$ comprises a group of the formula:

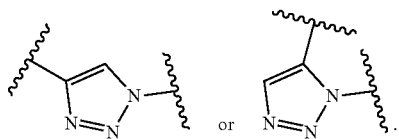 [SMILES: *c1cn(*)nn1 ; *c1cnnn1*]

In certain embodiments. $L^A$ is of the formula:

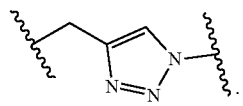 [SMILES: *Cc1cn(*)nn1]

In certain embodiments, $L^B$ is a linker selected from the group consisting of optionally substituted alkylene, optionally substituted heteroalkylene, optionally substituted alkenylene, optionally substituted alkynylene, optionally substituted carbocyclylene, optionally substituted heterocyclylene, optionally substituted arylene, optionally substituted heteroarylene, and combinations thereof. In certain embodiments, $L^B$ is optionally substituted alkylene, optionally substituted heteroalkylene, optionally substituted heteroarylene, or optionally substituted heteroarylalkylene. In certain embodiments, $L^B$ is optionally substituted alkylene. In certain embodiments, $L^B$ is optionally substituted heteroalkylene. In certain embodiments, $L^B$ is optionally substituted heteroarylene. In certain embodiments. $L^B$ is unsubstituted alkylene. In certain embodiments, $L^B$ is unsubstituted heteroalkylene. In certain embodiments, $L^B$ is substituted heteroalkylene. In certain embodiments, $L^B$ is optionally substituted $C_{1-20}$ heteroalkylene. In certain embodiments, $L^B$ is optionally substituted $C_{1-10}$ heteroalkylene. In certain embodiments. $L^B$ is substituted $C_{1-10}$ heteroalkylene. In certain embodiments, $L^B$ is $C_{1-10}$ heteroalkylene substituted with at least one oxo ($=O$) group. In certain embodiments, $L^B$ is of the formula:

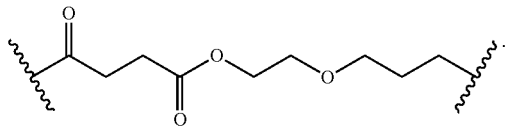

In certain embodiments, $L^B$ is of the formula:

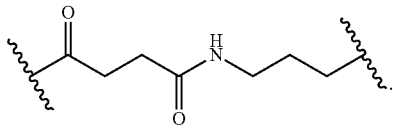 [SMILES: *CCCNC(=O)CCC(*)=O]

In certain embodiments, $L^B$ is unsubstituted heteroarylalkylene. In certain embodiments, $L^B$ is optionally substituted heteroarylalkylene. In certain embodiments, $L^B$ is an unsubstituted 5-membered heteroarylalkylene. In certain embodiments. $L^B$ comprises a triazole. In certain embodiments, $L^B$ comprises a group of the formula:

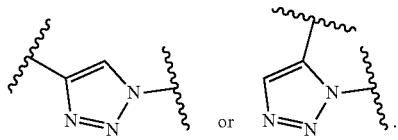 [SMILES: *c1cn(*)nn1 ; *c1cnnn1*]

In certain embodiments, $L^B$ is of the formula:

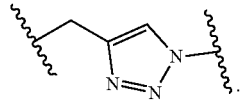 [SMILES: *Cc1cn(*)nn1]

In certain embodiments, $L^A$ is optionally substituted alkylene, optionally substituted heteroalkylene, optionally substituted heteroarylalkylene, or optionally substituted heteroarylene; and $L^B$ is optionally substituted alkylene, optionally substituted heteroalkylene, optionally substituted heteroarylalkylene, or optionally substituted heteroarylene. In certain embodiments, $L^A$ is optionally substituted heteroalkylene; and $L^B$ is optionally substituted heteroarylalkylene. In certain embodiments, $L^A$ is unsubstituted heteroalkylene; and $L^B$ is substituted heteroarylalkylene. In certain embodiments, $L^A$ is substituted $C_{1-10}$ heteroalkylene; and $L^B$ is an unsubstituted 5-membered heteroarylalkylene.

In certain embodiments, $L^A$ is of the formula:

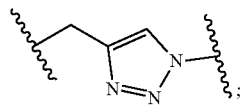 [SMILES: *Cc1cn(*)nn1]

and $L^B$ is of the formula:

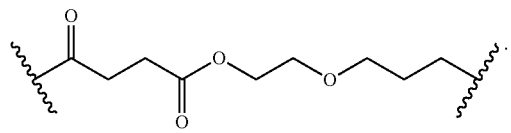

In certain embodiments. $L^A$ is of the formula:

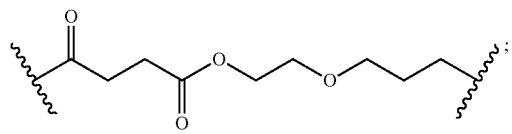 [SMILES: *CCCOCCOC(=O)CCC(*)=O]

and $L^B$ is of the formula:

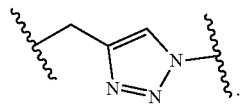 [SMILES: *Cc1cn(*)nn1]

In certain embodiments, $L^A$ is of the formula:

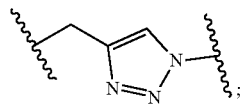 [SMILES: *Cc1cn(*)nn1]

and $L^B$ is of the formula:

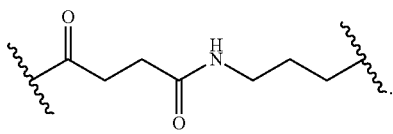 [SMILES: *CCCNC(=O)CCC(*)=O]

In certain embodiments, $L^A$ is of the formula:

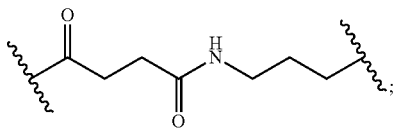

and $L^B$ is of the formula:

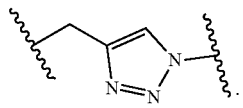 [SMILES: *Cc1cn(*)nn1]

In certain embodiments, n is an integer between 1 and 4000, inclusive. In certain embodiments, n is an integer between 5 and 4000, inclusive. In certain embodiments, n is an integer is between 50 and 4000, inclusive. In certain embodiments, n is an integer between 100 and 4000, inclusive. In certain embodiments, n is an integer between 1000 and 4000, inclusive. In certain embodiments, n is an integer between 2000 and 4000, inclusive. In certain embodiments, n is an integer between 2 and 4000, inclusive. In certain embodiments, n is an integer between 2 and 2000, inclusive. In certain embodiments, n is an integer between 2 and 1000, inclusive. In certain embodiments, n is an integer between 10 and 1000, inclusive. In certain embodiments, n is an integer between 2 and 100, inclusive. In certain embodiments, n is an integer between 10 and 100, inclusive. In certain embodiments, n is an integer between 10 and 50, inclusive. In certain embodiments, n is an integer between 25 and 50, inclusive. In certain embodiments, n is an integer between 25 and 100, inclusive. In certain embodiments, n is about 10, about 25, about 50, or about 100. In certain embodiments, the average of n is about 10, about 25, about 50, or about 100. In certain embodiments, the average of n is about 25 or about 50. In certain embodiments, the average of n is about 10. In certain embodiments, the average of n is about 25. In certain embodiments, the average of n is about 50. In certain embodiments, the average of n is about 100. In certain embodiments, n is the same as the degree of polymerization of the polymer.

In certain embodiments, each of $T^1$ and $T^2$ is independently a terminal group selected from the group consisting of hydrogen, halogen, optionally substituted alkyl, optionally substituted alkenyl, optionally substituted alkynyl, optionally substituted carbocyclyl, optionally substituted heterocyclyl, optionally substituted aryl, optionally substituted heteroaryl, optionally substituted acyl, optionally substituted hydroxyl, optionally substituted amino, and optionally substituted thiol. In certain embodiments, $T^1$ is hydrogen. In certain embodiments, $T^1$ is halogen. In certain embodiments, $T^1$ is optionally substituted alkyl. In certain embodiments, $T^1$ is optionally substituted alkenyl. In certain embodiments, $T^1$ is optionally substituted alkynyl. In certain embodiments, $T^1$ is optionally substituted carbocyclyl. In certain embodiments, $T^1$ is optionally substituted heterocyclyl. In certain embodiments. $T^1$ is optionally substituted aryl. In certain embodiments, $T^1$ is optionally substituted heteroaryl. In certain embodiments, $T^1$ is optionally substituted acyl. In certain embodiments, $T^1$ is optionally substituted hydroxyl. In certain embodiments, $T^1$ is optionally substituted amino. In certain embodiments, $T^1$ is optionally substituted thiol. In certain embodiments, $T^2$ is hydrogen. In certain embodiments, $T^2$ is halogen. In certain embodiments, $T^2$ is optionally substituted alkyl. In certain embodiments, $T^2$ is optionally substituted alkenyl. In certain embodiments, $T^2$ is optionally substituted alkynyl. In certain embodiments. $T^2$ is optionally substituted carbocyclyl. In certain embodiments, $T^2$ is optionally substituted heterocyclyl. In certain embodiments, $T^2$ is optionally substituted aryl. In certain embodiments, $T^2$ is optionally substituted heteroaryl. In certain embodiments, $T^2$ is optionally substituted acyl. In certain embodiments, $T^2$ is optionally substituted hydroxyl. In certain embodiments, $T^2$ is optionally substituted amino. In certain embodiments, $T^2$ is optionally substituted thiol. In certain embodiments, both $T^1$ and $T^2$ are hydrogen.

In certain embodiments, $T^1$ is optionally substituted aryl, and $T^2$ is hydrogen. In certain embodiments, $T^1$ is phenyl, and $T^2$ is hydrogen. In certain embodiments, $T^2$ is optionally substituted aryl, and $T^1$ is hydrogen. In certain embodiments, $T^2$ is phenyl, and $T^1$ is hydrogen.

In certain embodiments, A is a polysiloxane and B is a different polymer. In certain embodiments, A is a polysiloxane having a number average molecular weight of about 1,000 Da to about 20.000 Da; and B is a different polymer having a number average molecular weight of about 1,000 Da to about 20,000 Da.

In certain embodiments. A is a polysiloxane. In certain embodiments, the polysiloxane is of the formula:

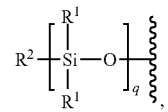

wherein:

$R^1$ is optionally substituted alkyl, optionally substituted alkenyl, optionally substituted aryl, or optionally substituted alkoxy;

$R^2$ is optionally substituted alkyl, optionally substituted alkenyl, optionally substituted aryl, or optionally substituted alkoxy; and q is an integer between 5 and 2000, inclusive.

In certain embodiments, $R^1$ is optionally substituted alkyl. In certain embodiments, $R^1$ is optionally substituted $C_{1-6}$ alkyl. In certain embodiments, $R^1$ is unsubstituted $C_{1-6}$ alkyl.

In certain embodiments, $R^1$ is selected from the group consisting of methyl, ethyl, n-propyl, iso-propyl, n-butyl, sec-butyl, iso-butyl, and tert-butyl. In certain embodiments, $R^1$ is methyl. In certain embodiments, $R^1$ is $C_{1-6}$ alkyl, and the polysiloxane has a number average molecular weight of about 2,000 Da to about 20,000 Da, about 2,000 Da to about 10,000 Da, about 2,000 Da to about 6,000 Da, or about 4,000 Da to about 6,000 Da, or about 4,500 Da to about 5,500 Da.

In certain embodiments, $R^2$ is optionally substituted alkyl. In certain embodiments, $R^2$ is optionally substituted $C_{1-20}$ alkyl. In certain embodiments. $R^2$ is unsubstituted $C_{1-20}$ alkyl. In certain embodiments, $R^2$ is optionally substituted $C_{1-6}$ alkyl. In certain embodiments, $R^2$ is unsubstituted $C_{1-6}$ alkyl. In certain embodiments, $R^2$ is selected from the group consisting of methyl, ethyl, n-propyl, iso-propyl, n-butyl, sec-butyl, iso-butyl, and tert-butyl.

In certain embodiments, $R^2$ is n-butyl. In certain embodiments, q is an integer between 5 and 500, inclusive. In certain embodiments, q is an integer between 5 and 100, inclusive. In certain embodiments, q is an integer between 10 and 100, inclusive. In certain embodiments, q is an integer between 30 and 80, inclusive. In certain embodiments, q is an integer between 50 and 80, inclusive. In certain embodiments, q is an integer between 60 and 70, inclusive.

In certain embodiments, $R^1$ is optionally substituted $C_{1-6}$ alkyl; $R^2$ is optionally substituted $C_{1-6}$ alkyl; and q is an integer between 10 and 100, inclusive. In certain embodiments, $R^1$ is unsubstituted $C_{1-6}$ alkyl; $R^2$ is unsubstituted $C_{1-6}$ alkyl; and q is an integer between 10 and 100, inclusive. In certain embodiments, $R^1$ is methyl; $R^2$ is n-butyl; and q is an integer between 50 and 100, inclusive.

In certain embodiments, $R^1$ is $C_{1-6}$ alkyl, and the polysiloxane has a number average molecular weight of about 2,000 Da to about 20,000 Da, about 2,000 Da to about 10,000 Da, about 2,000 Da to about 6,000 Da, or about 4,000 Da to about 6,000 Da. or about 4,500 Da to about 5,500 Da.

In certain embodiments, the polysiloxane is polydimethylsiloxane (PDMS) having a number average molecular weight of about 2,000 Da to about 20,000 Da, about 2,000 Da to about 10,000 Da, about 2,000 Da to about 6,000 Da, about 4,000 Da to about 6,000 Da, about 4,500 Da to about 5,500 Da.

In certain embodiments, B is a vinyl polymer of the following formula:

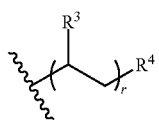

wherein:
$R^3$ is optionally substituted alkyl, halogen, hydrogen, cyano, $OR^a$, optionally substituted alkenyl, optionally substituted alkynyl, optionally substituted aryl, or optionally substituted heteroaryl;

$R^4$ is optionally substituted alkyl, optionally substituted alkenyl, optionally substituted alkynyl, optionally substituted aryl, or optionally substituted heteroaryl;

$R^a$ is hydrogen, optionally substituted alkyl, optionally substituted alkenyl, optionally substituted alkynyl, optionally substituted aryl, or optionally substituted heteroaryl; and r is an integer between 5 and 2000, inclusive.

In certain embodiments, $R^3$ is hydrogen. In certain embodiments, $R^3$ is optionally substituted alkyl. In certain embodiments, $R^3$ is optionally substituted alkenyl. In certain embodiments, $R^3$ is optionally substituted alkynyl. In certain embodiments, $R^3$ is optionally substituted aryl. In certain embodiments, $R^3$ is optionally substituted heteroaryl. In certain embodiments, $R^3$ is cyano. In certain embodiments, $R^3$ is halogen. In certain embodiments, $R^3$ is $OR^a$, wherein $R^a$ is hydrogen or optionally substituted alkyl. In certain embodiments, $R^3$ is optionally substituted phenyl. In certain embodiments, $R^3$ is unsubstituted phenyl.

In certain embodiments, $R^4$ is optionally substituted alkyl. In certain embodiments, $R^4$ is optionally substituted alkenyl. In certain embodiments, $R^4$ is optionally substituted alkynyl. In certain embodiments, $R^4$ is optionally substituted aryl. In certain embodiments, $R^4$ is optionally substituted heteroaryl. In certain embodiments, $R^4$ is optionally substituted $C_{1-6}$ alkyl. In certain embodiments, $R^4$ is unsubstituted $C_{1-6}$ alkyl. In certain embodiments, $R^4$ is $C_{1-6}$ alkyl substituted with an ester group.

In certain embodiments, r is an integer between 5 and 500, inclusive. In certain embodiments, r is an integer between 5 and 100, inclusive. In certain embodiments, r is an integer between 10 and 100, inclusive. In certain embodiments, r is an integer between 10 and 50, inclusive. In certain embodiments, r is an integer between 20 and 40, inclusive. In certain embodiments, r is an integer between 30 and 40, inclusive.

In certain embodiments, $R^3$ is optionally substituted aryl; $R^4$ is optionally substituted $C_{1-6}$ alkyl; and r is an integer between 10 and 100, inclusive. In certain embodiments, $R^3$ is unsubstituted aryl; $R^4$ is substituted $C_{1-6}$ alkyl; and r is an integer between 10 and 50, inclusive. In certain embodiments, $R^3$ is unsubstituted phenyl; $R^4$ is substituted $C_{1-6}$ alkyl; and r is an integer between 10 and 50, inclusive.

In certain embodiments, the vinyl polymer is polystyrene. In certain embodiments, the vinyl polymer is polystyrene having a number average molecular weight of about 2.000 Da to about 20,000 Da, about 10,000 Da to about 15.000 Da, about 2.000 Da to about 10,000 Da, about 7,000 Da to about 10,000 Da, about 8,000 Da to about 9,500 Da, about 2,000 Da to about 7,000 Da, about 2,000 Da to about 4,000 Da, about 2,000 Da to about 3,000 Da, or about 2,500 Da to about 3,600 Da.

In certain embodiments. B is a polyacrylate of the following formula:

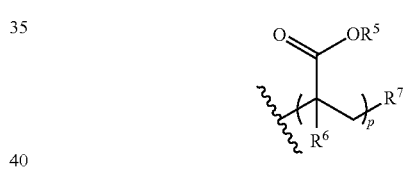

wherein:
$R^5$ is optionally substituted alkyl, hydrogen, optionally substituted alkenyl, optionally substituted alkynyl, optionally substituted aryl, or optionally substituted heteroaryl;

$R^6$ is optionally substituted alkyl, hydrogen, optionally substituted alkenyl, optionally substituted alkynyl, optionally substituted aryl, or optionally substituted heteroaryl;

$R^7$ is optionally substituted alkyl, optionally substituted alkenyl, optionally substituted alkynyl, optionally substituted aryl, or optionally substituted heteroaryl; and p is an integer between 5 and 2000, inclusive.

In certain embodiments, $R^5$ is hydrogen. In certain embodiments, $R^5$ is optionally substituted alkyl. In certain embodiments, $R^5$ is optionally substituted alkenyl. In certain embodiments, $R^5$ is optionally substituted alkynyl. In certain embodiments, $R^5$ is optionally substituted aryl. In certain embodiments, $R^5$ is optionally substituted heteroaryl. In certain embodiments, $R^5$ is optionally substituted alkyl. In certain embodiments, $R^5$ is optionally substituted $C_{1-6}$ alkyl. In certain embodiments, $R^5$ is unsubstituted $C_{1-6}$ alkyl. In certain embodiments, $R^5$ is selected from the group consisting of methyl, ethyl, n-propyl, iso-propyl, n-butyl, sec-butyl, iso-butyl, and tert-butyl. In certain embodiments. $R^5$ is tert-butyl.

In certain embodiments. $R^6$ is optionally substituted alkyl. In certain embodiments, $R^6$ is hydrogen. In certain embodiments, $R^6$ is optionally substituted alkenyl. In certain embodiments, $R^6$ is optionally substituted alkynyl. In certain embodiments, $R^6$ is optionally substituted aryl. In certain embodiments, $R^6$ is optionally substituted heteroaryl. In certain embodiments, $R^6$ is optionally substituted $C_{1-6}$ alkyl. In certain embodiments, $R^6$ is unsubstituted $C_{1-6}$ alkyl. In certain embodiments, $R^6$ is methyl.

In certain embodiments, $R^7$ is optionally substituted alkyl. In certain embodiments, $R^7$ is optionally substituted alkenyl. In certain embodiments, $R^7$ is optionally substituted alkynyl. In certain embodiments, $R^7$ is optionally substituted aryl. In certain embodiments, $R^7$ is optionally substituted heteroaryl. In certain embodiments, $R^7$ is optionally substituted $C_{1-6}$ alkyl. In certain embodiments, $R^7$ is unsubstituted $C_{1-6}$ alkyl. In certain embodiments, $R^7$ is $C_{1-6}$ alkyl substituted with an ester group.

In certain embodiments, p is an integer between 5 and 500, inclusive. In certain embodiments, p is an integer between 5 and 100, inclusive. In certain embodiments, p is an integer between 10 and 100, inclusive. In certain embodiments, p is an integer between 10 and 50, inclusive. In certain embodiments, p is an integer between 20 and 40, inclusive. In certain embodiments, p is an integer between 25 and 35, inclusive.

In certain embodiments, $R^5$ is optionally substituted alkyl; $R^6$ is hydrogen; $R^7$ is optionally substituted $C_{1-6}$ alkyl; and p is an integer between 10 and 100, inclusive. In certain embodiments, $R^5$ is optionally substituted $C_{1-6}$ alkyl; $R^6$ is hydrogen; $R^7$ is substituted $C_{1-6}$ alkyl; and p is an integer between 10 and 50, inclusive. In certain embodiments, $R^5$ is tert-butyl; $R^6$ is hydrogen; $R^4$ is substituted $C_{1-6}$ alkyl; and p is an integer between 20 and 40, inclusive.

In certain embodiments, the vinyl polymer is polystyrene. In certain embodiments, the vinyl polymer is polystyrene having a number average molecular weight of about 2,000 Da to about 20.000 Da, about 10,000 Da to about 15,000 Da, about 2,000 Da to about 10,000 Da, about 7,000 Da to about 10.000 Da, about 8.000 Da to about 9,500 Da, about 2,000 Da to about 7,000 Da, about 2,000 Da to about 4,000 Da, about 2,000 Da to about 3.000 Da, or about 2,500 Da to about 3,600 Da.

In certain embodiments, B is a polyester of the following formula:

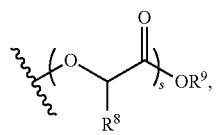

wherein:

$R^8$ is hydrogen, optionally substituted alkyl, optionally substituted alkenyl, optionally substituted alkynyl, optionally substituted aryl, optionally substituted heteroaryl, optionally substituted carbocyclyl, optionally substituted heterocyclyl, or optionally substituted acyl;

$R^9$ is hydrogen, optionally substituted alkyl, optionally substituted alkenyl, optionally substituted alkynyl, optionally substituted aryl, optionally substituted heteroaryl, optionally substituted carbocyclyl, optionally substituted heterocyclyl, optionally substituted acyl, or an oxygen protecting group; and s is an integer between 5 and 2000), inclusive.

In certain embodiments, $R^8$ is hydrogen, optionally substituted alkyl, optionally substituted alkenyl, optionally substituted alkynyl, optionally substituted aryl, optionally substituted heteroaryl, optionally substituted carbocyclyl, optionally substituted heterocyclyl, or optionally substituted acyl. In certain embodiments, $R^8$ is hydrogen. In certain embodiments, $R^8$ is optionally substituted alkyl. In certain embodiments, $R^8$ is optionally substituted alkenyl. In certain embodiments, $R^8$ is optionally substituted alkynyl. In certain embodiments, $R^8$ is optionally substituted aryl. In certain embodiments, $R^8$ is optionally substituted heteroaryl In certain embodiments, $R^8$ is optionally substituted carbocyclyl. In certain embodiments, $R^8$ is optionally substituted heterocyclyl. In certain embodiments. $R^8$ is optionally substituted acyl. In certain embodiments, $R^8$ is optionally substituted $C_{1-6}$ alkyl. In certain embodiments, $R^8$ is unsubstituted $C_{1-6}$ alkyl. In certain embodiments, $R^8$ is optionally substituted $C_{1-3}$ alkyl. In certain embodiments, $R^8$ is unsubstituted $C_{1-3}$ alkyl. In certain embodiments, $R^8$ is selected from the group consisting of methyl, ethyl, n-propyl, iso-propyl, n-butyl, sec-butyl, iso-butyl, and tert-butyl. In certain embodiments, $R^8$ is methyl.

In certain embodiments, $R^9$ hydrogen, optionally substituted alkyl, optionally substituted alkenyl, optionally substituted alkynyl, optionally substituted aryl, optionally substituted heteroaryl, optionally substituted carbocyclyl, optionally substituted heterocyclyl, optionally substituted acyl, or an oxygen protecting group. In certain embodiments, $R^9$ is hydrogen. In certain embodiments, $R^9$ is optionally substituted alkyl. In certain embodiments, $R^9$ is optionally substituted $C_{1-6}$ alkyl. In certain embodiments, $R^9$ is unsubstituted $C_{1-6}$ alkyl. In certain embodiments, $R^9$ is selected from the group consisting of methyl, ethyl, n-propyl, iso-propyl, n-butyl, sec-butyl, iso-butyl, and tert-butyl. In certain embodiments, $R^9$ is optionally substituted alkenyl. In certain embodiments, $R^9$ is optionally substituted alkynyl. In certain embodiments, $R^9$ is optionally substituted aryl. In certain embodiments, $R^9$ is optionally substituted heteroaryl. In certain embodiments, $R^9$ is optionally substituted carbocyclyl. In certain embodiments, $R^9$ is optionally substituted heterocyclyl. In certain embodiments. $R^9$ is optionally substituted acyl. In certain embodiments, $R^9$ is an oxygen protecting group.

In certain embodiments, s is an integer between 5 and 2000, inclusive. In certain embodiments, s is an integer between 5 and 1000, inclusive. In certain embodiments, s is an integer between 5 and 500, inclusive. In certain embodiments, s is an integer between 5 and 200, inclusive. In certain embodiments, s is an integer between 5 and 100, inclusive.

In certain embodiments, the polyester is poly(lactic acid). In certain embodiments, the polyester is poly(lactic acid) having a number average molecular weight of about 2,000 Da to about 20,000 Da, about 2,000 Da to about 10,000 Da, about 2,000 Da to about 7,000 Da, or about 2,000 Da to about 4,000 Da.

In certain embodiments, A is of the formula:

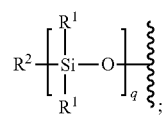

and B is of the formula:

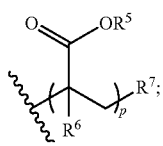

wherein $R^1$, $R^2$, $R^5$, $R^6$, $R^7$, q, and p are as defined in the embodiments of Formula (I); and the ratio of q:r is about 1:1, about 1.5:1, about 2:1, about 2.1:1, about 2.2:1, about 2.3:1, about 2.4:1, about 2.5:1, about 2.6:1, about 2.7:1, about 2.8:1, about 2.9:1, about 3:1, about 4:1, or about 5:1. In certain embodiments, any of these parameters lead to a BBCP with hexagonal cylindrical morphology. In certain embodiments, any of these parameters lead to a BBCP with gyroid morphology.

In certain embodiments, A is of the formula:

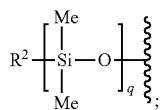

and B is of the formula:

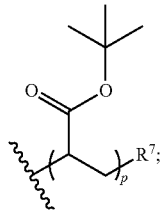

wherein $R^2$, $R^7$, q, and p are as defined in the embodiments of Formula (I); and the ratio of q:r is about 1:1, about 1.5:1, about 2:1, about 2.1:1, about 2.2:1, about 2.3:1, about 2.4:1, about 2.5:1, about 2.6:1, about 2.7:1, about 2.8:1, about 2.9:1, about 3:1, about 4:1, or about 5:1. In certain embodiments, any of these parameters lead to a BBCP with hexagonal cylindrical morphology. In certain embodiments, any of these parameters lead to a BBCP with gyroid morphology.

In certain embodiments, A is of the formula:

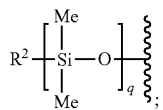

and B is of the formula:

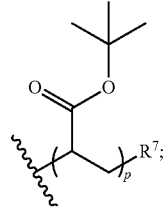

wherein $R^2$, $R^7$, q, and p are as defined in the embodiments of Formula (I); and the ratio of q:r is about 2.6:1. In certain embodiments, these parameters lead to a BBCP with hexagonal cylindrical morphology. In certain embodiments, these parameters lead to a BBCP with gyroid morphology.

In certain embodiments, A is of the formula:

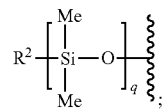

and B is of the formula:

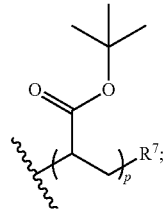

wherein $R^2$ and $R^7$ are as defined in the embodiments of Formula (I); q is about 65 to about 70; p is about 25 to about 30; and the ratio of q:r is about 2.6:1. In certain embodiments, any of these parameters lead to a BBCP with hexagonal cylindrical morphology. In certain embodiments, any of these parameters lead to a BBCP with gyroid morphology.

In certain embodiments, A is of the formula:

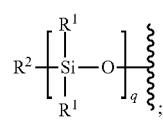

and B is of the formula:

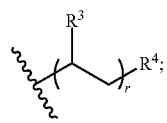

wherein $R^1$, $R^2$, $R^3$, $R^4$, q, and r are as defined in the embodiments of Formula (I); and the ratio of q:r is about 1:1.1, about 1:1.2, about 1:1.3, about 1:1.4, about 1:1.5, about 1:1.6, about 1:1.7, about 1:1.8, about 1:1.9, about 1:2, about 1:2.1, about 1:2.2, about 1:2.3, about 1:2.4, about 1:2.5, about 1:2.6, about 1:2.7, about 1:2.8, about 1:2.9, about 1:3, about 1:4, about 1:5, about 1:1, about 1.1:1, about 1.2:1, about 1.3:1, about 1.4:1, about 1.5:1, about 1.6:1, about 1.7:1, about 1.8:1, about 1.9:1, about 2:1, about 2.1:1, about 2.2:1, about 2.3:1, about 2.4:1, about 2.5:1, about 2.6:1, about 2.7:1, about 2.8:1, about 2.9:1, about 3:1, about 4:1, or about 5:1. In certain embodiments, any of these parameters lead to a BBCP with hexagonal cylindrical morphology. In certain embodiments, any of these parameters lead to a BBCP with gyroid morphology.

In certain embodiments, A is of the formula:

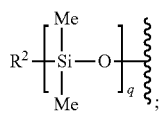

and B is of the formula:

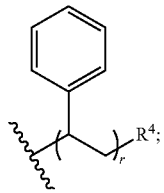

wherein $R^2$, $R^4$, q, and r are as defined in the embodiments of Formula (I); and wherein the ratio of q:r is about 1:1.1, about 1:1.2, about 1:1.3, about 1:1.4, about 1:1.5, about 1:1.6, about 1:1.7, about 1:1.8, about 1:1.9, about 1:2, about 1:2.1, about 1:2.2, about 1:2.3, about 1:2.4, about 1:2.5, about 1:2.6, about 1:2.7, about 1:2.8, about 1:2.9, about 1:3, about 1:4, about 1:5, about 1:1, about 1.1:1, about 1.2:1, about 1.3:1, about 1.4:1, about 1.5:1, about 1.6:1, about 1.7:1, about 1.8:1, about 1.9:1, about 2:1, about 2.1:1, about 2.2:1, about 2.3:1, about 2.4:1, about 2.5:1, about 2.6:1, about 2.7:1, about 2.8:1, about 2.9:1, about 3:1, about 4:1, or about 5:1. In certain embodiments, any of these parameters lead to a BBCP with hexagonal cylindrical morphology. In certain embodiments, any of these parameters lead to a BBCP with gyroid morphology.

In certain embodiments, A is of the formula:

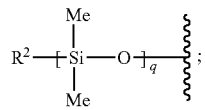

and B is of the formula:

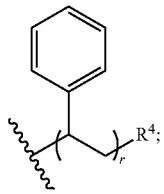

wherein $R^2$, $R^4$, q, and r are as defined in the embodiments of Formula (I); and the ratio of q:r is about 2:1. In certain embodiments, these parameters lead to a BBCP with hexagonal cylindrical morphology. In certain embodiments, these parameters lead to a BBCP with gyroid morphology.

In certain embodiments, A is of the formula:

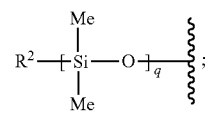

and B is of the formula:

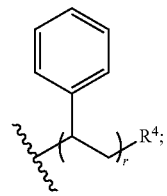

wherein $R^2$, $R^4$, q, and r are as defined in the embodiments of Formula (I); and the ratio of q:r is about 3:1. In certain embodiments, these parameters lead to a BBCP with hexagonal cylindrical morphology. In certain embodiments, these parameters lead to a BBCP with gyroid morphology.

In certain embodiments, A is of the formula:

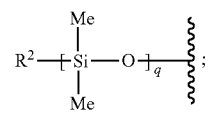

and B is of the formula:

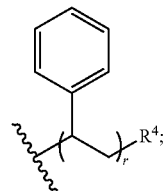

wherein $R^2$, $R^4$, q, and r are as defined in the embodiments of Formula (I); and the ratio of q:r is about 1:1.5. In certain embodiments, these parameters lead to a BBCP with hexagonal cylindrical morphology. In certain embodiments, these parameters lead to a BBCP with gyroid morphology.

In certain embodiments, A is of the formula:

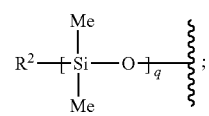

and B is of the formula:

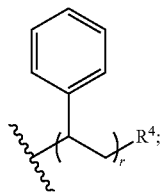

wherein $R^2$, $R^4$, q, and r are as defined in the embodiments of Formula (I); and the ratio of q:r is about 1:2.2. In certain embodiments, these parameters lead to a BBCP with hexagonal cylindrical morphology. In certain embodiments, these parameters lead to a BBCP with gyroid morphology.

In certain embodiments, A is of the formula:

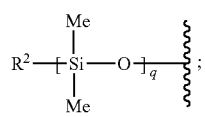

and B is of the formula:

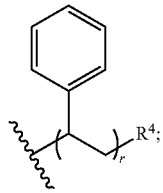

wherein $R^2$, $R^4$, q, and r are as defined in the embodiments of Formula (I); and the ratio of q:r is about 1:1.2 to about 1:1.3. In certain embodiments, these parameters lead to a BBCP with hexagonal cylindrical morphology. In certain embodiments, these parameters lead to a BBCP with gyroid morphology.

In certain embodiments, A is of the formula:

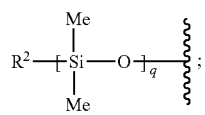

and B is of the formula:

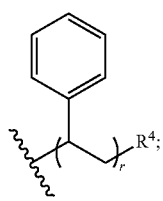

wherein $R^2$ and $R^4$ are as defined in the embodiments of Formula (I); q is about 65 to about 70; r is about 80 to about 90; and the ratio of q:r is about 1:1.2 to about 1:1.3. In certain embodiments, these parameters lead to a BBCP with hexagonal cylindrical morphology. In certain embodiments, these parameters lead to a BBCP with gyroid morphology.

In certain embodiments, the bottlebrush polymer of Formula (I) is of Formula (I-c):

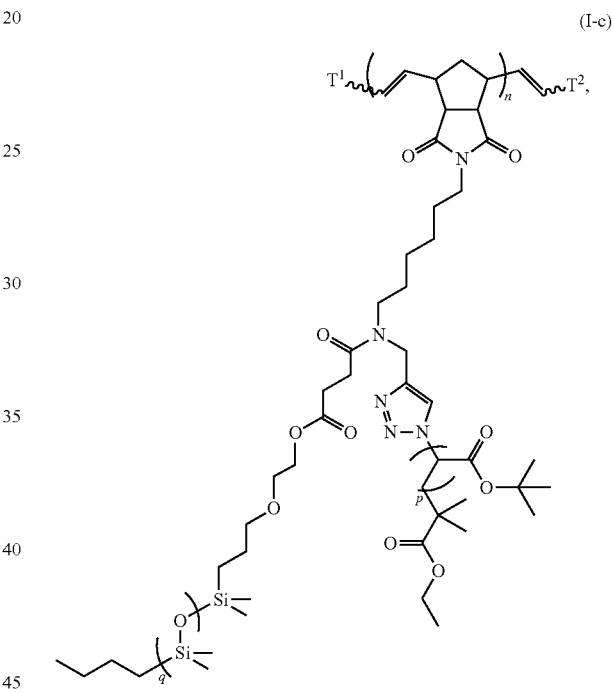

(I-c)

or salts thereof, wherein:

each of $T^1$ and $T^2$ is independently hydrogen or phenyl;

n is an integer between 10 and 100, inclusive;

p is an integer between 10 and 100, inclusive; and q is an integer between 25 and 260, inclusive; wherein the ratio of q:p is about 2.6:1. In certain embodiments, the polymer has a hexagonal cylindrical morphology. In certain embodiments, the polymer has a gyroid morphology.

In certain embodiments, the bottlebrush polymer of Formula (I) is of Formula (I-d):

(I-d)

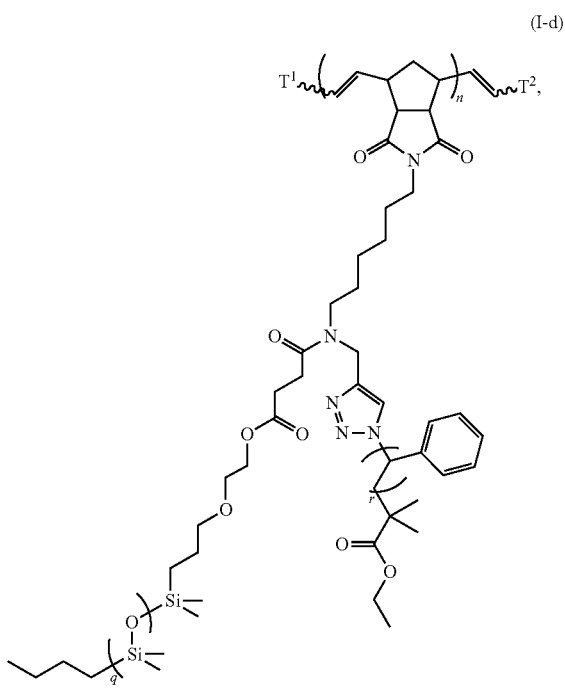

or salts thereof, wherein:
each of $T^1$ and $T^2$ is independently hydrogen or phenyl;
n is an integer between 10 and 100, inclusive;
r is an integer between 20 and 200, inclusive; and
q is an integer between 20 and 200, inclusive; wherein the ratio of q:r is about 1:1.2 to about 1:1.3. In certain embodiments, the polymer has a hexagonal cylindrical morphology. In certain embodiments, the polymer has a gyroid morphology.

In certain embodiments, the bottlebrush polymer of Formula (I) is of Formula (I-e):

(I-e)

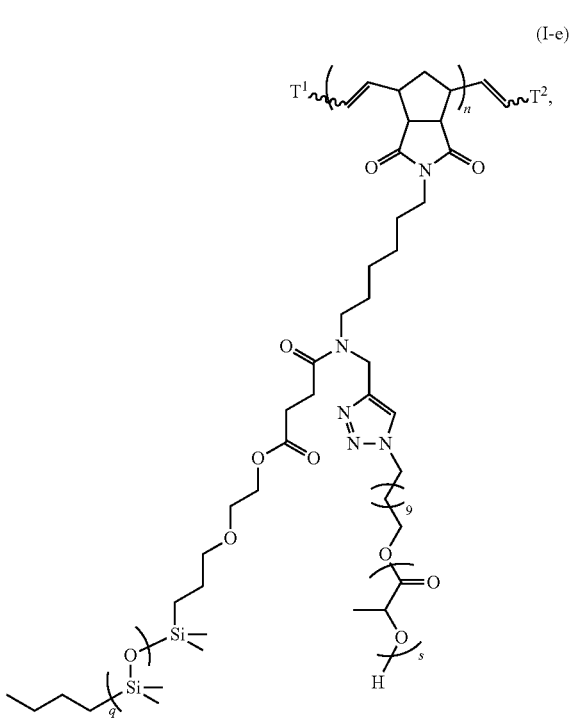

or salts thereof, wherein each of $T^1$ and $T^2$ is independently hydrogen or phenyl; n is an integer between 10 and 100, inclusive; s is an integer between 20 and 200, inclusive; and q is an integer between 20 and 200, inclusive. In certain embodiments, the polymer has a hexagonal cylindrical morphology. In certain embodiments, the polymer has a gyroid morphology.

As described herein, in certain embodiments, a bottlebrush polymer of the present invention has a bottlebrush or comb structure. In certain embodiments, the polymer has a bottlebrush structure. In certain embodiments, the polymer has a comb structure. A bottlebrush polymer described herein may self-assemble to form any type of polymer network or nanostructure. In certain embodiments, a bottlebrush polymer described herein self-assembles to form photonic crystals. In certain embodiments, a bottlebrush polymer described herein self-assembles to form a spherical, lamellar, cylindrical, ellipsoidal, polyhedral, or gyroid shape.

In certain embodiments, the bottlebrush polymer described herein self-assembles to form a structure with a hexagonal cylindrical morphology. In certain embodiments, the bottlebrush polymer described herein self-assembles to form a structure with a gyroid morphology. In certain embodiments, the bottlebrush polymer described herein self-assembles to form a spherical morphology. In certain embodiments, the bottlebrush polymer described herein self-assembles to form a lamellar morphology. In certain embodiments, the bottlebrush polymer described herein self-assembles to form an ellipsoidal morphology. In certain embodiments, the bottlebrush polymer described herein self-assembles to form a polyhedral morphology.

Additional Bottlebrush Polymers Having Gyroid Morphologies

As described herein, the present invention provides new bottlebrush polymers having gyroid morphologies. In certain embodiments, provided herein are bottlebrush polymers of Formula (I):

(I)

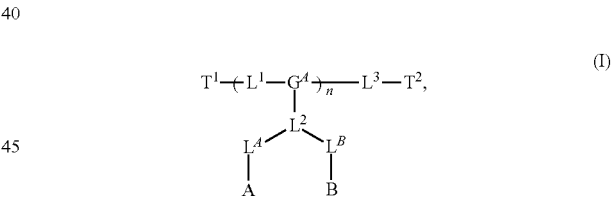

and salts thereof, wherein:
$G^A$ is optionally substituted alkylene, optionally substituted heteroalkylene, optionally substituted carbocyclylene, optionally substituted heterocyclylene, optionally substituted arylene, optionally substituted heteroarylene, or a combination thereof;
each of $L^1$, $L^2$, $L^3$, $L^A$, and $L^B$ is independently a linker selected from the group consisting of a bond, optionally substituted alkylene, optionally substituted heteroalkylene, optionally substituted alkenylene, optionally substituted alkynylene, optionally substituted carbocyclylene, optionally substituted heterocyclylene, optionally substituted arylene, optionally substituted heteroarylene, and combinations thereof;
each of $T^1$ and $T^2$ is independently a terminal group selected from the group consisting of hydrogen, halogen, optionally substituted alkyl, optionally substituted alkenyl, optionally substituted alkynyl, optionally substituted carbocyclyl, optionally substituted heterocyclyl, optionally substituted aryl, optionally substituted heteroaryl, optionally substituted acyl, optionally substituted hydroxyl, optionally substituted amino, and optionally substituted thio;

n is an integer between 1 and 4000, inclusive;

A is a polymer having a number average molecular weight of about 1,000 Da to about 20,000 Da; and B is a different polymer having a number average molecular weight of about 1,000 Da to about 20,000 Da;

wherein the bottlebrush polymer has a gyroid morphology.

In certain embodiments, $G^A$ is optionally substituted carbocyclylene, optionally substituted heterocyclylene, or a combination thereof. In certain embodiments, $G^A$ is optionally substituted carbocyclylene. In certain embodiments, $G^A$ is optionally substituted heterocyclylene. In certain embodiments, $G^A$ comprises optionally substituted 5-membered carbocyclylene or 5-membered heterocyclylene. In certain embodiments, $G^A$ comprises optionally substituted cyclopentylene, cyclohexylene, tetrahydrofuranylene, tetrahydrothiophenylene, or pyrrolidinylene. In certain embodiments, $G^A$ is optionally substituted bicyclic heterocyclylene. In certain embodiments, $G^A$ is substituted bicyclic heterocyclylene. In certain embodiments, $G^A$ is of the following formula:

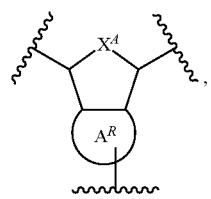

wherein $X^A$ is —CH$_2$—, —CH$_2$CH$_2$—, —O—, or —S—; and $A^R$ is optionally substituted carbocyclyl or optionally substituted heterocyclyl. In certain embodiments. $G^A$ is of the following formula:

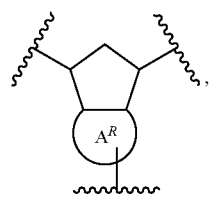

wherein $A^R$ is optionally substituted carbocyclyl or optionally substituted heterocyclyl. In certain embodiments, $G^A$ is of the following formula:

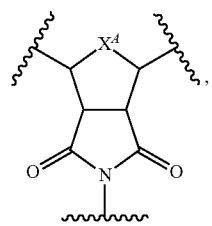

wherein $X^A$ is —CH$_2$—, —CH$_2$CH$_2$—, —O—, or —S—. In certain embodiments, $G^A$ is of the following formula:

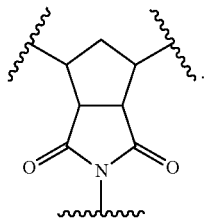

In certain embodiments, each of $L^1$ and $L^3$ is independently a linker selected from the group consisting of optionally substituted alkylene, optionally substituted heteroalkylene, optionally substituted alkenylene, optionally substituted alkynylene, and combinations thereof. In certain embodiments, each of $L^1$ and $L^3$ is optionally substituted alkylene. In certain embodiments, each of $L^1$ and $L^3$ is optionally substituted heteroalkylene. In certain embodiments, each of $L^1$ and $L^3$ is optionally substituted alkynylene. In certain embodiments, each of $L^1$ and $L^3$ is optionally substituted alkenylene. In certain embodiments, each of $L^1$ and $L^3$ is substituted alkenylene. In certain embodiments, each of $L^1$ and $L^3$ is unsubstituted alkenylene. In certain embodiments, each of $L^1$ and $L^3$ is of the formula:

In certain embodiments, each of $L^1$ and $L^3$ is of the formula:

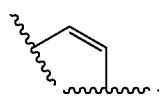 [SMILES: */C=C\*]

In certain embodiments, each of $L^1$ and $L^3$ is of the formula:

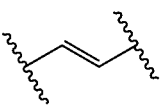

In certain embodiments, $L^1$ is optionally substituted alkylene. In certain embodiments, $L^1$ is optionally substituted heteroalkylene. In certain embodiments, $L^1$ is optionally substituted alkynylene. In certain embodiments, $L^1$ is optionally substituted alkenylene. In certain embodiments, $L^1$ substituted alkenylene. In certain embodiments, $L^1$ is unsubstituted alkenylene. In certain embodiments, $L^1$ is of the formula:

In certain embodiments, $L^1$ is of the formula:

In certain embodiments, $L^1$ is of the formula:

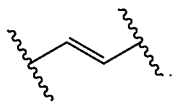

In certain embodiments, $L^3$ is optionally substituted alkylene. In certain embodiments, $L^3$ is optionally substituted heteroalkylene. In certain embodiments, $L^3$ is optionally substituted alkynylene. In certain embodiments, $L^3$ is optionally substituted alkenylene. In certain embodiments, $L^3$ substituted alkenylene. In certain embodiments, $L^3$ is unsubstituted alkenylene. In certain embodiments, $L^3$ is of the formula:

In certain embodiments, $L^3$ is of the formula:

certain embodiments, $L^3$ is of the formula:

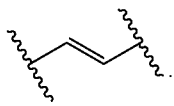

In certain embodiments. $L^2$ is a linker selected from the group consisting of optionally substituted alkylene, optionally substituted heteroalkylene, optionally substituted alkenylene, optionally substituted alkynylene, optionally substituted carbocyclylene, optionally substituted heterocyclylene, optionally substituted arylene, optionally substituted heteroarylene, and combinations thereof. In certain embodiments, $L^2$ is optionally substituted alkylene or optionally substituted heteroalkylene. In certain embodiments, $L^2$ is optionally substituted alkylene. In certain embodiments, $L^2$ is optionally substituted heteroalkylene. In certain embodiments, $L^2$ is unsubstituted alkylene. In certain embodiments, $L^2$ is unsubstituted heteroalkylene. In certain embodiments, $L^2$ is optionally substituted $C_{1-20}$ heteroalkylene. In certain embodiments, $L^2$ is optionally substituted $C_{1-10}$ heteroalkylene. In certain embodiments, $L^2$ is unsubstituted $C_{1-10}$ heteroalkylene. In certain embodiments, $L^2$ is of the formula:

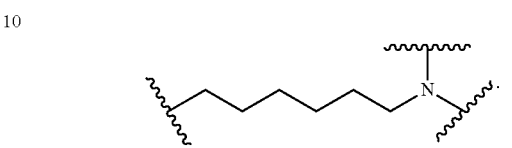

In certain embodiments, the bottlebrush polymer of Formula (I) is of Formula (I-a):

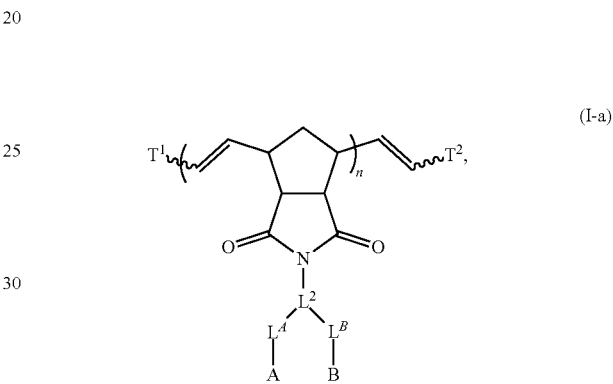

(I-a)

or salts thereof, wherein:

each of $L^2$, $L^A$, and $L^B$ is independently a linker selected from the group consisting of a bond, optionally substituted alkylene, optionally substituted heteroalkylene, optionally substituted alkenylene, optionally substituted alkynylene, optionally substituted carbocyclylene, optionally substituted heterocyclylene, optionally substituted arylene, optionally substituted heteroarylene, and combinations thereof;

each of $T^1$ and $T^2$ is independently a terminal group selected from the group consisting of hydrogen, halogen, optionally substituted alkyl, optionally substituted alkenyl, optionally substituted alkynyl, optionally substituted carbocyclyl, optionally substituted heterocyclyl, optionally substituted aryl, optionally substituted heteroaryl, optionally substituted acyl, optionally substituted hydroxyl, optionally substituted amino, and optionally substituted thio;

n is an integer between 1 and 4000, inclusive;

A is a polymer having a number average molecular weight of about 1,000 Da to about 20,000 Da; and B is a different polymer having a number average molecular weight of about 1,000 Da to about 20,000 Da;

wherein the bottlebrush polymer has a gyroid morphology.

In certain embodiments, the bottlebrush polymer is of Formula (I-b):

(I-b)

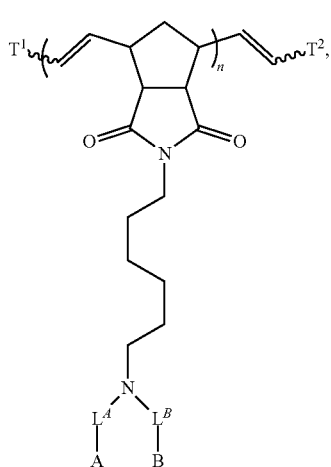

or salts thereof, wherein:

each $L^A$, and $L^B$ is independently a linker selected from the group consisting of a bond, optionally substituted alkylene, optionally substituted heteroalkylene, optionally substituted alkenylene, optionally substituted alkynylene, optionally substituted carbocyclylene, optionally substituted heterocyclylene, optionally substituted arylene, optionally substituted heteroarylene, and combinations thereof;

each of $T^1$ and $T^2$ is independently a terminal group selected from the group consisting of hydrogen, halogen, optionally substituted alkyl, optionally substituted alkenyl, optionally substituted alkynyl, optionally substituted carbocyclyl, optionally substituted heterocyclyl, optionally substituted aryl, optionally substituted heteroaryl, optionally substituted acyl, optionally substituted hydroxyl, optionally substituted amino, and optionally substituted thio;

n is an integer between 1 and 4000, inclusive;

A is a polymer having a number average molecular weight of about 1,000 Da to about 20,000 Da; and B is a different polymer having a number average molecular weight of about 1.000 Da to about 20,000 Da:

wherein the bottlebrush polymer has a gyroid morphology.

In certain embodiments, $L^A$ is a linker selected from the group consisting of optionally substituted alkylene, optionally substituted heteroalkylene, optionally substituted alkenylene, optionally substituted alkynylene, optionally substituted carbocyclylene, optionally substituted heterocyclylene, optionally substituted arylene, optionally substituted heteroarylene, and combinations thereof. In certain embodiments, $L^A$ is optionally substituted alkylene, optionally substituted heteroalkylene, optionally substituted heteroarylene, or optionally substituted heteroarylalkylene. In certain embodiments, $L^A$ is optionally substituted alkylene. In certain embodiments, $L^A$ is optionally substituted heteroalkylene. In certain embodiments, $L^A$ is optionally substituted heteroarylene. In certain embodiments, $L^A$ is unsubstituted alkylene. In certain embodiments, $L^A$ is unsubstituted heteroalkylene. In certain embodiments, $L^A$ is substituted heteroalkylene. In certain embodiments, $L^A$ is optionally substituted $C_{1-20}$ heteroalkylene. In certain embodiments, $L^A$ is optionally substituted $C_{1-10}$ heteroalkylene. In certain embodiments, $L^A$ is substituted $C_{1-10}$ heteroalkylene. In certain embodiments, $L^A$ is $C_{1-10}$ heteroalkylene substituted with at least one oxo (=O) group. In certain embodiments, $L^A$ is of the formula:

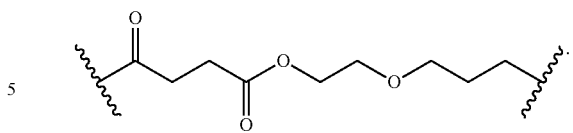

In certain embodiments, $L^A$ is of the formula:

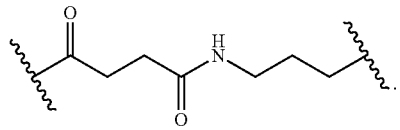

In certain embodiments, $L^A$ is unsubstituted heteroarylalkylene. In certain embodiments, $L^A$ is optionally substituted heteroarylalkylene. In certain embodiments, $L^A$ is an unsubstituted 5-membered heteroarylalkylene. In certain embodiments, $L^A$ comprises a triazole. In certain embodiments, $L^A$ comprises a group of the formula:

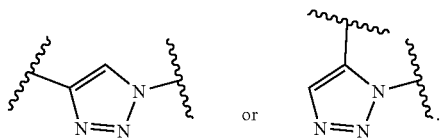 [SMILES: *c1cn(*)nn1 ; *c1cnnn1*]

In certain embodiments, $L^A$ is of the formula:

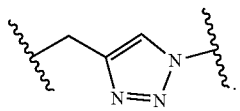 [SMILES: *Cc1cn(*)nn1]

In certain embodiments, $L^B$ is a linker selected from the group consisting of optionally substituted alkylene, optionally substituted heteroalkylene, optionally substituted alkenylene, optionally substituted alkynylene, optionally substituted carbocyclylene, optionally substituted heterocyclylene, optionally substituted arylene, optionally substituted heteroarylene, and combinations thereof. In certain embodiments, $L^B$ is optionally substituted alkylene, optionally substituted heteroalkylene, optionally substituted heteroarylene, or optionally substituted heteroarylalkylene. In certain embodiments, $L^B$ is optionally substituted alkylene. In certain embodiments, $L^B$ is optionally substituted heteroalkylene. In certain embodiments, $L^B$ is optionally substituted heteroarylene. In certain embodiments, $L^B$ is unsubstituted alkylene. In certain embodiments, $L^B$ is unsubstituted heteroalkylene. In certain embodiments, $L^B$ is substituted heteroalkylene. In certain embodiments, $L^B$ is optionally substituted $C_{1-20}$ heteroalkylene. In certain embodiments. $L^B$ is optionally substituted $C_{1-10}$ heteroalkylene. In certain embodiments, $L^B$ is substituted $C_{1-10}$ heteroalkylene. In certain embodiments, $L^B$ is $C_{1-10}$ heteroalkylene substituted with at least one oxo (=O) group. In certain embodiments, $L^B$ is of the formula:

[Structure: succinyl-ethyleneglycol-ether linker]

In certain embodiments, $L^B$ is of the formula:

[Structure: succinyl-amide linker with NH]

In certain embodiments, $L^B$ is unsubstituted heteroarylalkylene. In certain embodiments, $L^B$ is optionally substituted heteroarylalkylene. In certain embodiments, $L^B$ is an unsubstituted 5-membered heteroarylalkylene. In certain embodiments, $L^B$ comprises a triazole. In certain embodiments, $L^B$ comprises a group of the formula:

[Two triazole structures] or [triazole structure].

In certain embodiments, $L^B$ is of the formula:

[Triazole-methylene structure]

In certain embodiments, $L^2$ is optionally substituted alkylene or optionally substituted heteroalkylene; $L^A$ is optionally substituted alkylene, optionally substituted heteroalkylene, optionally substituted heteroarylalkylene, or optionally substituted heteroarylene; and $L^B$ is optionally substituted alkylene, optionally substituted heteroalkylene, optionally substituted heteroarylalkylene, or optionally substituted heteroarylene. In certain embodiments, $L^2$ is optionally substituted heteroalkylene; $L^A$ is optionally substituted heteroalkylene; and $L^B$ is optionally substituted heteroarylalkylene. In certain embodiments, $L^2$ is unsubstituted heteroalkylene; $L^A$ is unsubstituted heteroalkylene; and $L^B$ is substituted heteroarylalkylene. In certain embodiments, $L^2$ is unsubstituted $C_{1-10}$ heteroalkylene; $L^A$ is substituted $C_{1-10}$ heteroalkylene; and $L^B$ is an unsubstituted 5-membered heteroarylalkylene.

In certain embodiments, $L^2$ is of the formula:

[Alkyl-amine structure]

$L^A$ is of the formula:

[Triazole-methylene structure];

and $L^B$ is of the formula:

[Succinyl-ethyleneglycol-ether structure].

In certain embodiments, $L^2$ is of the formula:

[Alkyl-amine structure];

$L^A$ is of the formula:

[Succinyl-ethyleneglycol-ether structure];

and $L^B$ is of the formula:

[Triazole-methylene structure].

In certain embodiments, $L^2$ is of the formula:

[Alkyl-amine structure];

$L^A$ is of the formula:

[Triazole-methylene structure];

and $L^B$ is of the formula:

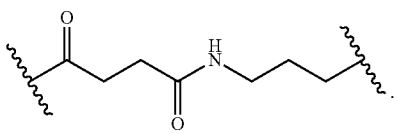

In certain embodiments, $L^2$ is of the formula:

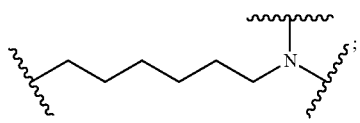 [SMILES: *CCCCCCN(*)* ; ";"]

$L^A$ is of the formula:

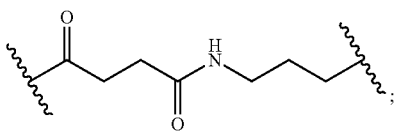 [SMILES: *CCCNC(=O)CCC(*)=O ; ";"]

and $L^B$ is of the formula:

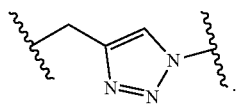 [SMILES: *Cc1cn(*)nn1 ; "."]

In certain embodiments, n is an integer between 1 and 4000, inclusive. In certain embodiments, n is an integer between 5 and 4000, inclusive. In certain embodiments, n is an integer is between 50 and 4000, inclusive. In certain embodiments, n is an integer between 100 and 4000, inclusive. In certain embodiments, n is an integer between 1000 and 4000, inclusive. In certain embodiments, n is an integer between 2000 and 4000, inclusive. In certain embodiments, n is an integer between 2 and 4000, inclusive. In certain embodiments, n is an integer between 2 and 2000, inclusive. In certain embodiments, n is an integer between 2 and 1000, inclusive. In certain embodiments, n is an integer between 10 and 1000, inclusive. In certain embodiments, n is an integer between 2 and 100, inclusive. In certain embodiments, n is an integer between 10 and 100, inclusive. In certain embodiments, n is an integer between 10 and 50, inclusive. In certain embodiments, n is an integer between 25 and 50, inclusive. In certain embodiments, n is an integer between 25 and 100, inclusive. In certain embodiments, n is about 10, about 25, about 50, or about 100. In certain embodiments, the average of n is about 10, about 25, about 50, or about 100. In certain embodiments, the average of n is about 25 or about 50. In certain embodiments, the average of n is about 10. In certain embodiments, the average of n is about 25. In certain embodiments, the average of n is about 50. In certain embodiments, the average of n is about 100. In certain embodiments, n is the same as the degree of polymerization of the polymer.

In certain embodiments, each of $T^1$ and $T^2$ is independently a terminal group selected from the group consisting of hydrogen, halogen, optionally substituted alkyl, optionally substituted alkenyl, optionally substituted alkynyl, optionally substituted carbocyclyl, optionally substituted heterocyclyl, optionally substituted aryl, optionally substituted heteroaryl, optionally substituted acyl, optionally substituted hydroxyl, optionally substituted amino, and optionally substituted thiol. In certain embodiments, $T^1$ is hydrogen. In certain embodiments, $T^1$ is halogen. In certain embodiments, $T^1$ is optionally substituted alkyl. In certain embodiments, $T^1$ is optionally substituted alkenyl. In certain embodiments, $T^1$ is optionally substituted alkynyl. In certain embodiments, $T^1$ is optionally substituted carbocyclyl. In certain embodiments, $T^1$ is optionally substituted heterocyclyl. In certain embodiments, $T^1$ is optionally substituted aryl. In certain embodiments, $T^1$ is optionally substituted heteroaryl. In certain embodiments, $T^1$ is optionally substituted acyl. In certain embodiments, $T^1$ is optionally substituted hydroxyl. In certain embodiments, $T^1$ is optionally substituted amino. In certain embodiments, $T^1$ is optionally substituted thiol. In certain embodiments, $T^2$ is hydrogen. In certain embodiments, $T^2$ is halogen. In certain embodiments. $T^2$ is optionally substituted alkyl. In certain embodiments, $T^2$ is optionally substituted alkenyl. In certain embodiments, $T^2$ is optionally substituted alkynyl. In certain embodiments, $T^2$ is optionally substituted carbocyclyl. In certain embodiments, $T^2$ is optionally substituted heterocyclyl. In certain embodiments, $T^2$ is optionally substituted aryl. In certain embodiments, $T^2$ is optionally substituted heteroaryl. In certain embodiments, $T^2$ is optionally substituted acyl. In certain embodiments, $T^2$ is optionally substituted hydroxyl. In certain embodiments, $T^2$ is optionally substituted amino. In certain embodiments, $T^2$ is optionally substituted thiol. In certain embodiments, both $T^1$ and $T^2$ are hydrogen.

In certain embodiments, $T^1$ is optionally substituted aryl, and $T^2$ is hydrogen. In certain embodiments, $T^1$ is phenyl, and $T^2$ is hydrogen. In certain embodiments, $T^2$ is optionally substituted aryl, and $T^1$ is hydrogen. In certain embodiments. $T^2$ is phenyl, and $T^1$ is hydrogen.

As defined herein, A is a polymer. In certain embodiments, A is a polyether, a polyester, a polyacrylamide, a polyacrylate, or a vinyl polymer. The polyacrylate may be any polyester described herein. The polyester may be any polyether described herein. The polyether may be any polyether described herein. The polyacrylamide may be any polyacrylamide described herein. Additionally, the vinyl polymer may be any vinyl polymer described herein.

In certain embodiments, A is a polyether selected from the group consisting of polyethylene glycol (PEG), polyoxymethylene (POM), polypropylene glycol (PPG), polytetramethylene glycol (PTMG), poly(ethyl ethylene) phosphate (PEEP), and poly(oxazoline). In certain embodiments, A is polyethylene glycol (PEG). In certain embodiments, A is a polyester. In certain embodiments, A is a polyester selected from the group consisting of polyglycolic acid (PGA), polylactic acid (PLA), poly(lactic-co-glycolic acid) (PLGA), polycaprolactone (PCL), polyhydroxyalkanoate (PHA), polyhydroxybutryate (PHB), polyethylene adipate (PEA), polybutylene succinate (PBS), and poly(3-hydroxybutyrate-co-3-hydroxyvalerate) (PHBV). In certain embodiments, A is polylactic acid (PLA). In certain embodiments, A is polyglycolic acid (PGA) or poly(lactic-co-glycolic acid) (PLGA). In certain embodiments, A is a polyacrylamide. In certain embodiments, A is a poly(N-alkylacrylamide). In certain embodiments, A is poly(N-isopropylacrylamide). In certain embodiments, A is a vinyl polymer. In certain embodiments, A is a vinyl polymer selected from the group consisting of polystyrene, polyvinyl chloride, polyethylene, polypropylene, polybutadiene, polyvinyl acetate, polyvinyl alcohol, and polyacrylonitrile. In certain embodiments, A is polystyrene. In certain embodiments, A is a polyacrylate. In certain embodiments, A is a polyacrylate selected from the group consisting of poly(methyl methacrylate), poly(methyl acrylate), poly(methacrylate), poly(hydroxyethyl methacrylate), poly(n-butyl acrylate), and poly(tert-butyl acrylate). In certain embodiments, A is poly(tert-butyl acrylate).

As defined herein, B is a polymer (e.g., a different polymer than polymer A). In certain embodiments, B is a polyether, a polyester, a polyacrylamide, a polyacrylate, or a vinyl polymer. The polyacrylate may be any polyester described herein. The polyester may be any polyester described herein. The polyether may be any polyether described herein. The polyacrylamide may be any polyacrylamide described herein. Additionally, the vinyl polymer may be any vinyl polymer described herein.

In certain embodiments, B is a polyether selected from the group consisting of polyethylene glycol (PEG), polyoxymethylene (POM), polypropylene glycol (PPG), polytetramethylene glycol (PTMG), poly(ethyl ethylene) phosphate (PEEP), and poly(oxazoline). In certain embodiments. B is polyethylene glycol (PEG). In certain embodiments, B is a polyester. In certain embodiments, B is a polyester selected from the group consisting of polyglycolic acid (PGA), polylactic acid (PLA), poly(lactic-co-glycolic acid) (PLGA), polycaprolactone (PCL), polyhydroxyalkanoate (PHA), polyhydroxybutryate (PHB), polyethylene adipate (PEA), polybutylene succinate (PBS), and poly(3-hydroxybutyrate-co-3-hydroxyvalerate) (PHBV). In certain embodiments. B is polylactic acid (PLA). In certain embodiments, B is polyglycolic acid (PGA) or poly(lactic-co-glycolic acid) (PLGA). In certain embodiments, B is a polyacrylamide. In certain embodiments, B is a poly(N-alkylacrylamide). In certain embodiments. B is poly(N-isopropylacrylamide). In certain embodiments, B is a vinyl polymer. In certain embodiments, B is a vinyl polymer selected from the group consisting of polystyrene, polyvinyl chloride, polyethylene, polypropylene, polybutadiene, polyvinyl acetate, polyvinyl alcohol, and polyacrylonitrile. In certain embodiments, B is polystyrene. In certain embodiments. B is a polyacrylate. In certain embodiments. B is a polyacrylate selected from the group consisting of poly(methyl methacrylate), poly(methyl acrylate), poly(methacrylate), poly(hydroxyethyl methacrylate), poly(n-butyl acrylate), and poly(tert-butyl acrylate). In certain embodiments, B is poly(tert-butyl acrylate).

In certain embodiments, A is a polyester; and B is a different polymer. In certain embodiments. A is a polyester having a number average molecular weight of about 1,000 Da to about 20,000 Da; and B is a different polymer having a number average molecular weight of about 1,000 Da to about 20,000 Da. In certain embodiments, A is PLA; and B is a different polymer. In certain embodiments, A is PLA having a number average molecular weight of about 1,000 Da to about 20,000 Da; and B is a different polymer having a number average molecular weight of about 1.000 Da to about 20,000 Da.

In certain embodiments, B is a vinyl polymer; and A is a different polymer. In certain embodiments, B is a vinyl polymer having a number average molecular weight of about 1,000 Da to about 20,000 Da; and A is a different polymer having a number average molecular weight of about 1,000 Da to about 20,000 Da. In certain embodiments, B is polystyrene; and A is a different polymer. In certain embodiments, B is polystyrene having a number average molecular weight of about 1,000 Da to about 20,000 Da; and A is a different polymer having a number average molecular weight of about 1,000 Da to about 20,000 Da.

In certain embodiments, A is a polyester; and B is a vinyl polymer. In certain embodiments, A is a polyester having a number average molecular weight of about 1,000 Da to about 20,000 Da; and B is vinyl polymer having a number average molecular weight of about 1,000 Da to about 20,000 Da. In certain embodiments, A is PLA; and B is polystyrene. In certain embodiments, A is PLA having a number average molecular weight of about 1,000 Da to about 20,000 Da; and B is polystyrene having a number average molecular weight of about 1,000 Da to about 20,000 Da.

In certain embodiments, A is a polyester of the following formula:

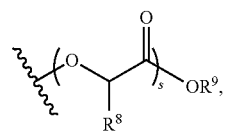

wherein:

$R^8$ is hydrogen, optionally substituted alkyl, optionally substituted alkenyl, optionally substituted alkynyl, optionally substituted aryl, optionally substituted heteroaryl, optionally substituted carbocyclyl, optionally substituted heterocyclyl, or optionally substituted acyl:

$R^9$ is hydrogen, optionally substituted alkyl, optionally substituted alkenyl, optionally substituted alkynyl, optionally substituted aryl, optionally substituted heteroaryl, optionally substituted carbocyclyl, optionally substituted heterocyclyl, optionally substituted acyl, or an oxygen protecting group; and s is an integer between 5 and 2000, inclusive.

In certain embodiments, $R^8$ is hydrogen, optionally substituted alkyl, optionally substituted alkenyl, optionally substituted alkynyl, optionally substituted aryl, optionally substituted heteroaryl, optionally substituted carbocyclyl, optionally substituted heterocyclyl, or optionally substituted acyl. In certain embodiments, $R^8$ is hydrogen. In certain embodiments, $R^8$ is optionally substituted alkyl. In certain embodiments, $R^8$ is optionally substituted alkenyl. In certain embodiments, $R^8$ is optionally substituted alkynyl. In certain embodiments, $R^8$ is optionally substituted aryl. In certain embodiments, $R^8$ is optionally substituted heteroaryl In certain embodiments, $R^8$ is optionally substituted carbocyclyl. In certain embodiments, $R^8$ is optionally substituted heterocyclyl. In certain embodiments, $R^8$ is optionally substituted acyl. In certain embodiments, $R^8$ is optionally substituted $C_{1-6}$ alkyl. In certain embodiments, $R^8$ is unsubstituted $C_{1-6}$ alkyl. In certain embodiments, $R^8$ is optionally substituted $C_{1-3}$ alkyl. In certain embodiments, $R^8$ is unsubstituted $C_{1-3}$ alkyl. In certain embodiments, $R^8$ is selected from the group consisting of methyl, ethyl, n-propyl, iso-propyl, n-butyl, sec-butyl, iso-butyl, and tert-butyl. In certain embodiments, $R^8$ is methyl.

In certain embodiments, $R^9$ hydrogen, optionally substituted alkyl, optionally substituted alkenyl, optionally substituted alkynyl, optionally substituted aryl, optionally substituted heteroaryl, optionally substituted carbocyclyl, optionally substituted heterocyclyl, optionally substituted acyl, or an oxygen protecting group. In certain embodiments, $R^9$ is hydrogen. In certain embodiments. $R^9$ is optionally substituted alkyl. In certain embodiments, $R^9$ is optionally substituted $C_{1-6}$ alkyl. In certain embodiments, $R^9$ is unsubstituted $C_{1-6}$ alkyl. In certain embodiments, $R^9$ is selected from the group consisting of methyl, ethyl, n-propyl, iso-propyl, n-butyl, sec-butyl, iso-butyl, and tert-butyl. In certain embodiments, $R^9$ is optionally substituted alkenyl. In certain embodiments, $R^9$ is optionally substituted alkynyl. In certain embodiments, $R^9$ is optionally substituted aryl. In certain embodiments, $R^9$ is optionally substituted heteroaryl. In certain embodiments, $R^9$ is optionally substituted carbocyclyl. In certain embodiments, $R^9$ is optionally substituted heterocyclyl. In certain embodiments, $R^9$ is optionally substituted acyl. In certain embodiments, $R^9$ is an oxygen protecting group.

In certain embodiments, s is an integer between 5 and 2000, inclusive. In certain embodiments, s is an integer between 5 and 1000, inclusive. In certain embodiments, s is an integer between 5 and 500, inclusive. In certain embodiments, s is an integer between 5 and 200, inclusive. In certain embodiments, s is an integer between 5 and 100, inclusive. In certain embodiments, s is an integer between 10 and 100, inclusive.

In certain embodiments, the polyester is poly(lactic acid). In certain embodiments, the polyester is poly(lactic acid) having a number average molecular weight of about 2,000 Da to about 20,000 Da, about 2.000 Da to about 10,000 Da, about 2,000 Da to about 7,000 Da, or about 2,000 Da to about 4,000 Da. In certain embodiments, the number average molecular weight is 3,000 to 4,000 Da.

In certain embodiments, B is a vinyl polymer of the following formula:

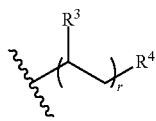

wherein:

$R^3$ is optionally substituted alkyl, halogen, hydrogen, cyano, $OR^a$, optionally substituted alkenyl, optionally substituted alkynyl, optionally substituted aryl, or optionally substituted heteroaryl;

$R^4$ is optionally substituted alkyl, optionally substituted alkenyl, optionally substituted alkynyl, optionally substituted aryl, or optionally substituted heteroaryl;

$R^a$ is hydrogen, optionally substituted alkyl, optionally substituted alkenyl, optionally substituted alkynyl, optionally substituted aryl, or optionally substituted heteroaryl; and r is an integer between 5 and 2000, inclusive.

In certain embodiments. $R^3$ is hydrogen. In certain embodiments, $R^3$ is optionally substituted alkyl. In certain embodiments, $R^3$ is optionally substituted alkenyl. In certain embodiments, $R^3$ is optionally substituted alkynyl. In certain embodiments, $R^3$ is optionally substituted aryl. In certain embodiments, $R^3$ is optionally substituted heteroaryl. In certain embodiments, $R^3$ is cyano. In certain embodiments. $R^3$ is halogen. In certain embodiments, $R^3$ is $OR^a$, wherein $R^a$ is hydrogen or optionally substituted alkyl. In certain embodiments, $R^3$ is optionally substituted phenyl. In certain embodiments, $R^3$ is unsubstituted phenyl.

In certain embodiments, $R^4$ is optionally substituted alkyl. In certain embodiments, $R^4$ is optionally substituted alkenyl. In certain embodiments, $R^4$ is optionally substituted alkynyl. In certain embodiments. $R^4$ is optionally substituted aryl. In certain embodiments, $R^4$ is optionally substituted heteroaryl. In certain embodiments, $R^4$ is optionally substituted $C_{1-6}$ alkyl. In certain embodiments, $R^4$ is unsubstituted $C_{1-6}$ alkyl. In certain embodiments, $R^4$ is $C_{1-6}$ alkyl substituted with an ester group.

In certain embodiments, r is an integer between 5 and 500, inclusive. In certain embodiments, r is an integer between 5 and 100, inclusive. In certain embodiments, r is an integer between 10 and 100, inclusive. In certain embodiments, r is an integer between 10 and 50, inclusive. In certain embodiments, r is an integer between 20 and 40, inclusive. In certain embodiments, r is an integer between 30 and 40, inclusive.

In certain embodiments, $R^3$ is optionally substituted aryl; $R^4$ is optionally substituted $C_{1-6}$ alkyl; and r is an integer between 10 and 100, inclusive. In certain embodiments, $R^3$ is unsubstituted aryl; $R^4$ is substituted $C_{1-6}$ alkyl; and r is an integer between 10 and 50, inclusive. In certain embodiments, $R^3$ is unsubstituted phenyl; $R^4$ is substituted $C_{1-6}$ alkyl; and r is an integer between 10 and 50, inclusive.

In certain embodiments, the vinyl polymer is polystyrene. In certain embodiments, the vinyl polymer is polystyrene having a number average molecular weight of about 2,000 Da to about 20,000 Da, about 10.000 Da to about 15,000 Da, about 2,000 Da to about 10.000 Da, about 7,000 Da to about 10,000 Da, about 8,000 Da to about 9,500 Da, about 2,000 Da to about 7,000 Da, about 2,000 Da to about 4,000 Da, about 2,000 Da to about 3,000 Da, or about 2,500 Da to about 3,600 Da. In certain embodiments, the vinyl polymer is polystyrene having a number average molecular weight of about 4,000 Da to about 5,000 Da.

In certain embodiments, the ratio of A:B, by weight, is about 1:1, about 1:1.1, about 1:1.2, about 1:1.3, about 1:1.4, about 1:1.5, about 1:1.6, about 1:1.7, about 1:1.8, about 1:1.9, about 1:2, about 1:2.5, about 1:3, about 1:3.5, about 1:4, about 1:1.4, or about 1:5. In certain embodiments, the ratio of A:B, by weight, is about 1:1.2, 1:1.21, 1:1.23, 1:1.24, 1:1.25, 1:1.26, 1:1.27, or 1:1.29. In certain embodiments, the ratio of A:B, by weight, is about 1:1.25.

In certain embodiments, the ratio of PLA:PS, by weight, is about 1:1, about 1:1.1, about 1:1.2, about 1:1.3, about 1:1.4, about 1:1.5, about 1:1.6, about 1:1.7, about 1:1.8, about 1:1.9, about 1:2, about 1:2.5, about 1:3, about 1:3.5, about 1:4, about 1:1.4, or about 1:5. In certain embodiments, the ratio of PLA:PS, by weight, is about 1:1.2, 1:1.21, 1:1.23, 1:1.24, 1:1.25, 1:1.26, 1:1.27, or 1:1.29. In certain embodiments, the ratio of PLA:PS, by weight, is about 1:1.25.

In certain embodiments, A is of the formula:

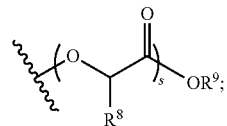

and B is of the formula:

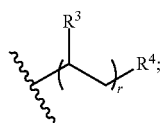

wherein $R^3$, $R^4$, $R^8$, $R^9$, s and r are as defined in the embodiments of Formula (I); and the ratio of s:r is about 1:1.1, about 1:1.2, about 1:1.25, about 1:1.3, about 1:1.4, about 1:1.5, about 1:1.6, about 1:1.7, about 1:1.8, about 1:1.9, about 1:2, about 1:2.1, about 1:2.2, about 1:2.3, about 1:2.4, about 1:2.5, about 1:2.6, about 1:2.7, about 1:2.8, about 1:2.9, about 1:3, about 1:4, about 1:5, about 1:1, about 1.1:1, about 1.2:1, about 1.3:1, about 1.4:1, about 1.5:1, about 1.6:1, about 1.7:1, about 1.8:1, about 1.9:1, about 2:1, about 2.1:1, about 2.2:1, about 2.3:1, about 2.4:1, about 2.5:1, about 2.6:1, about 2.7:1, about 2.8:1, about 2.9:1, about 3:1, about 4:1, or about 5:1. In certain embodiments, any of these parameters lead to a BBCP with gyroid morphology.

In certain embodiments, A is of the formula:

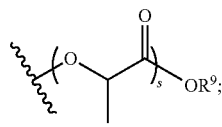

and B is of the formula:

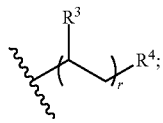

wherein $R^3$, $R^4$, $R^9$, s and r are as defined in the embodiments of Formula (I); and the ratio of s:r is about 1:1.1, about 1:1.2, about 1:1.25, about 1:1.3, about 1:1.4, about 1:1.5, about 1:1.6, about 1:1.7, about 1:1.8, about 1:1.9, about 1:2, about 1:2.1, about 1:2.2, about 1:2.3, about 1:2.4, about 1:2.5, about 1:2.6, about 1:2.7, about 1:2.8, about 1:2.9, about 1:3, about 1:4, about 1:5, about 1:1, about 1.1:1, about 1.2:1, about 1.3:1, about 1.4:1, about 1.5:1, about 1.6:1, about 1.7:1, about 1.8:1, about 1.9:1, about 2:1, about 2.1:1, about 2.2:1, about 2.3:1, about 2.4:1, about 2.5:1, about 2.6:1, about 2.7:1, about 2.8:1, about 2.9:1, about 3:1, about 4:1, or about 5:1. In certain embodiments, any of these parameters lead to a BBCP with gyroid morphology.

In certain embodiments, A is of the formula:

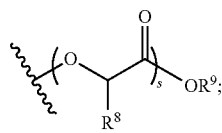

and B is of the formula:

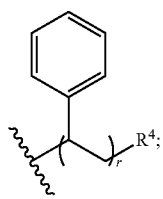

wherein $R^4$, $R^8$, $R^9$, s and r are as defined in the embodiments of Formula (I); and the ratio of s:r is about 1:1.1, about 1:1.2, about 1:1.25, about 1:1.3, about 1:1.4, about 1:1.5, about 1:1.6, about 1:1.7, about 1:1.8, about 1:1.9, about 1:2, about 1:2.1, about 1:2.2, about 1:2.3, about 1:2.4, about 1:2.5, about 1:2.6, about 1:2.7, about 1:2.8, about 1:2.9, about 1:3, about 1:4, about 1:5, about 1:1, about 1.1:1, about 1.2:1, about 1.3:1, about 1.4:1, about 1.5:1, about 1.6:1, about 1.7:1, about 1.8:1, about 1.9:1, about 2:1, about 2.1:1, about 2.2:1, about 2.3:1, about 2.4:1, about 2.5:1, about 2.6:1, about 2.7:1, about 2.8:1, about 2.9:1, about 3:1, about 4:1, or about 5:1. In certain embodiments, any of these parameters lead to a BBCP with gyroid morphology.

In certain embodiments, A is of the formula:

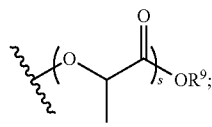

and B is of the formula:

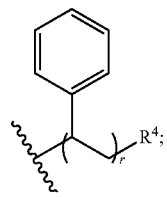

wherein $R^4$, $R^9$, s and r are as defined in the embodiments of Formula (I); and the ratio of s:r is about 1:1.1, about 1:1.2, about 1:1.25, about 1:1.3, about 1:1.4, about 1:1.5, about 1:1.6, about 1:1.7, about 1:1.8, about 1:1.9, about 1:2, about 1:2.1, about 1:2.2, about 1:2.3, about 1:2.4, about 1:2.5, about 1:2.6, about 1:2.7, about 1:2.8, about 1:2.9, about 1:3, about 1:4, about 1:5, about 1:1, about 1.1:1, about 1.2:1, about 1.3:1, about 1.4:1, about 1.5:1, about 1.6:1, about 1.7:1, about 1.8:1, about 1.9:1, about 2:1, about 2.1:1, about 2.2:1, about 2.3:1, about 2.4:1, about 2.5:1, about 2.6:1, about 2.7:1, about 2.8:1, about 2.9:1, about 3:1, about 4:1, or about 5:1. In certain embodiments, any of these parameters lead to a BBCP with gyroid morphology.

In certain embodiments, A is of the formula:

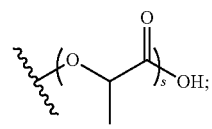

and B is of the formula:

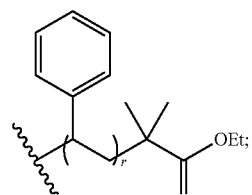

wherein s and r are as defined in the embodiments of Formula (I); and the ratio of s:r is about 1:1.1, about 1:1.2, about 1:1.25, about 1:1.3, about 1:1.4, about 1:1.5, about 1:1.6, about 1:1.7, about 1:1.8, about 1:1.9, about 1:2, about 1:2.1, about 1:2.2, about 1:2.3, about 1:2.4, about 1:2.5, about 1:2.6, about 1:2.7, about 1:2.8, about 1:2.9, about 1:3, about 1:4, about 1:5, about 1:1, about 1.1:1, about 1.2:1, about 1.3:1, about 1.4:1, about 1.5:1, about 1.6:1, about 1.7:1, about 1.8:1, about 1.9:1, about 2:1, about 2.1:1, about 2.2:1, about 2.3:1, about 2.4:1, about 2.5:1, about 2.6:1, about 2.7:1, about 2.8:1, about 2.9:1, about 3:1, about 4:1, or about 5:1. In certain embodiments, any of these parameters lead to a BBCP with gyroid morphology.

In certain embodiments, the bottlebrush polymer of Formula (I), having a gyroid morphology, is of Formula (I-aa):

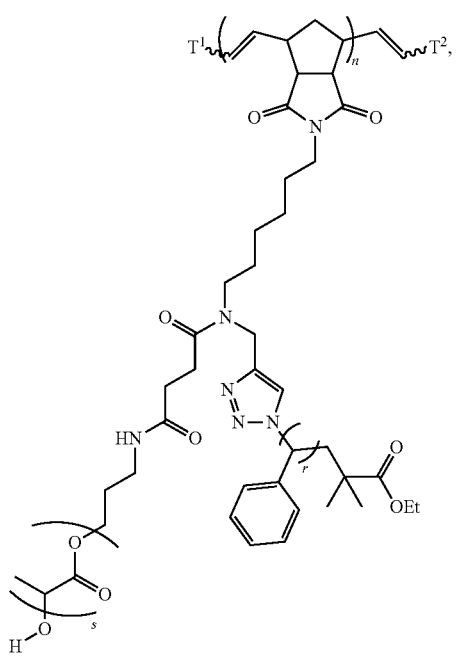

(I-aa)

or a salt thereof, wherein:
each of $T^1$ and $T^2$ is independently hydrogen or phenyl:
n is an integer between 10 and 100, inclusive;
s is an integer between 10 and 100, inclusive; and
r is an integer between 10 and 100, inclusive.

In certain embodiments, the bottlebrush polymer of Formula (I), having a gyroid morphology, is of Formula (I-bb):

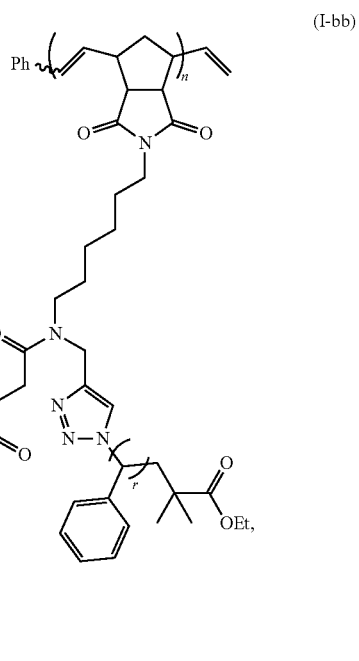

(I-bb)

or a salt thereof, wherein:
each of $T^1$ and $T^2$ is independently hydrogen or phenyl:
n is an integer between 10 and 100, inclusive;
s is an integer between 10 and 100, inclusive; and
r is an integer between 10 and 100, inclusive.

Diblock Bottlebrush Copolymers

Another aspect of the present invention relates to diblock bottlebrush copolymers. In certain embodiments, the polymer is an AB diblock bottlebrush copolymer comprising a Block A polymer, and a Block B polymer. A diblock bottlebrush copolymer of the present disclosure comprises a backbone polymer of repeating units covalently linked to polymeric sidechains; wherein Block A and Block B of the copolymer comprise polymeric sidechains covalently linked to the repeating units of the backbone polymer. In certain embodiments, at least one of Block A and Block B comprise repeating units linked to at least two different polymeric sidechains.

The diblock bottlebrush copolymers provided herein are AB diblock bottlebrush copolymers, meaning that at least one polymeric sidechain of Block A is different from the polymeric sidechains of Block B. In the converse, at least one polymeric sidechain of Block B is different from the polymeric sidechains of Block A. In certain embodiments, Block A comprises repeating units covalently linked to at least two polymeric sidechains and Block B comprises repeating units covalently linked to at least two polymeric sidechains. In other embodiments. Block A comprises repeating units covalently linked to one polymeric sidechain and Block B comprises repeating units covalently linked to at least two polymeric sidechains. In other embodiments, Block B comprises repeating units covalently linked to one polymeric sidechain and Block A comprises repeating units covalently linked to at least two polymeric sidechains. In other embodiments, the polymeric sidechains of Blocks A and B each are of a different polymer class. Further, any two polymeric sidechains of Blocks A and B may be of the same or different length, or of the same or different molecular weight.

The diblock bottlebrush copolymers provided herein comprise a backbone polymer of repeating units ("backbone units"). The repeating backbone units of any two of Blocks A and B may be the same or different. Further, any two of Blocks A and B may comprise the same or a different number of repeating backbone units. In certain embodiments, each of Blocks A and B independently comprise 1 to 4000 repeating backbone units, inclusive. In certain embodiments, each of Blocks A and B independently comprise 2 to 4000 repeating backbone units, inclusive. In certain embodiments, each of Blocks A and B independently comprise 2 to 2000 repeating backbone units, inclusive. In certain embodiments, each of Blocks A and B independently comprise 2 to 1000 repeating backbone units, inclusive. In certain embodiments, each of Blocks A and B independently comprise 2 to 500 repeating backbone units, inclusive. In certain embodiments, each of Blocks A and B independently comprise 2 to 200 repeating backbone units, inclusive. In certain embodiments, each of Blocks A and B independently comprise 2 to 100 repeating backbone units, inclusive. In certain embodiments, each of Blocks A and B independently comprise 10 to 100 repeating backbone units, inclusive. In certain embodiments, each of Blocks A and B independently comprise 10 to 50 repeating backbone units, inclusive.

The backbone units may be derived from polymerization of a monomer including substituted or unsubstituted norbornene, olefin, cyclic olefin, norbomene anhydride, cyclooctene, cyclopentadiene, styrene or acrylate. Some backbone units useful in the present disclosure may be obtained from a ring opening metathesis polymerization (ROMP) reaction.

The polymeric sidechains of Block A, and Block B of the diblock bottlebrush copolymer may comprise any polymer. Examples of classes of polymers include, but are not limited to, vinyl polymers (e.g., polystyrene), polyethylenes (e.g., polyethylene, polytetrafluoroethylene), polypropylenes, polyacetylenes, polyethers (e.g., polyethylene glycol, polyoxymethylene, polypropylene glycol, polytetramethylene glycol, poly(ethyl ethylene) phosphate, poly(oxazoline)), polyamines, polyesters (e.g., polyglycolic acid, polylactic acid, poly(lactic-co-glycolic acid), polycaprolactone, polyhydroxyalkanoate, polyhydroxybutryate, polyethylene adipate, polybutylene succinate, poly(3-hydroxybutyrate-co-3-hydroxyvalerate), polysilanes, polysiloxanes (e.g., polydimethylsiloxane), polyacrylates (e.g., polymethacrylate, poly(n-butyl acrylate), poly(tert-butyl acrylate)), polylactides (e.g., polylactic acid), polyamino acids, polypeptides, polyamides, polyacrylamides (e.g., polymethylacrylamide), and polysaccharides. The polymeric sidechains may be homopolymers or copolymers. The polymeric sidechains may be linear or branched. In certain embodiments, the polymeric sidechains are linear. In certain embodiments, the polymeric sidechains are branched.

In certain embodiments, one or more of Block A and Block B of the diblock bottlebrush copolymer comprise polyester sidechains. In certain embodiments, Block A of the diblock bottlebrush copolymer comprises polyester sidechains. In certain embodiments, Block B of the diblock bottlebrush copolymer comprises polyester sidechains. Examples of polyesters include, but are not limited to, polyglycolic acid (PGA), polylactic acid (PLA), poly(lactic-co-glycolic acid) (PLGA), polycaprolactone (PCL), polyhydroxyalkanoate (PHA), polyhydroxybutyrate (PHB), polyethylene adipate (PEA), polybutylene succinate (PBS), or poly(3-hydroxybutyrate-co-3-hydroxyvalerate) (PHBV). In certain embodiments, the diblock bottlebrush copolymer comprises polylactic acid (PLA) sidechains. In certain embodiments, the diblock bottlebrush copolymer comprises polyglycolic acid (PGA) or poly(lactic-co-glycolic acid) (PLGA) sidechains. In certain embodiments, Block A of the diblock bottlebrush copolymer comprises a polylactic acid (PLA), polyglycolic acid (PGA), or poly(lactic-co-glycolic acid) (PLGA) sidechain. In certain embodiments, Block A of the diblock bottlebrush copolymer comprises PLA sidechains. In certain embodiments, Block B of the diblock bottlebrush copolymer comprises PLA sidechains.

In certain embodiments, one or more of Block A and Block B of the diblock bottlebrush copolymer comprise polyether sidechains. In certain embodiments. Block B of the diblock bottlebrush copolymer comprises polyether sidechains. In certain embodiments, Block A of the diblock bottlebrush copolymer comprises polyether sidechains. Examples of polyethers include, but are not limited to, polyethylene glycol (PEG), polyoxymethylene (POM), polypropylene glycol (PPG), polytetramethylene glycol (PTMG), poly(ethyl ethylene) phosphate (PEEP), and poly(oxazoline). In certain embodiments, the diblock bottlebrush copolymer comprises polyethylene glycol (PEG) sidechains.

In certain embodiments, at least one of Block A and Block B of the diblock bottlebrush copolymer comprises polysiloxane sidechains. In certain embodiments, the polysiloxane is polydimethylsiloxane (PDMS). In certain embodiments. Block A comprises polydimethylsiloxane sidechains. In certain embodiments, Block B comprises polydimethylsiloxane sidechains.

In certain embodiments, the diblock bottlebrush copolymer comprises polyacrylamide sidechains. In certain embodiments, the diblock bottlebrush copolymer comprises poly(N-alkylacrylamide) sidechains. In certain embodiments, the diblock bottlebrush copolymer comprises poly(N-isopropylacrylamide) (PNIPAM) sidechains. In certain embodiments, Block A comprises poly(N-alkylacrylamide) sidechains. In certain embodiments, Block B comprises poly(N-alkylacrylamide) sidechains.

In certain embodiments, the diblock bottlebrush copolymer comprises vinyl polymer sidechains. Examples of vinyl polymers include, but are not limited to, polystyrene, polyvinyl chloride, polyethylene, polypropylene, polybutadiene, polyvinyl acetate, polyvinyl alcohol, and polyacrylonitrile. In certain embodiments, Block A comprises polystyrene sidechains. In certain embodiments, Block B comprises polystyrene sidechains.

In certain embodiments, the diblock bottlebrush copolymer comprises polyacrylate sidechains. Examples of polyacrylates include, but are not limited to, poly(methyl methacrylate), poly(methyl acrylate), poly(methacrylate), poly(hydroxyethyl methacrylate), poly(n-butyl acrylate), and poly(tert-butyl acrylate). In certain embodiments, Block A comprises poly(tert-butyl acrylate) sidechains. In certain embodiments, Block B comprises poly(tert-butyl acrylate) sidechains.

In certain embodiments, the diblock bottlebrush copolymer comprises polysiloxane sidechains, polyester sidechains, and vinyl polymer sidechains. In certain embodiments, the diblock bottlebrush copolymer comprises polysiloxane sidechains, polyacrylate sidechains, polyester sidechains, and vinyl polymer sidechains. In certain embodiments, the diblock bottlebrush copolymer comprises polydimethylsiloxane sidechains, poly(lactic acid) sidechains, and polystyrene sidechains. In certain embodiments, the diblock bottlebrush copolymer comprises polydimethylsiloxane sidechains, poly(tert-butylacrylate) sidechains, poly(lactic acid) sidechains, and polystyrene sidechains.

The polymeric sidechains of Blocks A and B may be of any molecular weight. In certain embodiments, the polymeric sidechains of Blocks A and B each independently have a number average molecular weight of about 50 to about 10000 Da, about 100 to about 10000 Da, about 500 to about 10000 Da, about 1000 to about 10000 Da, about 2000 to about 10000 Da, about 2000 to about 7000 Da, about 2000 to about 4000 Da, about 3000 to about 4000 Da, or about 4000 to about 6000 Da; each range being inclusive.

In certain embodiments, one block of the copolymer comprises repeating units of the backbone linked to at least two different polymeric sidechains. In certain embodiments, each block of the copolymer comprises repeating units of the backbone linked to at least two different polymeric sidechains.

In certain embodiments, the diblock bottlebrush copolymer is of Formula (II):

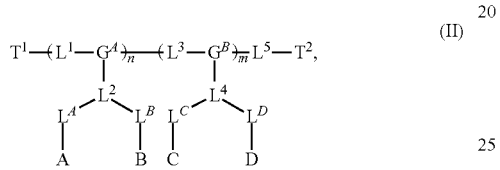

(II)

or salts thereof, wherein:

each of $G^A$ and $G^B$ is independently optionally substituted alkylene, optionally substituted heteroalkylene, optionally substituted carbocyclylene, optionally substituted heterocyclylene, optionally substituted arylene, optionally substituted heteroarylene, or a combination thereof;

each of $L^1$, $L^2$, $L^3$, $L^4$, and $L^5$ is independently a linker selected from the group consisting of a bond, optionally substituted alkylene, optionally substituted heteroalkylene, optionally substituted alkenylene, optionally substituted alkynylene, optionally substituted carbocyclylene, optionally substituted heterocyclylene, optionally substituted arylene, optionally substituted heteroarylene, and combinations thereof;

each of $L^A$, $L^B$, $L^C$, and $L^D$ is independently a linker selected from the group consisting of a bond, optionally substituted alkylene, optionally substituted heteroalkylene, optionally substituted alkenylene, optionally substituted alkynylene, optionally substituted carbocyclylene, optionally substituted heterocyclylene, optionally substituted arylene, optionally substituted heteroarylene, and combinations thereof;

each of $T^1$ and $T^2$ is independently a terminal group selected from the group consisting of hydrogen, halogen, optionally substituted alkyl, optionally substituted alkenyl, optionally substituted alkynyl, optionally substituted carbocyclyl, optionally substituted heterocyclyl, optionally substituted aryl, optionally substituted heteroaryl, optionally substituted acyl, optionally substituted hydroxyl, optionally substituted amino, and optionally substituted thio;

n is an integer between 1 and 4000, inclusive;

m is an integer between 1 and 4000, inclusive; and each of A, B, C, and D is independently a polymer or hydrogen.

In certain embodiments, no more than one of A, B, C, or D is hydrogen. In certain embodiments, no more than two of A, B, C, or D is the same polymer. In certain embodiments, none of A, B, C, or D is the same polymer. In certain embodiments, at least one of A, B, C, or D is a polysiloxane.

In certain embodiments, $G^A$ is optionally substituted carbocyclylene, optionally substituted heterocyclylene, or a combination thereof. In certain embodiments, $G^A$ is optionally substituted carbocyclylene. In certain embodiments, $G^A$ is optionally substituted heterocyclylene. In certain embodiments, $G^A$ comprises optionally substituted 5-membered carbocyclylene or 5-membered heterocyclylene. In certain embodiments, $G^A$ comprises optionally substituted cyclopentylene, cyclohexylene, tetrahydrofuranylene, tetrahydrothiophenylene, or pyrrolidinylene. In certain embodiments, $G^A$ is optionally substituted bicyclic heterocyclylene. In certain embodiments, $G^A$ is substituted bicyclic heterocyclylene. In certain embodiments, $G^A$ is of the following formula:

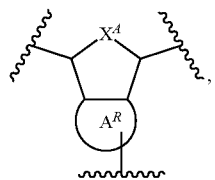

wherein $X^A$ is —CH$_2$—, —CH$_2$CH$_2$—, —O—, or —S—; and AR is optionally substituted carbocyclyl or optionally substituted heterocyclyl. In certain embodiments, $G^A$ is of the following formula:

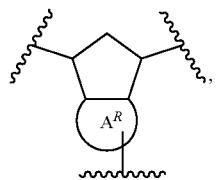

wherein $A^R$ is optionally substituted carbocyclyl or optionally substituted heterocyclyl. In certain embodiments, $G^A$ is of the following formula:

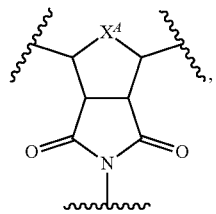

wherein $X^A$ is —CH$_2$—, —CH$_2$CH$_2$—, —O—, or —S—. In certain embodiments, $G^A$ is of the following formula:

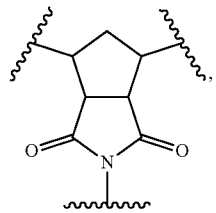 [SMILES: *C1CC(*)C2C(=O)N(*)C(=O)C12]

In certain embodiments. $G^B$ is optionally substituted carbocyclylene, optionally substituted heterocyclylene, or a combination thereof. In certain embodiments, $G^B$ is optionally substituted carbocyclylene. In certain embodiments, $G^B$ is optionally substituted heterocyclylene. In certain embodiments, $G^B$ is optionally substituted bicyclic heterocyclylene. In certain embodiments, $G^B$ comprises optionally substituted 5-membered carbocyclylene or 5-membered heterocyclylene. In certain embodiments, $G^B$ comprises optionally substituted cyclopentylene, cyclohexylene, tetrahydrofuranylene, tetrahydrothiophenylene, or pyrrolidinylene. In certain embodiments, $G^B$ is substituted bicyclic heterocyclylene. In certain embodiments, $G^B$ is of the following formula:

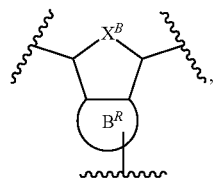

wherein $X^B$ is —CH$_2$—, —CH$_2$CH$_2$—, —O—, or —S—; and $B^R$ is optionally substituted carbocyclyl or optionally substituted heterocyclyl. In certain embodiments, $G^B$ is of the following formula:

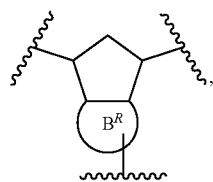

wherein $B^R$ is optionally substituted carbocyclyl or optionally substituted heterocyclyl. In certain embodiments, $G^B$ is of the following formula:

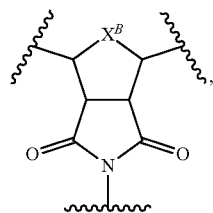

wherein $X^B$ is —CH$_2$—, —CH$_2$CH$_2$—, —O—, or —S—. In certain embodiments, $G^B$ is of the following formula:

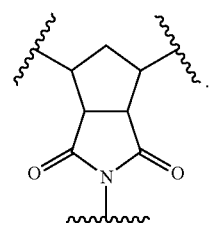

In certain embodiments, $G^A$ and $G^B$ are the same. In certain embodiments, each of $G^A$ and $G^B$ is independently optionally substituted carbocyclylene, optionally substituted heterocyclylene, or a combination thereof. In certain embodiments, each of $G^A$ and $G^B$ is of the following formula:

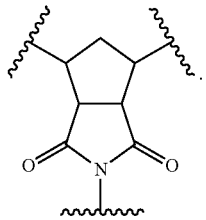 [SMILES: *C1CC(*)C2C(=O)N(*)C(=O)C12 ; "."]

In certain embodiments, $G^A$ and $G^B$ are different, as defined in the embodiments of Formula (II) above.

In certain embodiments, each of $L^1$, $L^3$, and $L^5$ is independently a linker selected from the group consisting of optionally substituted alkylene, optionally substituted heteroalkylene, optionally substituted alkenylene, optionally substituted alkynylene, and combinations thereof. In certain embodiments, each of $L^1$, $L^3$, and $L^5$ is optionally substituted alkylene. In certain embodiments, each of $L^1$, $L^3$, and $L^5$ is optionally substituted heteroalkylene. In certain embodiments, each of $L^1$, $L^3$, and $L^5$ is optionally substituted alkynylene. In certain embodiments, each of $L^1$, $L^3$, and $L^5$ is optionally substituted alkenylene. In certain embodiments, each of $L^1$, $L^3$, and $L^5$ is substituted alkenylene. In certain embodiments, each of $L^1$, $L^3$, and $L^5$ is unsubstituted alkenylene. In certain embodiments, each of $L^1$, $L^3$, and $L^5$ is of the formula:

In certain embodiments, each of $L^1$, $L^3$, and $L^5$ is of the formula:

In certain embodiments, each of $L^1$, $L^3$, and $L^5$ is of the formula:

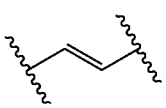

In certain embodiments, $L^1$ is optionally substituted alkylene. In certain embodiments, $L^1$ is optionally substituted heteroalkylene. In certain embodiments, $L^1$ is optionally substituted alkynylene. In certain embodiments, $L^1$ is optionally substituted alkenylene. In certain embodiments, $L^1$ substituted alkenylene. In certain embodiments. $L^1$ is unsubstituted alkenylene. In certain embodiments. $L^1$ is of the formula:

In certain embodiments, $L^1$ is of the formula:

In certain embodiments, $L^1$ is of the formula:

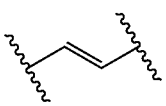

In certain embodiments, $L^3$ is optionally substituted alkylene. In certain embodiments. $L^3$ is optionally substituted heteroalkylene. In certain embodiments, $L^3$ is optionally substituted alkynylene. In certain embodiments, $L^3$ is optionally substituted alkenylene. In certain embodiments, $L^3$ substituted alkenylene. In certain embodiments, $L^3$ is unsubstituted alkenylene. In certain embodiments, $L^3$ is of the formula:

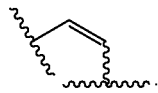

In certain embodiments, $L^3$ is of the formula:

In certain embodiments, $L^3$ is of the formula

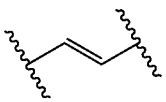

In certain embodiments, $L^5$ is optionally substituted alkylene. In certain embodiments, $L^5$ is optionally substituted heteroalkylene. In certain embodiments, $L^5$ is optionally substituted alkynylene. In certain embodiments, $L^5$ is optionally substituted alkenylene. In certain embodiments, $L^5$ substituted alkenylene. In certain embodiments, $L^5$ is unsubstituted alkenylene. In certain embodiments, $L^5$ is of the formula:

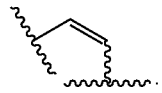

In certain embodiments, $L^5$ is of the formula:

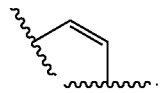 [SMILES: */C=C\* ; "."]

In certain embodiments, $L^5$ is of the formula:

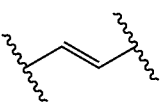

In certain embodiments, $L^2$ is a linker selected from the group consisting of optionally substituted alkylene, optionally substituted heteroalkylene, optionally substituted alkenylene, optionally substituted alkynylene, optionally substituted carbocyclylene, optionally substituted heterocyclylene, optionally substituted arylene, optionally substituted heteroarylene, and combinations thereof. In certain embodiments, $L^2$ is optionally substituted alkylene or optionally substituted heteroalkylene. In certain embodiments, $L^2$ is optionally substituted alkylene. In certain embodiments, $L^2$ is optionally substituted heteroalkylene. In certain embodiments, $L^2$ is unsubstituted alkylene. In certain embodiments, $L^2$ is of the formula:

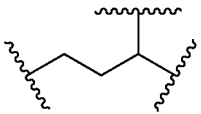

certain embodiments, $L^2$ is unsubstituted heteroalkylene. In certain embodiments, $L^2$ is optionally substituted $C_{1-20}$ heteroalkylene. In certain embodiments, $L^2$ is optionally substituted $C_{1-10}$ heteroalkylene. In certain embodiments, $L^2$ is unsubstituted $C_{1-10}$ heteroalkylene. In certain embodiments, $L^2$ is of the formula:

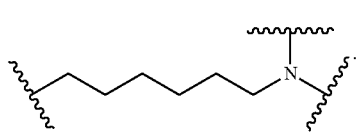

In certain embodiments, $L^2$ is substituted $C_{1-10}$ heteroalkylene. In certain embodiments, $L^2$ is of the formula:

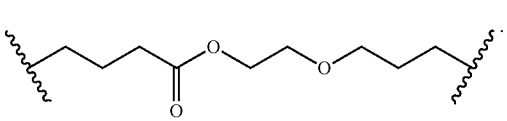

In certain embodiments. $L^4$ is a linker selected from the group consisting of optionally substituted alkylene, optionally substituted heteroalkylene, optionally substituted alkenylene, optionally substituted alkynylene, optionally substituted carbocyclylene, optionally substituted heterocyclylene, optionally substituted arylene, optionally substituted heteroarylene, and combinations thereof. In certain embodiments, $L^4$ is optionally substituted alkylene or optionally substituted heteroalkylene. In certain embodiments, $L^4$ is optionally substituted alkylene. In certain embodiments, $L^4$ is optionally substituted heteroalkylene. In certain embodiments, $L^4$ is unsubstituted alkylene. In certain embodiments. $L^4$ is of the formula:

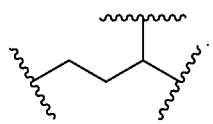

In certain embodiments, $L^4$ is unsubstituted heteroalkylene. In certain embodiments, L is optionally substituted $C_{1-20}$ heteroalkylene. In certain embodiments, $L^4$ is optionally substituted $C_{1-10}$ heteroalkylene. In certain embodiments, $L^4$ is unsubstituted $C_{1-10}$ heteroalkylene. In certain embodiments. $L^4$ is of the formula:

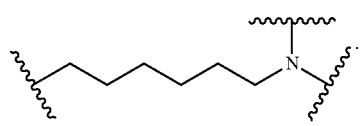

In certain embodiments, $L^4$ is substituted $C_{1-10}$ heteroalkylene. In certain embodiments, $L^4$ is of the formula:

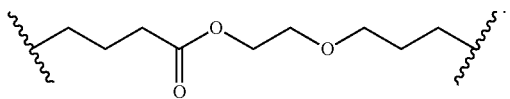 [SMILES: "." ; *CCCOCCOC(=O)CCC*]

In certain embodiments, each of $L^2$ and $L^4$ is independently optionally substituted alkylene or optionally substituted heteroalkylene.

In certain embodiments, $L^2$ is substituted $C_{1-10}$ heteroalkylene, and $L^4$ is unsubstituted $C_{1-10}$ heteroalkylene.

In certain embodiments, $L^2$ is of the formula:

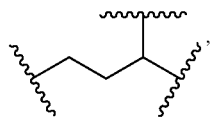

and $L^4$ is of the formula:

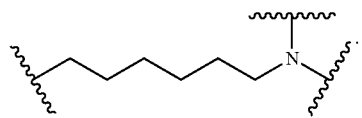

In certain embodiments. $L^4$ is a linker selected from the group consisting of a bond, optionally substituted alkylene, optionally substituted heteroalkylene, optionally substituted alkenylene, optionally substituted alkynylene, optionally substituted carbocyclylene, optionally substituted heterocyclylene, optionally substituted arylene, optionally substituted heteroarylene, and combinations thereof. In certain embodiments, $L^A$ is a bond. In certain embodiments, $L^A$ is optionally substituted alkylene, optionally substituted heteroalkylene, optionally substituted heteroarylene, or optionally substituted heteroarylalkylene. In certain embodiments, $L^A$ is optionally substituted alkylene. In certain embodiments, $L^A$ is optionally substituted heteroalkylene. In certain embodiments, $L^A$ is optionally substituted heteroarylene. In certain embodiments, $L^A$ is unsubstituted alkylene. In certain embodiments, $L^A$ is unsubstituted heteroalkylene. In certain embodiments. $L^A$ is substituted heteroalkylene. In certain embodiments, L is optionally substituted $C_{1-20}$ heteroalkylene. In certain embodiments, $L^A$ is optionally substituted $C_{1-10}$ heteroalkylene. In certain embodiments, $L^A$ is substituted $C_{1-10}$ heteroalkylene. In certain embodiments, $L^A$ is $C_{1-10}$ heteroalkylene substituted with at least one oxo (=O) group. In certain embodiments, $L^A$ is of the formula:

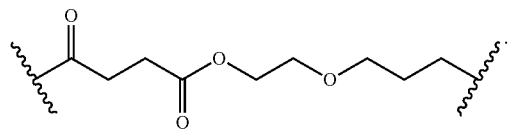 [SMILES: *CCCOCCOC(=O)CCC(*)=O ; "."]

certain embodiments. $L^A$ is of the formula:

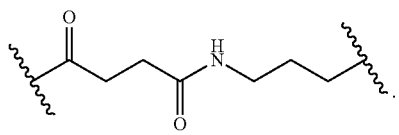

In certain embodiments, $L^A$ is unsubstituted heteroarylalkylene. In certain embodiments, $L^A$ is optionally substituted heteroarylalkylene. In certain embodiments, $L^A$ is an unsubstituted 5-membered heteroarylalkylene. In certain embodiments, $L^A$ comprises a triazole. In certain embodiments, $L^A$ comprises a group of the formula:

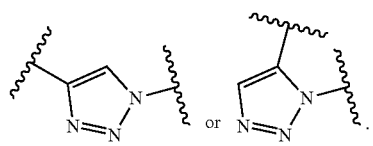 [SMILES: *c1cn(*)nn1 ; "or" ; *c1cnnn1* ; "."]

In certain embodiments, $L^A$ is of the formula:

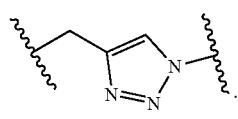

In certain embodiments. $L^B$ is a linker selected from the group consisting of a bond, optionally substituted alkylene, optionally substituted heteroalkylene, optionally substituted alkenylene, optionally substituted alkynylene, optionally substituted carbocyclylene, optionally substituted heterocyclylene, optionally substituted arylene, optionally substituted heteroarylene, and combinations thereof. In certain embodiments. $L^B$ is optionally substituted alkylene, optionally substituted heteroalkylene, optionally substituted heteroarylene, or optionally substituted heteroarylalkylene. In certain embodiments, $L^B$ is optionally substituted alkylene. In certain embodiments, $L^B$ is optionally substituted heteroalkylene. In certain embodiments, $L^B$ is optionally substituted heteroarylene. In certain embodiments, $L^B$ is unsubstituted alkylene. In certain embodiments, $L^B$ is unsubstituted heteroalkylene. In certain embodiments, $L^B$ is substituted heteroalkylene. In certain embodiments, $L^B$ is optionally substituted $C_{1-20}$ heteroalkylene. In certain embodiments, $L^B$ is optionally substituted $C_{1-10}$ heteroalkylene. In certain embodiments, $L^B$ is substituted $C_{1-10}$ heteroalkylene. In certain embodiments, $L^B$ is $C_{1-10}$ heteroalkylene substituted with at least one oxo (=O) group. In certain embodiments, $L^B$ is of the formula:

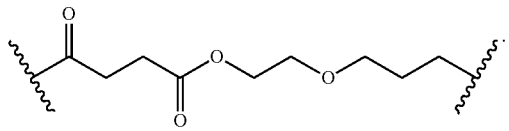 [SMILES: *CCCOCCOC(=O)CCC(*)=O ; "."]

In certain embodiments, $L^B$ is of the formula:

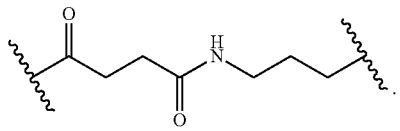

In certain embodiments, $L^B$ is unsubstituted heteroarylalkylene. In certain embodiments, $L^B$ is optionally substituted heteroarylalkylene. In certain embodiments, $L^B$ is an unsubstituted 5-membered heteroarylalkylene. In certain embodiments, $L^B$ comprises a triazole. In certain embodiments. LB comprises a group of the formula:

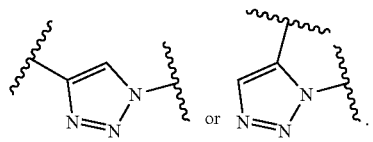 [SMILES: *c1cn(*)nn1 ; "or" ; *c1cnnn1* ; "."]

In certain embodiments. $L^B$ is of the formula:

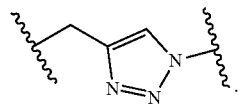

In certain embodiments, $L^C$ is a linker selected from the group consisting of a bond, optionally substituted alkylene, optionally substituted heteroalkylene, optionally substituted alkenylene, optionally substituted alkynylene, optionally substituted carbocyclylene, optionally substituted heterocyclylene, optionally substituted arylene, optionally substituted heteroarylene, and combinations thereof. In certain embodiments, $L^c$ is a bond. In certain embodiments, $L^c$ is optionally substituted alkylene, optionally substituted heteroalkylene, optionally substituted heteroarylene, or optionally substituted heteroarylalkylene. In certain embodiments, $L^C$ is optionally substituted alkylene. In certain embodiments, $L^c$ is optionally substituted heteroalkylene. In certain embodiments, $L^C$ is optionally substituted heteroarylene. In certain embodiments, $L^C$ is unsubstituted alkylene. In certain embodiments, $L^c$ is unsubstituted heteroalkylene. In certain embodiments, $L^C$ is substituted heteroalkylene. In certain embodiments, $L^c$ is optionally substituted $C_{1-20}$ heteroalkylene. In certain embodiments, $L^A$ is optionally substituted $C_{1-10}$ heteroalkylene. In certain embodiments, $L^C$ is substituted $C_{1-10}$ heteroalkylene. In certain embodiments, $L^C$ is $C_{1-10}$ heteroalkylene substituted with at least one oxo (=O) group. In certain embodiments, $L^C$ is of the formula:

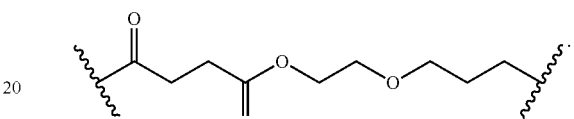

In certain embodiments, $L^c$ is of the formula:

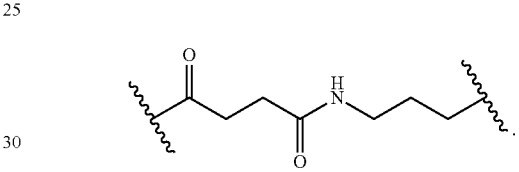

In certain embodiments, $L^c$ is unsubstituted heteroarylalkylene. In certain embodiments, $L^c$ is optionally substituted heteroarylalkylene. In certain embodiments, $L^C$ is an unsubstituted 5-membered heteroarylalkylene. In certain embodiments, $L^C$ comprises a triazole. In certain embodiments, $L^C$ comprises a group of the formula:

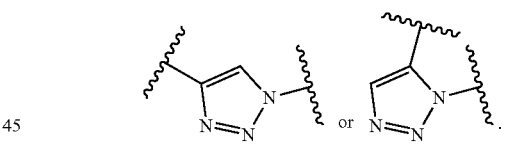

In certain embodiments, $L^c$ is of the formula:

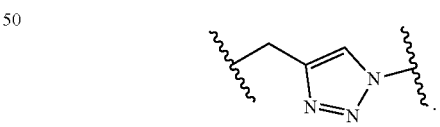

In certain embodiments, $L^D$ is a linker selected from the group consisting of a bond, optionally substituted alkylene, optionally substituted heteroalkylene, optionally substituted alkenylene, optionally substituted alkynylene, optionally substituted carbocyclylene, optionally substituted heterocyclylene, optionally substituted arylene, optionally substituted heteroarylene, and combinations thereof. In certain embodiments, $L^D$ is optionally substituted alkylene, optionally substituted heteroalkylene, optionally substituted heteroarylene, or optionally substituted heteroarylalkylene. In certain embodiments, $L^D$ is optionally substituted alkylene. In certain embodiments, $L^D$ is optionally substituted heteroalkylene. In certain embodiments, $L^D$ is optionally substituted heteroarylene. In certain embodiments, $L^D$ is unsubstituted alkylene. In certain embodiments, $L^D$ is unsubstituted heteroalkylene. In certain embodiments, $L^D$ is substituted heteroalkylene. In certain embodiments, $L^D$ is optionally substituted $C_{1-20}$ heteroalkylene. In certain embodiments, $L^D$ is optionally substituted $C_{1-10}$ heteroalkylene. In certain embodiments, $L^D$ is substituted $C_{1-10}$ heteroalkylene. In certain embodiments, $L^D$ is $C_{1-10}$ heteroalkylene substituted with at least one oxo (=O) group. In certain embodiments, $L^D$ is of the formula:

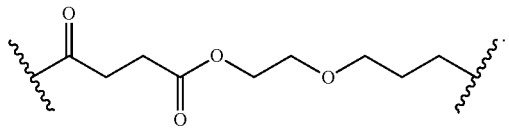

In certain embodiments, $L^D$ is of the formula:

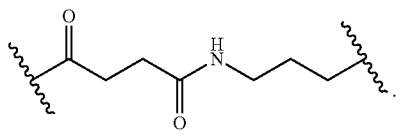

In certain embodiments, $L^D$ is unsubstituted heteroarylalkylene. In certain embodiments, $L^D$ is optionally substituted heteroarylalkylene. In certain embodiments. $L^D$ is an unsubstituted 5-membered heteroarylalkylene. In certain embodiments, $L^D$ comprises a triazole. In certain embodiments, $L^D$ comprises a group of the formula:

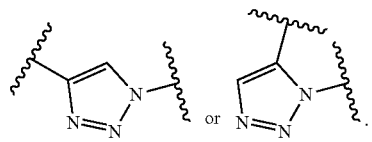 [SMILES: *c1cn(*)nn1 ; "or" ; *c1cnnn1* ; "."]

In certain embodiments, $L^D$ is of the formula:

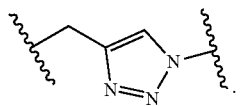

In certain embodiments, $L^2$ and $L^4$ are each independently optionally substituted alkylene or optionally substituted heteroalkylene; and $L^A$, $L^B$, $L^C$, and $L^D$ are each independently a bond, optionally substituted alkylene, optionally substituted heteroalkylene, optionally substituted heteroarylalkylene, or optionally substituted heteroarylene; wherein no more than one of $L^A$, $L^B$, $L^C$, and $L^D$ is a bond.

In certain embodiments, $L^2$ is optionally substituted alkylene; $L^4$ is optionally substituted heteroalkylene; $L^A$ is a bond; $L^B$ is optionally substituted heteroalkylene; $L^C$ is optionally substituted heteroalkylene; and $L^D$ is optionally substituted heteroarylalkylene.

In certain embodiments, $L^2$ is unsubstituted alkylene; $L^4$ is unsubstituted heteroalkylene; $L^A$ is a bond; $L^B$ is substituted heteroalkylene; $L^c$ is substituted heteroalkylene; and $L^D$ is unsubstituted heteroarylalkylene.

In certain embodiments, $L^2$ is of the formula:

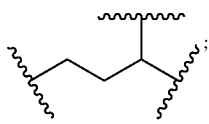 [SMILES: *CCC(*)* ; ";"]

$L^4$ is of the formula:

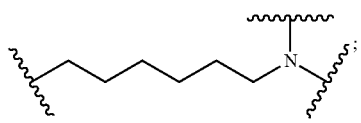

$L^A$ is a bond; $L^B$ is of the formula:

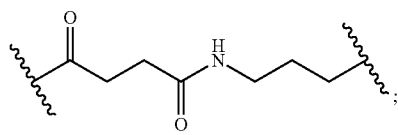 [SMILES: *CCCNC(=O)CCC(*)=O ; ";"]

$L^C$ is of the formula:

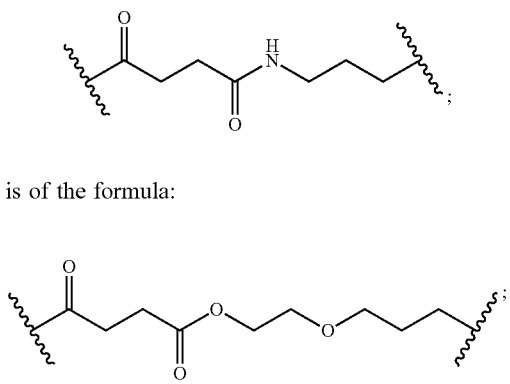

and $L^D$ is of the formula:

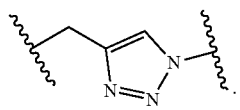

In certain embodiments, $L^2$ and $L^4$ are each independently optionally substituted alkylene or optionally substituted heteroalkylene; and $L^A$, $L^B$, $L^C$, and $L^D$ are each independently optionally substituted alkylene, optionally substituted heteroalkylene, optionally substituted heteroarylene, or optionally substituted heteroarylalkylene.

In certain embodiments, $L^2$ is optionally substituted heteroalkylene; $L^4$ is optionally substituted heteroalkylene; $L^A$ is optionally substituted heteroarylene; $L^B$ is optionally substituted heteroalkylene; $L^C$ is optionally substituted heteroalkylene; and $L^D$ is optionally substituted heteroarylalkylene.

In certain embodiments, $L^2$ is of the formula:

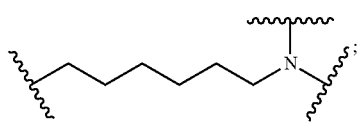

$L^A$ is of the formula:

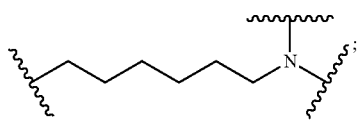 [SMILES: *CCCCCCN(*)* ; ";"]

$L^A$ is of the formula:

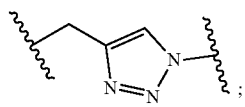 [SMILES: *Cc1cn(*)nn1]

$L^B$ is of the formula:

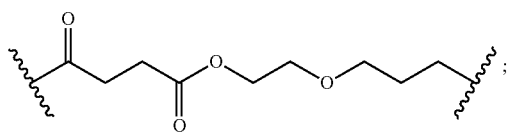 [SMILES: *CCCOCCOC(=O)CCC(*)=O]

$L^C$ of the formula:

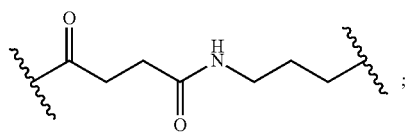 [SMILES: *CCCNC(=O)CCC(*)=O]

and $L^D$ is of the formula:

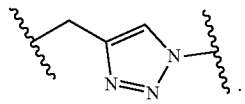 [SMILES: *Cc1cn(*)nn1]

In certain embodiments, n is an integer between 1 and 4000, inclusive. In certain embodiments, n is an integer between 5 and 4000, inclusive. In certain embodiments, n is an integer is between 50 and 4000, inclusive. In certain embodiments, n is an integer between 100 and 4000, inclusive. In certain embodiments, n is an integer between 1000 and 4000, inclusive. In certain embodiments, n is an integer between 2000 and 4000, inclusive. In certain embodiments, n is an integer between 2 and 4000, inclusive. In certain embodiments, n is an integer between 2 and 2000, inclusive. In certain embodiments, n is an integer between 2 and 1000, inclusive. In certain embodiments, n is an integer between 10 and 1000, inclusive. In certain embodiments, n is an integer between 2 and 100, inclusive. In certain embodiments, n is an integer between 10 and 100, inclusive. In certain embodiments, n is an integer between 10 and 50, inclusive. In certain embodiments, n is an integer between 25 and 50, inclusive. In certain embodiments, n is an integer between 25 and 100, inclusive. In certain embodiments, n is about 10, about 25, about 50, or about 100. In certain embodiments, the average of n is about 10, about 25, about 50, or about 100. In certain embodiments, the average of n is about 25 or about 50. In certain embodiments, the average of n is about 10. In certain embodiments, the average of n is about 25. In certain embodiments, the average of n is about 50. In certain embodiments, the average of n is about 100. In certain embodiments, n is the same as the degree of polymerization of the polymer.

In certain embodiments, m is an integer between 1 and 4000, inclusive. In certain embodiments, m is an integer between 5 and 4000, inclusive. In certain embodiments, m is an integer is between 50 and 4000, inclusive. In certain embodiments, m is an integer between 100 and 4000, inclusive. In certain embodiments, m is an integer between 1000 and 4000, inclusive. In certain embodiments, n is an integer between 2000 and 4000, inclusive. In certain embodiments, m is an integer between 2 and 4000, inclusive. In certain embodiments, m is an integer between 2 and 2000, inclusive. In certain embodiments, m is an integer between 2 and 100, inclusive. In certain embodiments, m is an integer between 10 and 1000, inclusive. In certain embodiments, m is an integer between 2 and 100, inclusive. In certain embodiments, m is an integer between 10 and 100, inclusive. In certain embodiments, m is an integer between 10 and 50, inclusive. In certain embodiments, m is an integer between 25 and 50, inclusive. In certain embodiments, m is an integer between 25 and 100, inclusive. In certain embodiments, m is about 10, about 25, about 50, or about 100. In certain embodiments, the average of m is about 10, about 25, about 50, or about 100. In certain embodiments, the average of m is about 25 or about 50. In certain embodiments, the average of m is about 10. In certain embodiments, the average of m is about 25. In certain embodiments, the average of m is about 50. In certain embodiments, the average of m is about 100. In certain embodiments, m is the same as the degree of polymerization of the polymer.

In certain embodiments, each of $T^1$ and $T^2$ is independently a terminal group selected from the group consisting of hydrogen, halogen, optionally substituted alkyl, optionally substituted alkenyl, optionally substituted alkynyl, optionally substituted carbocyclyl, optionally substituted heterocyclyl, optionally substituted aryl, optionally substituted heteroaryl, optionally substituted acyl, optionally substituted hydroxyl, optionally substituted amino, and optionally substituted thiol. In certain embodiments, $T^1$ is hydrogen. In certain embodiments, $T^1$ is halogen. In certain embodiments, $T^1$ is optionally substituted alkyl. In certain embodiments, $T^1$ is optionally substituted alkenyl. In certain embodiments, $T^1$ is optionally substituted alkynyl. In certain embodiments, $T^1$ is optionally substituted carbocyclyl. In certain embodiments, $T^1$ is optionally substituted heterocyclyl. In certain embodiments, $T^1$ is optionally substituted aryl. In certain embodiments, $T^1$ is optionally substituted heteroaryl. In certain embodiments, $T^1$ is optionally substituted acyl. In certain embodiments, $T^1$ is optionally substituted hydroxyl. In certain embodiments, $T^1$ is optionally substituted amino. In certain embodiments, $T^1$ is optionally substituted thiol. In certain embodiments. $T^2$ is hydrogen. In certain embodiments. $T^2$ is halogen. In certain embodiments, $T^2$ is optionally substituted alkyl. In certain embodiments, $T^2$ is optionally substituted alkenyl. In certain embodiments, $T^2$ is optionally substituted alkynyl. In certain embodiments, $T^2$ is optionally substituted carbocyclyl. In certain embodiments, $T^2$ is optionally substituted heterocyclyl. In certain embodiments, $T^2$ is optionally substituted aryl. In certain embodiments, $T^2$ is optionally substituted heteroaryl. In certain embodiments, $T^2$ is optionally substituted acyl. In certain embodiments, $T^2$ is optionally substituted hydroxyl. In certain embodiments, $T^2$ is optionally substituted amino.

In certain embodiments, T² is optionally substituted thiol. In certain embodiments, both T¹ and T² are hydrogen.

In certain embodiments, T¹ is optionally substituted aryl, and T² is hydrogen. In certain embodiments, T¹ is phenyl, and T² is hydrogen. In certain embodiments, T² is optionally substituted aryl, and T¹ is hydrogen. In certain embodiments, T² is phenyl, and T¹ is hydrogen.

At least one of A, B, C, or D is a polysiloxane. In certain embodiments, the polysiloxane is of the formula:

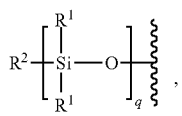

wherein:
R¹ is optionally substituted alkyl, optionally substituted alkenyl, optionally substituted aryl, or optionally substituted alkoxy;
R² is optionally substituted alkyl, optionally substituted alkenyl, optionally substituted aryl, or optionally substituted alkoxy; and
q is an integer between 5 and 2000, inclusive.

In certain embodiments, R¹ is optionally substituted alkyl. In certain embodiments, R¹ is optionally substituted $C_{1-6}$ alkyl. In certain embodiments, R¹ is unsubstituted $C_{1-6}$ alkyl. In certain embodiments, R¹ is selected from the group consisting of methyl, ethyl, n-propyl, iso-propyl, n-butyl, sec-butyl, iso-butyl, and tert-butyl. In certain embodiments, R¹ is methyl.

In certain embodiments, R² is optionally substituted alkyl. In certain embodiments, R² is optionally substituted $C_{1-20}$ alkyl. In certain embodiments, R² is unsubstituted $C_{1-20}$ alkyl. In certain embodiments, R² is optionally substituted $C_1$, alkyl. In certain embodiments, R² is unsubstituted $C_{1-6}$ alkyl. In certain embodiments, R² is selected from the group consisting of methyl, ethyl, n-propyl, iso-propyl, n-butyl, sec-butyl, iso-butyl, and tert-butyl. In certain embodiments, R² is n-butyl.

In certain embodiments, q is an integer between 5 and 500, inclusive. In certain embodiments, q is an integer between 5 and 100, inclusive. In certain embodiments, q is an integer between 10 and 100, inclusive. In certain embodiments, q is an integer between 30 and 80, inclusive. In certain embodiments, q is an integer between 50 and 80, inclusive. In certain embodiments, q is an integer between 60 and 70, inclusive.

In certain embodiments, R¹ is optionally substituted $C_{1-6}$ alkyl; R² is optionally substituted $C_{1-6}$ alkyl; and q is an integer between 10 and 100, inclusive. In certain embodiments, R¹ is unsubstituted $C_{1-6}$ alkyl; R² is unsubstituted $C_{1-6}$ alkyl; and q is an integer between 10 and 100, inclusive. In certain embodiments, R¹ is methyl; R² is n-butyl; and q is an integer between 50 and 100, inclusive.

In certain embodiments, R¹ is $C_{1-6}$ alkyl, and the polysiloxane has a number average molecular weight of about 2,000 Da to about 20,000 Da, about 2,000 Da to about 10,000 Da, about 2,000 Da to about 6,000 Da, or about 4,000 Da to about 6,000 Da. or about 4,500 Da to about 5,500 Da.

In certain embodiments, the polysiloxane is polydimethylsiloxane (PDMS) having a number average molecular weight of about 2,000 Da to about 20,000 Da, about 2,000 Da to about 10,000 Da, about 2,000 Da to about 6,000 Da, about 4,000 Da to about 6,000 Da, or about 4,500 Da to about 5,500 Da.

In certain embodiments, one of A, B, C, or D is a polysiloxane and the remaining are selected from the group consisting of a polyether, a polyester, a polyacrylamide, a polyacrylate, or a vinyl polymer. The polyacrylate may be any polyester described herein. The polyester may be any polyester described herein. The polyether may be any polyether described herein. The polyacrylamide may be any polyacrylamide described herein. Additionally, the vinyl polymer may be any vinyl polymer described herein.

In certain embodiments, A, B, C, or D is a polyester. In certain embodiments, A, B, C, or D is a polyester selected from the group consisting of polyglycolic acid (PGA), polylactic acid (PLA), poly(lactic-co-glycolic acid) (PLGA), polycaprolactone (PCL), polyhydroxyalkanoate (PHA), polyhydroxybutryate (PHB), polyethylene adipate (PEA), polybutylene succinate (PBS), and poly(3-hydroxybutyrate-co-3-hydroxyvalerate) (PHBV). In certain embodiments, A, B, C, or D is polylactic acid (PLA). In certain embodiments, A, B, C, or D is a vinyl polymer. In certain embodiments, A, B, C, or D is a vinyl polymer selected from the group consisting of polystyrene, polyvinyl chloride, polyethylene, polypropylene, polybutadiene, polyvinyl acetate, polyvinyl alcohol, and polyacrylonitrile. In certain embodiments, A, B, C, or D is polystyrene. In certain embodiments, B is a polyacrylate. In certain embodiments, A, B, C, or D is a polyacrylate selected from the group consisting of poly(methyl methacrylate), poly(methyl acrylate), poly(methacrylate), poly(hydroxyethyl methacrylate), poly(n-butyl acrylate), and poly(tert-butyl acrylate). In certain embodiments, A, B, C, or D is poly(tert-butyl acrylate).

In certain embodiments, A, B, C, or D is a vinyl polymer of the following formula

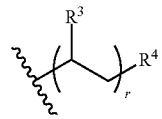

wherein:
R³ is optionally substituted alkyl, halogen, hydrogen, cyano, OR$^a$, optionally substituted alkenyl, optionally substituted alkynyl, optionally substituted aryl, or optionally substituted heteroaryl;
R⁴ is optionally substituted alkyl, optionally substituted alkenyl, optionally substituted alkynyl, optionally substituted aryl, or optionally substituted heteroaryl;
R$^a$ is hydrogen, optionally substituted alkyl, optionally substituted alkenyl, optionally substituted alkynyl, optionally substituted aryl, or optionally substituted heteroaryl; and
r is an integer between 5 and 2000, inclusive.

In certain embodiments, R³ is hydrogen. In certain embodiments, R³ is optionally substituted alkyl. In certain embodiments, R³ is optionally substituted alkenyl. In certain embodiments, R³ is optionally substituted alkynyl. In certain embodiments, R³ is optionally substituted aryl. In certain embodiments, R³ is optionally substituted heteroaryl. In certain embodiments, R³ is cyano. In certain embodiments, R³ is halogen. In certain embodiments, R³ is OR$^a$, wherein R$^a$ is hydrogen or optionally substituted alkyl. In certain embodiments, R³ is optionally substituted phenyl. In certain embodiments, R³ is unsubstituted phenyl.

In certain embodiments. R⁴ is optionally substituted alkyl. In certain embodiments, R⁴ is optionally substituted alkenyl. In certain embodiments, R⁴ is optionally substituted alkynyl.

In certain embodiments, $R^4$ is optionally substituted aryl. In certain embodiments, $R^4$ is optionally substituted heteroaryl. In certain embodiments, $R^4$ is optionally substituted $C_{1-6}$ alkyl. In certain embodiments. $R^4$ is unsubstituted $C_{1-6}$ alkyl. In certain embodiments, $R^4$ is $C_{1-6}$ alkyl substituted with an ester group.

In certain embodiments, r is an integer between 5 and 500, inclusive. In certain embodiments, r is an integer between 5 and 100, inclusive. In certain embodiments, r is an integer between 10 and 100, inclusive. In certain embodiments, r is an integer between 10 and 50, inclusive. In certain embodiments, r is an integer between 20 and 40, inclusive. In certain embodiments, r is an integer between 30 and 40, inclusive.

In certain embodiments, $R^3$ is optionally substituted aryl; $R^4$ is optionally substituted $C_{1-6}$ alkyl; and r is an integer between 10 and 100, inclusive. In certain embodiments, $R^3$ is unsubstituted aryl; $R^4$ is substituted $C_{1-6}$ alkyl; and r is an integer between 10 and 50, inclusive. In certain embodiments, $R^3$ is unsubstituted phenyl; $R^4$ is substituted $C_{1-6}$ alkyl; and r is an integer between 10 and 50, inclusive.

In certain embodiments, the vinyl polymer is polystyrene. In certain embodiments, the vinyl polymer is polystyrene having a number average molecular weight of about 2,000 Da to about 20,000 Da, about 10.000 Da to about 15,000 Da, about 2,000 Da to about 10.000 Da, about 7,000 Da to about 10,000 Da, about 8,000 Da to about 9,500 Da, about 2,000 Da to about 7,000 Da, about 2,000 Da to about 4,000 Da, about 2,000 Da to about 3,000 Da, or about 2,500 Da to about 3,600 Da.

In certain embodiments, A, B, C, or D is a polyacrylate of the following formula:

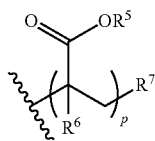

wherein:
$R^5$ is optionally substituted alkyl, hydrogen, optionally substituted alkenyl, optionally substituted alkynyl, optionally substituted aryl, or optionally substituted heteroaryl;

$R^6$ is optionally substituted alkyl, hydrogen, optionally substituted alkenyl, optionally substituted alkynyl, optionally substituted aryl, or optionally substituted heteroaryl;

$R^7$ is optionally substituted alkyl, optionally substituted alkenyl, optionally substituted alkynyl, optionally substituted aryl, or optionally substituted heteroaryl; and p is an integer between 5 and 2000, inclusive.

In certain embodiments, $R^5$ is hydrogen. In certain embodiments, $R^5$ is optionally substituted alkyl. In certain embodiments, $R^5$ is optionally substituted alkenyl. In certain embodiments, $R^5$ is optionally substituted alkynyl. In certain embodiments, $R^5$ is optionally substituted aryl. In certain embodiments, $R^5$ is optionally substituted heteroaryl. In certain embodiments. $R^5$ is optionally substituted alkyl. In certain embodiments, $R^5$ is optionally substituted $C_{1-6}$ alkyl. In certain embodiments, $R^5$ is unsubstituted $C_{1-6}$ alkyl. In certain embodiments, $R^5$ is selected from the group consisting of methyl, ethyl, n-propyl, iso-propyl, n-butyl, sec-butyl, iso-butyl, and tert-butyl. In certain embodiments, $R^5$ is tert-butyl.

In certain embodiments, $R^6$ is optionally substituted alkyl. In certain embodiments, $R^6$ is hydrogen. In certain embodiments, $R^6$ is optionally substituted alkenyl. In certain embodiments, $R^6$ is optionally substituted alkynyl. In certain embodiments, $R^6$ is optionally substituted aryl. In certain embodiments, $R^6$ is optionally substituted heteroaryl. In certain embodiments. $R^6$ is optionally substituted $C_{1-6}$ alkyl. In certain embodiments, $R^6$ is unsubstituted $C_{1-6}$ alkyl. In certain embodiments, $R^6$ is methyl.

In certain embodiments, $R^7$ is optionally substituted alkyl. In certain embodiments, $R^7$ is optionally substituted alkenyl. In certain embodiments, $R^7$ is optionally substituted alkynyl. In certain embodiments. $R^7$ is optionally substituted aryl. In certain embodiments, $R^7$ is optionally substituted heteroaryl. In certain embodiments, $R^7$ is optionally substituted $C_{1-6}$ alkyl. In certain embodiments, $R^7$ is unsubstituted $C_{1-6}$ alkyl. In certain embodiments, $R^7$ is $C_{1-6}$ alkyl substituted with an ester group.

In certain embodiments, p is an integer between 5 and 500, inclusive. In certain embodiments, p is an integer between 5 and 100, inclusive. In certain embodiments, p is an integer between 10 and 100, inclusive. In certain embodiments, p is an integer between 10 and 50, inclusive. In certain embodiments, p is an integer between 20 and 40, inclusive. In certain embodiments, p is an integer between 25 and 35, inclusive.

In certain embodiments, $R^5$ is optionally substituted alkyl; $R^6$ is hydrogen; $R^7$ is optionally substituted $C_{1-6}$ alkyl; and p is an integer between 10 and 100, inclusive. In certain embodiments, $R^5$ is optionally substituted $C_{1-6}$ alkyl; $R^6$ is hydrogen; $R^7$ is substituted $C_{1-6}$ alkyl; and p is an integer between 10 and 50, inclusive. In certain embodiments, $R^5$ is tert-butyl; $R^6$ is hydrogen; $R^4$ is substituted $C_{1-6}$ alkyl; and p is an integer between 20 and 40, inclusive.

In certain embodiments, the vinyl polymer is polystyrene. In certain embodiments, the vinyl polymer is polystyrene having a number average molecular weight of about 2,000 Da to about 20.000 Da, about 10,000 Da to about 15,000 Da, about 2,000 Da to about 10,000 Da, about 7,000 Da to about 10,000 Da, about 8,000 Da to about 9,500 Da, about 2,000 Da to about 7,000 Da, about 2,000 Da to about 4,000 Da, about 2,000 Da to about 3,000 Da, or about 2,500 Da to about 3,600 Da.

In certain embodiments, A, B, C, or D is a polyester of the following formula:

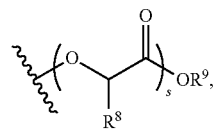

wherein:
$R^8$ is hydrogen, optionally substituted alkyl, optionally substituted alkenyl, optionally substituted alkynyl, optionally substituted aryl, optionally substituted heteroaryl, optionally substituted carbocyclyl, optionally substituted heterocyclyl, or optionally substituted acyl;

$R^9$ is hydrogen, optionally substituted alkyl, optionally substituted alkenyl, optionally substituted alkynyl, optionally substituted aryl, optionally substituted heteroaryl, optionally substituted carbocyclyl, optionally substituted heterocyclyl, optionally substituted acyl, or an oxygen protecting group; and s is an integer between 5 and 2000, inclusive.

In certain embodiments, $R^8$ is hydrogen, optionally substituted alkyl, optionally substituted alkenyl, optionally substituted alkynyl, optionally substituted aryl, optionally substituted heteroaryl, optionally substituted carbocyclyl, optionally substituted heterocyclyl, or optionally substituted acyl. In certain embodiments, $R^8$ is hydrogen. In certain embodiments, $R^8$ is optionally substituted alkyl. In certain embodiments, $R^8$ is optionally substituted alkenyl. In certain embodiments, $R^8$ is optionally substituted alkynyl. In certain embodiments, $R^8$ is optionally substituted aryl. In certain embodiments, $R^8$ is optionally substituted heteroaryl In certain embodiments, $R^8$ is optionally substituted carbocyclyl. In certain embodiments. $R^8$ is optionally substituted heterocyclyl. In certain embodiments, $R^8$ is optionally substituted acyl. In certain embodiments, $R^8$ is optionally substituted $C_{1-6}$ alkyl. In certain embodiments, $R^8$ is unsubstituted $C_{1-6}$ alkyl. In certain embodiments, $R^8$ is optionally substituted $C_{1-3}$ alkyl. In certain embodiments, $R^8$ is unsubstituted $C_{1-3}$ alkyl. In certain embodiments, $R^8$ is selected from the group consisting of methyl, ethyl, n-propyl, iso-propyl, n-butyl, sec-butyl, iso-butyl, and tert-butyl. In certain embodiments, $R^8$ is methyl.

In certain embodiments, $R^9$ hydrogen, optionally substituted alkyl, optionally substituted alkenyl, optionally substituted alkynyl, optionally substituted aryl, optionally substituted heteroaryl, optionally substituted carbocyclyl, optionally substituted heterocyclyl, optionally substituted acyl, or an oxygen protecting group. In certain embodiments. $R^9$ is hydrogen. In certain embodiments, $R^9$ is optionally substituted alkyl. In certain embodiments, $R^9$ is optionally substituted $C_{1-6}$ alkyl. In certain embodiments, $R^9$ is unsubstituted $C_{1-6}$ alkyl. In certain embodiments, $R^9$ is selected from the group consisting of methyl, ethyl, n-propyl, iso-propyl, n-butyl, sec-butyl, iso-butyl, and tert-butyl. In certain embodiments, $R^9$ is optionally substituted alkenyl. In certain embodiments, $R^9$ is optionally substituted alkynyl. In certain embodiments, $R^9$ is optionally substituted aryl. In certain embodiments, $R^9$ is optionally substituted heteroaryl. In certain embodiments, $R^9$ is optionally substituted carbocyclyl. In certain embodiments, $R^9$ is optionally substituted heterocyclyl. In certain embodiments, $R^9$ is optionally substituted acyl. In certain embodiments, $R^9$ is an oxygen protecting group.

In certain embodiments, s is an integer between 5 and 2000, inclusive. In certain embodiments, s is an integer between 5 and 1000, inclusive. In certain embodiments, s is an integer between 5 and 500, inclusive. In certain embodiments, s is an integer between 5 and 200, inclusive. In certain embodiments, s is an integer between 5 and 100, inclusive.

In certain embodiments, A, B, C, or D is a polyether of the following formula:

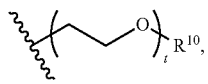

wherein:
$R^{10}$ is hydrogen, optionally substituted alkyl, optionally substituted alkenyl, optionally substituted alkynyl, optionally substituted aryl, optionally substituted heteroaryl, optionally substituted carbocyclyl, optionally substituted heterocyclyl, optionally substituted acyl, or an oxygen protecting group; and
t is an integer between 5 and 2000, inclusive.

As generally defined herein, t is an integer between 5 and 200), inclusive. In certain embodiments, t is an integer between 5 and 1000, inclusive. In certain embodiments, t is an integer between 5 and 500, inclusive. In certain embodiments, t is an integer between 5 and 200, inclusive. In certain embodiments, t is an integer between 5 and 100, inclusive.

In certain embodiments, A, B, C. or D is a polyacrylamide group of the following formula:

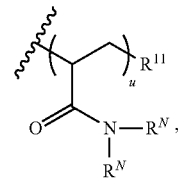

wherein:
each instance of $R^N$ is independently hydrogen, optionally substituted alkyl, optionally substituted alkenyl, optionally substituted alkynyl, optionally substituted carbocyclyl, optionally substituted heterocyclyl, optionally substituted aryl, optionally substituted heteroaryl, or a nitrogen protecting group; or optionally two $R^N$ on the same nitrogen atom are taken together with the intervening atoms to form optionally substituted heterocyclyl or optionally substituted heteroaryl;

$R^{11}$ is hydrogen, halogen, —CN, optionally substituted alkyl, optionally substituted alkenyl, optionally substituted alkynyl, optionally substituted aryl, optionally substituted heteroaryl, optionally substituted carbocyclyl, optionally substituted heterocyclyl, optionally substituted acyl, optionally substituted amino, optionally substituted hydroxyl, or optionally substituted thiol; and u is an integer between 5 and 2000, inclusive.

In certain embodiments, each instance of $R^N$ is independently hydrogen, optionally substituted alkyl, optionally substituted alkenyl, optionally substituted alkynyl, optionally substituted carbocyclyl, optionally substituted heterocyclyl, optionally substituted aryl, optionally substituted heteroaryl, or a nitrogen protecting group; or optionally two $R^N$ on the same nitrogen atom are taken together with the intervening atoms to form optionally substituted heterocyclyl or optionally substituted heteroaryl. In certain embodiments, $R^N$ is hydrogen. In certain embodiments, $R^N$ is optionally substituted alkyl. In certain embodiments, $R^N$ is optionally substituted alkenyl. In certain embodiments, $R^N$ is optionally substituted alkynyl. In certain embodiments, $R^N$ is optionally substituted carbocyclyl. In certain embodiments, $R^N$ is optionally substituted heterocyclyl. In certain embodiments, $R^N$ is optionally substituted aryl. In certain embodiments, $R^N$ is optionally substituted heteroaryl. In certain embodiments, $R^N$ is or a nitrogen protecting group. In certain embodiments, $R^N$ on the same nitrogen atom are taken together with the intervening atoms to form optionally substituted heterocyclyl or optionally substituted heteroaryl. In certain embodiments. $R^N$ is optionally substituted $C_{1-6}$ alkyl. In certain embodiments, $R^N$ is unsubstituted $C_{1-6}$ alkyl. In certain embodiments, $R^N$ is optionally substituted $C_{1-3}$ alkyl. In certain embodiments, $R^N$ is unsubstituted $C_{1-3}$ alkyl. In certain embodiments, $R^N$ is selected from the group consisting of methyl, ethyl, n-propyl, iso-propyl, n-butyl, sec-butyl, iso-butyl, and tert-butyl. In certain embodiments, $R^N$ is iso-propyl.

In certain embodiments. $R^{11}$ is hydrogen, halogen, —CN, optionally substituted alkyl, optionally substituted alkenyl, optionally substituted alkynyl, optionally substituted aryl, optionally substituted heteroaryl, optionally substituted carbocyclyl, optionally substituted heterocyclyl, optionally substituted acyl, optionally substituted amino, optionally substituted hydroxyl, or optionally substituted thiol. In certain embodiments, $R^{11}$ is hydrogen. In certain embodiments, $R^{11}$ is halogen. In certain embodiments, $R^{11}$ is —CN. In certain embodiments, $R^{11}$ is optionally substituted alkyl. In certain embodiments, $R^{11}$ is optionally substituted alkenyl. In certain embodiments, $R^{11}$ is optionally substituted alkynyl. In certain embodiments, $R^{11}$ is optionally substituted aryl. In certain embodiments, $R^{11}$ is optionally substituted heteroaryl. In certain embodiments, $R^{11}$ is optionally substituted carbocyclyl. In certain embodiments, $R^{11}$ is optionally substituted heterocyclyl. In certain embodiments, $R^{11}$ is optionally substituted acyl. In certain embodiments, $R^{11}$ is optionally substituted amino. In certain embodiments, $R^C$ is optionally substituted hydroxyl. In certain embodiments, $R^{11}$ is optionally substituted thiol. In certain embodiments, $R^{11}$ is optionally substituted $C_{1-6}$ alkyl. In certain embodiments, $R^{11}$ is substituted $C_{1-6}$ alkyl. In certain embodiments, $R^{11}$ is optionally substituted $C_{1-3}$ alkyl. In certain embodiments, $R^{11}$ is substituted $C_{1-3}$ alkyl. In certain embodiments, $R^{11}$ is of the formula:

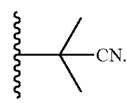

In certain embodiments, u is an integer between 5 and 2000, inclusive. In certain embodiments, u is an integer between 5 and 1000, inclusive. In certain embodiments, u is an integer between 5 and 500, inclusive. In certain embodiments, u is an integer between 5 and 200, inclusive. In certain embodiments, u is an integer between 5 and 100, inclusive.

In certain embodiments, one of A, B, C, or D is hydrogen; and one of the remaining is a polysiloxane. In certain embodiments, A is hydrogen; and one of B, C, or D is a polysiloxane. In certain embodiments, A is hydrogen; B is a polysiloxane; and C and D are independently selected from the group consisting of a polyether, a polyester, a polyacrylamide, a polyacrylate, and a vinyl polymer. In certain embodiments, A is hydrogen; B is a polysiloxane; C and D are independently selected from the group consisting of a polyester, a polyacrylate, and a vinyl polymer. In certain embodiments, A is hydrogen; B is a polysiloxane; C is a polyester; and D is a vinyl polymer. In certain embodiments, A is hydrogen; B is a polydimethylsiloxane; C is poly(lactic acid); and D is polystyrene.

In certain embodiments, one of A, B, C, or D is polysiloxane; and the remaining are independently selected from the group consisting of a polyether, a polyester, a polyacrylamide, a polyacrylate, and a vinyl polymer. In certain embodiments, B is a polysiloxane; and A, C, and D are independently selected from the group consisting of a polyester, a polyacrylate, and a vinyl polymer. In certain embodiments, A is a polyacrylate; B is a polysiloxane; C is a polyester; and D is a vinyl polymer. In certain embodiments, A is poly(tert-butylacrylate); B is polydimethylsiloxane; C is poly(lactic acid); and D is polystyrene.

In certain embodiments, the diblock bottlebrush copolymer is of Formula (II-a):

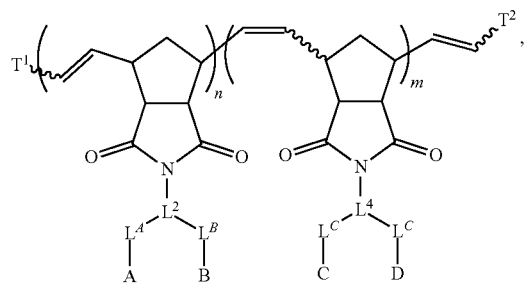

(II-a)

or salts thereof, wherein each of $T^1$, $T^2$, $L^2$, $L^4$, $L^A$, $L^B$, $L^C$, $L^D$, A, B, C, D, n, and m are as defined in any of the embodiments of Formula (II).

In certain embodiments, the diblock bottlebrush copolymer is of Formula (II-b):

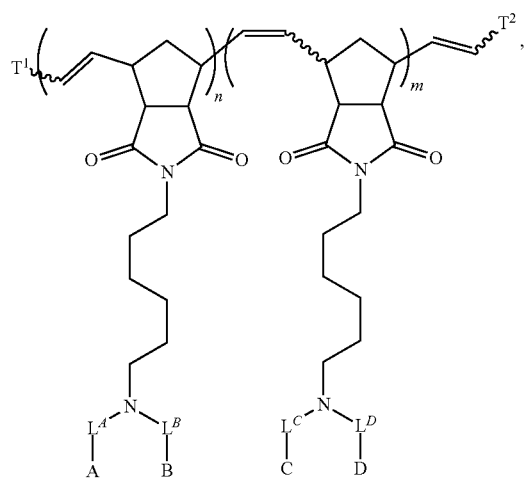

(II-b)

or salts thereof, wherein each of $T^1$, $T^2$, $L^A$, $L^B$, $L^C$, $L^D$, A, B, C, D, n, and m are as defined in any of the embodiments of Formula (II).

In certain embodiments, the diblock bottlebrush copolymer is of Formula (II-c):

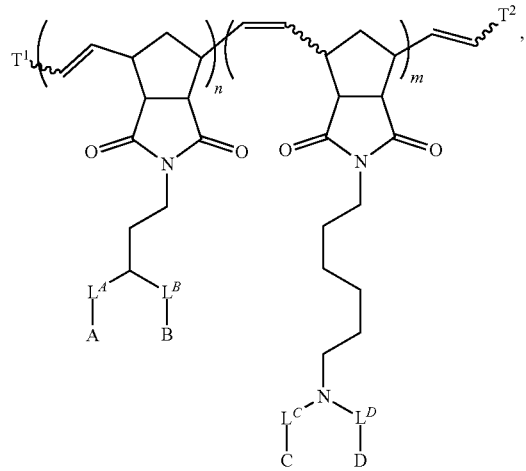

(II-c)

or salts thereof, wherein each of $T^1$, $T^2$, $L^A$, $L^B$, $L^C$, $L^D$, A, B, C, D, n, and m are as defined in any of the embodiments of Formula (II).

In certain embodiments, the diblock bottlebrush copolymer of Formula (II) is of Formula (II-d):

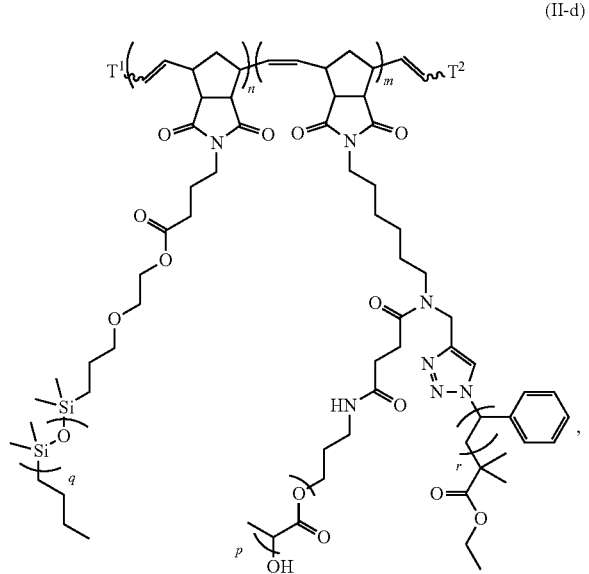

(II-d)

or salts thereof, wherein:
each of $T^1$ and $T^2$ is independently hydrogen or phenyl:
n is an integer between 10 and 100, inclusive;
m is an integer between 10 and 100, inclusive;
q is an integer between 50 and 100, inclusive;
p is an integer between 30 and 70, inclusive; and
r is an integer between 10 and 50, inclusive.

In certain embodiments, the bottlebrush polymer of Formula (II) is of Formula (I-c):

or salts thereof, wherein:
each of $T^1$ and $T^2$ is independently hydrogen or phenyl;
n is an integer between 10 and 100, inclusive;
m is an integer between 10 and 100, inclusive;
p is an integer between 10 and 50, inclusive;
q is an integer between 50 and 100, inclusive;
s is an integer between 30 and 70, inclusive; and
r is an integer between 10 and 50, inclusive.

The properties of a diblock bottlebrush copolymer described herein may be dependent upon the ratio of Block A to Block B in the copolymer. In certain embodiments, the ratio of Block A to Block B repeating backbone units in the diblock bottlebrush copolymer is about 1:1, about 3:2, about 4:3, about 5:4, about 6:4, about 7:3, about 4:1, or about 9:1.

As described herein, in certain embodiments, a diblock bottlebrush copolymer of the present invention has a bottlebrush, comb, or graft-copolymer structure. In certain embodiments, the copolymer has a bottlebrush structure. In certain embodiments, the copolymer has a comb structure. In certain embodiments, the copolymer has a graft-copolymer structure. A diblock bottlebrush copolymer described herein may self-assemble to form any type of polymer network or nanostructure. In certain embodiments, a diblock bottlebrush copolymer described herein self-assembles to form a spherical, lamellar, cylindrical, ellipsoidal, polyhedral, hexagonal cylindrical, or gyroid shape.

In certain embodiments, the diblock bottlebrush copolymer described herein self-assembles to form a structure with a hexagonal cylindrical morphology. In certain embodiments, the diblock bottlebrush copolymer described herein self-assembles to form a structure with a gyroid morphology. In certain embodiments, the diblock bottlebrush copolymer described herein self-assembles to form a spherical morphology. In certain embodiments, the diblock bottlebrush copolymer described herein self-assembles to form a lamellar morphology. In certain embodiments, the diblock bottlebrush copolymer described herein self-assembles to form an (II-e)

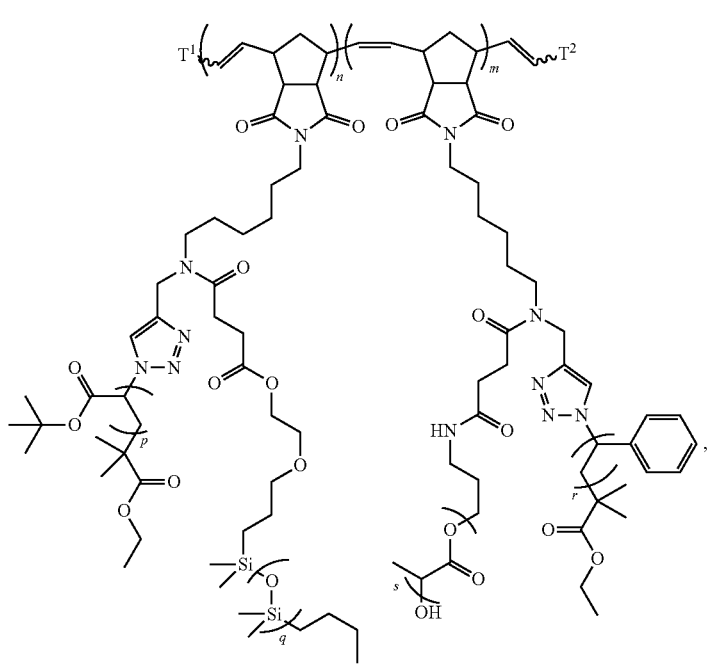

ellipsoidal morphology. In certain embodiments, the diblock bottlebrush copolymer described herein self-assembles to form a polyhedral morphology.

Diblock bottlebrush copolymers described herein may comprise one or more additional blocks (e.g., to form a triblock bottlebrush copolymer in the case of one additional block).

Methods for Preparing Bottlebrush Polymers and Diblock Bottlebrush Copolymers

In one aspect, the present invention provides methods for preparing the bottlebrush polymers and copolymers described herein. The methods comprise forming the polymers and copolymers via a polymerization reaction or series of subsequent polymerization reactions, and any polymerization reactions known in the art may be employed. Examples of polymerization reactions include, but are not limited to, free-radical polymerization, cationic polymerization, anionic polymerization, and olefin metathesis polymerization (e.g., ring-opening metathesis polymerization (abbreviated "ROMP")).

A method of preparing a bottlebrush polymer or diblock bottlebrush copolymer described herein may comprise two or more sequential polymerization steps. For instance, a first macromonomer may be polymerized to form a homopolymer or copolymer. Then, the homopolymer or copolymer can be polymerized with itself to form a bottlebrush polymer, or it can be polymerized with a second macromonomer to form a diblock copolymer.

Provided herein is a method of producing a bottlebrush polymer described herein, the method comprising the steps of:

(a) providing a first macromonomer comprising one or more polymeric sidechains and one or more reactive moieties;

(b) reacting the macromonomer provided in step (a) under conditions suitable to effect a polymerization reaction and yield a bottlebrush polymer;

In certain embodiments, the method of preparing a bottlebrush polymer described herein comprises one or more olefin metathesis polymerization steps (e.g., step (b)). In certain embodiments, the method of preparing a bottlebrush polymer described herein comprises one or more ROMP steps (e.g., step (b)). Ring-opening metathesis polymerization (ROMP) is an olefin metathesis strategy for chain-growth polymerization that utilizes ring strain of cyclic olefins (e.g., norbornene or cyclopentane; or heterocyclic analogs thereof) to drive the polymerization reaction. For olefin metathesis polymerization, the one or more reactive moieties on the macromonomers are olefins. For ROMP reactions, the one or more reactive moieties are cyclic olefins (e.g., norbornene or cyclopentane; or heterocyclic analogs thereof).

Therefore, in certain embodiments, the method of producing a bottlebrush polymer described herein comprises steps of:

(a) providing a macromonomer comprising two polymeric sidechains (e.g., polymeric sidechains described herein) and one or more olefins (e.g., a cyclic olefin);

(b) reacting the macromonomer provided in step (a) under conditions suitable to effect a polymerization reaction and yield a bottlebrush polymer.

Also provided herein is a method of producing a diblock bottlebrush copolymer described herein, the method comprising the steps of:

(a) providing a first macromonomer comprising one or more polymeric sidechains and one or more reactive moieties;

(b) providing a second macromonomer comprising one or more polymeric sidechains and one or more reactive moieties;

(c) reacting the macromonomer provided in step (a) under conditions suitable to effect a polymerization reaction and yield a polymer;

(d) reacting the polymer in step (c) with the macromonomer provided in step (b) under conditions suitable to effect a polymerization reaction and yield a diblock bottlebrush copolymer.

In certain embodiments, the method of preparing a diblock bottlebrush copolymer described herein comprises one or more olefin metathesis polymerization steps (e.g., steps (c) and (d)). In certain embodiments, the method of preparing a diblock bottlebrush copolymer described herein comprises one or more ROMP steps (e.g., steps (c) and (d)). Ring-opening metathesis polymerization (ROMP) is a olefin metathesis strategy for chain-growth polymerization that utilizes ring strain of cyclic olefins (e.g., norbornene or cyclopentane; or heterocyclic analogs thereof) to drive the polymerization reaction. For olefin metathesis polymerization, the one or more reactive moieties on the macromonomers are olefins. For ROMP reactions, the one or more reactive moieties are cyclic olefins (e.g., norbornene or cyclopentane; or heterocyclic analogs thereof).

Therefore, in certain embodiments, the method of producing a diblock bottlebrush copolymer described herein comprises steps of:

(a) providing a first macromonomer comprising one or two polymeric sidechains (e.g., polymeric sidechains described herein) and one or more olefins (e.g., a cyclic olefin);

(b) providing a second macromonomer comprising two polymeric sidechains (e.g., polymeric sidechains described herein) and one or more olefins (e.g., a cyclic olefin);

(c) reacting the macromonomer provided in step (a) under conditions suitable to effect a polymerization reaction and yield a polymer;

(d) reacting the polymer in step (c) with the macromonomer provided in step (b) under conditions suitable to effect a polymerization reaction and yield a diblock bottlebrush copolymer.

A "macromonomer" is a monomer comprising one or more polymer groups (e.g., polymeric sidechains described herein) and a reactive moiety (e.g., an olefin such as a cyclic olefin). In general, a macromonomer is a polymer comprising a reactive group that allows it to act as a monomer in a polymerization reaction. In certain embodiments, the macromonomer contains two polymeric sidechains covalently linked through a branching linker. The reactive group may be anywhere on the polymer and may be at the end/terminus of the polymer chain. Macromonomers function as monomers in polymerization reactions and, after polymerization, are the repeating units in the larger diblock bottlebrush copolymer.

In certain embodiments, macromonomers for the preparation of bottlebrush polymers of the present disclosure are of the following formulae:

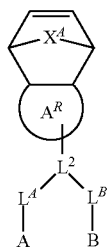

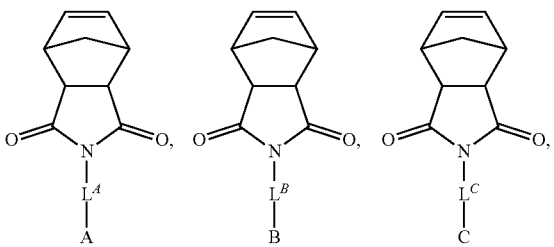

or salts thereof, wherein $X^A$, $A^R$, $L^2$. $L^A$, $L^B$, $L^C$, A, and B are as defined in embodiments of Formula (I). In the exemplary macromonomer shown above, the cyclic olefins represent reactive moieties and A and B represent polymeric sidechains.

In certain embodiments, the reactive moieties are cyclic olefins such as norbomene (or variants thereof). For example, in certain embodiments, macromonomers for the preparation of bottlebrush polymers of the present disclosure are of the following formulae:

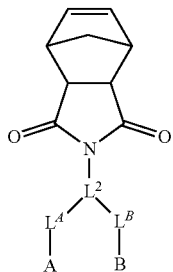

or salts thereof, wherein $L^2$, $L^A$, $L^B$, A, and B are as defined in embodiments of Formula (I). Further examples of macromonomers of the present disclosure are provided in the Examples below.

In certain embodiments, macromonomers for the preparation of diblock bottlebrush copolymers of the present disclosure are of the following formulae:

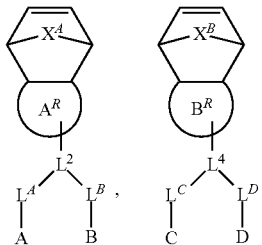

or salts thereof, wherein $X^A$, $X^B$, $A^R$, $B^R$, $L^2$, $L^4$. $L^A$, $L^B$, $L^C$, A, B, C, and D are as defined in embodiments of Formula (II). In the exemplary macromonomers shown above, the cyclic olefins represent reactive moieties and A, B, C, and D represent polymeric sidechains.

In certain embodiments, the reactive moieties are cyclic olefins such as norbomene (or variants thereof). For example, in certain embodiments, macromonomers of the present invention are of the following formulae:

or salts thereof, wherein $L^A$, $L^B$, $L^c$, A, B. and C are as defined in embodiments of Formula (II). Further examples of macromonomers of the present disclosure are provided in the Examples below.

In order to effect a polymerization reaction to form a bottlebrush polymer or diblock bottlebrush copolymer described herein, macromonomers are reacted in the presence of a polymerization initiator. In certain embodiments, when polymerization reaction is an olefin metathesis polymerization reaction (e.g. ROMP), the polymerization initiator is a catalyst or promoter of olefin metathesis. In certain embodiments, a ROMP polymerization involves reacting macromonomers in the presence of a ruthenium complex. In certain embodiments, the ruthenium complex is what is known in the art as a Grubbs or Grubbs-Hoveyda catalyst. Examples of commercially available ruthenium complexes useful in the polymerization reactions described herein can be found on the internet (See, e.g., www.sigmaaldrich.com/chemistry/chemical-synthesis/technology-spotlights/metathesis.html).

In certain embodiments, a ruthenium complex useful in a ROMP reaction described herein is of the following formula:

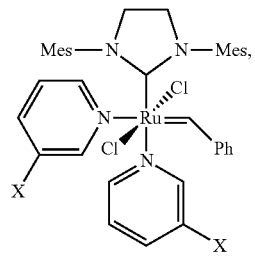

wherein X is a halogen (e.g., Br) or hydrogen.

For examples of olefin metathesis reagents, catalysts, and reaction conditions useful in the present methods, see, e.g., Schrodi, Y.; Pederson, R. L. *Aldrichimnica Acta* 2007, 40, 45; *Adv. Synth. Catal,* 2007, 349, 1-268; Grubbs, R. H. *Tetrahedron* 2004, 60, 7117; *Handbook of Metathesis*; Grubbs, R. H., Ed.; Wiley-VCH: Weinheim, 2003; Vols. 1-3: Trnka, T. M.; Grubbs, R. H. Acc. *Chem. Res.* 2001, 34, 18; Fürstner, A. *Angew. Chem., Int. Ed.* 2000, 39, 3012; Schuster, M.; Blechert. S. *Angew. Chem., Int. Ed.* 1997, 36, 2036; Ritter, T. et al. *Organometallics* 2006, 25, 5740; Chatterjee, A. K. et al. *J. Am. Chem. Soc.* 2000, 122, 3783; Chatterjee, A. K.; Grubbs, R. H. *Org. Lett.* 1999, 1, 1751; Murelli, R. P.; Snapper, M. L. *Org. Lett.* 2007, 9, 1749; Stewart, I. C. et al. *Org. Lett.* 2007, 9, 1589; Ung, T. et al. *Organometallics* 2004, 23, 5399; Benitez, D.; Goddard, W. A., III. *J. Am. Chem. Soc.* 2005, 127, 12218; Love, J. A. et al. *Angew. Chem., Int. Ed.* 2002, 41, 4035; Sanford, M. S. et al. *Organometallics* 2001, 20, 5314; Choi. T.-L.; Grubbs, R. H. *Angew. Chem.* 2003, 115, 1785; Ritter, T. et al. *Organome-*

*tallics* 2006, 25, 5740; and references cited therein; each of which is incorporated herein by reference.

Uses of the Bottlebrush Polymers and Copolymers

The bottlebrush polymers and diblock bottlebrush copolymers described herein may be useful in a variety of applications. For example, self-assembly of the bottlebrush polymers and copolymers can provide useful materials such as photonics (e.g., photonic crystals), functional materials, drug delivery systems, therapeutic vehicles, chromatography media, stimuli-responsive materials, lubricants, nanolithography, films, and coatings.

In certain embodiments, the bottlebrush polymers are capable of self assembling into materials useful for nanofiltration. In particular, bottlebrush polymers that self assemble into hexagonal cylindrical or gyroid morphologies are useful materials for nanofiltration.

In certain embodiments, the bottlebrush polymers are capable of self assembling into materials useful for photonics such as photonic crystals. In particular, bottlebrush polymers that self assemble into gyroid morphologies can provide useful photonic crystals.

In certain embodiments, a self-assembled material deriving from a bottlebrush polymer or copolymer of the present disclosure may be chemically modified to provide useful materials. For example, a self-assembled material deriving from a bottlebrush polymer or copolymer comprising polysiloxane sidechains may be treated with a fluoride ion source to chemically degrade the polysiloxane sidechains. The chemical degradation of the polysiloxane can result in the formation of a porous material useful for nanofiltration. In another example, a self-assembled material deriving from a bottlebrush polymer or copolymer comprising poly(tert-butylacrylate) sidechains may be subjected to conditions that hydrolyze the tert-butyl ester, resulting in polyacrylic acid sidechains, which can function as an anionic polymer and create porous channels useful for ion exchange and/or filtration.

Additional uses will be self-evident to one of ordinary skill in the art.

EXAMPLES

These and other aspects of the present invention will be further appreciated upon consideration of the following Examples, which are intended to illustrate certain particular embodiments of the invention but are not intended to limit its scope, as defined by the claims.

Figure 2:
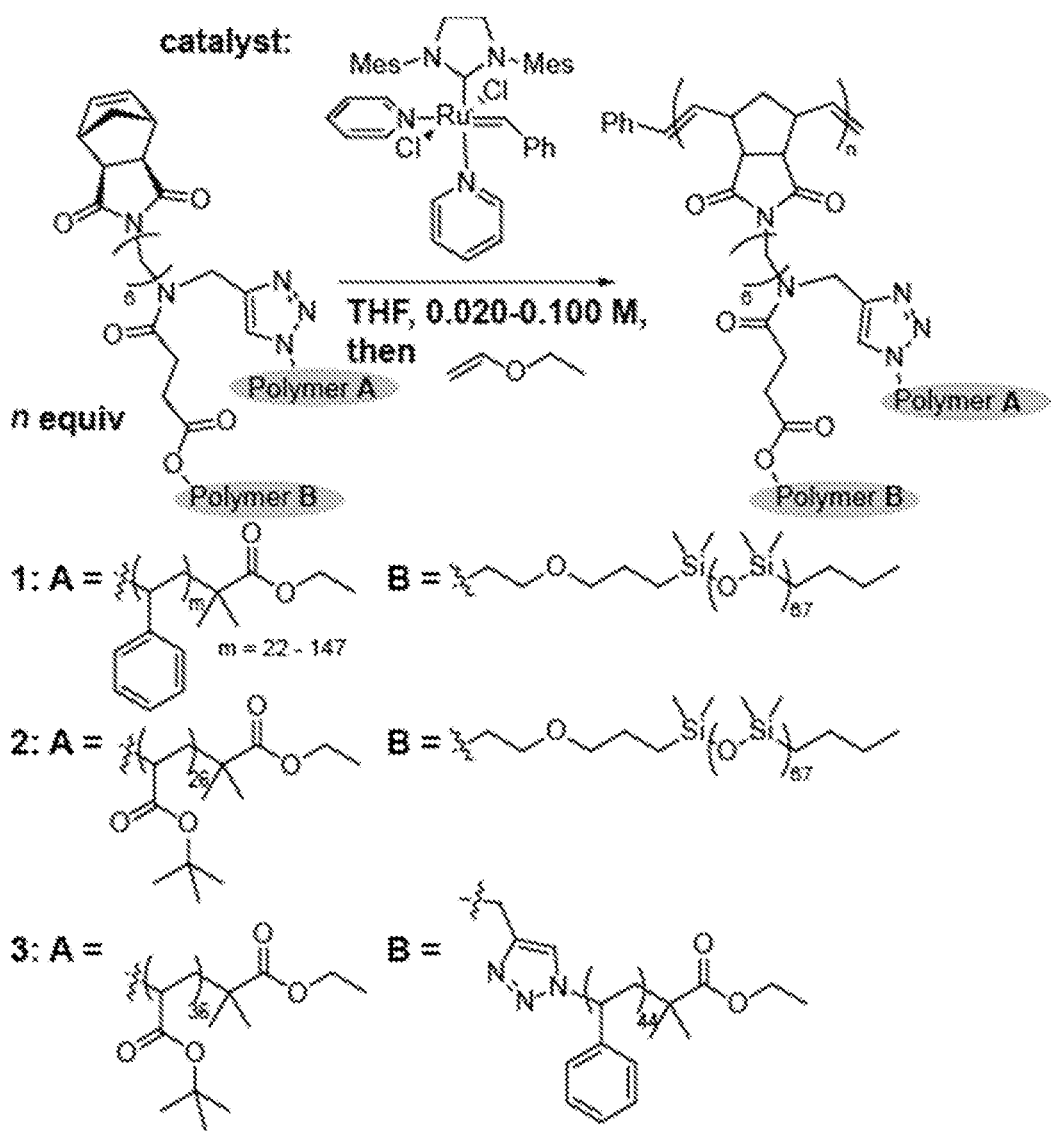
FIG. 2 includes Scheme 1, the synthesis of pseudo-alternating BBCPs.

Graft-Through Synthesis and Assembly of Janus Bottlebrush Polymers from A-Branch-B Diblock Macromonomers Branched macromolecules (BMMs) were synthesized with different "A" and "B" polymer combinations: (1) polystyrene (PS) and polydimethylsiloxane (PDMS); (2) PDMS and poly(tert-butyl acrylate) (PtBA); and (3) PS and PtBA (FIG. 2). The assembly of linear PS-b-PDMS has been particularly well-studied[10]; for comparison eight different variants of BMM 1 with differing number average molecular weight (MW) of PS were synthesized. These BMMs are referred to as norbornene PS-x-branch-PDMS-y, where x and y are the MW of PS and PDMS, respectively. ROMP of these BMMs produced A-branch-B BBCPs of tunable backbone degree of polymerization (DP).

Figure 3:
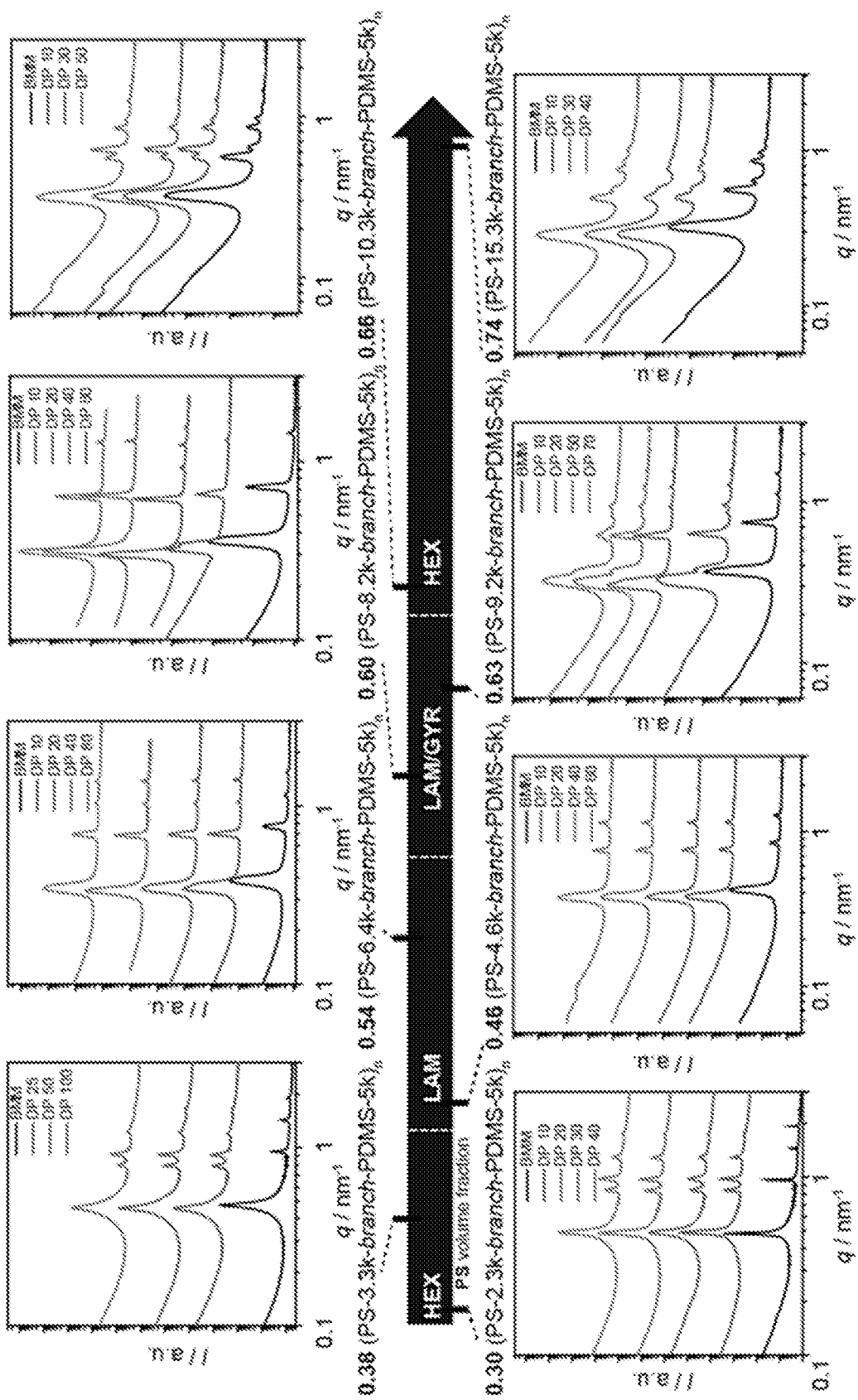
FIG. 3 shows one-dimensional SAXS profiles of PS-branch-PDMS BBCPs containing different PS/PDMS volume fractions.
Figure 7:
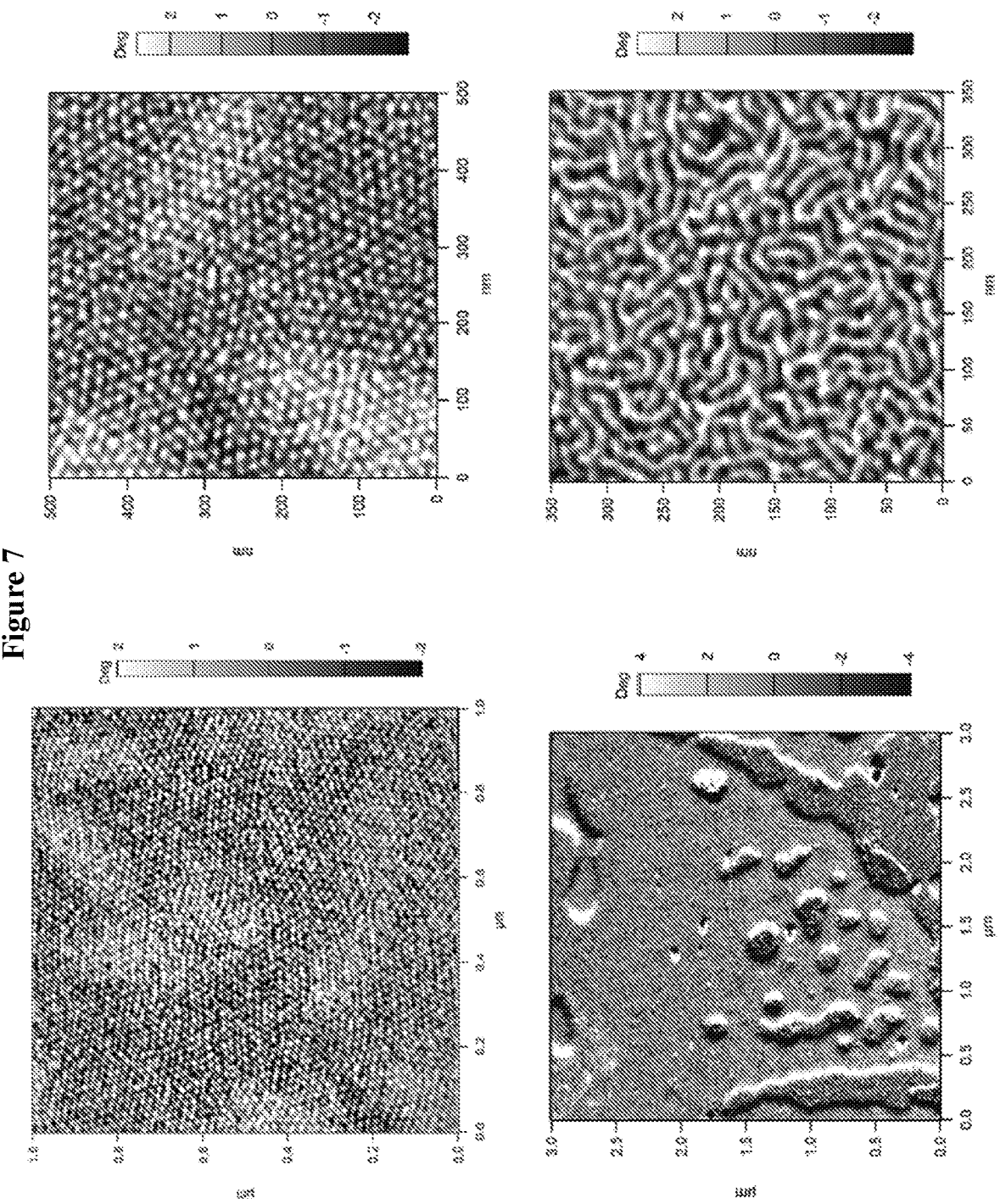
FIG. 7 shows representative AFM images of (PDMS-5k-branch-PS-3.3k)$_{25}$.
Figure 8:
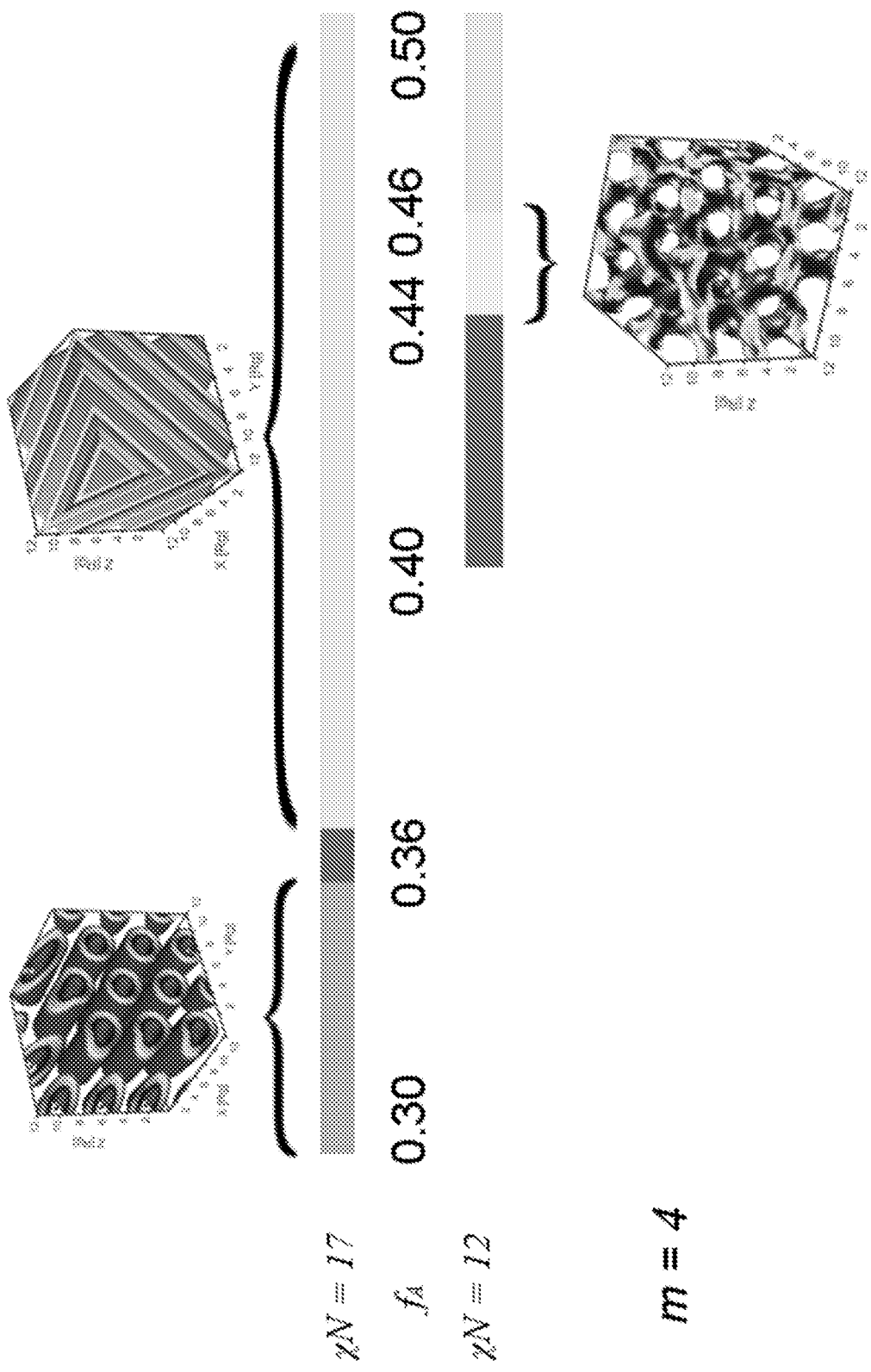
FIG. 8 shows phase plots as a function of the total volume fraction $f_A$ and m=4, at $\chi_{AB}N$=12 and $\chi_{AB}N$=17. The low $\chi_{AB}N$ show defective bicontinuous morphologies for $f_A$<0.44. Gyroid structure is observed $f_A$=0.44-0.46 after which lamellar structure is formed. The bicontinuous structures are suppressed at high $\chi_{AB}N$ where the structure goes from cylinders to lamellae at $f_A$~0.36.

The structures of thermally annealed samples (145° C. in a vacuum oven for 6 h) of the PS-PDMS BMMs and their corresponding BBCPs were studied using small-angle X-ray scattering (SAXS) at 20° C. In the bulk state, the BMMs readily formed ordered lamellar (LAM) or hexagonal cylinder (HEX) morphologies. In contrast, the resultant BBCPs spanned a wider range of morphologies. Interestingly, the bulk morphology of the BMMs was not necessarily the same morphology as the resulting BBCP. For example, the PS-2.3k-branch-PDMS-5k BMM formed lamellae with a domain size of 13.0 nm by SAXS, while the DP=10, 20, 30, and 40 BBCPs (0.30 PS volume fraction in all cases) formed highly ordered HEX morphologies with domain sizes of 12.9 or 13.0 nm (FIG. 3A and Table 1). Similar behavior was observed for the PS-3.3k-branch-PDMS-5k BMM (0.38 PS volume fraction) and its resultant BBCPs (FIG. 3A). Atomic force microscopy (AFM) phase images of drop-cast thick films of the (PS-3.3k-branch-PDMS-5k)$_{25}$ BBCP confirmed the HEX phase (FIG. 7). Furthermore, self-consistent field theory (SCFT) confirmed the HEX morphology at PS volume fractions between 0.30 and 0.36 (FIG. 8).

TABLE 1

Principal q and d for BMMs and BBCPs.

| Sample Composition | Backbone DP | Principal q (nm$^{-1}$) | d (nm) |
|---|---|---|---|
| PS-2.3k-branch-PDMS-5k | MM | 0.482 | 13.0 |
|  | 10 | 0.489 | 12.9 |
|  | 20 | 0.489 | 12.9 |
|  | 30 | 0.486 | 12.9 |
|  | 40 | 0.489 | 12.9 |
| PS-3.3k-branch-PDMS-5k | MM | 0.476 | 13.2 |
|  | 25 | 0.456 | 13.8 |
|  | 50 | 0.459 | 13.7 |
|  | 100 | 0.459 | 13.7 |
| PS-4.6k-branch-PDMS-5k | MM | 0.421 | 14.9 |
|  | 10 | 0.380 | 16.5 |
|  | 20 | 0.378 | 16.6 |
|  | 30 | 0.378 | 16.6 |
|  | 40 | 0.380 | 16.5 |
|  | 50 | 0.375 | 16.7 |
|  | 70 | 0.378 | 16.6 |
|  | 80 | 0.375 | 16.7 |
| PS-6.4k-branch-PDMS-5k | MM | 0.387 | 16.2 |
|  | 10 | 0.348 | 18.1 |
|  | 20 | 0.348 | 18.1 |
|  | 40 | 0.335 | 18.7 |
|  | 80 | 0.345 | 18.2 |
| PS-8.2k-branch-PDMS-5k | MM | 0.363 | 17.3 |
|  | 10 | 0.321 | 19.5 |
|  | 20 | 0.301 | 20.9 |
|  | 40 | 0.315 | 20.0 |
|  | 80 | 0.312 | 20.1 |
| PS-9.2k-branch-PDMS-5k | MM | 0.358 | 17.6 |
|  | 10 | 0.321 | 19.5 |
|  | 20 | 0.301 | 20.8 |
|  | 40 | 0.317 | 19.8 |
|  | 80 | 0.312 | 20.1 |
| PS-10.3k-branch-PDMS-5k | MM | 0.327 | 19.2 |
|  | 10 | 0.321 | 19.6 |
|  | 20 | 0.317 | 19.8 |
|  | 30 | 0.316 | 19.9 |
|  | 40 | 0.316 | 19.9 |
|  | 50 | 0.314 | 20.0 |
|  | 60 | 0.321 | 19.6 |
| PS-15.3k-branch-PDMS-5k | MM | 0.324 | 19.4 |
|  | 10 | 0.292 | 21.5 |
|  | 30 | 0.287 | 21.9 |
|  | 40 | 0.287 | 21.9 |
| PtBA-3.6k-branch-PDMS-5k | MM | 0.555 | 11.3 |
|  | 25 | 0.483 | 13.0 |
|  | 50 | 0.473 | 13.3 |
|  | 100 | 0.471 | 13.3 |
| PS-4.6k-branch-PtBA-4.6k | MM | N/A |  |
|  | 10 | 0.498 | 12.6 |
|  | 20 | 0.477 | 13.2 |
|  | 30 | 0.473 | 13.3 |
|  | 40 | 0.465 | 13.5 |

Figure 9:
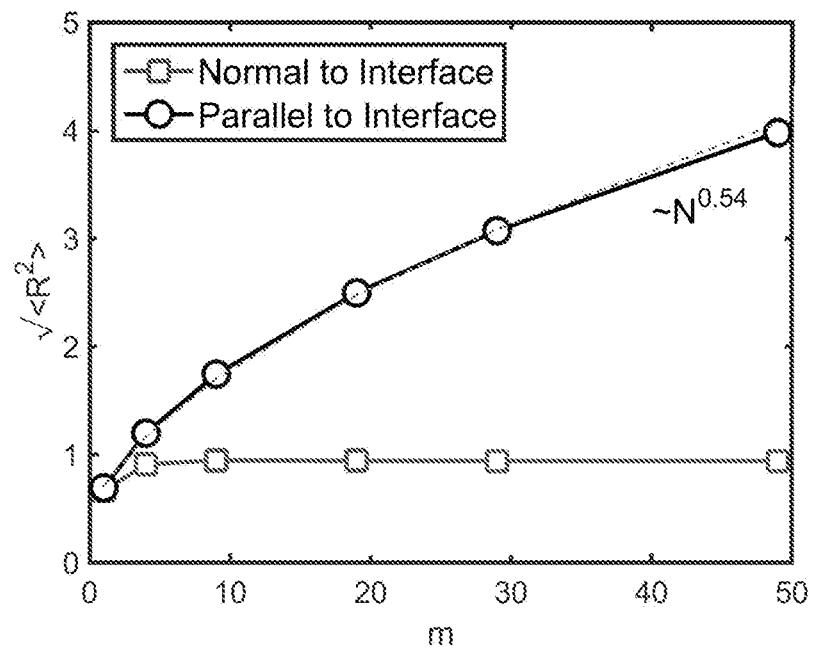
FIG. 9 shows $\sqrt{<R^2>}$ vs. DP (m) for BBCP normal and parallel to the interface. Root mean square end-to-end distance of the backbone chain C as a function of the number of backbone segments m. The chain size normal to the interface rapidly reaches a plateau determining the interface width. However, parallel to interface, the chain size continuously increases as m grows. The curve accurately follows $\sqrt{<R^2>}$~$N^{0.54}$. This shows that the backbone chain is slightly stretched due the large density packing of the AB side chains.

The small increase in domain spacing observed for the BBCPs relative to their corresponding BMMs is likely due to the A-branch-B BBCP architecture: the confinement of PS and PDMS on the densely grafted backbone stretches the two immiscible chains. However, when the DP was above a certain value—10 in this case—little increase in the domain size was observed. Simulation results using SCFT capture this behavior: the close packing of the side chains forces the ends to stretch away from the interface as inferred from the increase of sidechain length, L0, beyond the ideal value of a linear BCP (FIG. 9, $L_{ideal0}$~3.86Rg, Rg=radius of gyration). FIG. 9 depicts the increase of root mean squared end-to-end distance as a function of DP; in the simulations, the effect is prominent until DP~9 after which it plateaus. Overall, the equilibrium spacing increased~45% from 3.37Rg (for the BMM) to 4.87Rg (at backbone DP=29).

For BBCPs prepared from PS-8.2k-branch-PDMS-5k and PS-9.2k-branch-PDMS-5k BMMs, a coexistence of two phases that were indexed to lamellar and gyroidal morphologies was observed. Despite the fact that phase separation is dominated by the sidechains of these polymers, which are quite uniform, this coexistence could arise from the somewhat broad molecular weight distribution for the polymer backbone, especially at higher backbone DP (FIGS. 12 to 26). While the BMM with PS of MW=8.2k itself formed ordered lamellar structures, the DP=10, 20, and 40 BBCPs exhibited multiple sets of peaks. The principal and second order diffraction peaks in the DP=20 BBCP were indexed to a gyroid morphology, while the third, fourth, and fifth order diffraction peaks were indexed to lamellae. BBCPs formed from 9.2k PS appeared to have a greater fraction of gyroid phase.

Figure 4A:
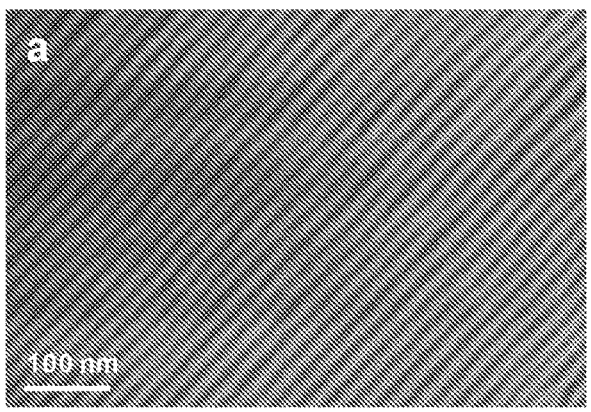
FIGS. 4A to 4D show top-view SEM images of the self-assembled morphology after etching of drop-cast bulk film of (PS-15.3k-branch-PDMS-5k)30 (FIG. 4A); spin-cast 28 nm thin film (FIG. 4B); 50 nm film treated with solvent annealing (FIG. 4C); and 50 nm film treated with thermal annealing (FIG. 4D). Scale bars are 100 nm.
Figure 4B:
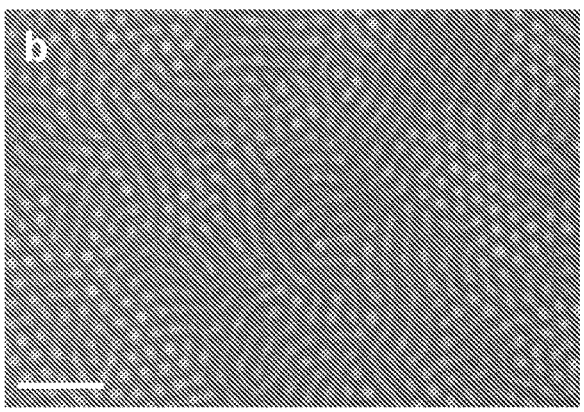
Figure 4C:
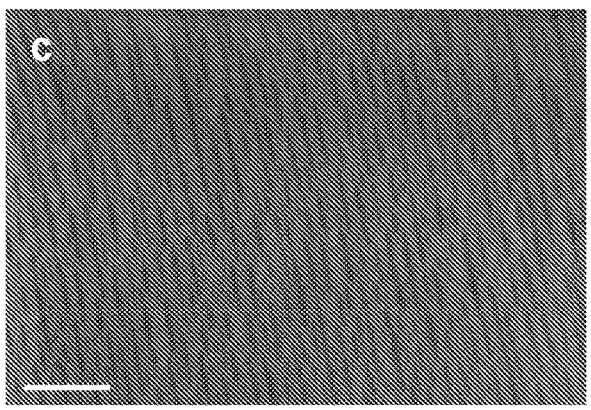
Figure 4D:
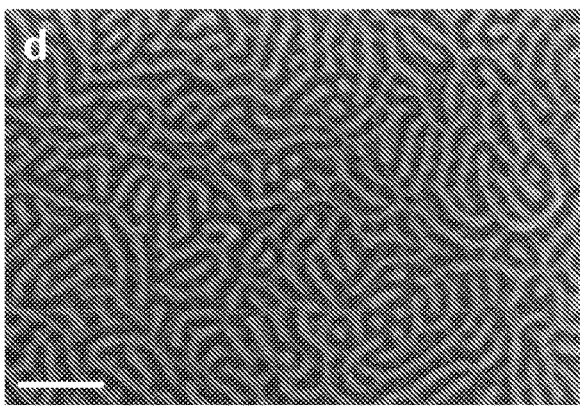

The thin film morphologies of (PS-15.3k-branch-PDMS-5k)$_{30}$ was also characterized. Well-ordered periodic cylindrical microdomains with 20 nm period and 10 nm line width were obtained for a sample drop-cast from toluene, slowly evaporated for 72 h, and plasma etched (FIG. 4A). FIG. 4B shows the annealed thin film morphology of a 28 nm as-cast film consisting of cylinders and spheres with average domain spacing of 25 nm. Hole formation suggested that the thickness of the film was insufficient to form a monolayer of microdomains. The structure is believed to consist of a wetting layer of PDMS blocks at the substrate and air interface surrounding a layer of PS, with poorly ordered rounded or linear microdomains protruding from the wetting layer. For a film with as-cast thickness of 50 nm, cylindrical microdomains oriented parallel to the substrate were achieved without terrace formation over macroscopic areas (FIG. 4C). Each microdomain appeared to be split longitudinally, which may be attributed to oxygen etching of the butyl terminus of the PDMS sidechain. In contrast, a thermally annealed 50 nm thick film produced a kinetically trapped state consisting of poorly ordered cylinders or an interpenetrated gyroid-like structure (FIG. 4D), with average domain spacing of 20 nm similar to the period of the drop-cast bulk BBCP.

These results indicate that solvent vapor annealing promotes microphase separation with improved ordering compared to thermal annealing. The large $\chi$ leads to a high thermodynamic driving force for microphase separation and a high order-disorder transition (ODT) temperature.[11] During solvent vapor annealing, solvent uptake by the film screens the strong interaction between blocks and lowers the diffusion barrier of the polymer chains, enhancing the microphase separation kinetics.[12] Additionally, in contrast to the conventional linear BCP systems with comparable high MW, the reduced chain entanglement arising from the steric hindrance between the densely grafted side chains in the BBCP system expedites the self-assembly.[13]

Figures 5A, 5B:
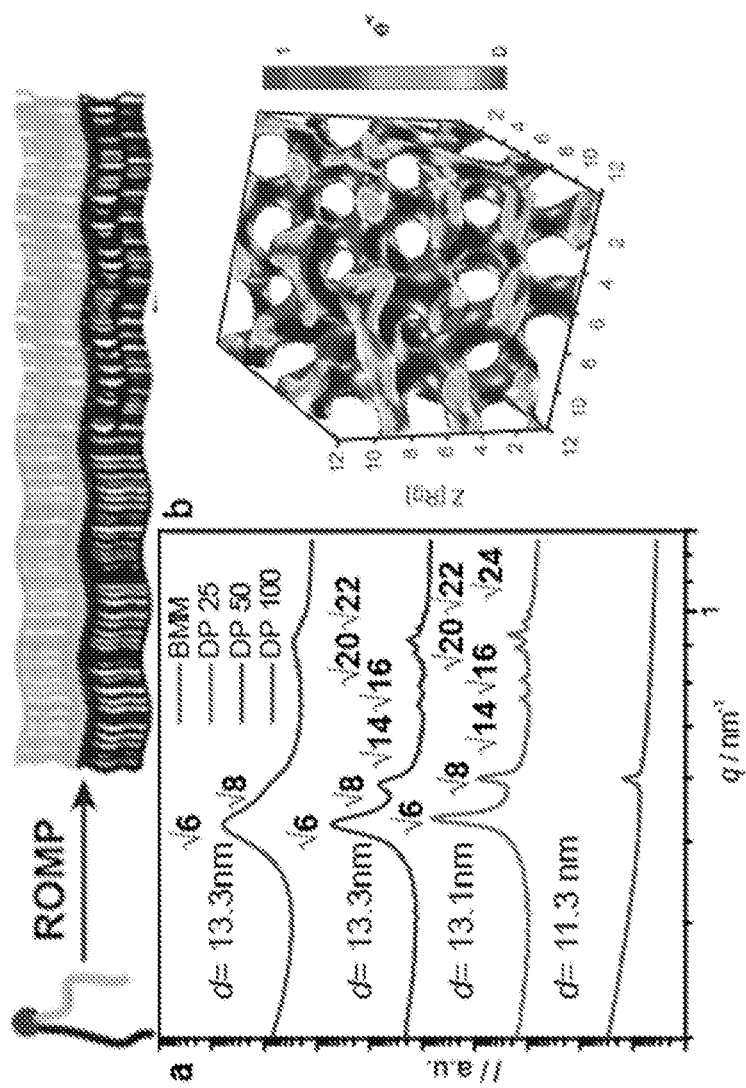
FIG. 5A shows SAXS profiles of PDMS-5k-branch-PtBA-3.6k BMM and BBCPs.
FIG. 5B shows a SCFT simulation of A-branch-B BBCP gyroid. The color scale represents the density of A blocks. B blocks are transparent for clarity.

Next, the bulk assembly of BMM 2 (FIG. 2, Scheme 1), PDMS-5k-branch-PtBA-3.6k (0.41 PtBA volume fraction), which was polymerized to form DP=25, 50, and 100 BBCPs was investigated. The BMM itself phase-separated, but only a single peak was observed by SAXS, which suggested limited ordering. Furthermore, freshly annealed BBCP samples also displayed one broad peak; they could not be indexed to any morphology. After eight months at ambient conditions, however, the scattering profiles of the DP=25 and 50 BBCPs had become highly ordered. As shown in FIG. 5A, the ratio of $q_i/q_1$, where $q_i$ is the scattering vector at the ith order diffraction peak, precisely matched that of the gyroid phase ($\sqrt{6}$, 29 8, $\sqrt{14}$, $\sqrt{16}$, $\sqrt{20}$, $\sqrt{22}$, $\sqrt{24}$), where $q_1$=0.481 nm$^{-1}$ and 0.472 nm$^{-1}$ for the 25 and 50 unit BBCPs, respectively. The DP=100 BBCP also displayed higher order peaks, but could not be indexed accurately due to the peak broadness. Nonetheless, these data represent observation of a pure gyroid phase in BBCP assembly, which is made possible by the unique A-branch-B BBCP architecture. SCFT simulation of a low $\chi$N=12 A-branch-B BBCP recapitulated a bicontinuous gyroid window for $f_A$=0.44-0.46 (FIG. 5B).

Figure 6A:
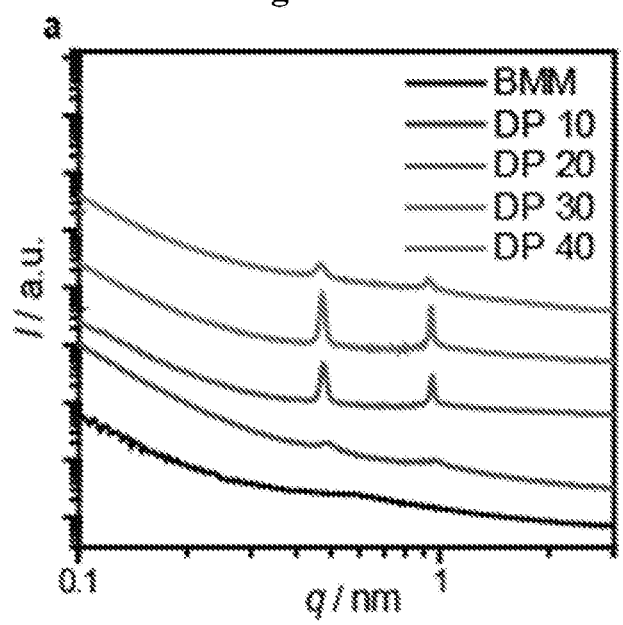
FIG. 6A shows SAXS profiles of PS 4.6k-branch-PtBA 4.6k BMM and BBCPs.
Figure 6B:
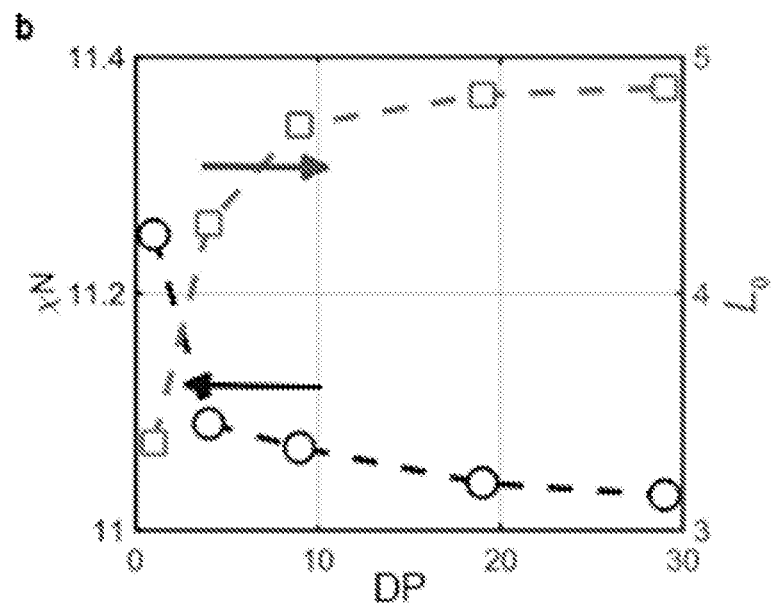
FIG. 6B shows the plot of $\chi N$ and sidechain length ($L_0$) vs backbone DP. Increasing backbone DP leads to stretching of the sidechains, and facilitates phase separation.

BMM 3 with PS of MW=4.6k and PtBA of MW=4.6k and resulting BBCPs was investigated also. In this case, the BMM was disordered, but the SAXS profile of the DP=10 BBCP displayed broad principal and higher-order peaks that were indexed as lamellae (FIG. 6A). The SAXS patterns of the DP=20, 30, and 40 BBCPs displayed sharp peaks that were also indexed to a lamellar morphology. In this system, the BMM components (PS and PtBA) were chosen to have lower $\chi$ than the examples above. The fact that the BMM itself does not phase-separate while the BBCPs do, i.e., the ODT is shifted upon polymerization, suggests that pre-organization of the sidechains along the dense BBCP backbone reduces the entropic penalty of self-assembly that the BMM suffers.

However, polymerization of the BMM lowered the critical $\chi A_0 N$ to 11.03 at DP=29, and lead to stretching of the sidechains (increase in $L_0$), which facilitates phase separation. These results suggest that the A-branch-B BBCP structure could enhance the assembly of short BCPs, and thereby provide access to ultra-small domains sizes via an architectural approach.[14]

The synthesis of the disclosed families of A-branch-B BBCPs demonstrate that these polymers have several unique advantages in the context of self-assembly. For example, polymerization-induced changes in bulk morphology and the ODT were observed, along with gyroid phases in BBCPs. Furthermore, the achievement of ~20 nm domain spacing in thin film assemblies from the high molecular weight BBCP breaks the conventional $\chi$N limitation.[11]

Experimental Procedures

All anhydrous and HPLC grade solvents were purchased from Sigma Aldrich or Alfa Aesar and used as supplied unless otherwise stated. Anhydrous, degassed dichloromethane (DCM) and tetrahydrofuran (THF) were used from a J. C. Meyer solvent purification system. HPLC grade DCM and THF were sparged vigorously with argon for at least one hour before being connected to the solvent purification system. All reagents were purchased from Sigma Aldrich or Alfa Aesar unless otherwise stated. All chromatography was performed on EMD Millipore silica gel 60, particle size 0.040-0.063 mm (230-400 mesh) on a BIOTAGE® ISOLERA PRIME™ flash purification system. Gel Permeation Chromatography (GPC) was performed with a concentration of 0.1-1.0 mg/mL on an Agilent 1260 Infinity system in THF, calibrated with monodisperse linear polystyrene standards and equipped with a UV diode array detector and a differential refractive index (dRI) detector. The GPC was run at a flow rate of 1 mL/minute at 35° C. and the $^1$H nuclear magnetic resonance ($^1$H NMR) spectra were acquired on 500 MHz Varian INOVA or 400 MHz Bruker AVANCE spectrometers. Spectra were calibrated by the residual solvent signal in deuterated solvent (CDCl$_3$), which was purchased from Cambridge Isotope Laboratories, Inc. NMR spectra were processed in MestReNova 10.0.2, 2D SAXS data were azimuthally averaged and plotted using RAW 0.99.9.13b or by the EPICS system in MatLab at the Advanced Photon Source.

SAXS Sample Preparation and Measurements

Dried samples from ROMPs were wet with 15-50 μL of THF to form thick, barely dissolved solutions. A small amount of the material was removed with a spatula or pipet tip and used to fill the hole of a circular washer that acted as a sample holder (outer diameter: 24 mm, inner diameter: 2 mm, thickness: 1 mm). Samples were then placed in a vacuum oven, evacuated, and heated to 145° C. for six hours. The vacuum oven was allowed to cool overnight and then vented to the atmosphere.

Transmission SAXS was conducted at the Cornell High Energy Synchrotron Source (CHESS) at the G1 beamline or beamline 12-ID-B at the Advanced Photon Source at Argonne National Lab. The sample to detector distance used at CHESS was 1.250 m and the wavelength of the beam was 1.268 Å. At APS, the sample to detector distance used was 1.9081 m and the wavelength of the beam was 0.886 Å.

AFM Imaging

Atomic force microscopy (AFM) imaging was performed using an Asylum Research MFP-3D. Samples were drop cast from a 10 mg/mL solution in toluene on a silicon wafer that was washed sequentially with hexane and acetone three times each. The silicon wafer was fixed to a glass microscope slide using a piece of double sided tape and the sample was allowed to slowly dry in a petri dish for one hour. Then the sample was annealed in a 140° C. oven for 30 minutes.

SEM Imaging

The BBCP was spin-coated from a 2 wt % toluene solution onto silicon substrates with a native oxide layer and then solvent annealed under toluene vapor, which is a partially selective solvent for the PS block The as-cast film thickness is measured by spectral reflectometry (Filmetrics F20). To induce microphase separation at room temperature, the BBCP thin films were solvent annealed under toluene vapor, which is a partially selective solvent for the PS block, at 298 K for 30 min. Solvent vapor annealing was performed in an 80 cm$^3$ chamber filled with 3 cm$^3$ of toluene liquid at ambient temperature for 30 min. During the solvent annealing process, the vapor pressure decreased as the solvent liquid gradually evaporated. After a total process time of 30 min, the lid was slowly removed and the film dried completely. For comparison, thermal annealing was implemented at 130° C. for 30 min in a vacuum oven. The annealed samples were subjected to a two-step reactive ion etching process in a Plasma-Therm 790 consisting of 5 sec, 50 W CF$_4$ plasma at 15 mTorr to remove the top surface layer of PDMS, followed by a 30 sec, 90 W O$_2$ plasma at 6 mTorr to remove the PS and produce robust oxidized PDMS microdomains on the substrate. Image analysis was performed with a Zeiss Merlin high-resolution scanning electron microscope at 3 kV as shown in FIG. 4.

Computation and Modeling

The effect of the polymer architecture of an $(AB)_mC_{m+1}$ block polymer on the characteristics of self-assembly was studied. The backbone polymer C is assumed to be neutral when interacting with the AB side chains ($\chi_{AC}=\chi_{BC}=0$) where x is the Flory Huggins parameter. This is motivated by noting that AB chains will be already extended away from the interface by the effect of $\chi_{AB}$. Hence, the interaction between side chains AB and the backbone C should be minimal. By doing so, the role of chain architecture on the self-assembled morphologies compared to simple AB diblock copolymers can be elucidated.

The backbone C and the AB side chains are modeled as flexible Gaussian chains[15] with degree of polymerization $N_i$ (i=A, B, or C). Along the contour of the backbone C, there are m AB junctions dividing the backbone into m+1 equal segments. For simplicity, all molecules are assumed to have equal statistical segment length b and the melt is incompressible. In this regards, a reference radius of gyration $R_g=b(N/6)^{1/2}$, which is that of a linear triblock $N=N_A+N_B+2NC$. Rg sets the length scale of the polymer morphology. In addition, $N_{tot}$ is the whole molecule degree of polymerization where $N_{tot}=m(N_A+N_B)+(m+1)NC$.[16] Hence, the total block volume fractions are calculated as follows $f_i=mN_i/N_{tot}$ for i=A and B and $f_C=(m+1)N_C/N_{tot}$. The geometric ratio $\alpha=N/N_{tot}$ acts as a scaling factor for the free energy expression as discussed below.[16]

The canonical partition function of a melt of a bottlebrush polymer with ABC blocks, in the field representation can be written.[17]

$$Z = \int DW_A DW_B DW_C DPD\varphi_A D\varphi_B D\varphi_C e^{-F[W_i,\varphi_i,P]/k_BT} \quad (S1)$$

And, $$\frac{\alpha F}{nk_BT} = \frac{1}{V}\int dr\left(\sum_{i<j}\chi_{ij}N\phi_i\phi_j - \sum_i W_i\phi_i + P\left(\sum_i(\phi_i-1)\right)\right) - \alpha\ln Q[W_i] \quad (S2)$$

Where n is the number of molecules in the melt. V is the system volume and $\chi_{ij}$ is the Flory Huggins parameter between species i and j. $Q[Q_i]$ is the single chain partition function describing the conformational entropy of the Gaussian chain in W fields.

The architecture of the molecule is constructed using six propagators $q_i(r, s_i, k)$ and $q_i^+(r, s_i, k)$ where s, is a variable parameterizing the contour of chain of type i and k is the segment number. The polymer probability distributions q, and $q_i^+$ satisfy the modified diffusion equation $$\frac{\partial}{\partial s_i}q = R_g^2\nabla^2 q - W_i q \quad (S3)$$

Hence, the applied field $W_i$ matches the block type of contour variable $s_i$ when solving equation S3. The key step in constructing the polymer structure is identifying the initial conditions for every propagator. In this regard, $q_A(r,0,k)=q_B(r,0,k)=1$; $q_C(r,0,1)=q^+_C(r,N_C,m+1)=1$; $q_C(r,0,k)=q_A(r,N_A,k)$ $*q_B(r,N_B,k)*q^+_C(r,N_C,k-1)$; $q^+_A(r,N_A,k)=q_B(r,N_B,k)*q_C(r,N_C,k)*q^+_C(r,N_C,m+1-k)$; $q_B^+(r,N_B,k)=q_A(r,N_A,k)*q_C(r,N_C,k)*q^+_C(r,N_C,m+1-k)$; $q^+_C(r,N_C,k)=q_A(r,N_A,k)*q_B(r,N_B,k)*q^+_C(r,0,k-1)$ where k∈[1,m]. The modified diffusion equation is solved using the pseudospectral method with operator splitting scheme.[18] Accordingly, the single chain partition function can be written as $Q=1/\alpha V\int dr\, q_C(r, N_C, m+1)$.

Minimization of the free energy F to the fields, density, and pressure leads to the following set of equations that have to be solved self-consistently.[18]

$$\phi_A = \frac{1}{QN} \sum_{k=1}^{m} \int_0^{N_A} ds q_A(r, s_A, k) q_A^+(r, s_A, k) \quad (S4)$$

$$\phi_B = \frac{1}{QN} \sum_{k=1}^{m} \int_0^{N_B} ds q_B(r, s_B, k) q_B^+(r, s_B, k)$$

$$\phi_C = \frac{1}{QN} \sum_{k=1}^{m+1} \int_0^{N_C} ds q_C(r, s_C, k) q_C^+(r, s_C, k)$$

$$W_A(r) = \chi_{AB} N \phi_B(r) + \chi_{AC} N \phi_C(r) + P(r)$$

$$W_B(r) = \chi_{AB} N \phi_A(r) + \chi_{BC} N \phi_C(r) + P(r)$$

$$W_C(r) = \chi_{AC} N \phi_A(r) + \chi_{BC} N \phi_B(r) + P(r)$$

$$\phi_A(r) + \phi_B(r) + \phi_C(r) = 1$$

The numerical solution of the SCFT equations to study phase separation of the bottlebrush polymer is initialized through random fields $W_i$'s that are used to solve the modified diffusion equation (S3). The calculated propagators are employed to estimate Q and accordingly the density distributions. The fields $W_i$'s and P are updated using a numerical relaxation scheme.[19]

In order to explore the effect of polymer architecture on the characteristics of self-assembly, a series of simulations of a lamellar structure (projected to striped domains in 2D) maintaining $N_i$ the same while changing the number of segments m were conducted. By doing so, the bottlebrush volume fractions $f^0_i = N_i/N$ are fixed, while the total block volume fractions are changing $f_i$. In this work the degree of polymerization of the equivalent linear triblock at N=100 was maintained. The composition profile is first calculated to analyze the degree of segregation. The computation cell has a pixel size of 0.2Rg, while the number of pixels is changed for every m to achieve a relaxed structure with a minimum in the system free energy (S2). The striped structure is formed at $f^0_A = f^0_B = 0.48$, $f^0_C = 0.02$.

Figure 10:
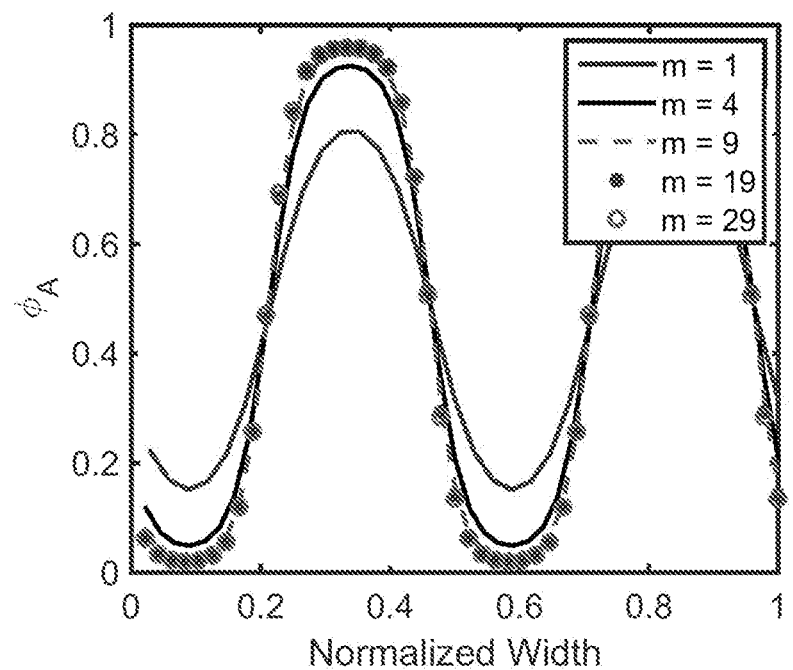
FIG. 10 shows the normalized density of block A ($\phi_A$) for a lamella forming structure as a function of the normalized width of the system. The degree of segregation rises sharply as the number of side-chains increase till m=9. After which it reaches a plateau at ~96%.

FIG. 10 compares the normalized density profile of block A ($\phi_A$) for five different polymers with increasing number of segments m at a relatively low degree of segregation $\chi_{AB}N=13$. It is shown that the degree of segregation is quite low for a single AB chain as $\phi_A$ peaks at ~80%. This is expected for the low magnitude of $\chi_{AB}N$ driving the phase separation; However, increasing the magnitude of m from one to nine segments causes $O_A$ to sharply rise, after which it reaches almost a constant value of $\phi_A$ ~96%. It is interesting to note that the interface remains diffuse despite the increase in the effect strength of segregation. In addition, the improvement in the degree of segregation is reflected in the equilibrium domain spacing $L_0$ as was shown in FIG. 10. FIG. 10 demonstrates the increase of $L_0$ as a function of m. The effect is quite prominent when the number segments m~9 after which it plateaus. Tethering more AB chains to the backbone increased the equilibrium spacing from $3.37R_g$ (m=1) to $4.87R_g$ at (m=29) with an increase of ~45%.

Studying the onset of phase separation for the lamellar structure revealed a shift in the critical $\chi_{AB}N$ to a higher value of 11.25 for m=1. This is significantly larger than the case of pure AB diblock copolymer of 50/50 volume fraction that phase separates at 10.49. However, the increase of number of segments m improves the onset of phase separation to 11.03 at m=29.

Figure 11:
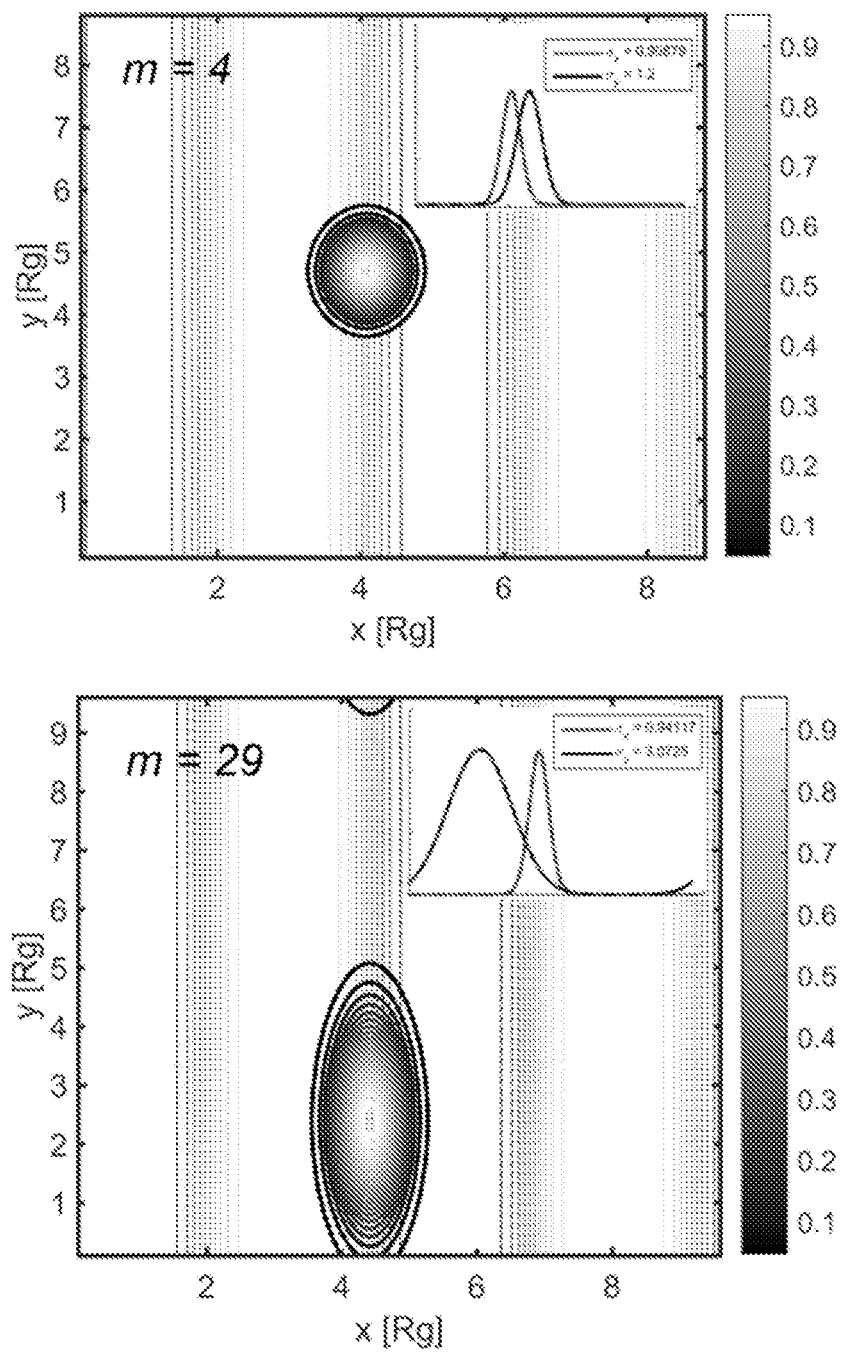
FIG. 11 shows the probability distribution of finding the end of the last segment of backbone. Concentric ovals are the probability distribution of finding the end of the last segment of the backbone chain C mapped for m=4 (top) and m=29 (bottom). The chains extend along the interface while maintaining the confinement normal to the interface. The spread of probability distribution is estimated to a fitted Gaussian (see inset).
Figure 12:
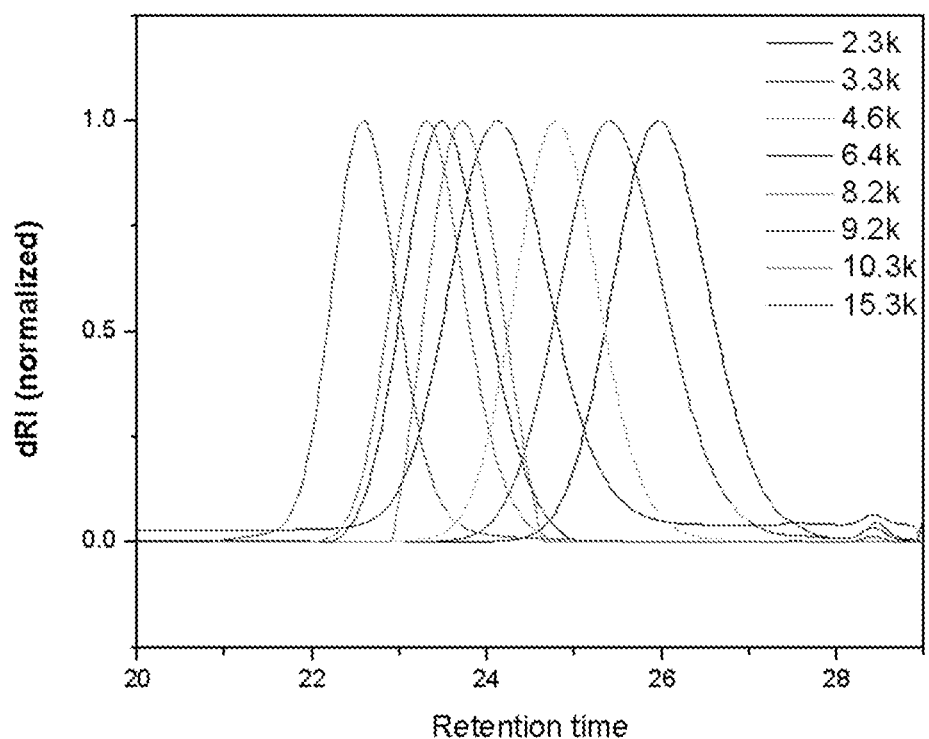
FIG. 12 shows differential refractive index GPC traces of PS—Br.
Figure 13:
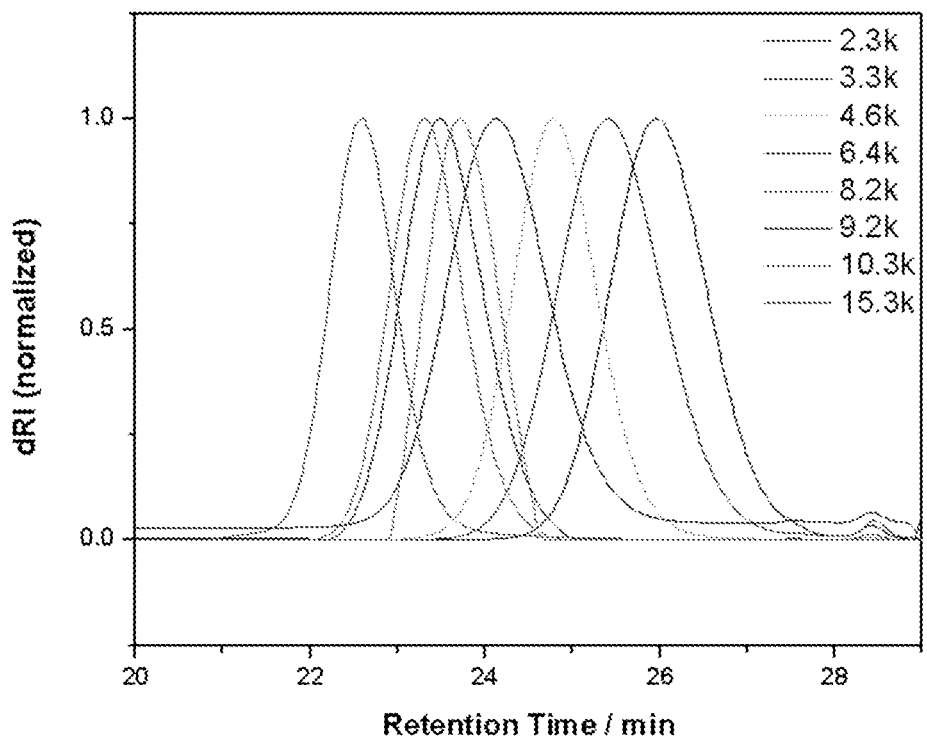
FIG. 13 shows differential refractive index GPC traces of PS—N3.
Figure 14:
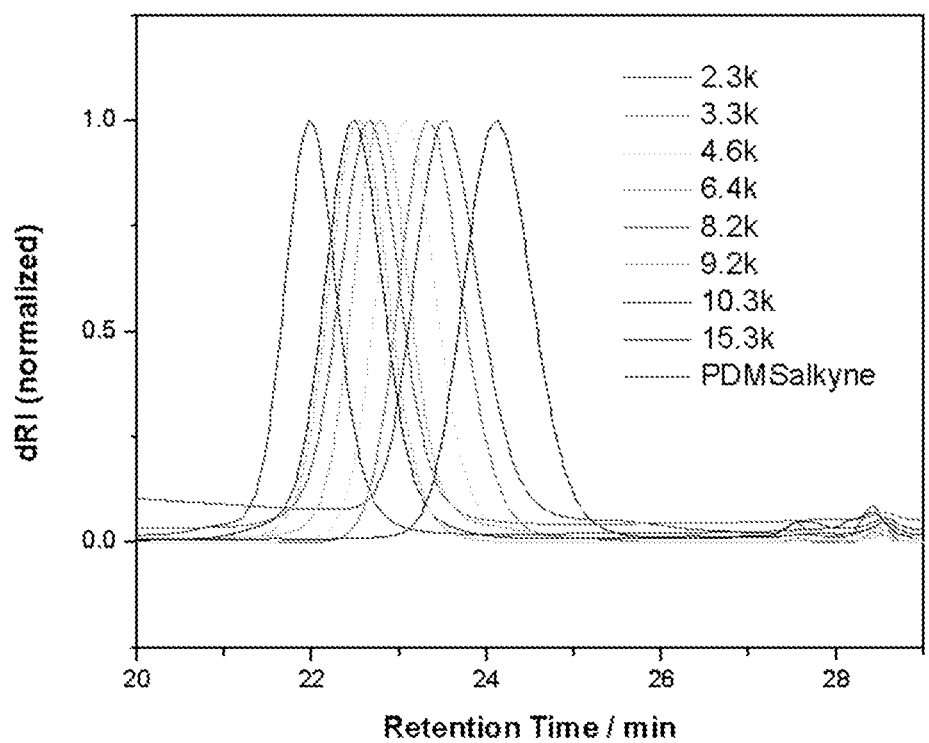
FIG. 14 shows differential refractive index GPC traces of Nb—PS-branch-PDMS macromonomers.
Figure 15:
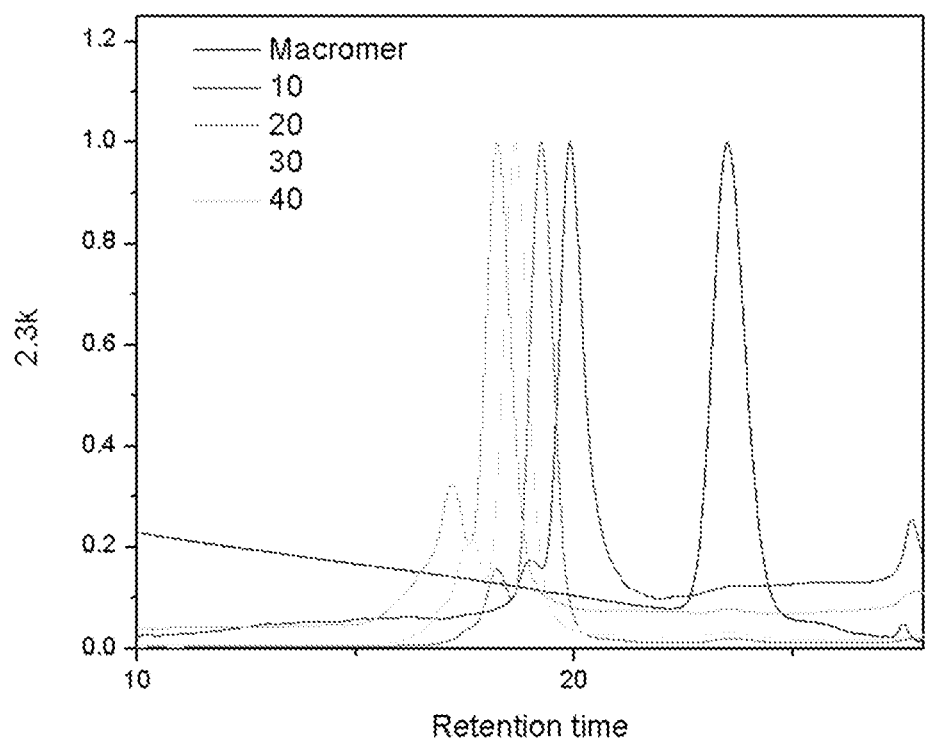
FIG. 15 shows differential refractive index GPC traces of (PS-2.3k-branch-PDMS-5k)$_n$.
Figure 16:
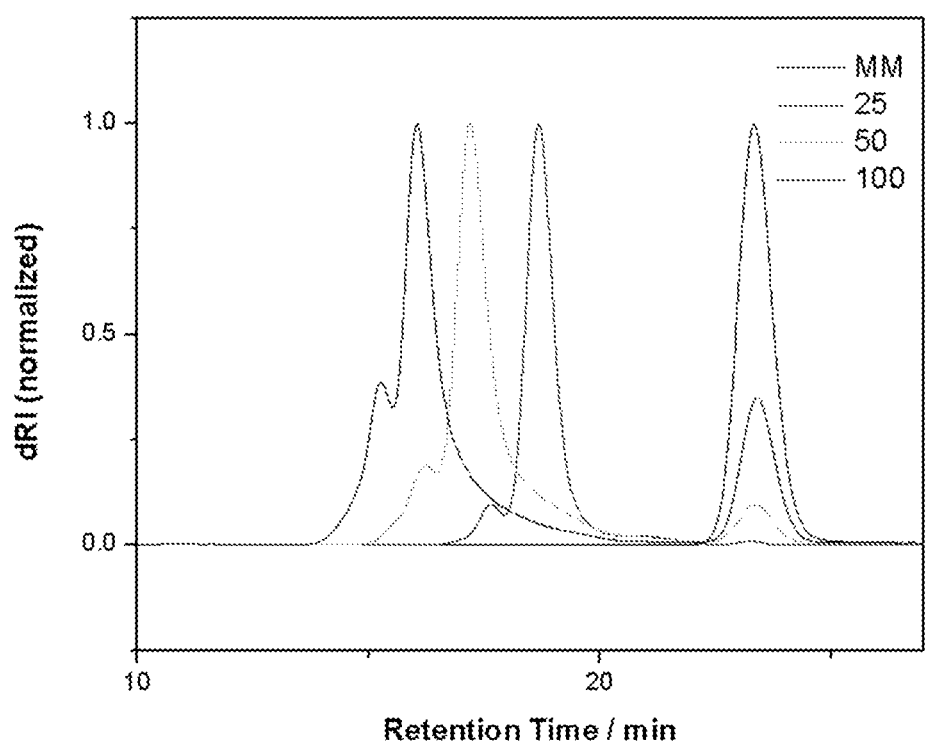
FIG. 16 shows differential refractive index GPC traces of (PS-3.3k-branch-PDMS-5k)$_n$.
Figure 17:
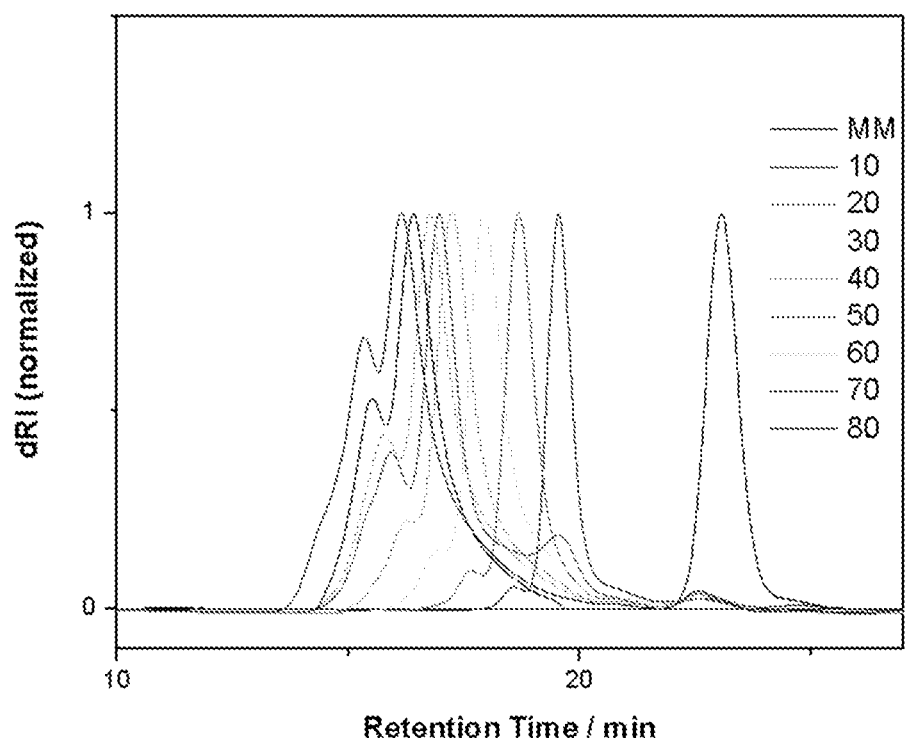
FIG. 17 shows differential refractive index GPC traces of (PS4.6k-branch-PDMS5k)$_n$.
Figure 18:
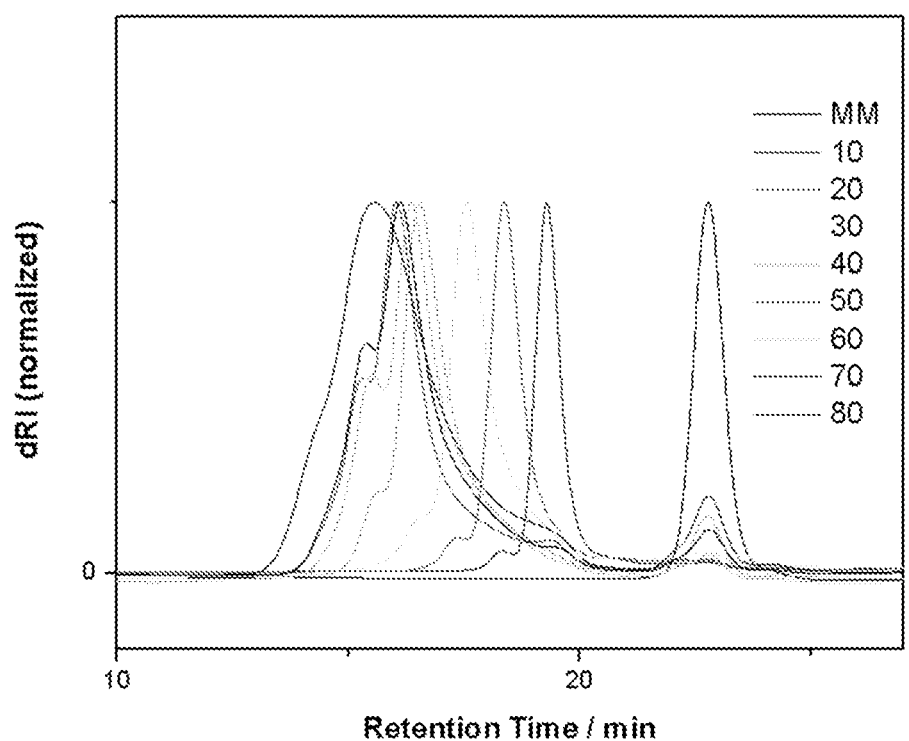
FIG. 18 shows differential refractive index GPC traces of (PS-6.4k-branch-PDMS-5k)$_n$.
Figure 19:
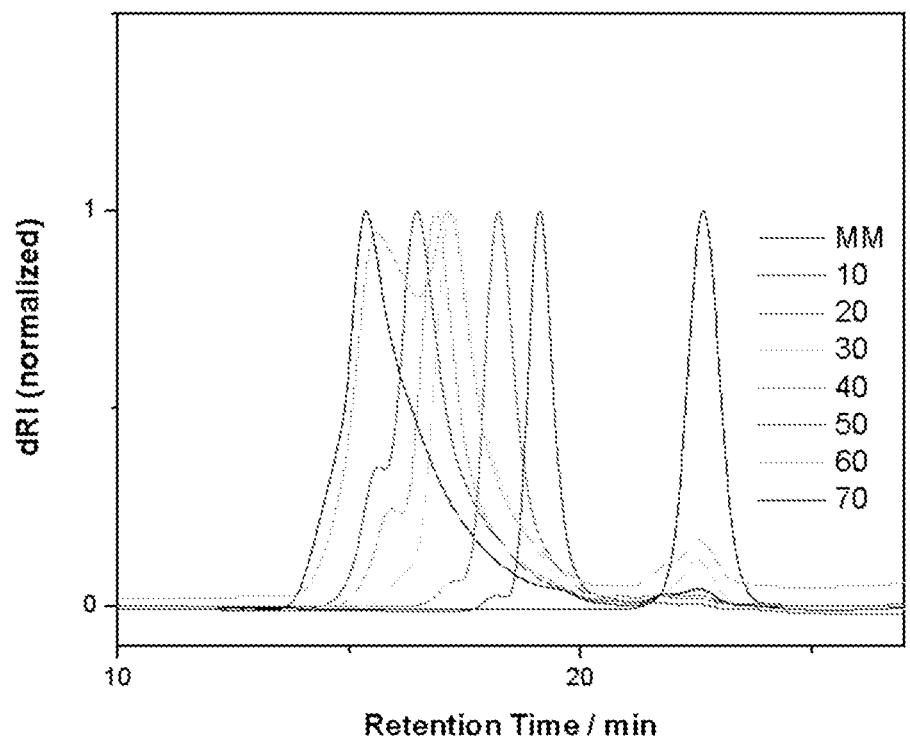
FIG. 19 shows differential refractive index GPC traces of (PS-8.2k-branch-PDMS-5k)$_n$.
Figure 20:
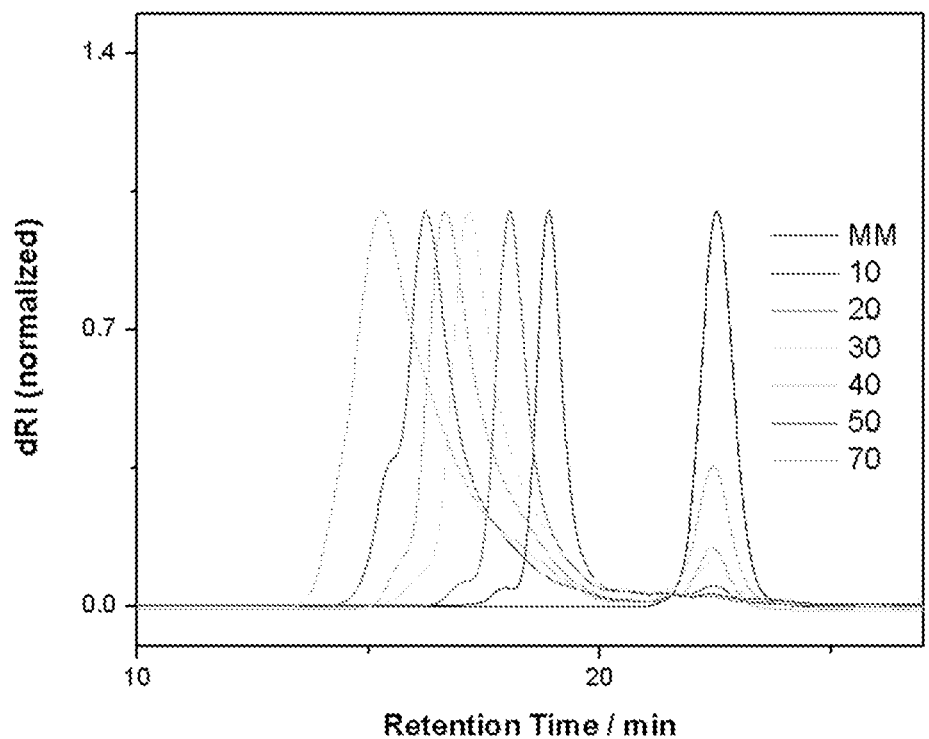
FIG. 20 shows differential refractive index GPC traces of (PS-9.2k-branch-PDMS-5k)$_n$.
Figure 21:
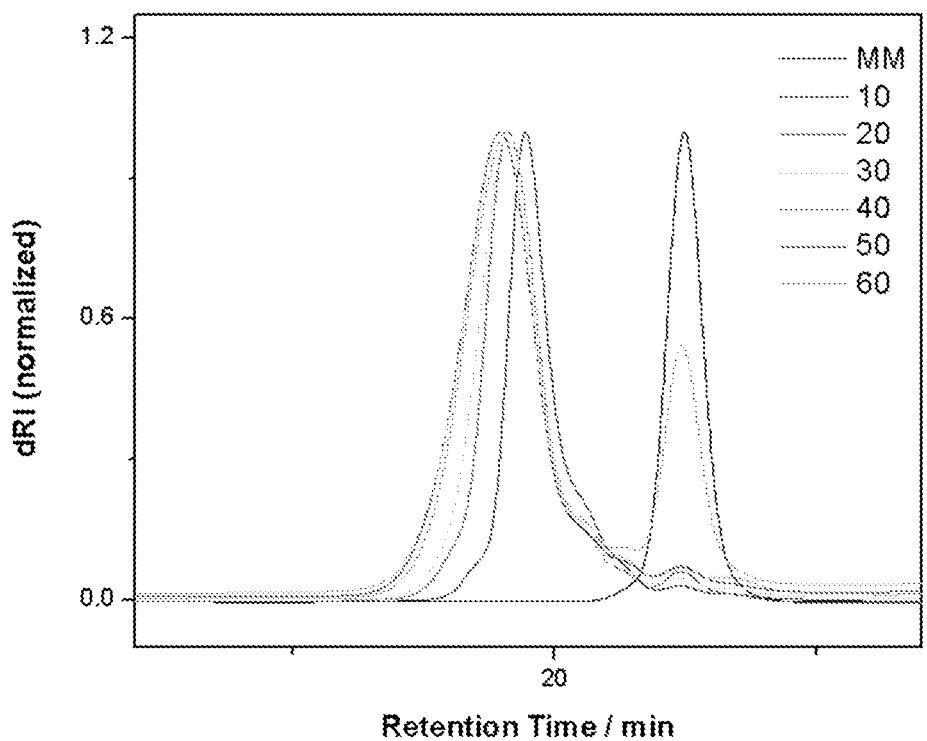
FIG. 21 shows differential refractive index GPC traces of (PS-10.3k-branch-PDMS-5k)$_n$.
Figure 22:
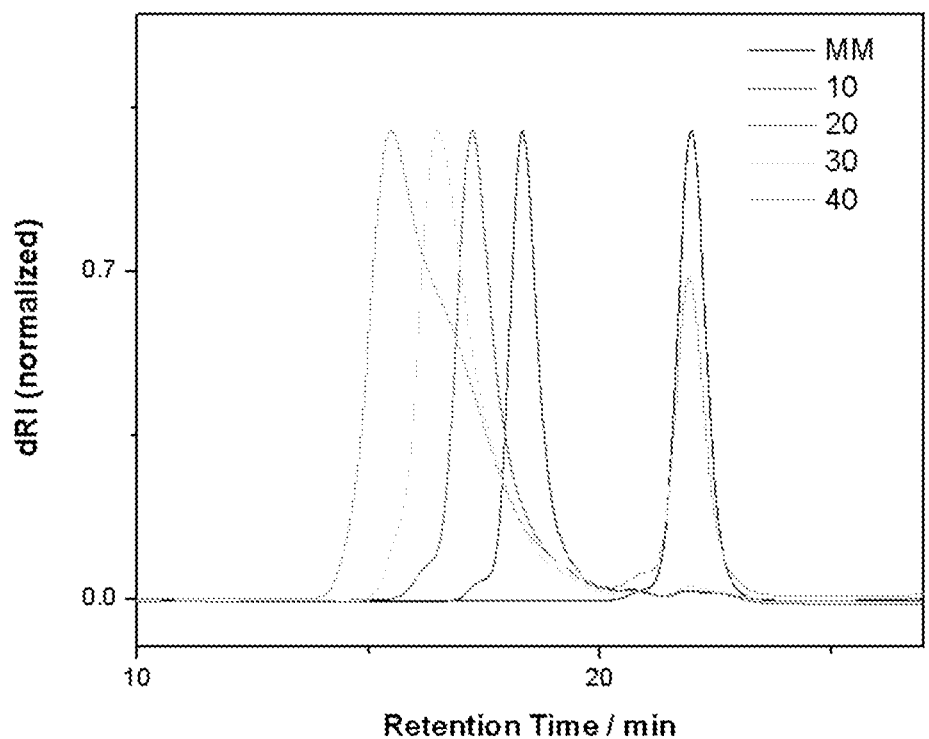
FIG. 22 shows differential refractive index GPC traces of (PS-15.3k-branch-PDMS-5k)$_n$.
Figure 23:
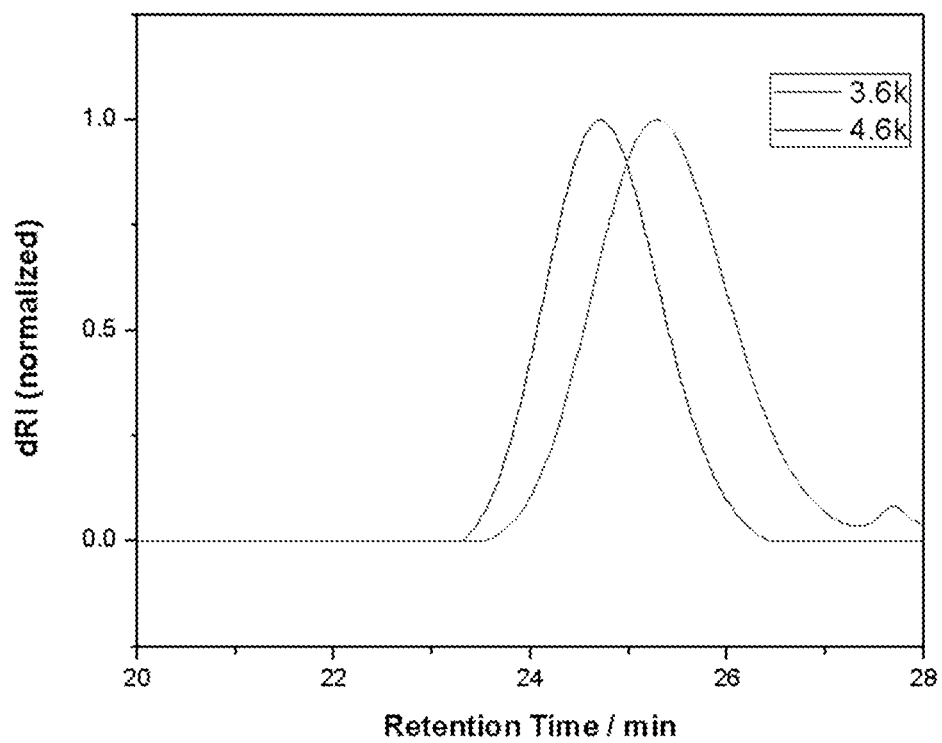
FIG. 23 shows differential refractive index GPC traces of PtBA-N$_3$.
Figure 24:
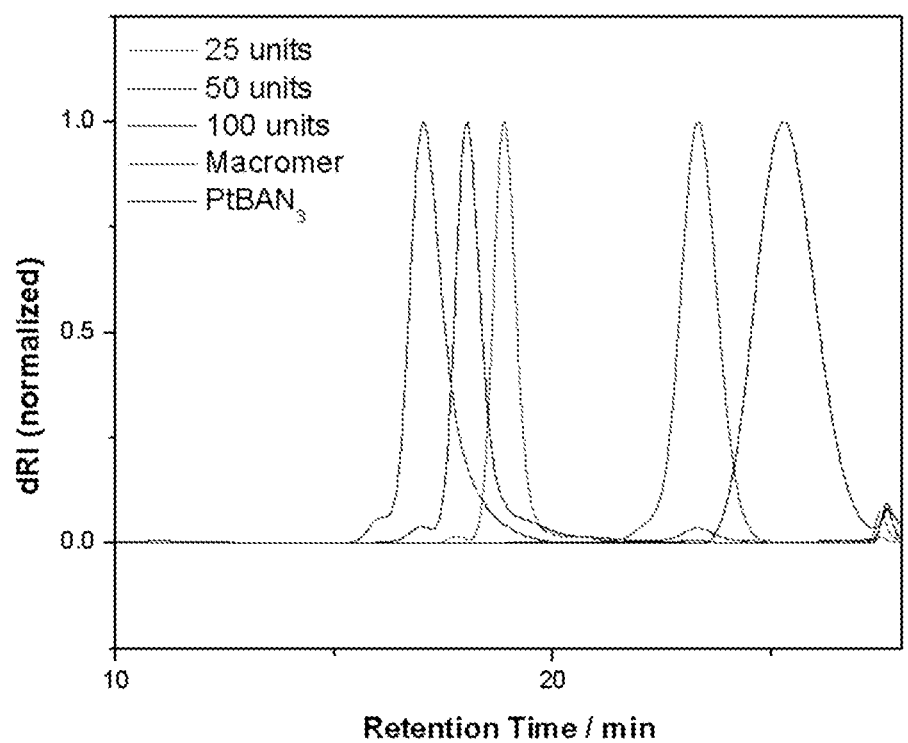
FIG. 24 shows differential refractive index GPC traces of (PtBA-3.6k-branch-PDMS-5k)$_n$.
Figure 25:
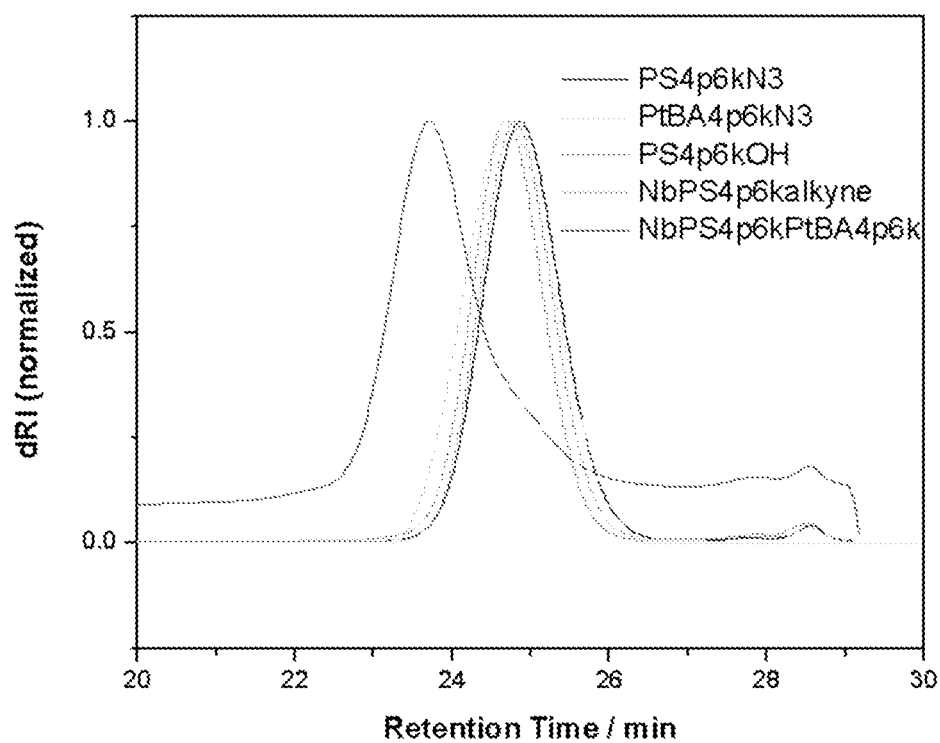
FIG. 25 shows differential refractive index GPC traces of starting materials and intermediates for 3.
Figure 26:
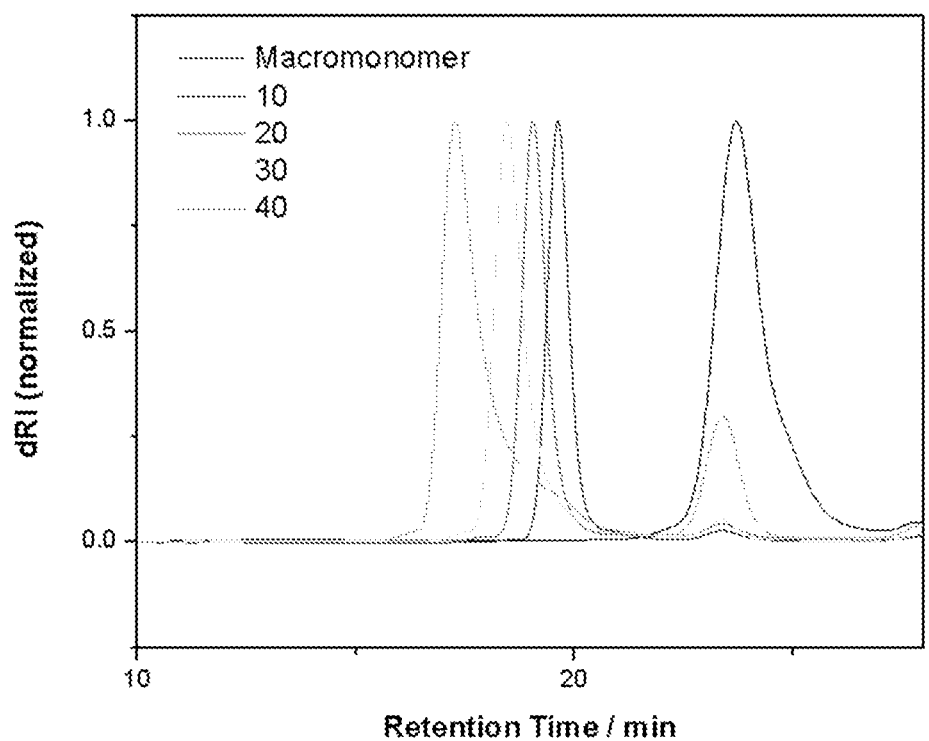
FIG. 26 shows differential refractive index GPC traces of (PS-4.6k-branch-PtBA-4.6k)$_n$.

The SCFT results shed light on the unique features of the new architecture of the bottlebrush polymer. The ability to regulate the spacing between the brush chains adds an extra constraint on the chain accessible volume. The close packing of the side chains forces the ends to stretch away from the interface. This is inferred from the increase of $L_0$ beyond the ideal value of a diblock ($L^{ideal}_0$ ~3.86Rg)$^{1(a)}$. The behavior becomes more prominent as the number of side chains increase where the polymer deviates from a star like structure to a bottlebrush structure. In the SCFT analysis, the transition occurs as the number of segments increases above nine. The chain distribution can be better understood if we analyze a single chain propagating in an applied field. In this regard, we freeze the equilibrium $W_i$ fields and change the initial condition of $qc(r_o,0,1)=1$, where $r_o$ is any point in space with a large relative density of C ($\phi C$). In the current polymer structure, $\phi C$ is maximum at the AB interface. FIG. 11 compares the probability distribution of a short (m=4) and long (m=29) chains propagating along the AB interface. The probability of finding the chain end can be accurately fit by two Gaussians to determine the spread as shown in the insets. The dotted background lines are for $\phi A$.

By plotting the propagator of the end point $q_C(r,N_C,m+1)$, the root mean square end-to-end $\sqrt{<R2>}$ distance can be calculated. FIG. 8 showed the evolution of the $\sqrt{<R2>}$ as a function of the size of the backbone C. Normal to the AB interface, the chain size remains almost constant with increasing the backbone size. This is consistent with the diffuse interface observed in the density profile of FIG. 9. However, the chain size was observed to continuously grow along the interface as the number of segments m increases. The chain growth closely follows a power law of $\sqrt{<R2>} \sim N^{0.54}$ which is slightly larger than the ideal chain model of $\sqrt{<R2>} \sim N^{0.5}$, see FIG. 8. The increase of the power law hints on the fact that chain C is also stretched in order to accommodate the dense packing of the side AB chains.

The 3D analysis of the bottlebrush structure can provide more information on chain packing and the conditions under which particular morphologies might emerge. Here, a simple phase diagram at m=4 and at two degrees of segregation $\chi_{AB}N=12$ and $\chi_{AB}N=17$ was constructed. The resulting morphologies when changing $f_A$ between 0.3 and 0.5 was studied. This goes slightly beyond the $f_A=f_B$ point due to the presence of C. $f^0_C$ is kept constant at the previously mentioned value. A cubic computational cell of 60 pixels a side was used. Every pixel has magnitude of $0.2R_g$. FIG. 9 shows the resulting phases, where the $\chi_{AB}N=17$ exhibits only two phases of lamellae and cylinders. The transition happens at $f_A$~0.36. No gyroid structure was observed. In addition, spherical BCC structure was not generated in the range of $f_A$ studied. On the other hand, the low $\chi_{AB}N=12$ demonstrated a different behavior where the lamellar structure persisted in the range of $f_A$>0.46. Below which a window of gyroid structure emerged at $f_A$=0.44-0.46. Lower than that, defective bicontinuous domains were generated till the disordered phase appeared below. $f_A$=0.4. The results indicate that the bottlebrush structure can stabilize a gyroid phase at low $\chi_{AB}N$. This can be expected with the ability of structure of introduce curvature in the case of unequal side-chain size.

Synthetic Procedures

Bromide-terminated polystyrene (PS—Br) was synthesized according to literature procedure, using the activator regenerated by electron transfer (ARGET) ATRP protocol.[20] Bromide-terminated poly(tert-butyl acrylate) (PtBA-Br) was synthesized according to literature procedure, using standard ATRP conditions.[21]

Grubbs Catalyst

A modified 3rd generation Grubbs' catalyst was synthesized according to literature procedure from the second generation Grubbs' catalyst, provided by Materia, Inc.[23] The catalyst was weighed into 4 mL vials under ambient conditions and stored in the glovebox. The catalyst was then dissolved in the requisite amount of THF to produce a 5 mg/mL stock solution inside the glovebox. The correct volume of stock solution was then dispensed to each reaction vial using a micropippetor. After 2.5 hours, the reactions were removed from the glovebox and quenched with three to five drops of ethyl vinyl ether. An aliquot of the reaction mixture was removed for GPC analysis.

Synthesis of PS—$N_3$

PS—Br was converted to azide-terminated polystyrene (PS—$N_3$) using the procedure below. The starting material was not completely purified before proceeding to the azidation; anisole and trace styrene were carried through and removed during the step below. The procedure below is based on PS of $M_n$: 4600.

To a dry 500 mL round bottom flask was added 23.3 g of PS—Br and 1.33 g of sodium azide. The flask was evacuated and backfilled with nitrogen three times. Then, approximately 130 mL of anhydrous DMF was cannulated into the flask under nitrogen. The reaction was then heated to 50° C. overnight under aluminum foil. After 18 hours, the reaction was cooled to room temperature and diluted with 200 mL of toluene. The organic layer was washed five times with water and once with brine. The organic layer was dried over sodium sulfate, filtered, and concentrated under reduced pressure. The material was then redissolved in THF and precipitated by dropwise addition to a stirring beaker of methanol (80-100 mL/g of PS). The product was collected by filtration through a medium fritted glass funnel.

PS2300: The product was collected as a white powder. 9.76 g

PS3300: The product was collected as a white powder. 13.70 g

PS4600: The product was collected as a white powder. 21.18 g

PS6400: The product was collected as a white powder. 25.30 g

PS8200: The product was collected as a white powder. 10.1 g

PS9200: The product was collected as a white powder. 11.02 g

PS 10300: The product was collected as a white powder. 10.50 g

PS 15300: The product was collected as a white powder. 9.19 g

Synthesis of PtBA-$N_3$

PtBA-Br was converted to azide-terminated PtBA (PtBA-Ns) using the procedure below. The starting material was not completely purified before proceeding to the azidation; anisole and trace tert-butyl acrylate were carried through and removed during the step below. The procedure below is based on PtBA of $M_n$: 4600.

To a dry 500 mL round bottom flask was added 16 g of PtBA-Br and 1.33 g of sodium azide. The flask was evacuated and backfilled with nitrogen three times. Then, approximately 130 mL of anhydrous DMF was cannulated into the flask under nitrogen. The reaction was then heated to 50° C. overnight under aluminum foil. After 18 hours, the reaction was cooled to room temperature and diluted with 200 mL of ethyl acetate. The organic layer was washed five times with water and once with brine. The organic layer was dried over sodium sulfate, filtered, and concentrated under reduced pressure. The material was then redissolved in DCM and chromatographed on silica using a 0 to 8% methanol/DCM gradient. The product eluted at approximately 5-6% methanol. The product was collected and the solvent was evaporated on a rotary evaporator. The rotation and vacuum were controlled such that the product dried as a foam inside the flask. The flask was then dried on a vacuum line overnight. Foaming during concentration and drying allows for facile collection of the product by scraping from the inside of the flask.

PtBA 3.6k: 8.5 g

PtBA 4.6k: 11 g

Synthesis of Compound S1

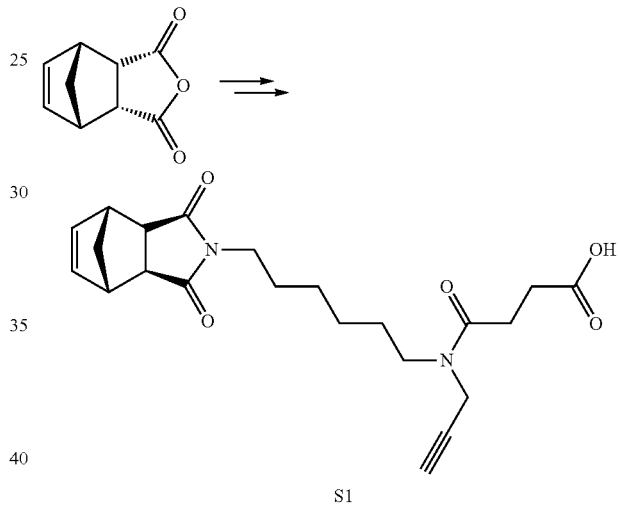

This compound was synthesized from cis-endo-Bicyclo[2.2.1]hept-5-ene-2,3-dicarboxylic anhydride according to literature procedure.[6(a)]

Nb-PDMS-alkyne (Compound S2)

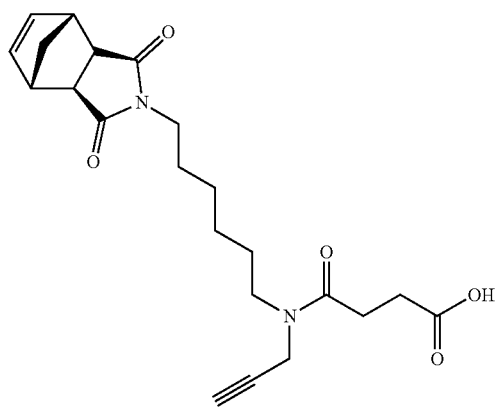

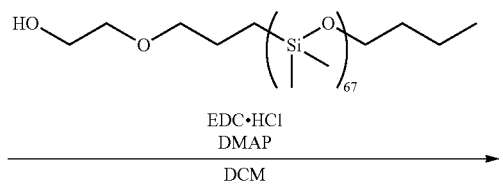

EDC·HCl
DMAP
DCM

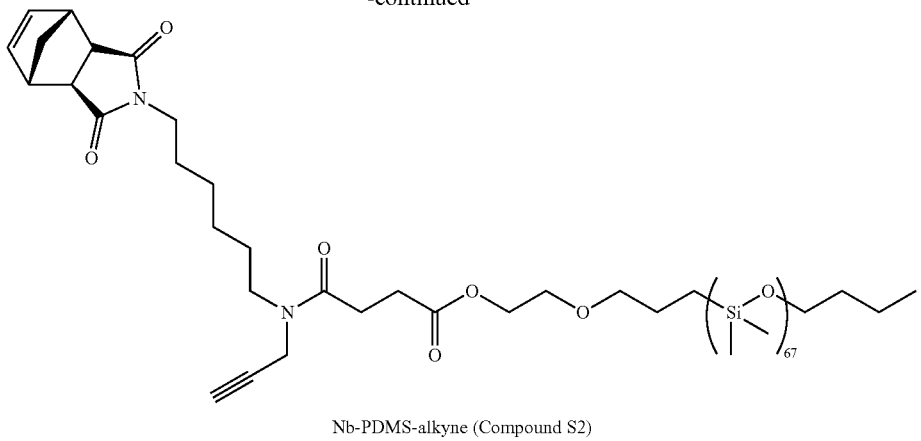

Nb-PDMS-alkyne (Compound S2)

To a flame-dried 100 mL round bottom flask was added 844.6 mg (2.1 mmol, 1 equiv) of compound S1, 9.74 g (2.1 mmol, 1 equiv) of PDMS ($M_n$: 5000) monocarbinol (from Gelest MCR-C18), 1.2 g (6.3 mmol, 3 equiv) of EDC-HCl, and 51 mg (0.42 mmol, 0.2 equiv) of DMAP. The flask was evacuated and backfilled with nitrogen three times, after which 20 mL of anhydrous dichloromethane was added via syringe. The reaction mixture was stirred for 16 hours at room temperature under nitrogen. The reaction mixture was concentrated under reduced pressure, and loaded directly onto a silica gel column. The column was first flushed with 100% dichloromethane to remove excess PDMS monocarbinol and the polarity was increased with a gradient to 8% methanol in dichloromethane to elute the desired product at approximately 6-7% methanol. The product was isolated as a viscous, slightly yellow oil. 8.03 g, 71% yield.

Nb-PLA-alkyne

Nb-PLA-alkyne could also be prepared from compound S1 by incorporation of poly(lactic acid).

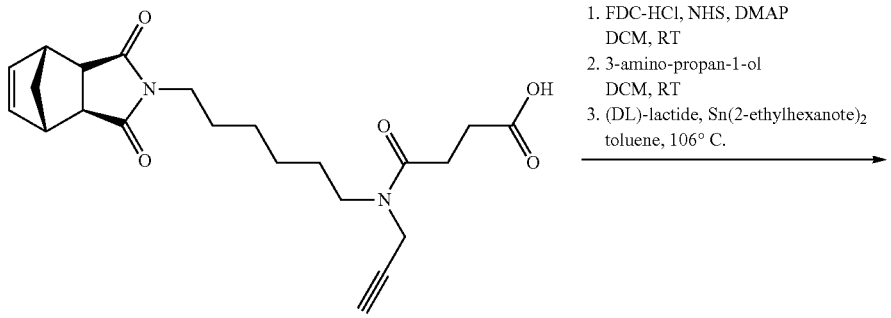

1. FDC-HCl, NHS, DMAP
   DCM, RT
2. 3-amino-propan-1-ol
   DCM, RT
3. (DL)-lactide, Sn(2-ethylhexanote)$_2$
   toluene, 106° C.

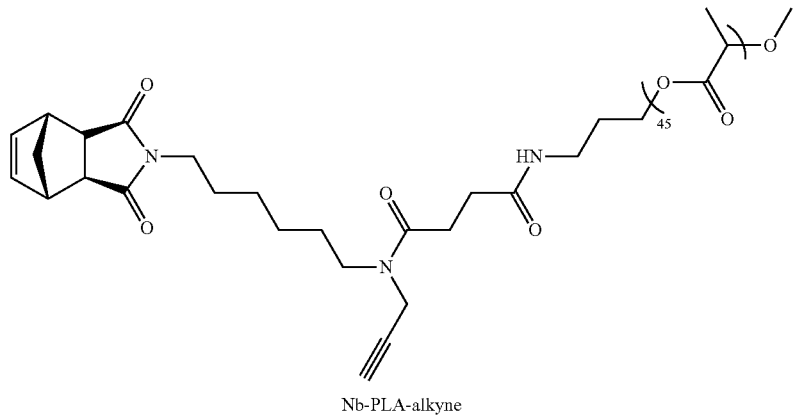

Nb-PLA-alkyne

Synthesis of Macromonomers 1 and 2

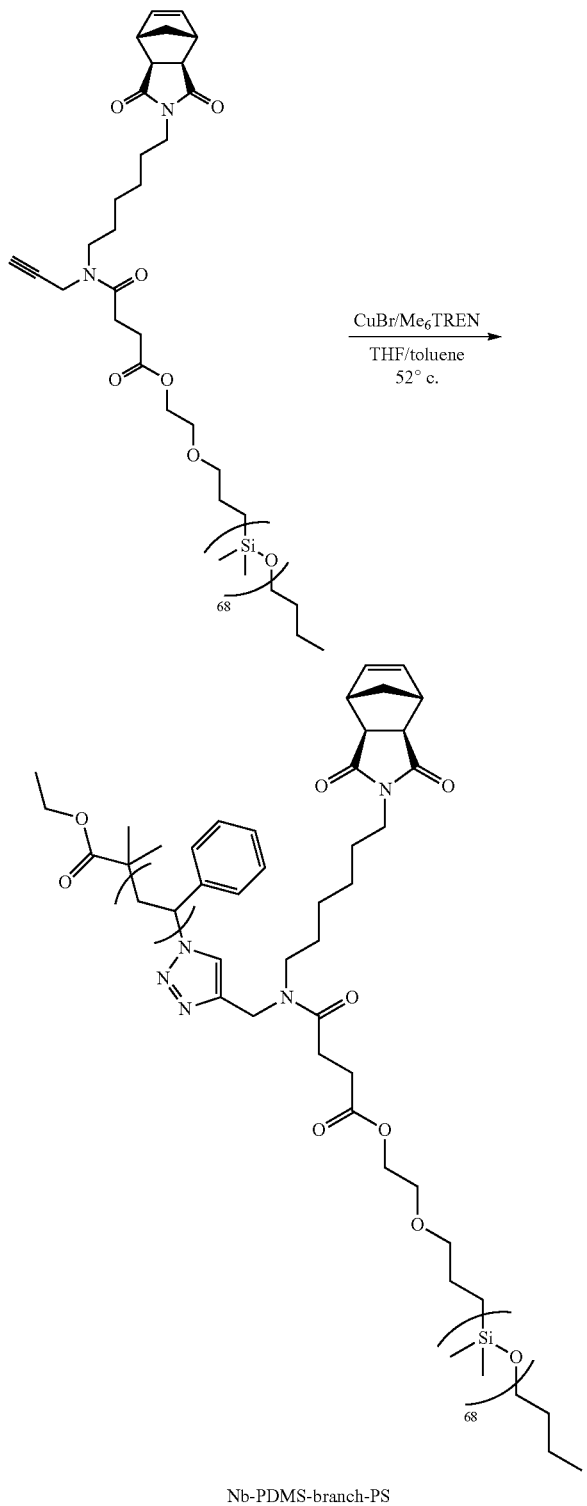

Nb-PDMS-branch-PS

Macromonomer 1 was synthesized with eight different Mn of PS-N3: 2300, 3300, 4600, 6400, 8200, 9200, 10,300, and 15,300. The same procedure was used for each molecular weight combination. Below is a representative protocol with PS of 4600 Mn.

To a 20 mL microwave vial was added 1.251 g (0.23 mmol, 1 equiv) of compound S2 via syringe. Then 1.53 g (0.33 mmol, 1.33 equiv) of PS-N3 (Mn: 4600) was added. The mixture was dissolved in 8 mL of THF and the vial was sealed with a PTFE-lined septum and aluminum crimp-top cap. The septum was pierced with a nitrogen inlet needle and an outlet needle and the solution was sparged for 45 minutes with nitrogen. The needles were carefully removed and the holes were sealed with electrical tape. The vial was brought into a nitrogen atmosphere glovebox, after which 1 mL of a stock solution of CuBr/Me$_6$TREN in toluene was added. The vial was then heated to 52° C. in the glovebox for 24 hours. In order to remove excess PS—N$_3$ and/or Nb-PDMS-alkyne, the vial was opened in the glovebox and 300 mg of azide-functionalized PS beads (average 4 mmol/gram), 300 mg of alkyne-functionalized PS beads (average 4 mmol/gram), and an extra 0.5 mL of the same CuBr/Me$_6$ TREN catalyst solution were added. The reaction was resealed and stirred for a minimum of 24 extra hours. To quench the reaction, the vial was removed from the glovebox, opened to air, and 5-10 mL of HPLC grade (not anhydrous or deoxygenated) THF was added and allowed to stir for at least 5 minutes. A 1 inch diameter column was packed with 4-5 inches of activated neutral alumina and equilibrated with HPLC-grade THF. To remove the majority of the copper, the reaction mixture, including the beads, were directly applied to the column, which was then flushed with approximately three column volumes of THF. The solvent was removed under reduced pressure at 40° C. to remove as much residual THF and toluene as possible. The product was redissolved in dichloromethane and chromatographed on silica gel using a 0→8% methanol/DCM gradient. The majority of the product eluted at approximately 6-7% methanol. The product was collected and dried under vacuum. 2.17 g, 98% yield.

PS2300/PDMS5000: The product was collected as a waxy solid. 2.1 g, 65% yield

PS3300/PDMS5000: The product was collected as a white, waxy solid. 2.42 g, 72% yield PS4600/PDMS5000: The product was collected as a slightly waxy, white solid. 1.69 g, 70% yield PS6400/PDMS5000: The product was collected as a white solid. 1.70 g, 93% yield PS8200/PDMS5000: The product was collected as a white solid. 1.50 g, 87% yield PS9200/PDMS5000: The product was collected as a white solid. 1.82 g, 68% yield PS10300/PDMS5000: The product was collected as a white solid. 1.35 g, 38% yield PS15300/PDMS5000: The product was collected as a white solid. 1.09 g, 72% yield Preparation of CuBr/Me$_6$ TREN Catalyst Solution CuBr was first purified according to literature procedure to remove Cu(II) salts.[22] CuBr was first weighed in a 40 mL scintillation vial inside a glovebox. The CuBr was then dispersed in toluene to a concentration of 20 mg/mL. Then, 1.1 equivalents of Me$_6$ TREN was added dropwise to the solution. The solution was stable for several weeks at a time. Some Cu(0) precipitated due to disproportionation, but did not seem to affect the reaction.

Synthesis of Macromonomer 2

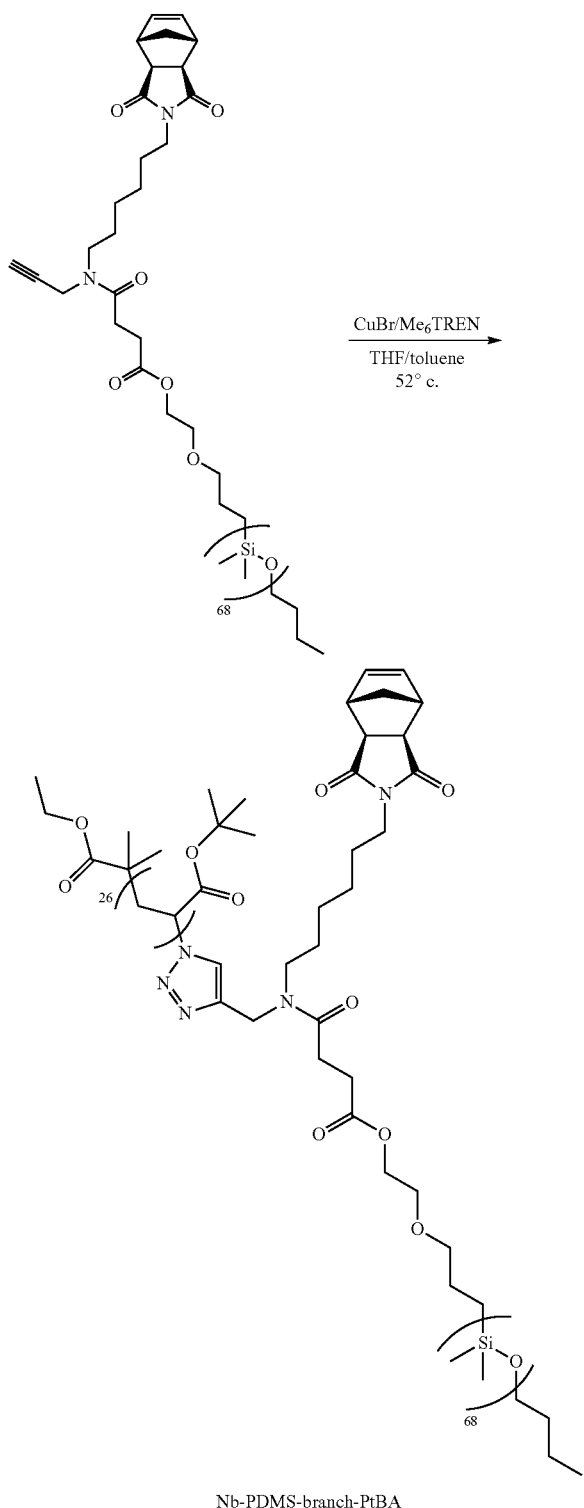

Nb-PDMS-branch-PtBA

Macromonomer 2 was synthesized in the same manner as macromonomer 1 but with PtBA-N3 as the azide for the copper catalyzed azide-alkyne cycloaddition. The product was isolated a sticky, gummy wax that initially foamed under vacuum. 1.727 g, 92% yield.

Synthesis of Compound S3

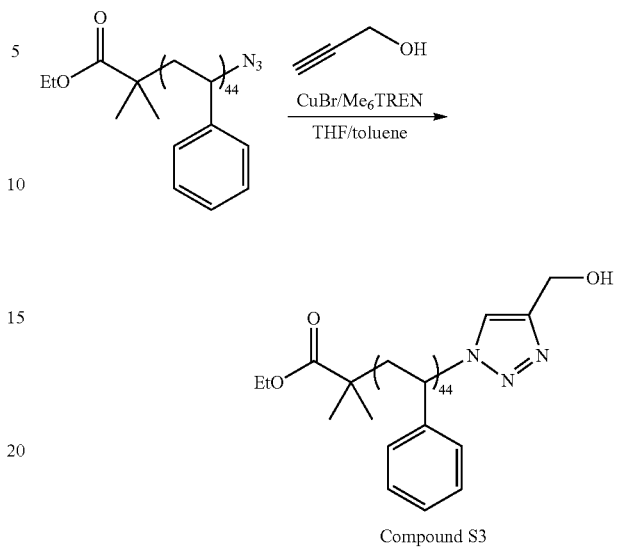

Compound S3

To a 20 mL microwave vial was added 2.09 g (0.45 mmol, 1 equiv) of PS—N$_3$ (Mn: 4600). The mixture was dissolved in 8 mL of THF and the vial was sealed with a PTFE-lined septum and aluminum crimp-top cap. The septum was pierced with a nitrogen inlet needle and an outlet needle and the solution was sparged for 45 minutes with nitrogen. The needles were carefully removed and the holes were sealed with electrical tape. The vial was brought into a nitrogen atmosphere glovebox, after which 250 μL (244 mg, 4.5 mmol, 10 equiv) of propargyl alcohol and 1 mL of a stock solution of CuBr/Me$_6$ TREN in toluene was added (vide infra). The vial was then heated to 52° C. in the glovebox for 24 hours. In order to remove excess PS—N$_3$, the vial was opened in the glovebox and 300 mg of alkyne-functionalized polystyrene beads (average 4 mmol/gram), and an extra 0.5 mL of the same CuBr/Me$_6$ TREN catalyst solution were added. The reaction was resealed and stirred for a minimum of 24 extra hours. To quench the reaction, the vial was removed from the glovebox, opened to air, and 5-10 mL of HPLC grade (not anhydrous or deoxygenated) THF was added and allowed to stir for at least 5 minutes. A 1 inch diameter column was packed with 4-5 inches of activated neutral alumina and equilibrated with HPLC-grade THF. To remove the majority of the copper, the reaction mixture, including the beads, were directly applied to the column, which was then flushed with approximately three column volumes of THF. The solvent was removed under reduced pressure at 40° C. to remove as much residual THF and toluene as possible. The product was redissolved in dichloromethane and chromatographed on silica gel using a 0→8% methanol/DCM gradient. The majority of the product eluted at approximately 4-5% methanol. The product, compound S3, was collected and dried under vacuum. 1.513 g, 72% yield.

Synthesis of Compound S4

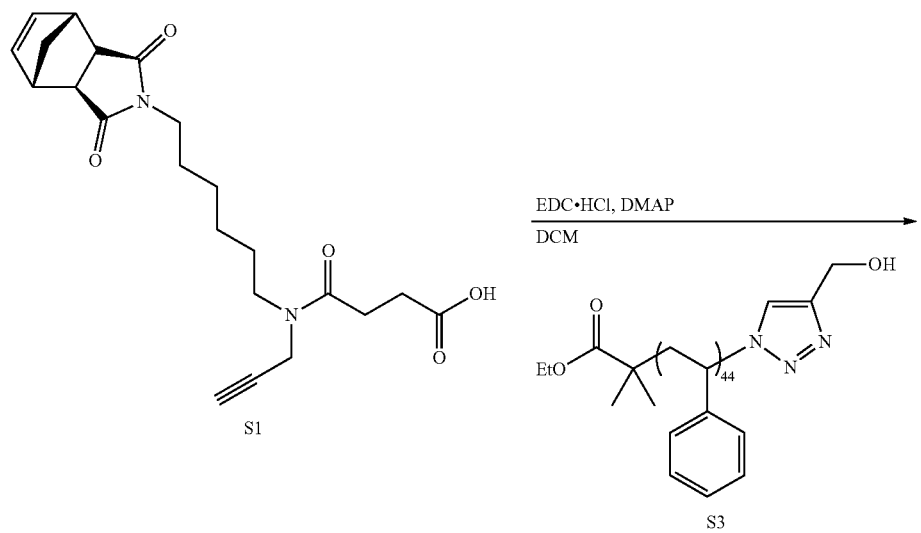

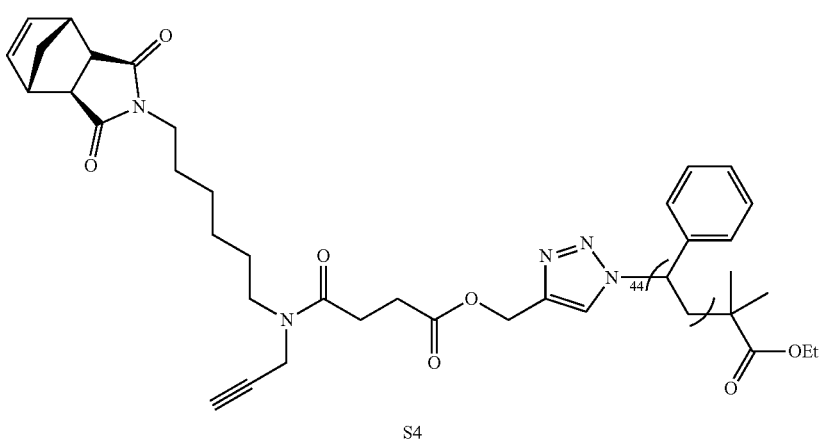

To a flame-dried 50 mL round bottom flask was added 128 mg (0.322 mmol, 1 equiv) of compound S1, 1.513 g (0.322 mmol, 1 equiv) of compound S3, 154 mg (0.805 mmol, 2.5 equiv) of EDC.HCl, and 11.8 mg (0.1 mmol, 0.3 equiv) of DMAP. The flask was evacuated and backfilled with nitrogen three times, after which 10 mL of anhydrous dichloromethane was added via syringe. The reaction mixture was stirred for 16 hours at room temperature under nitrogen. The reaction mixture was concentrated under reduced pressure, and loaded directly onto a silica gel column. The column was first flushed with 100%/o dichloromethane to remove excess PDMS monocarbinol and the polarity was increased with a gradient to 8% methanol in dichloromethane to elute the desired product at approximately 6-7% methanol. The product was isolated as white solid. 1.26 g, 78% yield.

Synthesis of Macromonomer 3

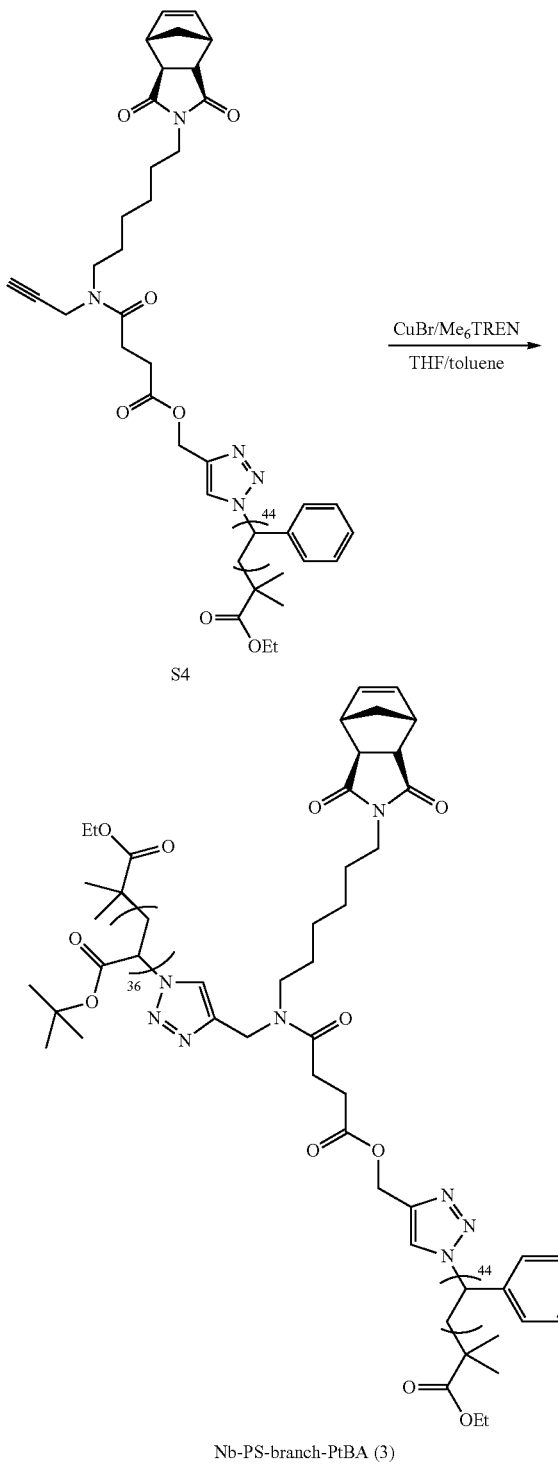

Nb-PS-branch-PtBA (3)

To a 20 mL microwave vial was added 1.267 g (0.253 mmol, 1 equiv) of compound S4 and 1.170 g (0.253 mmol, equiv) of PtBA-N$_3$ (M$_n$: 4600). The mixture was dissolved in 8 mL of THF and the vial was sealed with a PTFE-lined septum and aluminum crimp-top cap. The septum was pierced with a nitrogen inlet needle and an outlet needle and the solution was sparged for 45 minutes with nitrogen. The needles were carefully removed and the holes were sealed with electrical tape. The vial was brought into a nitrogen atmosphere glovebox, after which 1 mL of a stock solution of CuBr/Me$_6$TREN in toluene was added (vide infra). The vial was then heated to 52° C. in the glovebox for 24 hours. In order to remove excess PtBA-N$_3$ and S4 the vial was opened in the glovebox and 300 mg of alkyne-functionalized polystyrene beads (average 4 mmol/gram), 300 mg of azide-functionalized PS beads (average 4 mmol/gram), and an extra 0.5 mL of the same CuBr/Me$_6$TREN catalyst solution were added. The reaction was resealed and stirred for a minimum of 24 extra hours. To quench the reaction, the vial was removed from the glovebox, opened to air, and 5-10 mL of HPLC grade (not anhydrous or deoxygenated) THF was added and allowed to stir for at least 5 minutes. A 1 inch diameter column was packed with 4-5 inches of activated neutral alumina and equilibrated with HPLC-grade THF. To remove the majority of the copper, the reaction mixture, including the beads, were directly applied to the column, which was then flushed with approximately three column volumes of THF. The solvent was removed under reduced pressure at 40° C. to remove as much residual THF and toluene as possible. The product was redissolved in dichloromethane and chromatographed on silica gel using a 0→8% methanol/DCM gradient. The majority of the product eluted at approximately 7% methanol. The product was collected and dried under vacuum. 1.941 g, 77% yield.

Synthesis of Nb—PS-Branch-PLA

In analogous fashion, Nb—PS-branch-PLA was prepared from Nb-PLA-alkyne.

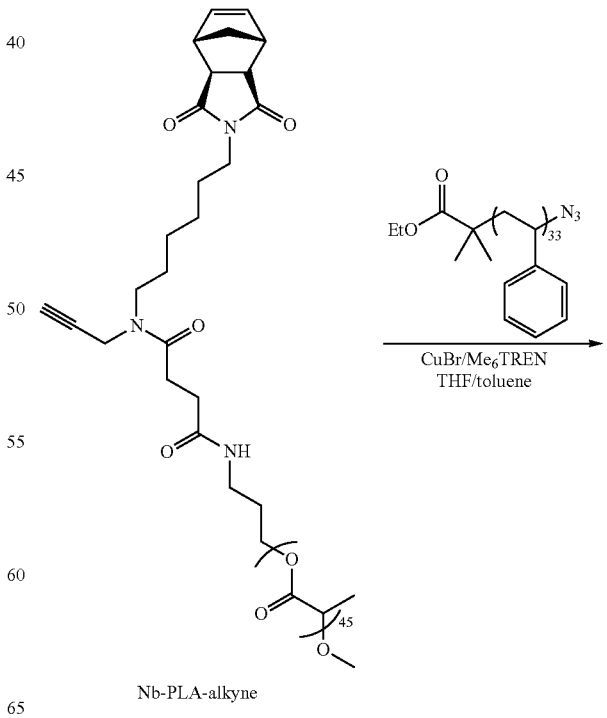

Nb-PLA-alkyne

147

-continued

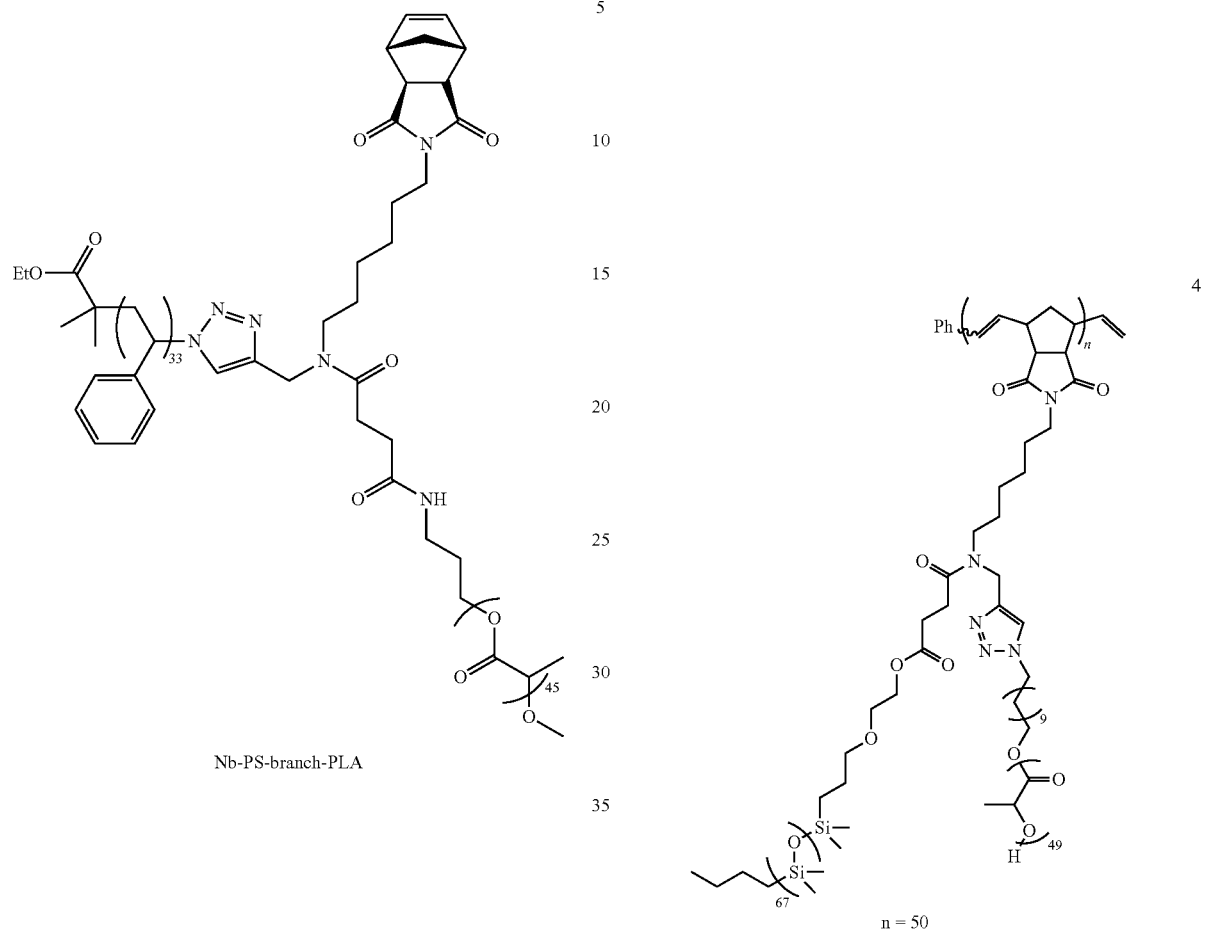

Nb-PS-branch-PLA

ROMP of Macromonomers

All ROMPs were performed in 2 mL vials equipped with Teflon stir bars and PTFE-lined caps. For macromonomers that could be easily scraped (i.e. 1 for PS 3300 and above and 3), 50 mg of the material were weighed out into glass vials. The vials were brought into the glovebox and then dissolved in 50 µL of THF while stirring. For macromonomers that were too waxy or intractable to handle with a spatula (i.e. 1 for PS 2300 and 2), the macromonomers were first dried under vacuum in a 20 mL scintillation vial and then brought into a glovebox. Anhydrous THF was added to dissolve the macromonomer at a concentration of 500 mg/mL; the density of the polymer was taken to be 1 g/mL in order to account for its volume. The macromonomer stock solution was then dispensed to 2 mL vials using a micropipettor.

148

In addition to the synthesis of 1-3, the following bottlebrush polymer (4) was synthesized in analogous fashion:

Bottlebrush polymer 4 (n=50) exhibited a larger periodicity than the macromonomer employed for its preparation. AFM of surface bulk samples showed ordered morphology.

Diblock bottlebrush copolymers (5) and (6) were also prepared in analogous fashion, but employing standard techniques of sequential polymerization for formation of the diblock copolymers. The following sets of diblock copolymers were prepared accordingly:

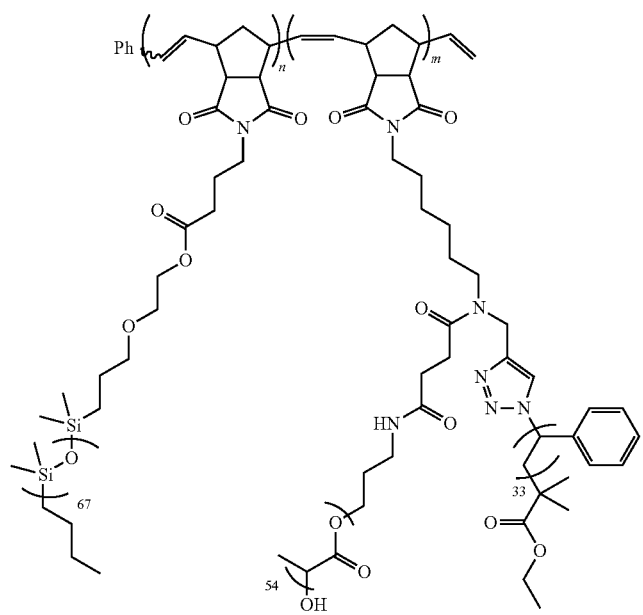

n = 25, m = 25
n = 50, m = 50
n = 100, m = 100

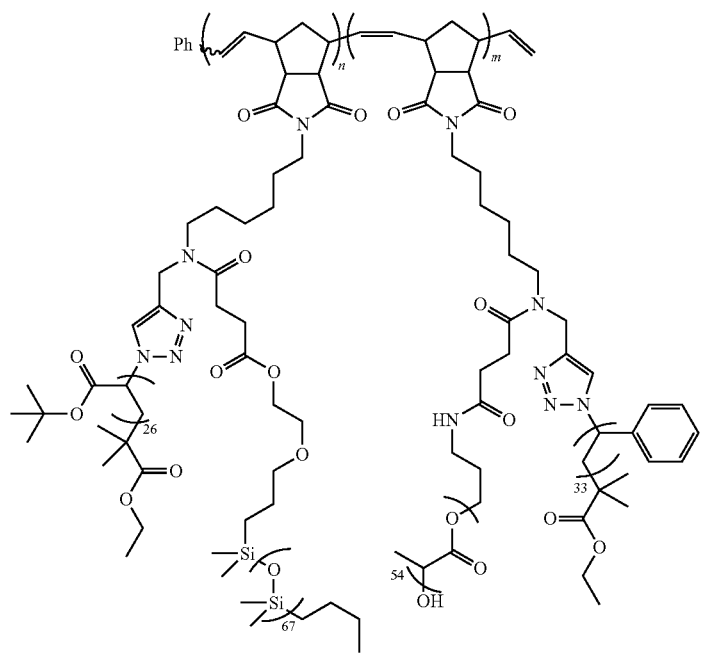

n = 25, m = 25

Bottlebrush copolymer 5 (n=25, 50, 100) showed ordered lamellar morphology Brushes of higher DP appeared to be photonic crystals. Bottlebrush copolymer 6 (n=25) was visible by SAXS, but internal sidechain features were not highly ordered (annealed at 120° C.). Brushes appeared to be photonic crystals.

Figure 27:
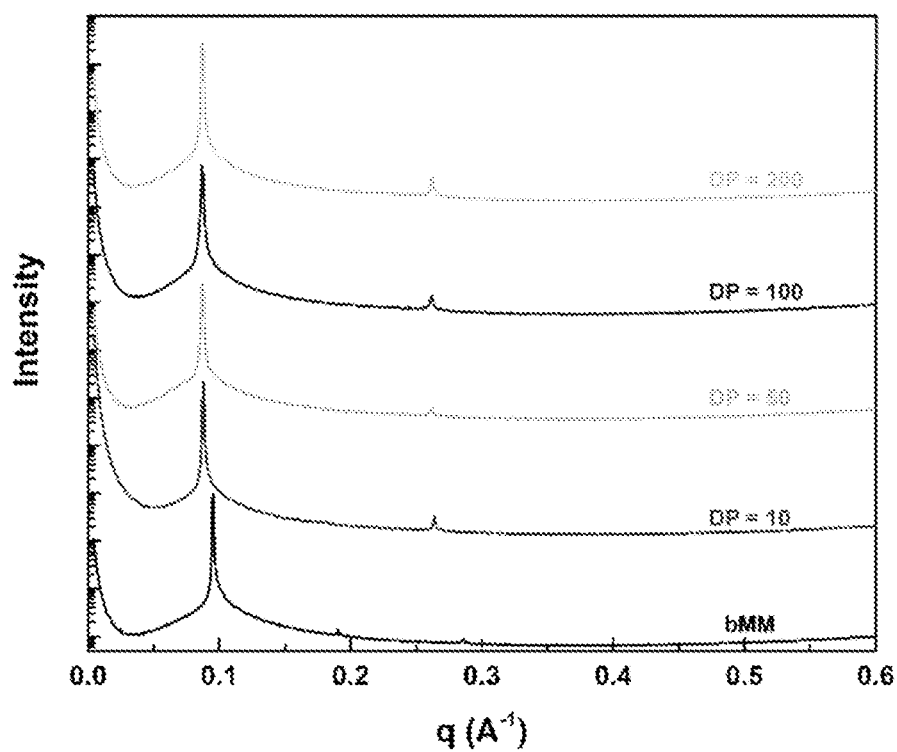
FIG. 27 shows that BBCP containing monodisperse PLA and PDMS with molecular weight of 1000 were synthesized. A ultra-small d-spacing of 5.68 nm. i.e., 2.84 nm single phase domain size, was observed in the long range ordered phase separation of PLA$_8$-branch-PDMS 1000 BBCP. Subscript stands for the degree of polymerization (DP) of a monodisperse sidechain polymer. SAXS patterns of BBCP containing PDMS 1000 and PLA$_{12}$ sidechains (left) and PDMS 1000 and PLA$_8$ sidechains (right). (DP) in the plots are the DP of a backbone; the broad peaks around q~0.4 Å$^{-1}$ originate from Kapton tape used to hold liquid samples.
Figure 27:
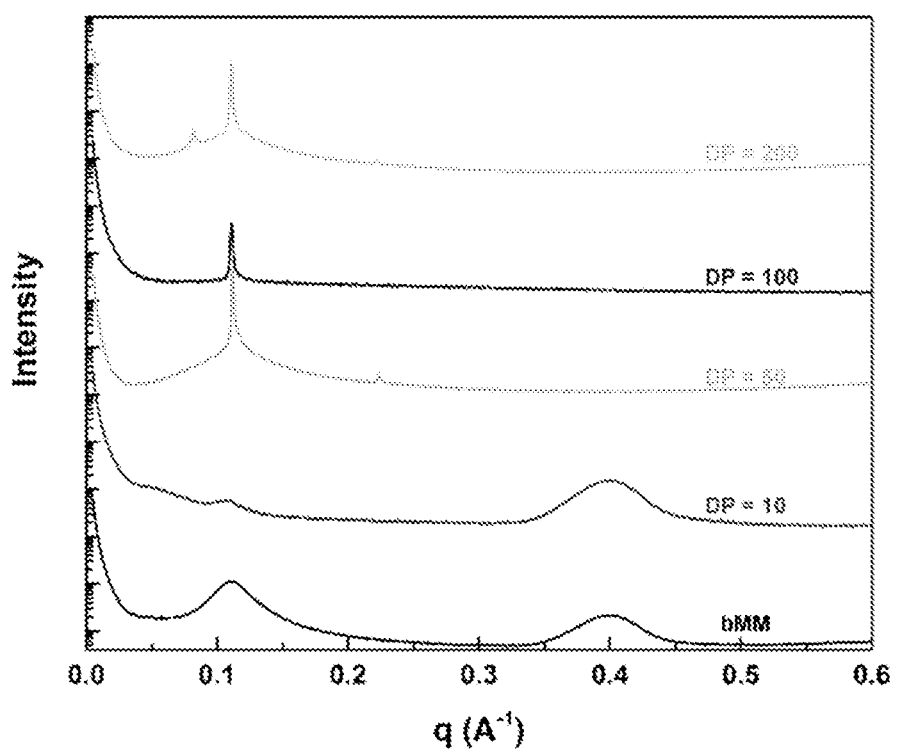

BBCP containing monodisperse PLA and PDMS with molecular weight of 1000 were also synthesized. A ultra-small d-spacing of 5.68 nm, i.e., 2.84 nm single phase domain size, was observed in the long range ordered phase separation of $PLA_8$-branch-PDMS 1000 BBCP. Subscript stands for the degree of polymerization (DP) of a monodisperse sidechain polymer (FIG. 27).

BBCP containing both monodisperse PLA and PDMS sidechains were also synthesized and characterized. d-Spacings BBCP samples with backbone DP of 100 are summarized in Table 2. The morphology of each sample is provided in the parenthesis. DIS: disordered. L: lamellae.

TABLE 2 d-Spacings of BBCP containing monodisperse PLA and PDMS sidechains

|  | $PLA_8$ | $PLA_{12}$ | $PLA_{16}$ |
|---|---|---|---|
| $PDMS_7$ | 4.24 nm (DIS) | 5.15 nm (DIS) | 5.93 nm (DIS/L) |
| $PDMS_{11}$ | 5.11 nm (DIS) | 6.30 nm (L) | 7.03 nm (L) |
| $PDMS_{15}$ | 5.82 nm (DIS) | 6.85 nm (L) | 7.73 nm (L) |

PS/PLA Bottlebrush Polymers with Gyroid Morphologies

Figure 28:
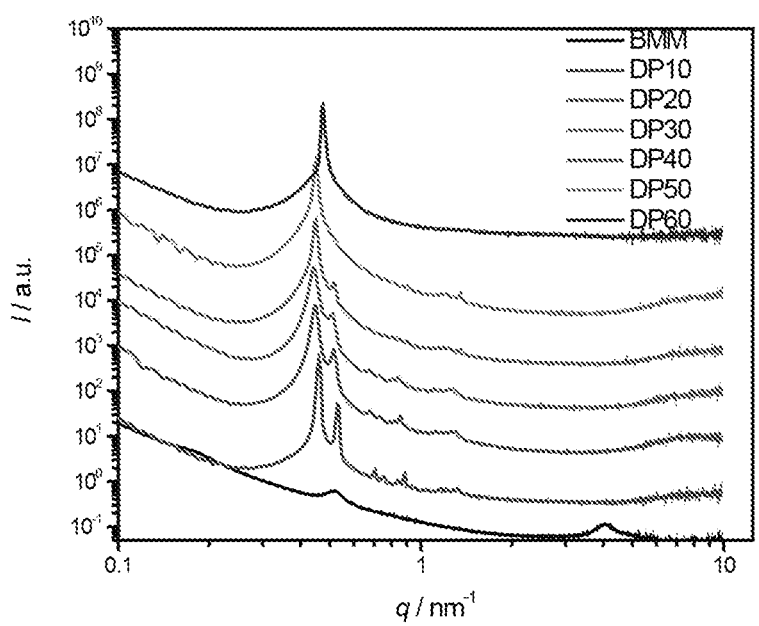
FIG. 28 shows 1D SAXS profile for (PS4.7k-br-PLA3.8k)$_n$. This polymer exhibited gyroid morphology with d=13.6 nm.

In addition to the PDMS/PS, PDMS/PtBA AB branched bottlebrush polymers PS/PLA AB branched bottlebrush polymers were also prepared as shown in the scheme below. These BBCPs had surprising gyroid morphologies; in particular, (PS4.7k-br-PLA3.8k)$_n$ as shown in FIG. 28.

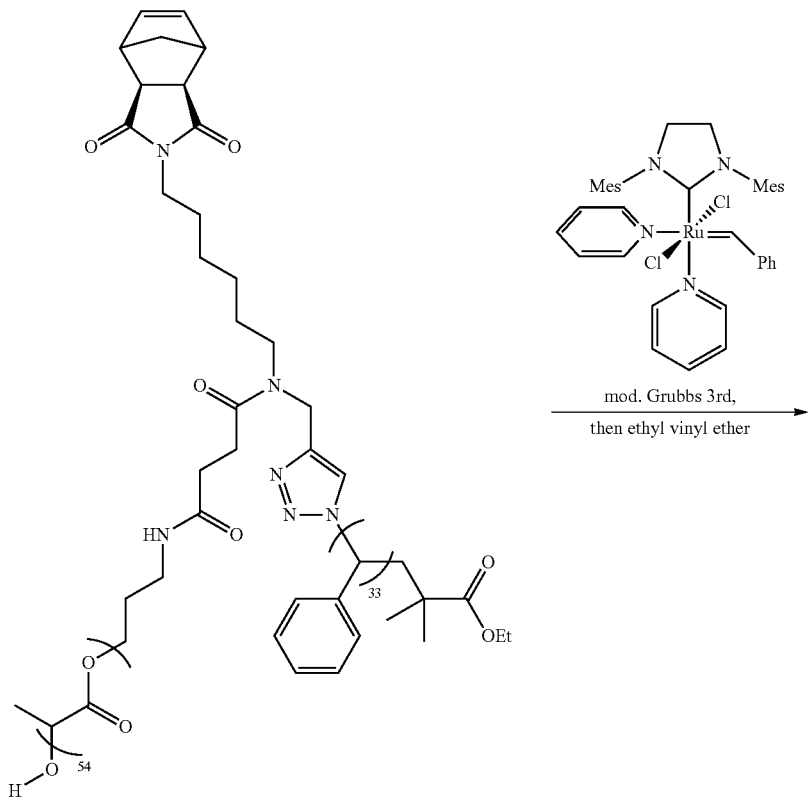

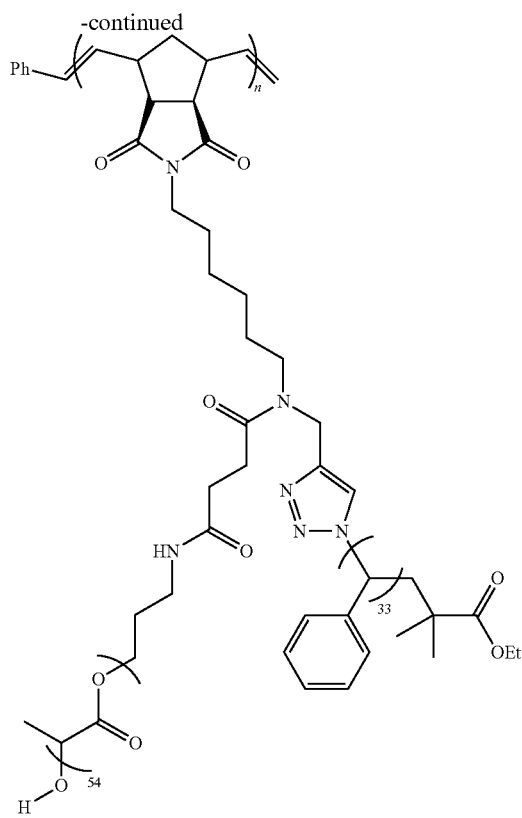

REFERENCES (1) (a) Bates, F. S.; Fredrickson, G. H. Physics Today 1999, 52, 32; (b) Verduzco, R.; Li, X.; Pesek. S. L.; Stein, G. E. Chem. Soc. Rev. 2015, 44, 2405.

(2) (a) Hawker, C. J.; Frechet, J. M. J. J. Am. Chem. Soc. 1990, 112, 7638; (b) Frechet, J. M. Science 1994, 263, 1710; (c) Zheng, W.; Wang, Z.-G. Macromolecules 1995, 28, 7215; (d) Bohbot-Raviv, Y.; Wang, Z.-G. Phys. Rev. Lett. 2000, 85, 3428; (e) Gao, H.; Matyjaszewski, K. Prog. Polym. Sci. 2009, 34, 317; (f) Lutz, J.-F.; Lehn, J.-M.; Meijer, E. W.; Matyjaszewski, K. Nature Reviews Materials 2016, 1, 16024.

(3) (a) Sheiko, S. S.; Sumerlin, B. S.; Matyjaszewski, K. Prog. Polym. Sci. 2008, 33, 759; (b) Lee, H.-i.; Pietrasik, J.; Sheiko, S. S.; Matyjaszewski, K. Prog. Polym. Sci. 2010, 35, 24; (c) Rzayev, J. ACS Macro Letters 2012, 1, 1146.

(4) (a) Xia, Y.; Olsen, B. D.; Kornfield, J. A.; Grubbs, R. H. J. Am. Chem. Soc. 2009, 131, 18525; (b) Xia Y.; Kornfield, J. A.; Grubbs, R. H. Macromolecules 2009, 42, 3761; (c) Miyake, G. M.; Piunova, V. A.; Weitekamp, R. A.; Grubbs, R. H. Angew. Chem. Int. Ed. 2012, 51, 11246; (d) Sveinbjoemsson, B. R.; Weitekamp, R. A.; Miyake, G. M.; Xia, Y.; Atwater, H. A.; Grubbs. R. H. Proc. Natl. Acad. Sci. U.S.A 2012, 109, 14332.

(5) (a) Héroguez, V.; Amedro, E.; Grande, D.; Fontanille, M.; Gnanou, Y. Macromolecules 2000, 33, 7241; (b) Li, Z.; Ma, J.; Lee, N. S.; Wooley, K. L. J. Am. Chem. Soc. 2011, 133, 1228.

(6) (a) Johnson, J. A.; Lu, Y. Y.; Burts, A. O.; Xia, Y.; Durrell, A. C.; Tirrell, D. A.; Grubbs, R. H. Macromolecules 2010, 43, 10326; (b) Johnson, J. A.; Lu, Y. Y.; Burts, A. O.; Lim, Y.-H.; Finn, M. G.; Koberstein, J. T.; Turro, N. J.; Tirrell, D. A.; Grubbs, R. H. J. Am. Chem. Soc. 2011, 133, 559; (c) Liu, J.; Burts, A. O.; Li, Y.; Zhukhovitskiy, A. V.; Ottaviani, M. F.: Turro, N. J.; Johnson. J. A. J. Am. Chem. Soc. 2012, 134, 16337; (d) Burts, A. O.; Li, Y.; Zhukhovitskiy, A. V.; Patel, P. R.; Grubbs, R. H.; Ottaviani, M. F.; Turro, N. J.; Johnson, J. A. Macromolecules 2012, 45, 8310; (e) Liao, L.; Liu, J.; Dreaden, E. C.; Morton, S. W.; Shopsowitz, K. E.; Hammond, P. T.; Johnson, J. A. J. Am. Chem. Soc. 2014, 136, 5896; (f) Sowers, M. A.; McCombs, J. R.; Wang, Y.; Paletta, J. T.; Morton. S. W.; Dreaden. E. C.; Boska, M. D.; Ottaviani, M. F.; Hammond, P. T.; Rajca, A.; Johnson, J. A. Nat Commun 2014, 5; (g) Mahanthappa, M. K.; Speetjens, F. W.; Wisconsin Alumni Research Foundation, USA. 2016, p 31pp.

(7) (a) Kale, T. S.; Klaikherd, A.; Popere, B.; Thayumanavan, S. Langmuir 2009, 25, 9660: (b) Cheng, C.; Yang, N.-L. Macromolecules 2010, 43, 3153; (c) Li, Y.; Themistou, E.; Zou, J.; Das, B. P.; Tsianou, M.; Cheng, C. ACS Macro Letters 2012, 1, 52; (d) Luo, H.; Santos, J. L.; Herrera-Alonso, M. Chem. Commun. 2014, 50, 536; (e) Burts, A. O. Gao, A. X.; Johnson, J. A. Macromol. Rapid Commun. 2014, 35, 168; (f) Rangadurai, P.; Molla, M. R.; Prasad. P.; Caissy, M.; Thayumanavan, S. J. Am. Chem. Soc. 2016, 138, 7508; (g) Li, H.; Miao, H.; Gao, Y.; Li, H.; Chen, D. Polymer Chemistry 2016, 7, 4476.

(8) (a) Zhao, L.; Byun, M.; Rzayev, J.; Lin, Z. Macromolecules 2009, 42, 9027; (b) Yuan, Y.-Y.; Du, Q.; Wang, Y.-C.; Wang, J. Macromolecules 2010, 43, 1739; (c) Li, Y.; Zou, J.; Das, B. P.; Tsianou, M.; Cheng, C. Macromolecules 2012, 45, 4623; (d) Li, Y.; Christian-Tabak, L.; Fuan, V. L. F.; Zou, J. Cheng, C. J. Polym. Sci., Part A; Polym. Chem. 2014, 52, 3250.

(9) (a) Bowden, N. B.; Runge, M. B.; Dutta, S.; American Chemical Society; 2005, p PMSE; (b) Theodorakis, P. E.;

Paul, W.; Binder, K. Macromolecules 2010, 43, 5137; (c) Dalsin, S. J.; Rions-Maehren, T. G.; Beam, M. D.; Bates, F. S.; Hillmyer, M. A.; Matsen, M. W. ACS Nano 2015, 9, 12233.
(10) Jung, Y. S.; Ross, C. A. Nano Lett. 2007, 7, 2046.
(11) Sinturel, C.; Bates, F. S.; Hillmyer, M. A. ACS Macro Letters 2015, 4, 1044.
(12) Jeong, J. W.; Park, W. I.; Kim, M.-J.; Ross, C. A.; Jung, Y. S. Nano Lett. 2011, 11, 4095.
(13) Rzayev, J. Macromolecules 2009, 42, 2135.
(14) (a) Bates, C. M.; Seshimo, T.; Maher, M. J.; Durand, W. J.; Cushen, J. D.; Dean, L. M.; Blachut, G.; Ellison, C. J.; Willson, C. G. Science 2012, 338, 775; (b) Cushen, J. D.; Bates, C. M.; Rausch, E. L.; Dean, L. M.; Zhou, S. X.; Willson, C. G.; Ellison, C. J. Macromolecules 2012, 45, 8722.
(15) Grason, G. M.; DiDonna. B. A.; Kamien, R. D. Phys. Rev. Lett. 2003, 91, 058304.
(16) Lee, W. B.; Elliott, R.; Mezzenga, R.; Fredrickson, G. H. Macromolecules 2009, 42, 849.
(17) Jiang, Z.; Wang, R.; Xue, G. The Journal of Physical Chemistry B 2009, 113, 7462.
(18) Rasmussen. K. Ø; Kalosakas, G. J. Polym. Sci., Part B: Polym. Phys. 2002, 40, 1777.
(19) Sides, S. W.; Fredrickson, G. H. Polymer 2003, 44, 5859.
(20) Jakubowski, W.; Min, K.; Matyjaszewski, K. Macromolecules 2006, 39, 39.
(21) Davis, K. A.; Matyjaszewski, K. Macromolecules 2000, 33, 4039.
(22) Kawamoto, K.; Zhong, M.; Wang, R.; Olsen, B. D.; Johnson, J. A. Macromolecules 2015, 48, 8980.
(23) Liu, J.; Gao, A. X.; Johnson, J. A. 2013, e50874

EQUIVALENTS AND SCOPE

In the claims, articles such as "a," "an," and "the" may mean one or more than one unless indicated to the contrary or otherwise evident from the context. Claims or descriptions that include "or" between one or more members of a group are considered satisfied if one, more than one, or all of the group members are present in, employed in, or otherwise relevant to a given product or process unless indicated to the contrary or otherwise evident from the context. The invention includes embodiments in which exactly one member of the group is present in, employed in, or otherwise relevant to a given product or process. The invention includes embodiments in which more than one, or all of the group members are present in, employed in, or otherwise relevant to a given product or process.

Furthermore, the invention encompasses all variations, combinations, and permutations in which one or more limitations, elements, clauses, and descriptive terms from one or more of the listed claims is introduced into another claim. For example, any claim that is dependent on another claim can be modified to include one or more limitations found in any other claim that is dependent on the same base claim. Where elements are presented as lists, e.g., in Markush group format, each subgroup of the elements is also disclosed, and any element(s) can be removed from the group. It should it be understood that, in general, where the invention, or aspects of the invention, is/are referred to as comprising particular elements and/or features, certain embodiments of the invention or aspects of the invention consist, or consist essentially of, such elements and/or features. For purposes of simplicity, those embodiments have not been specifically set forth in haec verba herein.

It is also noted that the terms "comprising" and "containing" are intended to be open and permits the inclusion of additional elements or steps. Where ranges are given, endpoints are included. Furthermore, unless otherwise indicated or otherwise evident from the context and understanding of one of ordinary skill in the art, values that are expressed as ranges can assume any specific value or sub-range within the stated ranges in different embodiments of the invention, to the tenth of the unit of the lower limit of the range, unless the context clearly dictates otherwise.

This application refers to various issued patents, published patent applications, journal articles, and other publications, all of which are incorporated herein by reference. If there is a conflict between any of the incorporated references and the instant specification, the specification shall control. In addition, any particular embodiment of the present invention that falls within the prior art may be explicitly excluded from any one or more of the claims. Because such embodiments are deemed to be known to one of ordinary skill in the art, they may be excluded even if the exclusion is not set forth explicitly herein. Any particular embodiment of the invention can be excluded from any claim, for any reason, whether or not related to the existence of prior art.

Those skilled in the art will recognize or be able to ascertain using no more than routine experimentation many equivalents to the specific embodiments described herein. The scope of the present embodiments described herein is not intended to be limited to the above Description, but rather is as set forth in the appended claims. Those of ordinary skill in the art will appreciate that various changes and modifications to this description may be made without departing from the spirit or scope of the present invention, as defined in the following claims.

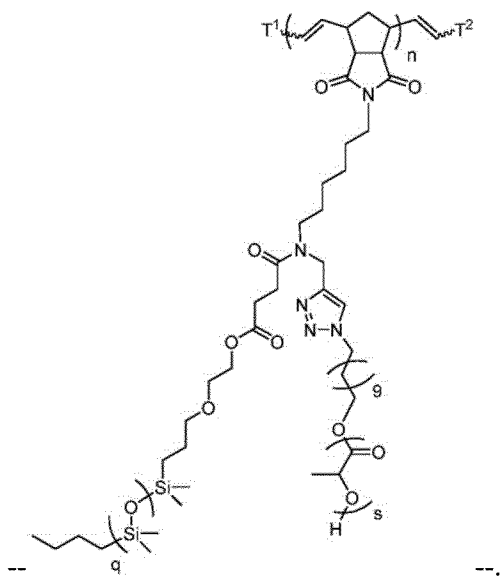

What is claimed is:

1. A bottlebrush polymer comprising a backbone of repeating units covalently linked to polymeric sidechains, wherein each repeating unit is linked to at least two different polymeric sidechains; and the polymer is capable of self-assembling into structures having a gyroid morphology.

2. The bottlebrush polymer of claim 1, wherein at least one polymeric sidechain of each repeating unit is a polysiloxane.

3. The bottlebrush polymer of claim 2, wherein the polysiloxane is of the formula:

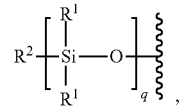

wherein:
R$^1$ is optionally substituted alkyl, optionally substituted alkenyl, optionally substituted aryl, or optionally substituted alkoxy;
R$^2$ is optionally substituted alkyl, optionally substituted alkenyl, optionally substituted aryl, or optionally substituted alkoxy; and
q is an integer between 1 and 1000, inclusive.

4. The bottlebrush polymer of claim 2, wherein the polysiloxane is polydimethylsiloxane (PDMS).

5. The bottlebrush polymer of claim 1, wherein the bottlebrush polymer is of Formula (I):

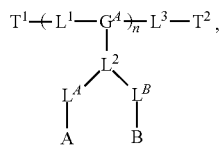

or a salt thereof, wherein:
G$^A$ is optionally substituted alkylene, optionally substituted heteroalkylene, optionally substituted carbocyclylene, optionally substituted heterocyclylene, optionally substituted arylene, optionally substituted heteroarylene, or a combination thereof;
each of L$^1$, L$^3$, L$^A$, and L$^B$ is independently a divalent linker selected from the group consisting of a bond, optionally substituted alkylene, optionally substituted heteroalkylene, optionally substituted alkenylene, optionally substituted alkynylene, optionally substituted carbocyclylene, optionally substituted heterocyclylene, optionally substituted arylene, optionally substituted heteroarylene, and combinations thereof;
L$^2$ is a trivalent linker comprising optionally substituted alkylene, optionally substituted heteroalkylene, optionally substituted alkenylene, optionally substituted alkynylene, optionally substituted carbocyclylene, optionally substituted heterocyclylene, optionally substituted arylene, optionally substituted heteroarylene, or a combination thereof;
each of T$^1$ and T$^2$ is independently a terminal group selected from the group consisting of hydrogen, halogen, optionally substituted alkyl, optionally substituted alkenyl, optionally substituted alkynyl, optionally substituted carbocyclyl, optionally substituted heterocyclyl, optionally substituted aryl, optionally substituted heteroaryl, optionally substituted acyl, optionally substituted hydroxyl, optionally substituted amino, and optionally substituted thio;
n is an integer between 1 and 4000, inclusive;
A is a polysiloxane having a number average molecular weight of about 1,000 Da to about 20,000 Da; and
B is a different polymer having a number average molecular weight of about 1,000 Da to about 20,000 Da.

6. The bottlebrush polymer of claim 5, wherein the bottlebrush polymer is of Formula (I-a):

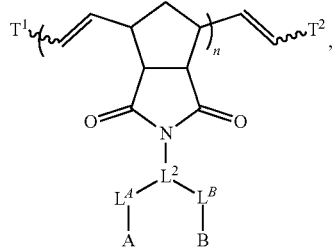

or a salt thereof.

7. The bottlebrush polymer of claim 5, wherein A is polydimethylsiloxane (PDMS).

8. The bottlebrush polymer of claim 5, wherein B is a polyether, a polyester, a polyacrylamide, a polyacrylate, or a vinyl polymer.

9. The bottlebrush polymer of claim 5, wherein B is polystyrene.

10. The bottlebrush polymer of claim 5, wherein A is polydimethylsiloxane (PDMS); and B is polystyrene.

11. The bottlebrush polymer of claim 5, wherein B is a polyacrylate.

12. The bottlebrush polymer of claim 5, wherein A is polydimethylsiloxane (PDMS); and B is poly(tert-butyl acrylate) (PtBA).

13. A self-assembled material comprising the bottlebrush polymer of claim 1.

14. A method of preparing a self-assembled material, the method comprising annealing the bottlebrush polymer of claim 1.

15. A method of preparing a bottlebrush polymer of claim 1, the method comprising forming the bottlebrush polymer via polymerization reactions.

16. The bottlebrush polymer of claim 1, wherein one polymeric sidechain of each repeating unit is a polysiloxane; and another polymeric sidechain of each repeating unit is polystyrene.

17. The bottlebrush polymer of claim 1, wherein one polymeric sidechain of each repeating unit is polydimethylsiloxane (PDMS); and another polymeric sidechain of each repeating unit is polystyrene.

18. The bottlebrush polymer of claim 17, wherein the PDMS sidechains have a molecular weight from about 4,500 Da to about 5,500 Da; and the polystyrene sidechains have a molecular weight from about 8,000 Da to about 9,500 Da.

19. The bottlebrush polymer of claim 1, wherein one polymeric sidechain of each repeating unit is a polysiloxane; and another polymeric sidechain of each repeating unit is a polyacrylate.

20. The bottlebrush polymer of claim 1, wherein one polymeric sidechain of each repeating unit is polydimethylsiloxane (PDMS); and another polymeric sidechain of each repeating unit is poly(tert-butylacrylate) (PtBA).

21. The bottlebrush polymer of claim 20, wherein the PDMS sidechains have a molecular weight from about 4,500 Da to about 5,500 Da; and the PtBA sidechains have a molecular weight from about 3,000 Da to about 4,000 Da.

22. The bottlebrush polymer of claim 1, wherein one polymeric sidechain of each repeating unit is polystyrene; and another polymeric sidechain of each repeating unit is a polyester.

23. The bottlebrush polymer of claim 1, wherein one polymeric sidechain of each repeating unit is polystyrene; and another polymeric sidechain of each repeating unit is polylactic acid (PLA).

24. The bottlebrush polymer of claim 23, wherein the polystyrene sidechains have a molecular weight from about 4,000 Da to about 5,000 Da; and wherein the PLA sidechains have a molecular weight from about 3,000 Da to about 4,000 Da.

25. The bottlebrush polymer of claim 1, wherein the bottlebrush polymer is selected from the group consisting of PS$_{8.2k}$-branch-PDMS$_{5k}$, PS$_{9.2k}$-branch-PDMS$_{5k}$, PDMS$_5$-branch-PtBA$_{3.6k}$, and PS$_{4.7k}$-branch-PLA$_{3.8k}$.

26. A bottlebrush polymer, wherein the bottlebrush polymer is of Formula (I):

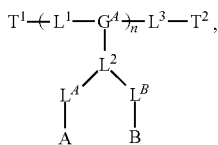

(I)

or a salt thereof, wherein:
- $G^A$ is optionally substituted alkylene, optionally substituted heteroalkylene, optionally substituted carbocyclylene, optionally substituted heterocyclylene, optionally substituted arylene, optionally substituted heteroarylene, or a combination thereof;
- each of $L^1$, $L^3$, $L^A$, and $L^B$ is independently a divalent linker selected from the group consisting of a bond, optionally substituted alkylene, optionally substituted heteroalkylene, optionally substituted alkenylene, optionally substituted alkynylene, optionally substituted carbocyclylene, optionally substituted heterocyclylene, optionally substituted arylene, optionally substituted heteroarylene, and combinations thereof;
- $L^2$ is a trivalent linker comprising optionally substituted alkylene, optionally substituted heteroalkylene, optionally substituted alkenylene, optionally substituted alkynylene, optionally substituted carbocyclylene, optionally substituted heterocyclylene, optionally substituted arylene, optionally substituted heteroarylene, or a combination thereof;
- each of $T^1$ and $T^2$ is independently a terminal group selected from the group consisting of hydrogen, halogen, optionally substituted alkyl, optionally substituted alkenyl, optionally substituted alkynyl, optionally substituted carbocyclyl, optionally substituted heterocyclyl, optionally substituted aryl, optionally substituted heteroaryl, optionally substituted acyl, optionally substituted hydroxyl, optionally substituted amino, and optionally substituted thio;
- n is an integer between 1 and 4000, inclusive;
- A is a polysiloxane having a number average molecular weight of about 1,000 Da to about 20,000 Da; and
- B is a different polymer having a number average molecular weight of about 1,000 Da to about 20,000 Da.

27. The bottlebrush polymer of claim 26, wherein the bottlebrush polymer is of Formula (I-a):

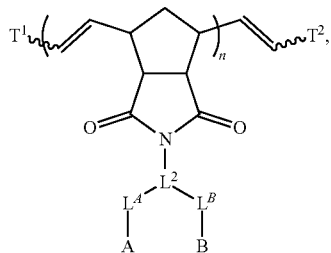

(I-a)

or a salt thereof.

28. The bottlebrush polymer of claim 26, wherein A is polydimethylsiloxane (PDMS).

29. The bottlebrush polymer of claim 26, wherein B is a polyether, a polyester, a polyacrylamide, a polyacrylate, or a vinyl polymer.

30. The bottlebrush polymer of claim 26, wherein B is polystyrene.

31. The bottlebrush polymer of claim 26, wherein A is polydimethylsiloxane (PDMS); and B is polystyrene.

32. The polymer of claim 26, wherein B is a polyacrylate.

33. The bottlebrush polymer of claim 26, wherein A is polydimethylsiloxane (PDMS); and B is poly(tert-butyl acrylate) (PtBA).

34. The polymer of claim 26, wherein B is a polyester.

35. The bottlebrush polymer of claim 26, wherein A is polydimethylsiloxane (PDMS); and B is poly(lactic acid) (PLA).

36. The bottlebrush polymer of claim 26, wherein the bottlebrush polymer is of Formula (I-c):

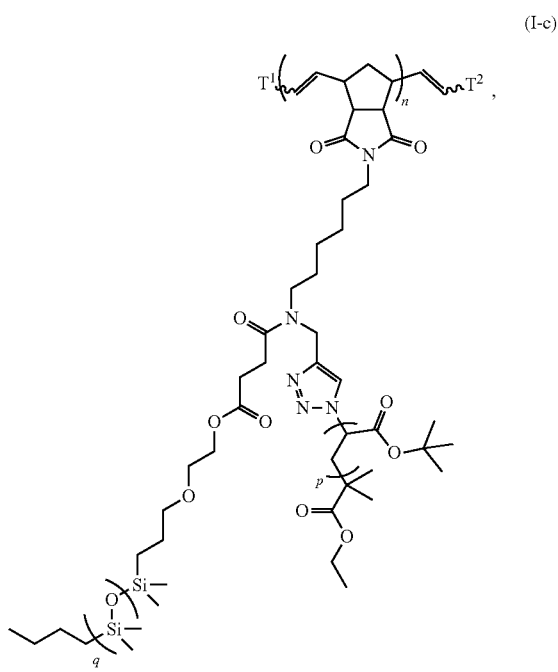

(I-c)

or a salt thereof, wherein:
- each of $T^1$ and $T^2$ is independently hydrogen or phenyl;
- n is an integer between 10 and 100, inclusive;
- p is an integer between 10 and 100, inclusive; and
- q is an integer between 25 and 260, inclusive; wherein the ratio of q:p is about 2.6:1.

37. The bottlebrush polymer of claim 26, wherein the bottlebrush polymer is of Formula (I-d):

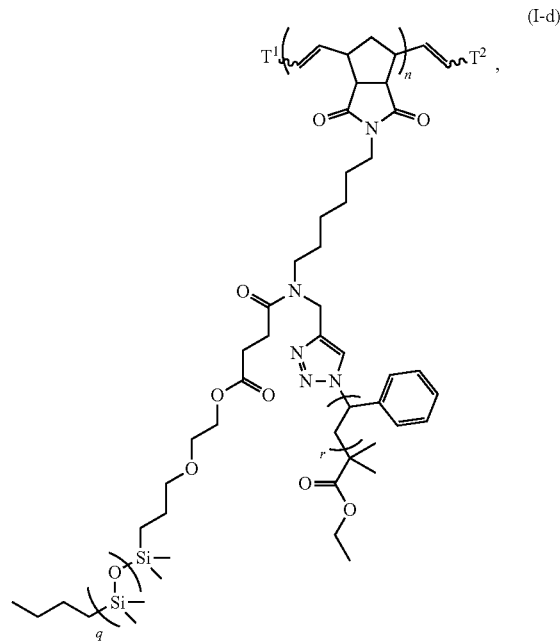

(I-d)

or a salt thereof, wherein:
each of $T^1$ and $T^2$ is independently hydrogen or phenyl;
n is an integer between 10 and 100, inclusive;
r is an integer between 20 and 200, inclusive; and
q is an integer between 20 and 200, inclusive; wherein the ratio of q:r is about 1:1.2 to about 1:1.3.

38. The bottlebrush polymer of claim 26, wherein the bottlebrush polymer of Formula (I) is of Formula (I-e):

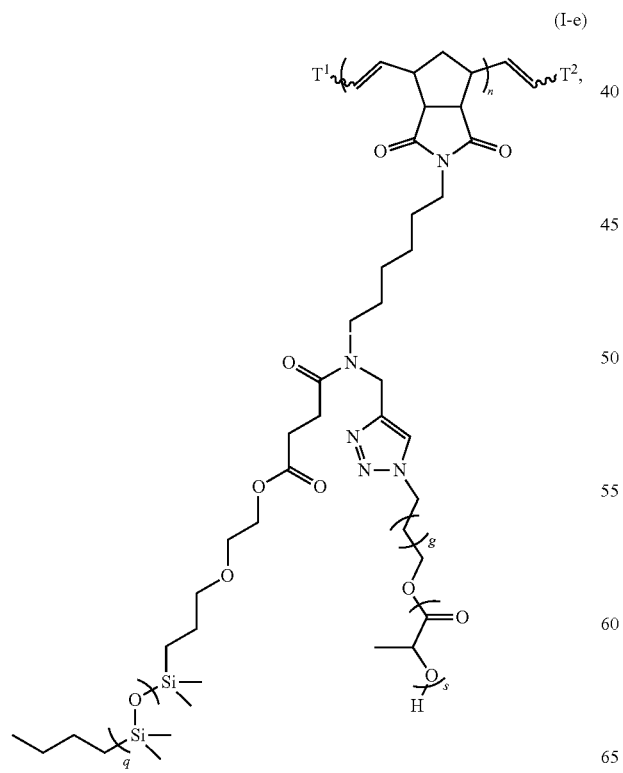

(I-e)

or a salt thereof, wherein:
each of $T^1$ and $T^2$ is independently hydrogen or phenyl;
n is an integer between 10 and 100, inclusive;
s is an integer between 20 and 200, inclusive; and
q is an integer between 20 and 200, inclusive.

39. A bottlebrush copolymer comprising a backbone of repeating units covalently linked to polymeric sidechains; wherein the bottlebrush copolymer is a diblock bottlebrush copolymer, and at least one block of the bottlebrush copolymer comprises polysiloxane sidechains linked to each repeating unit.

40. The bottlebrush copolymer of claim 39, wherein at least one block of the bottlebrush copolymer comprises at least two different polymeric sidechains linked to each repeating unit.

41. The bottlebrush copolymer of claim 40, wherein each block of the bottlebrush copolymer comprises at least two different polymeric sidechains linked to each repeating unit.

42. The copolymer of claim 39, wherein the polysiloxane sidechains are polydimethylsiloxane (PDMS).

43. The bottlebrush copolymer of claim 39, wherein the bottlebrush copolymer is of Formula (II):

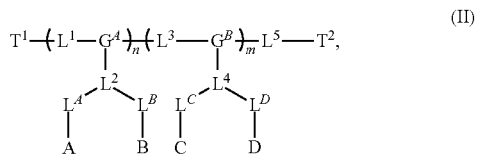

(II)

or a salt thereof, wherein:
each of $G^A$ and $G^B$ is independently optionally substituted alkylene, optionally substituted heteroalkylene, optionally substituted carbocyclylene, optionally substituted heterocyclylene, optionally substituted arylene, optionally substituted heteroarylene, or a combination thereof;
each of $L^1$, $L^3$, and $L^5$ is independently a divalent linker selected from the group consisting of a bond, optionally substituted alkylene, optionally substituted heteroalkylene, optionally substituted alkenylene, optionally substituted alkynylene, optionally substituted carbocyclylene, optionally substituted heterocyclylene, optionally substituted arylene, optionally substituted heteroarylene, and combinations thereof;
each of $L^2$ and $L^4$ is independently a trivalent linker comprising optionally substituted alkylene, optionally substituted heteroalkylene, optionally substituted alkenylene, optionally substituted alkynylene, optionally substituted carbocyclylene, optionally substituted heterocyclylene, optionally substituted arylene, optionally substituted heteroarylene, or combinations thereof;
each of $L^A$, $L^B$, $L^C$, and $L^D$ is independently a linker selected from the group consisting of a bond, optionally substituted alkylene, optionally substituted heteroalkylene, optionally substituted alkenylene, optionally substituted alkynylene, optionally substituted carbocyclylene, optionally substituted heterocyclylene, optionally substituted arylene, optionally substituted heteroarylene, and combinations thereof;
each of $T^1$ and $T^2$ is independently a terminal group selected from the group consisting of hydrogen, halogen, optionally substituted alkyl, optionally substituted alkenyl, optionally substituted alkynyl, optionally substituted carbocyclyl, optionally substituted heterocyclyl, optionally substituted aryl, optionally substituted heteroaryl, optionally substituted acyl, optionally substituted hydroxyl, optionally substituted amino, and optionally substituted thio;

n is an integer between 1 and 4000, inclusive;

m is an integer between 1 and 4000, inclusive; and each of A, B, C, and D is independently a polymer or hydrogen;

provided that one of A, B, C, and D is a polysiloxane;

provided that no two of A, B, C, or D are the same polymer type; and provided that no more than one of A, B, C, or D is hydrogen.

44. The bottlebrush copolymer of claim 43, wherein the bottlebrush copolymer is of Formula (II-a):

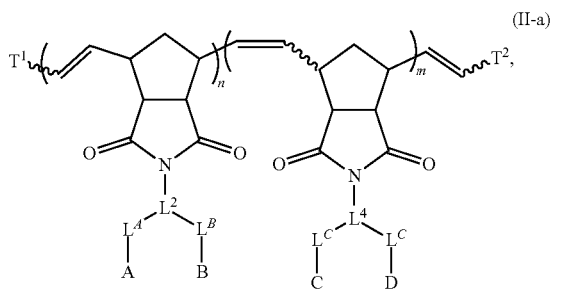

(II-a)

or a salt thereof.

45. The bottlebrush copolymer of claim 43, wherein B is polydimethylsiloxane (PDMS).

46. The bottlebrush copolymer of claim 43, wherein B is a polysiloxane; and each of A, C, and D is independently a polyether, a polyester, a polyacrylamide, a polyacrylate, or a vinyl polymer.

47. The bottlebrush copolymer of claim 43, wherein B is a polysiloxane; and each of A, C, and D is independently a polyacrylate, polyester, or polystyrene.

48. The bottlebrush copolymer of claim 43, wherein A is a poly(tert-butyl acrylate) (PtBA); B is polydimethylsiloxane (PDMS); C is poly(lactic acid) (PLA); and D is polystyrene.

49. The bottlebrush copolymer of claim 43, wherein $L^A$ is a bond; A is hydrogen; B is a polysiloxane; C is a polyester; and D is polystyrene.

50. The bottlebrush copolymer of claim 43, wherein $L^A$ is a bond; A is hydrogen; B is polydimethylsiloxane (PDMS); C is poly(lactic acid); and D is polystyrene.

51. A bottlebrush polymer, wherein the bottlebrush polymer is of Formula (I):

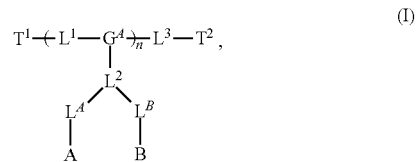

(I)

or a salt thereof, wherein:

$G^A$ is optionally substituted alkylene, optionally substituted heteroalkylene, optionally substituted carbocyclylene, optionally substituted heterocyclylene, optionally substituted arylene, optionally substituted heteroarylene, or a combination thereof;

each of $L^1$, $L^3$, $L^A$, and $L^B$ is independently a divalent linker selected from the group consisting of a bond, optionally substituted alkylene, optionally substituted heteroalkylene, optionally substituted alkenylene, optionally substituted alkynylene, optionally substituted carbocyclylene, optionally substituted heterocyclylene, optionally substituted arylene, optionally substituted heteroarylene, and combinations thereof;

$L^2$ is a trivalent linker comprising optionally substituted alkylene, optionally substituted heteroalkylene, optionally substituted alkenylene, optionally substituted alkynylene, optionally substituted carbocyclylene, optionally substituted heterocyclylene, optionally substituted arylene, optionally substituted heteroarylene, or a combination thereof;

each of $T^1$ and $T^2$ is independently a terminal group selected from the group consisting of hydrogen, halogen, optionally substituted alkyl, optionally substituted alkenyl, optionally substituted alkynyl, optionally substituted carbocyclyl, optionally substituted heterocyclyl, optionally substituted aryl, optionally substituted heteroaryl, optionally substituted acyl, optionally substituted hydroxyl, optionally substituted amino, and optionally substituted thio;

n is an integer between 1 and 4000, inclusive;

A is a polymer having a number average molecular weight of about 1,000 Da to about 20,000 Da; and B is a different polymer having a number average molecular weight of about 1,000 Da to about 20,000 Da;

wherein the bottlebrush polymer has a gyroid morphology.

* * * * *

UNITED STATES PATENT AND TRADEMARK OFFICE
CERTIFICATE OF CORRECTION

PATENT NO. : 10,961,338 B2
APPLICATION NO. : 16/080503
DATED : March 30, 2021
INVENTOR(S) : Jeremiah A. Johnson et al.

Page 1 of 2

It is certified that error appears in the above-identified patent and that said Letters Patent is hereby corrected as shown below:

In the Claims

In Claim 25, at Column 158, Line 63, the text:
"$PDMS_5$-"
Should be replaced with the text:
--$PDMS_{5k}$- --.

In Claim 38, at Column 161, Lines 39-65, formula:

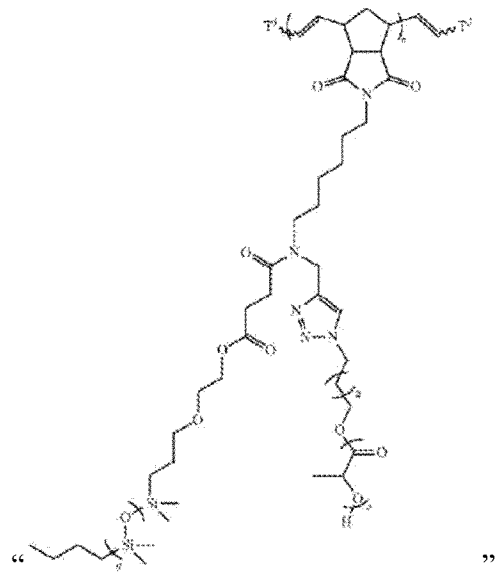

Should be replaced with the formula:

Signed and Sealed this
Eighth Day of June, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,961,338 B2

Page 2 of 2